US005853772A

United States Patent [19]

Kudert et al.

[11] Patent Number: 5,853,772

[45] Date of Patent: *Dec. 29, 1998

[54] METHODS AND APPARATUS FOR INJECTION MOLDING AND INJECTION BLOW MOLDING MULTI-LAYER ARTICLES, AND THE ARTICLES MADE THEREBY

[75] Inventors: Frederick G. Kudert, Niles; Maurice G. Latreille, Batavia; Robert J. McHenry, St. Charles; George F. Nahill, Crystal Lake, all of Ill.; Henry Pfutzenreuter, III, Alta Loma, Calif.; William A. Tennant, Schaumburg, Ill.; Thomas T. Tung, Hoffman Estates, Ill.; John Vella, Jr., Aurora, Ill.

[73] Assignee: American National Can Company, Chicago, Ill.

[ * ] Notice: The term of this patent shall not extend beyond the expiration date of Pat. No. 4,712,990.

[21] Appl. No.: 657,622

[22] Filed: May 29, 1996

Related U.S. Application Data

[63] Continuation of Ser. No. 341,700, Nov. 18, 1994, Pat. No. 5,523,045, which is a continuation of Ser. No. 740,749, Aug. 5, 1991, abandoned, which is a continuation of Ser. No. 563,169, Aug. 3, 1990, Pat. No. 5,037,285, which is a continuation of Ser. No. 397,348, Aug. 22, 1989, Pat. No. 4,946,365, which is a continuation of Ser. No. 283,000, Dec. 2, 1988, abandoned, which is a continuation of Ser. No. 909,941, Sep. 19, 1986, abandoned, which is a division of Ser. No. 484,707, Apr. 13, 1983, Pat. No. 4,712,990.

[51] Int. Cl.[6] ........ B29C 45/22

[52] U.S. Cl. ........ 425/130; 425/145

[58] Field of Search ........ 264/513, 241, 264/297.2, 328.8, 40.1, 45.1, 245, 255; 425/130, 131.1, 132, 133.1, 564, 524, 570, 572, 573, 568, 145, 533, DIG. 224, DIG. 225

[56] References Cited

U.S. PATENT DOCUMENTS 368,266 8/1887 Wright ........ 239/416
T904,007 11/1972 Garner ........ 264/45.1
T922,007 5/1974 Smith ........ 264/55

(List continued on next page.)

FOREIGN PATENT DOCUMENTS 0034158 10/1985 European Pat. Off. .
1106628 12/1955 France .
1290262 3/1962 France .
2522582 9/1983 France .

(List continued on next page.)

OTHER PUBLICATIONS

"Coextrusion—Blow Molding for Gas Tanks and Industrial Parts", *Modern Plastics*, pp. 70–73 (Mar. 1977).
"Injection Blow Molding", *Plastics World*, pp. 30–32 (May 19, 1975).
"Japanese Blow Molding Process", European Plastics News, p. 26 (Mar. 1975).

(List continued on next page.)

*Primary Examiner*—Tim Heitbrink
*Attorney, Agent, or Firm*—McDermott, Will & Emery

[57] ABSTRACT

An injection molding machine for simultaneously injection molding a plurality of articles each made of plural polymeric materials. The injection molding machine includes a source of a first polymeric material and a source of a second polymeric material. The injection molding machine also includes a plurality of co-injection nozz;es, each of the nozzles has na associated injection cavity mold. Each of the nozzles also has a first flow channel for providing a stream of said first polymeric material to said mold and a second flow channel for providing a stream of said second polymeric material to said mold. The machine further includes a flow control device for feeding the polymeric materials from their sources to each of the nozzles and each of the associated molds, such that each of the streams of the first polymeric materials flows from each nozzle into each associated mold simultaneously and each of the streams of the second polymeric materials flows from each nozzle into each associated mold simultaneously.

21 Claims, 116 Drawing Sheets

U.S. PATENT DOCUMENTS

| | | | |
|---|---|---|---|
| 2,418,856 | 4/1947 | Stacy | 264/328.8 |
| 2,470,089 | 5/1949 | Booth | 264/245 |
| 2,627,087 | 2/1953 | Hendry | 264/40.1 |
| 2,672,653 | 3/1954 | Simpkins et al. | 425/570 |
| 2,710,987 | 6/1955 | Sherman | 264/513 |
| 2,770,011 | 11/1956 | Kelly | 264/328.8 |
| 2,770,022 | 11/1956 | Brennan | 22/200.1 |
| 2,781,551 | 2/1957 | Richerod | 264/512 |
| 2,805,787 | 9/1957 | Sherman | 264/266 |
| 2,828,507 | 4/1958 | Strauss | 425/133.1 |
| 2,865,050 | 12/1958 | Strauss | 425/564 |
| 2,910,248 | 10/1959 | Keuter et al. | 239/415 |
| 2,924,391 | 2/1960 | Simmons | 239/551 |
| 2,996,764 | 8/1961 | Ross et al. | 264/279.1 |
| 2,996,765 | 8/1961 | Nelsson | 52/145 |
| 3,013,308 | 12/1961 | Armour | 425/570 |
| 3,016,579 | 1/1962 | Schlitzkus | 264/247 |
| 3,023,461 | 3/1962 | Sherman | 264/515 |
| 3,082,484 | 3/1963 | Sherman | 156/221 |
| 3,090,994 | 5/1963 | Stenger | 425/133.1 |
| 3,103,036 | 9/1963 | Nave et al. | 264/515 |
| 3,127,247 | 3/1964 | Weinke . | |
| 3,173,175 | 3/1965 | Lemelson | 425/156 |
| 3,247,550 | 4/1966 | Haines | 425/123 |
| 3,252,184 | 5/1966 | Ninneman | 425/570 |
| 3,281,899 | 11/1966 | Dacco | 264/328.12 |
| 3,288,903 | 11/1966 | Hendry | 264/329 |
| 3,296,353 | 1/1967 | Nouel | 264/328.8 |
| 3,322,869 | 5/1967 | Scott | 264/515 |
| 3,339,240 | 9/1967 | Corbett | 425/130 |
| 3,353,209 | 11/1967 | Schad | 425/133.1 |
| 3,409,710 | 11/1968 | Klygis | 264/515 |
| 3,417,433 | 12/1968 | Teraoka . | |
| 3,436,446 | 4/1969 | Angell, Jr. | 264/51 |
| 3,447,755 | 6/1969 | Cartwright | 239/551 |
| 3,457,337 | 7/1969 | Turner | 264/515 |
| 3,493,997 | 2/1970 | Albert et al. | 18/14 |
| 3,531,553 | 9/1970 | Bodkins | 264/46.6 |
| 3,533,594 | 10/1970 | Segmuller | 249/107 |
| 3,535,742 | 10/1970 | Marcus | 264/328.8 |
| 3,553,788 | 1/1971 | Putkowski | 425/133.1 |
| 3,561,062 | 2/1971 | Goron | 425/564 |
| 3,561,629 | 2/1971 | Turner | 215/1 |
| 3,571,856 | 3/1971 | Voelker | 425/562 |
| 3,599,290 | 8/1971 | Garner | 264/245 |
| 3,600,487 | 8/1971 | Zavasnik | 264/515 |
| 3,616,495 | 11/1971 | Lemelson | 425/155 |
| 3,635,624 | 1/1972 | Nakakoshi | 425/133 |
| 3,642,403 | 2/1972 | Havlik | 425/563 |
| 3,661,679 | 5/1972 | Law | 239/417.3 |
| 3,690,797 | 9/1972 | Garner | 425/146 |
| 3,694,529 | 9/1972 | Josephsen . | |
| 3,716,612 | 2/1973 | Schrenk et al. | 264/310 |
| 3,717,544 | 2/1973 | Valyi | 264/511 |
| 3,737,263 | 6/1973 | Schrenk | 425/131.1 |
| 3,751,534 | 8/1973 | Oxley | 264/45.2 |
| 3,751,544 | 8/1973 | Smorenburg | 264/157 |
| 3,767,339 | 10/1973 | Hunkar | 425/145 |
| 3,767,742 | 10/1973 | Robin | 264/45.2 |
| 3,768,940 | 10/1973 | Valyi | 425/112 |
| 3,779,680 | 12/1973 | Manceau | 425/145 |
| 3,785,116 | 1/1974 | Munz et al. | 425/242 B |
| 3,793,410 | 2/1974 | Garner | 264/45.1 |
| 3,801,254 | 4/1974 | Gotner | 425/380 |
| 3,801,684 | 4/1974 | Schrewe et al. | 264/40.7 |
| 3,807,914 | 4/1974 | Paulson et al. | 425/144 |
| 3,809,733 | 5/1974 | Sandiford et al. | 264/255 |
| 3,816,580 | 6/1974 | Valyi | 264/97 |
| 3,819,792 | 6/1974 | Ono et al. | 264/515 |
| 3,820,928 | 6/1974 | Lemelson | 425/146 |
| 3,822,867 | 7/1974 | Evans | 425/133.1 |
| 3,825,637 | 7/1974 | Robin | 264/55 |
| 3,851,030 | 11/1974 | Valyi | 264/513 |
| 3,857,658 | 12/1974 | Muzsnay | 425/145 |
| 3,857,754 | 12/1974 | Hirata et al. | 264/176 B |
| 3,865,914 | 2/1975 | Nahr | 264/261 |
| 3,865,915 | 2/1975 | Garner | 264/55 |
| 3,868,202 | 2/1975 | Valyi | 425/242 B |
| 3,869,056 | 3/1975 | Valyi | 215/1 C |
| 3,870,448 | 3/1975 | Majors et al. | 425/441 |
| 3,873,656 | 3/1975 | Garner | 249/142 |
| 3,878,282 | 4/1975 | Bonis et al. | 264/255 |
| 3,882,259 | 5/1975 | Nohara | 428/516 |
| 3,892,828 | 7/1975 | Weatherly | 425/806 |
| 3,894,823 | 7/1975 | Hanning | 425/817 R |
| 3,901,958 | 8/1975 | Doll | 425/133 |
| 3,921,856 | 11/1975 | Lengecker | 425/130 |
| 3,929,954 | 12/1975 | Valyi | 425/125 |
| 3,933,312 | 1/1976 | Fries | 425/564 |
| 3,939,239 | 2/1976 | Valyi | 264/511 |
| 3,943,219 | 3/1976 | Aoki | 425/242 B |
| 3,947,172 | 3/1976 | Myers | 425/113 |
| 3,947,173 | 3/1976 | Dougherty | 425/113 |
| 3,947,175 | 3/1976 | Melcher | 425/543 X |
| 3,947,176 | 3/1976 | Rainville | 425/130 |
| 3,947,177 | 3/1976 | Eckardt | 425/130 |
| 3,950,483 | 4/1976 | Spier | 264/245 |
| 3,962,396 | 6/1976 | Ono et al. | 264/173 |
| 3,966,378 | 6/1976 | Valyi | 425/242 B |
| 3,970,419 | 7/1976 | Valyi | 425/404 |
| 3,972,664 | 8/1976 | Fillman | 425/130 |
| 3,973,892 | 8/1976 | Rees | 425/250 |
| 3,976,226 | 8/1976 | Monnet | 222/135 |
| 3,978,232 | 8/1976 | Dodsworth | 215/1 C |
| 3,994,649 | 11/1976 | Valyi | 425/242 B |
| 3,999,915 | 12/1976 | Stepenske | 425/126 R |
| 4,004,868 | 1/1977 | Ohdate | 425/130 |
| 4,013,748 | 3/1977 | Valyi | 214/513 |
| 4,014,966 | 3/1977 | Hanning | 264/255 |
| 4,029,454 | 6/1977 | Monnet | 425/4 |
| 4,029,841 | 6/1977 | Schmidt | 425/441 |
| 4,030,637 | 6/1977 | Boden et al. | 22/137 |
| 4,035,466 | 7/1977 | Langecker | 264/255 |
| 4,040,233 | 8/1977 | Valyi | 425/535 |
| 4,047,868 | 9/1977 | Kudo et al. | 425/391 |
| 4,047,873 | 9/1977 | Farrell | 425/523 |
| 4,047,874 | 9/1977 | Valyi | 425/523 |
| 4,048,361 | 9/1977 | Valyi | 425/133.1 |
| 4,052,497 | 10/1977 | Monnet | 264/255 |
| 4,067,944 | 1/1978 | Valyi | 425/523 |
| 4,070,142 | 1/1978 | Farrell | 425/145 |
| 4,078,875 | 3/1978 | Eckhardt | 425/564 X |
| 4,079,850 | 3/1978 | Suzuki et al. | 428/35 |
| 4,083,903 | 4/1978 | Gilbert et al. | 264/40.3 |
| 4,093,121 | 6/1978 | Strom | 239/117 |
| 4,095,931 | 6/1978 | Reitan | 425/564 |
| 4,105,391 | 8/1978 | Aoki | 425/526 |
| 4,107,362 | 8/1978 | Valyi | 425/133.1 |
| 4,111,635 | 9/1978 | Rainville | 425/533 |
| 4,117,955 | 10/1978 | Sokolow | 425/130 X |
| 4,120,922 | 10/1978 | Lemelson | 264/40.7 |
| 4,144,013 | 3/1979 | Simmons | 264/513 |
| 4,149,839 | 4/1979 | Iwawaki | 425/133.1 |
| 4,150,074 | 4/1979 | Tilgner | 264/40.7 |
| 4,173,448 | 11/1979 | Rees et al. | 425/564 |
| 4,174,413 | 11/1979 | Yasuike et al. | 428/35 |
| 4,174,783 | 11/1979 | Abe et al. | 425/133.1 |
| 4,179,251 | 12/1979 | Hess et al. | 425/140 |
| 4,182,601 | 1/1980 | Hill | 425/97 |
| 4,210,616 | 7/1980 | Eckardt et al. | 425/133.1 |
| 4,212,627 | 7/1980 | Gellert | 425/564 |
| 4,242,073 | 12/1980 | Tsuchiya | 425/570 |

| | | | |
|---|---|---|---|
| 4,255,490 | 3/1981 | Katsura | 428/515 |
| 4,261,473 | 4/1981 | Yamada et al. | 215/1 C |
| 4,276,014 | 6/1981 | Aoki | 425/547 |
| 4,276,015 | 6/1981 | Rogers | 425/571 |
| 4,279,582 | 7/1981 | Osuna-Diaz | 425/159 |
| 4,280,629 | 7/1981 | Slaughter | 215/1 |
| 4,298,332 | 11/1981 | Aoki | 425/570 |
| 4,315,724 | 2/1982 | Taoka | 425/130 |
| 4,376,625 | 3/1983 | Eckhardt | 425/132 X |
| 4,378,963 | 4/1983 | Schouenberg | 425/564 |
| 4,398,642 | 8/1983 | Okudaira et al. | 215/1 |
| 4,403,706 | 9/1983 | Mahajan | 215/1 C |
| 4,403,934 | 9/1983 | Rusmussen | 425/192 |
| 4,405,547 | 9/1983 | Koch et al. | 264/171 |
| 4,412,807 | 11/1983 | York | 425/564 |
| 4,437,825 | 3/1984 | Harry et al. | 425/145 |
| 4,449,913 | 5/1984 | Krishnakumar et al. | 425/548 |
| 4,470,936 | 9/1984 | Potter | 264/255 |
| 4,496,064 | 1/1985 | Beck et al. | 215/1 C |
| 4,501,781 | 2/1985 | Kushida et al. | 428/35 |
| 4,518,344 | 5/1985 | Latreille et al. | 425/570 |
| 4,525,134 | 6/1985 | McHenry et al. | 425/130 |
| 4,526,821 | 7/1985 | McHenry et al. | 428/35 |
| 4,535,901 | 8/1985 | Okudaira et al. | 425/133.1 |
| 4,550,043 | 10/1985 | Beck | 428/36 |
| 4,567,090 | 1/1986 | Ohya et al. | 428/214 |
| 4,568,261 | 2/1986 | McHenry | 425/145 |
| 4,576,843 | 3/1986 | Beck et al. | 428/35 |
| 4,592,711 | 6/1986 | Capy | 425/144 |
| 4,601,869 | 7/1986 | Harry et al. | 264/523 |
| 4,609,341 | 9/1986 | Muller | 425/547 |
| 4,609,516 | 9/1986 | Krishnakumar | 264/255 |
| 4,635,852 | 1/1987 | Muhlnickel | 137/625.4 |
| 4,669,971 | 6/1987 | Gellert | 425/549 |
| 4,712,990 | 12/1987 | Kudert et al. | 425/523 |
| 4,734,243 | 3/1988 | Kohama et al. | 264/328.8 |
| 4,980,211 | 12/1990 | Kushida et al. | 428/36.7 |

FOREIGN PATENT DOCUMENTS

| | | |
|---|---|---|
| 1177326 | 9/1964 | Germany . |
| 1950212 | 4/1971 | Germany . |
| 2115269 | 10/1972 | Germany . |
| 2401168 | 7/1974 | Germany . |
| 2733913 | 2/1978 | Germany . |
| 2744058 | 4/1979 | Germany . |
| 2821257 | 4/1979 | Germany . |
| 3036064 | 5/1982 | Germany . |
| 3201986 | 9/1982 | Germany . |
| 3220970 | 8/1983 | Germany . |
| 3306714 | 9/1983 | Germany . |
| 522838 | 4/1955 | Italy . |
| 45-39190 | 10/1970 | Japan . |
| 45-40435 | 12/1970 | Japan . |
| 46-19709 | 2/1971 | Japan . |
| 46-29980 | 8/1971 | Japan . |
| 48-7048 | 1/1973 | Japan . |
| 4836255 | 5/1973 | Japan . |
| 47-1120 | 2/1974 | Japan . |
| 49-21424 | 2/1974 | Japan . |
| 135175 | 4/1974 | Japan . |
| 50-55676 | 5/1975 | Japan . |
| 52-10101 | 7/1975 | Japan . |
| 135174 | 10/1975 | Japan . |
| 151996 | 12/1975 | Japan . |
| 151997 | 12/1975 | Japan . |
| 158698 | 12/1975 | Japan . |
| 51-2773 | 1/1976 | Japan . |
| 158680 | 5/1976 | Japan . |
| 56885 | 5/1976 | Japan . |
| 5179173 | 7/1976 | Japan . |
| 51-109952 | 9/1976 | Japan . |
| 51-147555 | 12/1976 | Japan . |
| 51-92279 | 12/1976 | Japan . |
| 52-23160 | 2/1977 | Japan . |
| 53-140658 | 4/1977 | Japan . |
| 52-72762 | 6/1977 | Japan . |
| 52-73966 | 6/1977 | Japan . |
| 53-13726 | 4/1978 | Japan . |
| 53-56258 | 5/1978 | Japan . |
| 0066984 | 6/1978 | Japan . |
| 53-65350 | 6/1978 | Japan . |
| 53-66984 | 6/1978 | Japan . |
| 124590 | 10/1978 | Japan . |
| 53-134062 | 11/1978 | Japan . |
| 66964 | 5/1979 | Japan . |
| 55-27212 | 2/1980 | Japan . |
| 55-4484 | 3/1980 | Japan . |
| 79232 | 6/1980 | Japan . |
| 163519 | of 1981 | Japan . |
| 106838 | 8/1981 | Japan . |
| 56-106838 | 8/1981 | Japan . |
| 0187513 | 9/1985 | Japan . |
| 1023639 | 3/1966 | United Kingdom . |
| 1317116 | 5/1973 | United Kingdom . |
| 1329257 | 9/1973 | United Kingdom . |
| 1362133 | 7/1974 | United Kingdom . |
| 1437543 | 5/1976 | United Kingdom . |
| 1440770 | 6/1976 | United Kingdom . |
| 1445907 | 8/1976 | United Kingdom . |
| 1510115 | 5/1978 | United Kingdom . |
| 1510116 | 5/1978 | United Kingdom . |
| 2066108 | 5/1979 | United Kingdom . |
| 2070507 | 9/1981 | United Kingdom . |
| 2091629 | 8/1982 | United Kingdom . |
| 8100230 | 2/1981 | WIPO . |
| 8100231 | 2/1981 | WIPO . |
| 8102407 | 9/1981 | WIPO . |

OTHER PUBLICATIONS

"Multicomponent Injection Molding", *Plastics Machinery and Equipment*, pp. 16–23 (Jan. 1978).
"Plastic Cans Poised to Challenge Glass and Metal Food Containers", Technology, pp. 20–21 (Feb. 27, 1984).
"Foam Profiles", *Plastics Machinery and Equipment*, pp. 11–15 (Nov. 1977).
"Battenfeld Success in Multi Component Structural Moulding Technology", *European Plastics News*, p. 29, etc. (May 1977).
"Coinjection Molding", Modern Plastics Encyclopedia, pp. 316–318 (1977–1978).
"Multicomponent Injection Molding", Modern Plastics, pp. 68–69 (Apr. 1977).
"The Two–Component Foam (TCF) Process", Journal of Cellular Plastics, pp. 277–283 (Sep./Oct. 1976).
"Coinjection: New Molding Technology", Modern Plastics, pp. 40–42 (Jul. 1976).
"Finding the Way to a Smooth Surface in Structural Foam", Plastics Engineering, pp. 26–30 (May 1976).
"An Experimental Study of Sandwich Inspection Molding", Polymer Engineering and Science, vol. 15, No. 7, pp. 481–485 (Jul. 1975).
"Billion Demonstrates Sandwich Molder", European Plastics News, p. 4 (Jun. 1974).
"Flow Visualization for Injection Molding", Polymer Engineering and Science, vol. 14, No. 3, pp. 212–221 (Mar. 1974).
"Two–Component Injection Molding Machine", Plastics Machinery & Equipment, p. 11 (Feb. 1974).
"Serving Up a New Plastic Sandwich", SPE Journal, vol. 27, pp. 38–42 (Sep. 1971).

"Injection Molding of Plastic Foams", Plastics Design and Processing, pp. 18–20 (Feb. 1971).
"The Shape of Plastics Processing", Plastics Design & Processing, pp. 12–16 (Dec. 1970).
"New Technique Permits Injection Molding Sandwich Structure", Process Engineering News, p. 13 (Nov. 1970).
"Stratified Two–Phase Flow of Molten Polymers", Polymer Engineering and Science, vol. 17, No. 9, pp. 671–681 (Sep. 1977).
"Co–Extrusion", Plastics Technology, pp. 61–71 (Feb. 1977).
"Co–Extrusion", Plastics Technology, pp. 45–49 (Feb. 1976).
"Multilayer Film From a Single Die", Plastics Engineering, pp. 65–68 (Mar. 1974).
Fundamentals of Polymer Processing, Stanley Middleman, pp. 120–121 (1977).
"New Developments in Multicomponent Injection Molding", Plastics Machinery and Equipment, pp. 54–55 (Sep. 1979).
"Multi–Component Molding Goes for Commodity Markets", EP&R, pp. 20–22 (Jan. 1981).
"Multilayer Blow Molding Techniques Using Ring Piston Accumulator", Iwawaki, Kijima, Shitara (Date unknown).

FIG.3
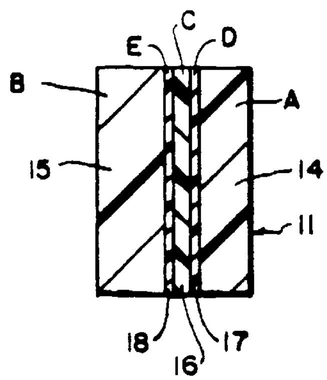
FIG.4
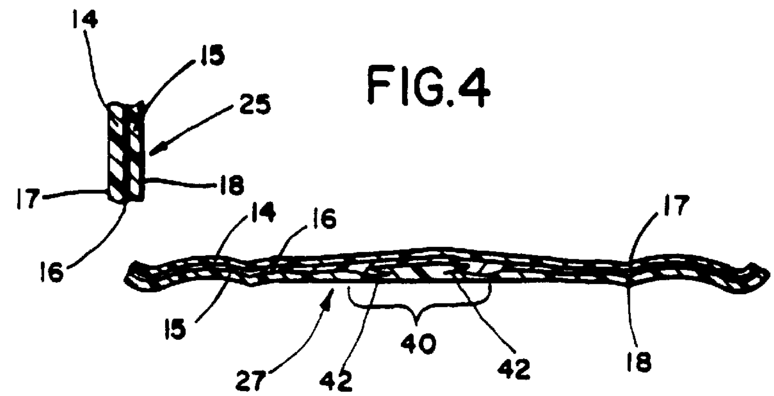
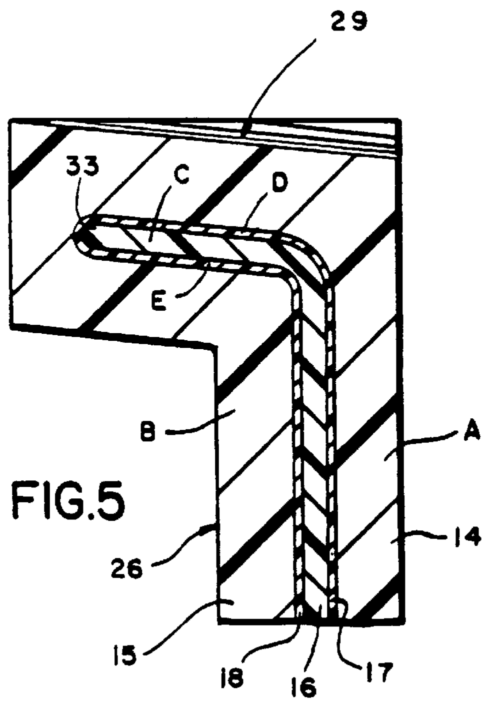
FIG.5

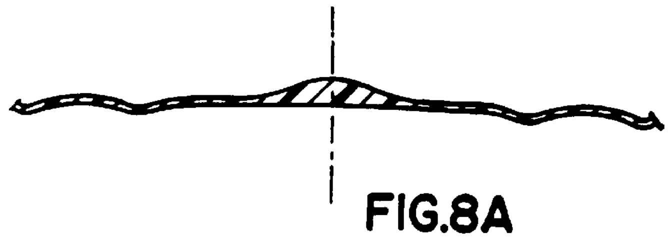
FIG.8A
FIG.9
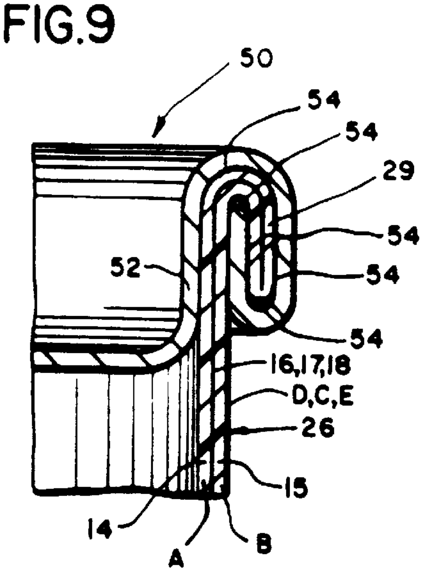
FIG.9A
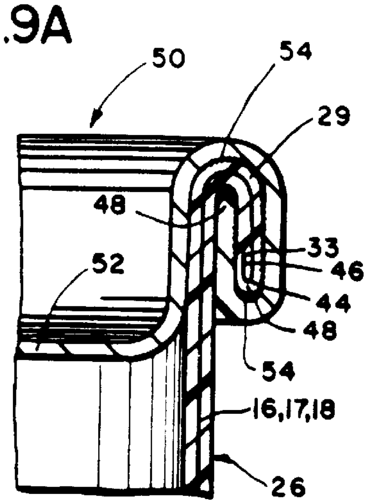
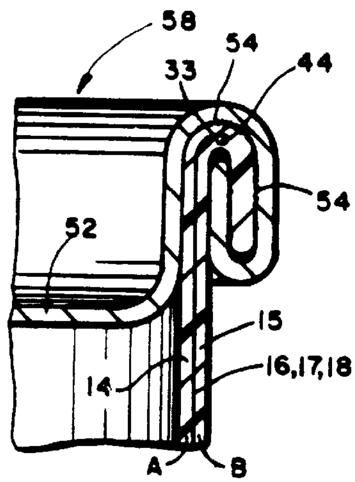
FIG.9C

FIG.9B
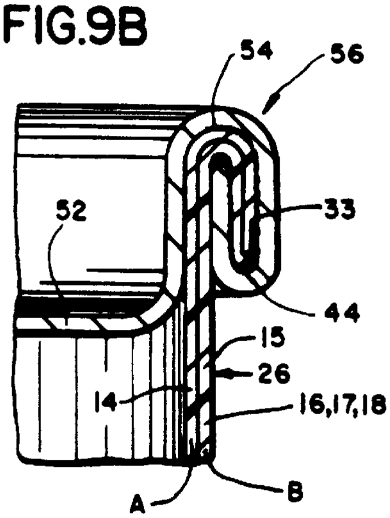
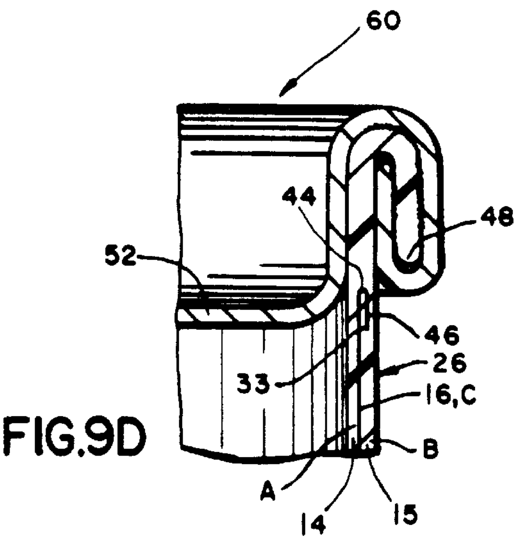
FIG.9D
FIG.10
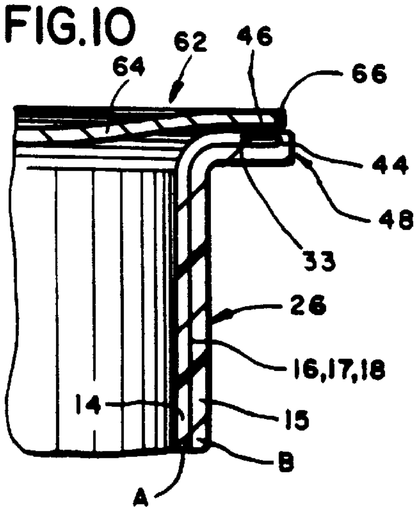
FIG.10A
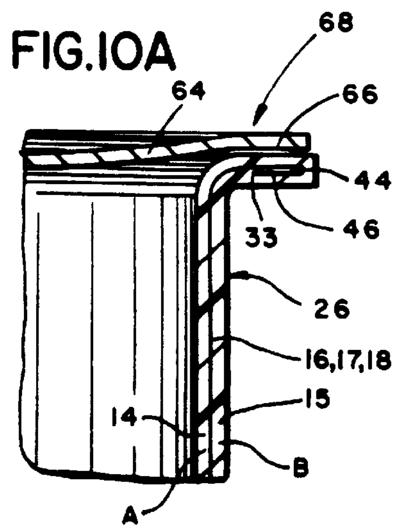

FIG.15
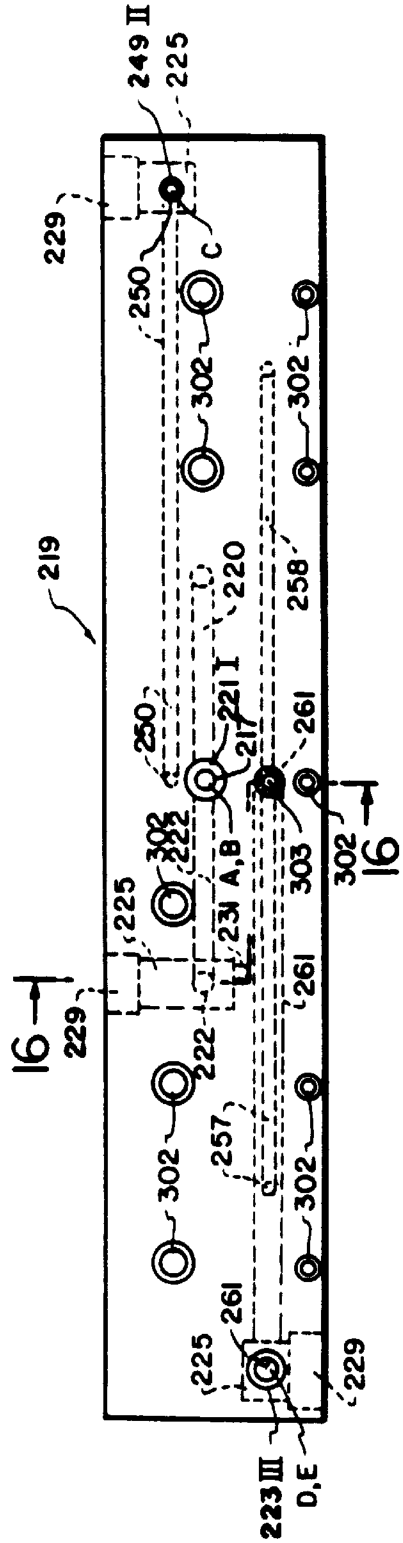
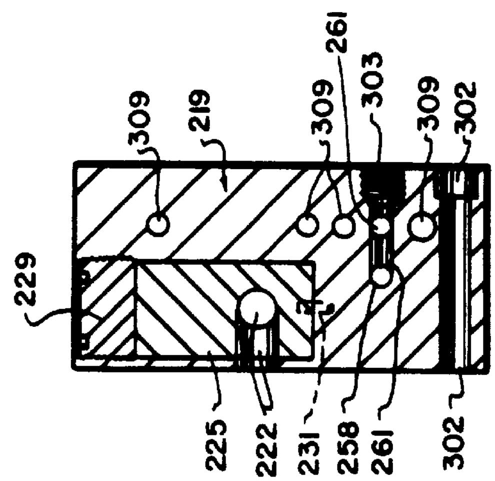
FIG.16

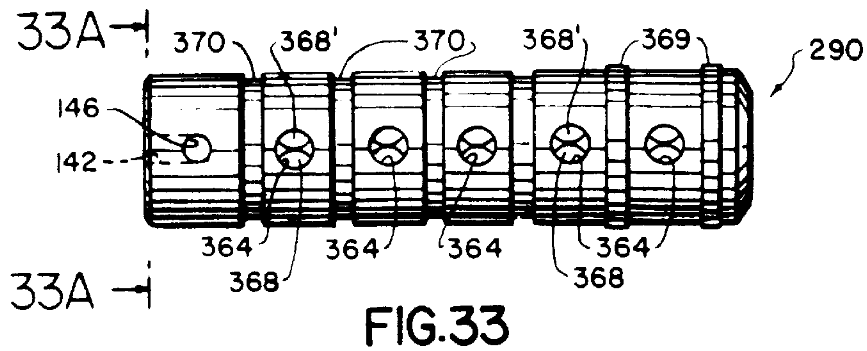
FIG.33
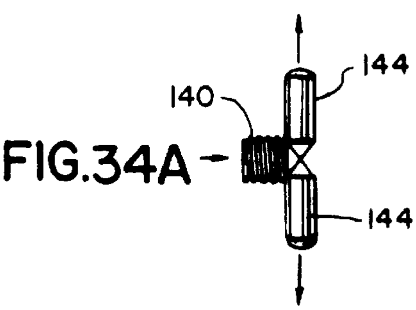
FIG.34A
FIG.34
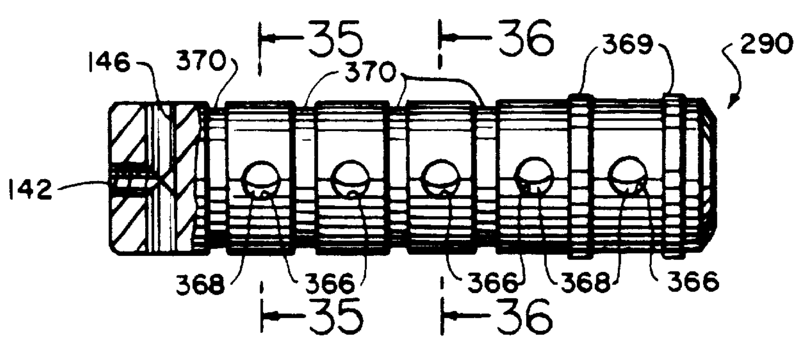

FIG.37
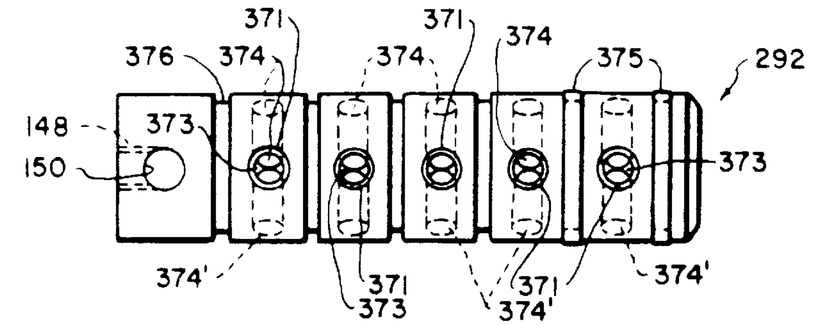
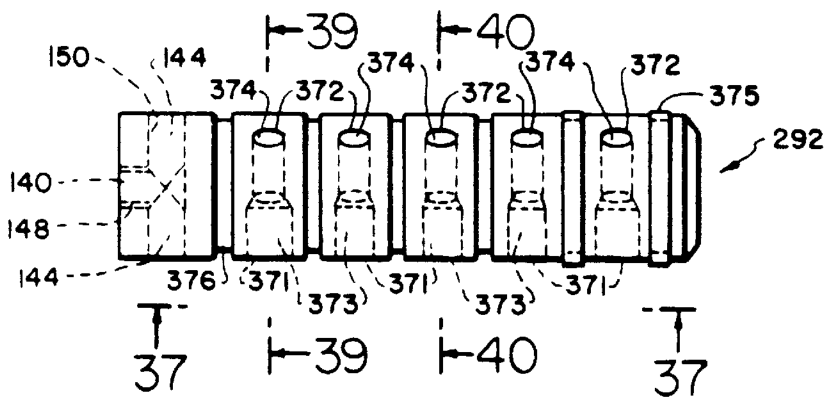
FIG.38
FIG.39
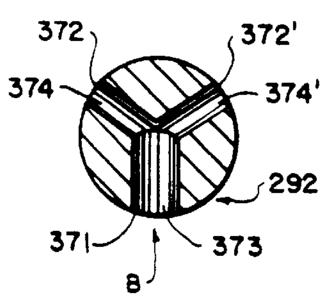
FIG.40
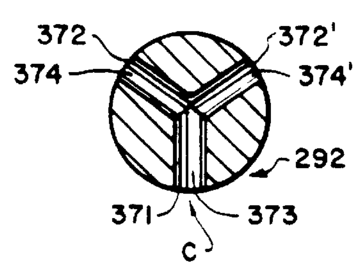

FIG.57
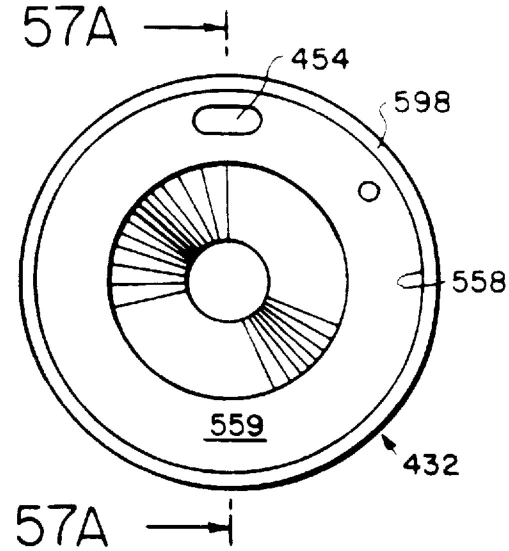
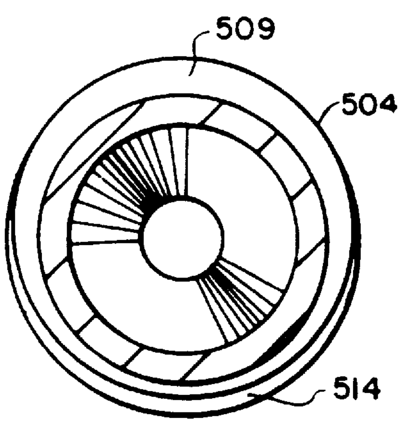
FIG.56

FIG.62
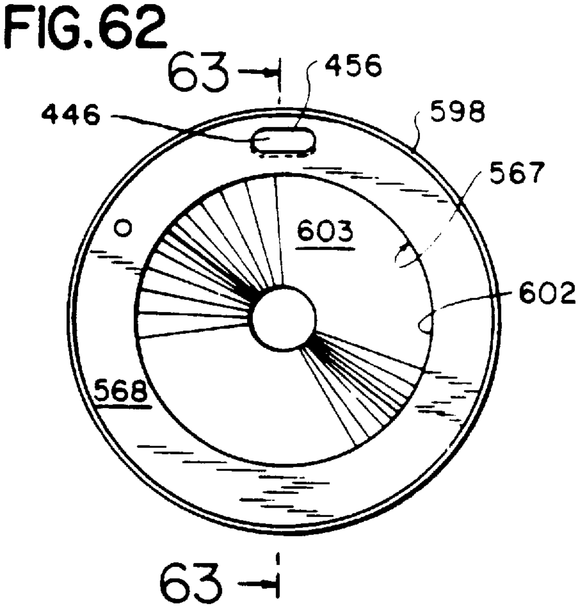
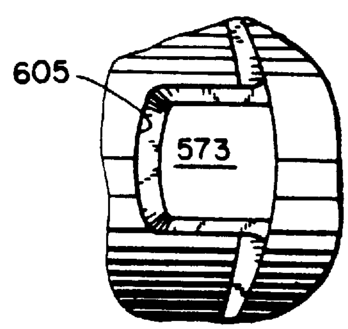
FIG.64

FIG.71
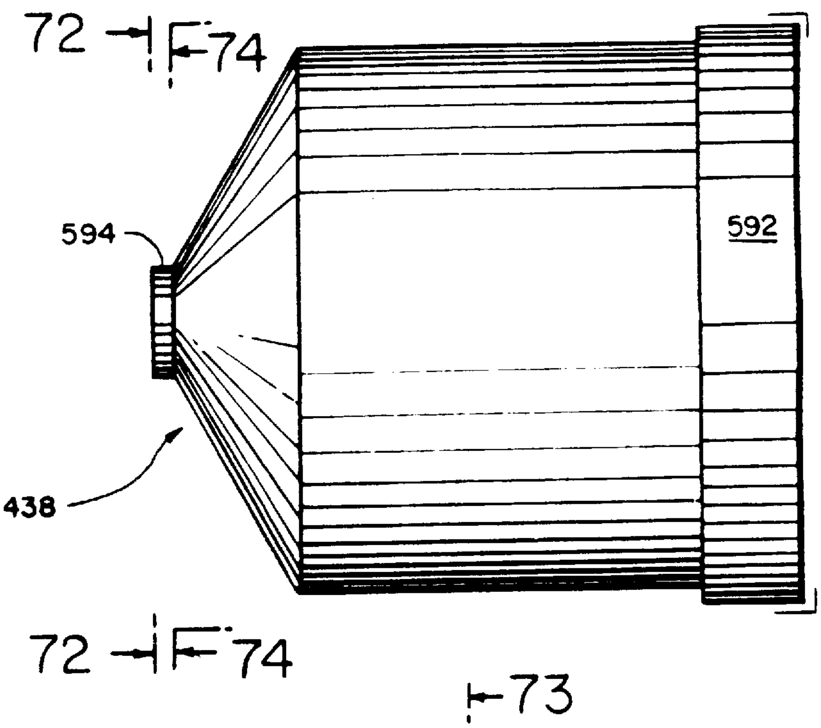
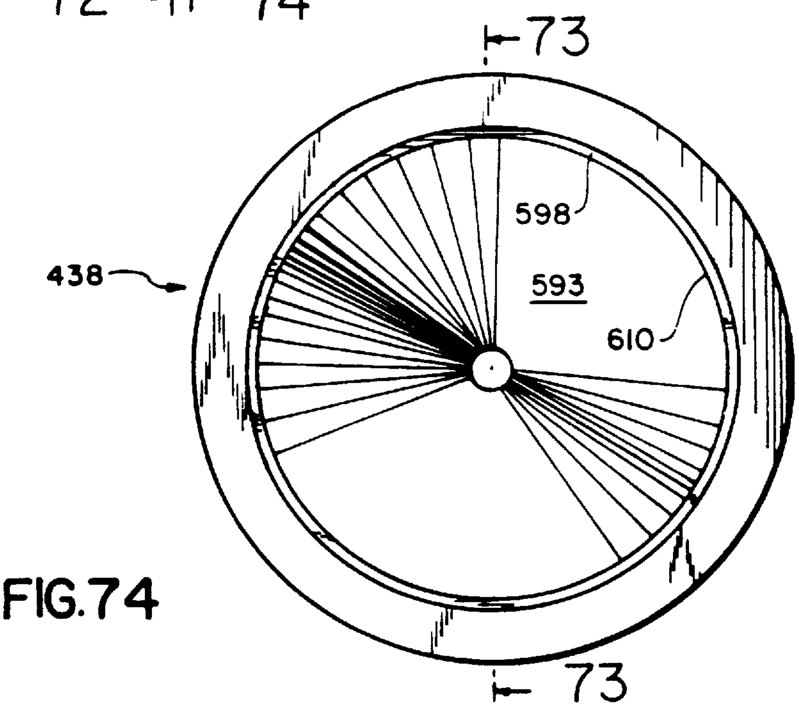
FIG.74

834
836
837
837
840
838

844
846
842
83
83
84
84

844
846
846

844
846
842
846

FIG.85A
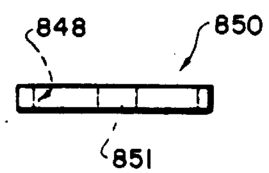
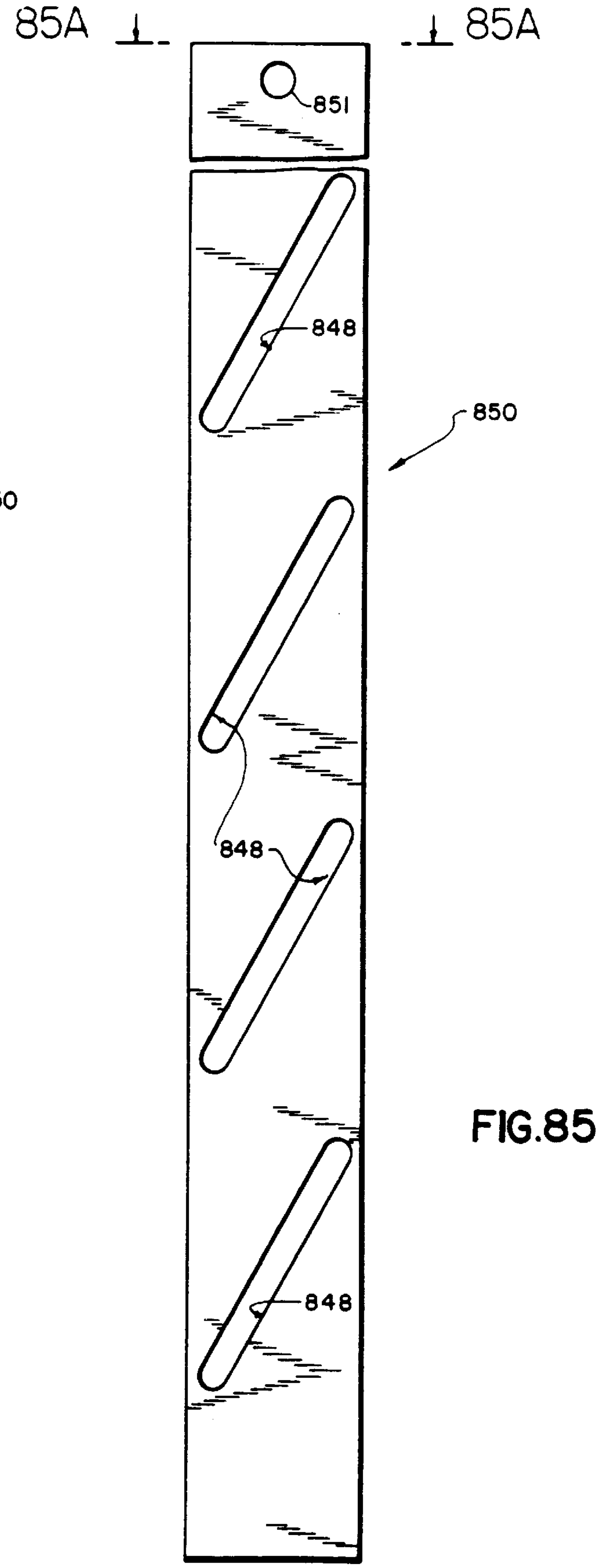
FIG.85

FIG.93A
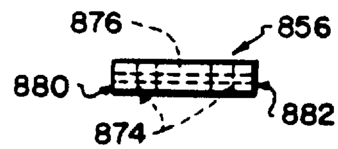
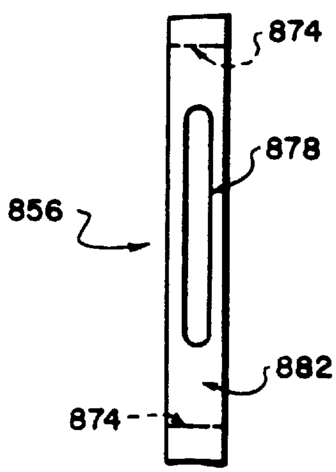
FIG.94

FIG.105
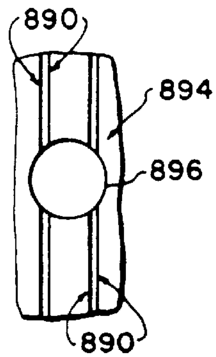
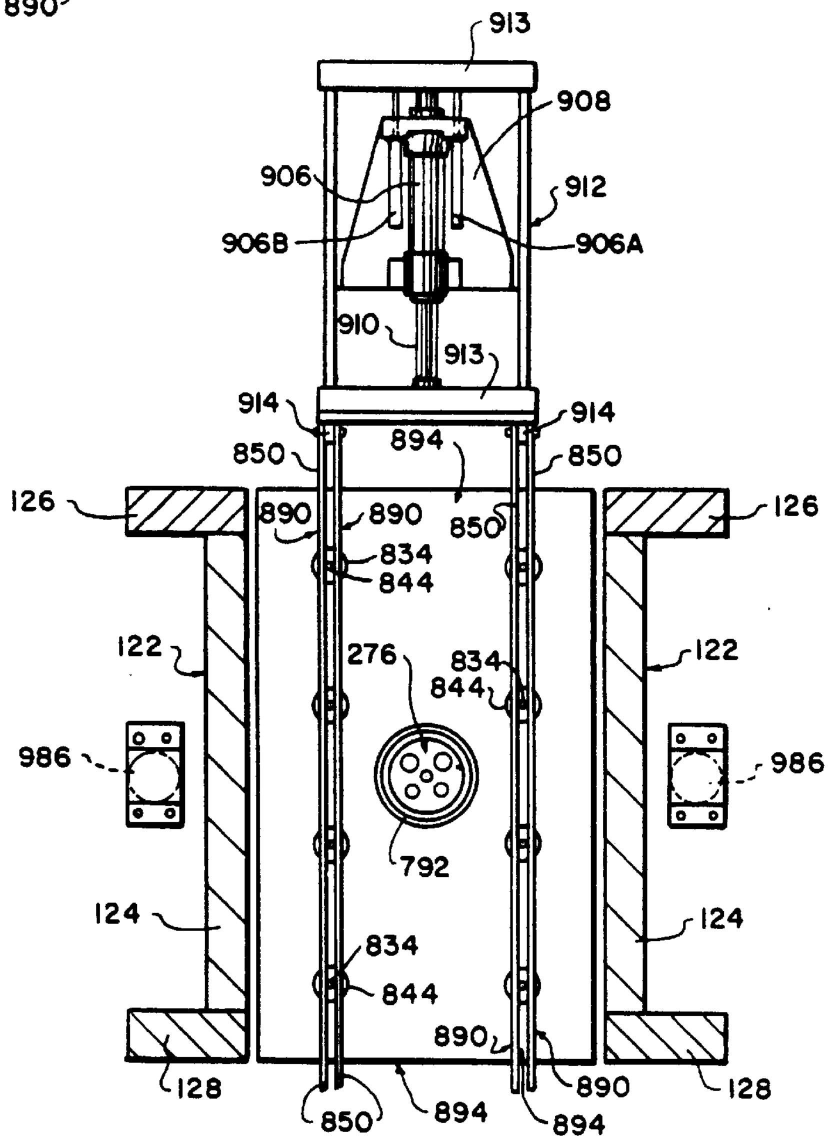
FIG.104

PRESSURE IN THE COMBINING AREA OF NOZZLE, VERSUS TIME

METHODS AND APPARATUS FOR INJECTION MOLDING AND INJECTION BLOW MOLDING MULTI-LAYER ARTICLES, AND THE ARTICLES MADE THEREBY

This application is a continuation of Ser. No. 08/341,700, filed Nov. 18, 1994, now U.S. Pat. No. 5,523,045, which is a continuation of Ser. No. 07/740,749 filed Aug. 5, 1991, now abandoned, which is a continuation of Ser. No. 07/563,169, filed Aug. 3, 1990, now U.S. Pat. No. 5,037,285, which is a continuation of Ser. No. 07/397,348, filed Aug. 22, 1989, now U.S. Pat. No. 4,946,365, which is a continuation of Ser. No. 07/283,000, filed Dec. 2, 1988, now abandoned, which is a continuation of Ser. No. 06/909,941, filed Sep. 19, 1986, now abandoned, which is division of Ser. No. 06/484,707, filed Apr. 13, 1983, now U.S. Pat. No. 4,712,990.

FIELD OF THE INVENTION

The present invention is concerned with improved multi-layer injection molded and injection blow molded articles, apparatus to manufacture such articles and methods to produce them.

BACKGROUND OF THE INVENTION

Containers for packaging food require a combination of physical properties which is not economically available with rigid and semi-rigid containers made from any single polymeric material. Among the properties required are low oxygen and moisture permeability, compatibility with the temperatures and pressures encountered in conventional food processing and sterilization, and the impact resistance and rigidity required to withstand shipping, warehousing, and abuse. Multi-layer constructions comprised of more than one plastic material can offer such a combination of properties.

Multi-layer containers have been made commercially by thermoforming and extrusion blow molding processes. These processes, however, suffer from major disadvantages. The chief disadvantage is that only a portion of the multi-layer material formed goes into the actual container. The remainder of the material can sometimes be recovered and used either in other applications or in one of the layers of future containers made by the same process. This “recycle” use, however, recovers only a part of the value of the original material because the scrap is a mixture of the materials. Other disadvantages of these processes include limited options in terminal end geometry or “finish,” in shape, and in material distribution.

Injection molding and injection blow molding are often preferred for making single layer containers because they are scrapless and overcome many of the other limitations of thermoforming and extrusion blow molding. These processes have not been commercially adapted to multi-layer constructions because of difficulties in achieving the required control of the location and uniformity of the various layers, particularly on a multi-cavity basis. In fact, even on a single cavity basis, multi-layer injection molding has been limited to relatively thick parts in which a thin surface layer of plastic covers a relatively thick core layer of either foamed plastic or of some other aesthetically unattractive material such as scrap plastic.

To be successfully commercially adapted to food containers, multi-layer injection molding would require two major improvements over the processes which are now commercially practiced. Economical multi-layer food containers require very thin core layers comprised of relatively expensive barrier resin such as a copolymer comprised of vinyl alcohol and ethylene monomer units. The location and continuity of these thin core layers are important and must be precisely controlled. U.S. patent applications, Ser. No. 059,375, now abandoned in favor of Continuation Ser. No. 324,824, and Ser. No. 059,374, each assigned to the assignee of this application and incorporated herein by reference, disclose multi-layer, injection molded and injection blow molded articles, parisons and containers having a thin continuous core layer substantially encapsulated within inner and outer structural layers, and methods and apparatus to make them. The disclosures in the aforementioned applications apply to both single and multi-cavity injection molding machines.

The second improvement over current commercial multi-layer injection molding processes is that the process must be capable of forming containers on a multi-cavity basis. Although the relatively large parts made by current commercial multi-layer processes can be economically practiced on a single cavity basis, food containers, which are relatively small, require a multi-cavity process to be economical. The extension from single cavity processes to an acceptable multi-cavity process presents many serious technical difficulties.

One way to extend from a single cavity to a multi-cavity process would be to replicate for each cavity the polymeric material melting and displacement and other flow distributing means used in a single cavity process. Such replication would realize some advantages over a unit cavity process. For example, a common clamp means could be used. However, it would not provide the maximum advantage because individual polymeric material melting and displacement means would still be necessary. Such a multiplicity of melting and pressurization means would not only be costly but would create severe geometrical and design problems of positioning a large number of separate flow streams in a balanced configuration, thereby increasing the required spacing between cavities, and limiting the number of cavities which would fit within the area of the clamped platens.

An alternate means of molding multi-layer articles on a multi-cavity basis would be to have a single multi-layer nozzle with its associated melting, displacement and distributing means communicate with a single channel or runner feeding multiple materials to multiple cavities. Such a runner system might be either of the cold runner type in which the plastic in the runner is cooled and removed with the injection molded article in each cycle, or of the hot runner type in which the plastic remaining in the runner after each shot is kept hot and is injected into the cavities during subsequent shots. The chief limitation of this single runner approach is that the single runner channel itself would contain multiple materials which would make it very difficult to control the flow of the individual materials into each cavity, particularly for a process having elements of both sequential and simultaneous flow such as that described in U.S. patent application Ser. No. 059,374. Controlling the flow of multiple materials in a single runner would be even more difficult in a case in which the runner is long, as in a multi-cavity system.

In the preferred embodiments of the apparatus and methods of this invention, a single displacement source is used for each material which is to form a layer of the article, but the materials are kept separate while each material is split into several streams each feeding a separate nozzle for each cavity. The individual materials are thereby combined into a multi-layer stream only at the individual nozzles, in their central channels, which feed directly into each cavity. Although this approach avoids many of the disadvantages of the previously described methods, it presents many problems which must be satisfactorily overcome for successful injection of articles in which thin core layers are properly distributed and located.

Several of these problems result from the length of the runner and the distribution system for a multi-coinjection nozzle machine. For economical reasons, it is desirable to have as many cavities as possible within the machine in order to provide as many articles as possible upon each injection cycle. It is possible to minimize the average runner length for a given number of cavities by having the channels run directly to the remotest nozzle, redirecting a part of the stream as it passes near each other nozzle. It has been found that such a channel geometry, while suitable for most single layer injection molding, has a major disadvantage for precise multi-layer injection in that a given impetus introduced at the displacement or pressurization source will have its effect more immediately in the more proximate nozzles than in the more remote ones. The time delay between the initiation of an impetus and its effect at a distance results from the compressibility of the plastic. Because of this compressibility, material must flow in the channel before a desired pressure change can be achieved at a remote location. It has been found that in order to achieve the same flow initiation and termination times and the same relative flow rates of various layers in each nozzle as well as to obtain articles from all cavities having substantially the same characteristics, the material entering each nozzle must have undergone essentially the same flow experience in its path to the nozzle.

It has further been found that in a system in which a given flow stream is split into several individual streams to feed each nozzle, the channel and device geometries which accomplish each of these flow splittings must be symmetrically designed so as to provide the same flow experience to the material in each of the resulting split streams. Such symmetry is difficult to achieve with viscoelastic materials such as polymer melts because the materials have a "memory" of their previous history. When a flow channel contains a sharp turn, for example, material which has passed near the inner radius of curvature of that turn will have a different flow experience from the material which has passed near the outer radius of curvature.

Even with a runner system which, by its design, minimizes the differences in flow history in the path to each nozzle, there will remain some differences as a result of remaining memory effects, temperature non-uniformities in the melt stream before it is split, temperature non-uniformities in the runner system, and machining tolerances. For this reason, it would be desirable to have independent control of the time of initiation and termination of each flow, a critical requirement for precise control of thin core multi-layer injection molding. Such independent control should be effected as near as possible to the point at which the individual flow streams are combined into a multi-layer flow stream. Although these control means should be located in each individual nozzle, they should be controlled in such a manner that they are actuated simultaneously in desired nozzles of a multi-coinjection nozzle machine.

It is not sufficient that the flow of each material be substantially identical in each nozzle. It is also necessary that the flow of the individual materials be uniformly distributed within each injection cavity and, hence, within the nozzle channel feeding the cavity. For axisymmetrical articles, such as most food containers, this is most readily achieved by shaping the various flow streams into concentric annular flows or by shaping one stream into a cylindrical flow and shaping the other flows into annular flows concentric with that cylinder before combining the flow streams.

In order to achieve the required uniformity in these concentric annular flows, it is necessary to redistribute a given flow stream from its shape as it leaves the runner system into a balanced annular flow. Achieving such a balanced annular flow is difficult in itself but is much more difficult to achieve with an intermittent flow process than it is, say, in conventional blown film dies where the flow is constant. Among the complexities of such an intermittent flow process are the difficulty of achieving flow balance when the rate of flow is deliberately varied during each cycle, and the additional problem of different time response behavior at various locations around the annulus.

An additional requirement for an acceptable multi-cavity, multi-layer runner system is that it accurately align and maintain an effective pressure contact seal between each nozzle with its respective cavity. This alignment is particularly critical for the injection of the internal layer of the multi-layer articles in that any misalignment will adversely affect the uniformity and location of the internal layer. The difficulty in achieving such alignment is that the metal for such a hot runner system is at a higher temperature than is the metal plate in which the cavities are mounted. Because of the thermal expansion of materials of construction normally used for such mold parts, the nozzle to nozzle distance will tend to grow with temperature more than will the cavity to cavity distance. In single layer, multi-cavity injection molding, there are two conventional ways of compensating for this difference in thermal expansion. The first is to prevent the relative expansion or contraction by physical restraint; that is, by physically interlocking the runner with the cavity plate. For a large runner system, such a physical constraint system will generate large often problematical opposing forces in the two parts. The second way is to size the runner system so that it will align with the cavity plate when it is at an elevated temperature within a narrow range, even though it will be misaligned beyond the range, e.g., at room temperature. In accordance with this invention, the runner system is not attached to the cavity plate, but rather is left free to grow radially. The nozzles and cavity faces are flat to provide a sliding interface. Given this feature, and that the cavity sprue orifices are provided with a larger diameter than that of the nozzle sprue orifices, the runner has a much greater opportunity to grow radially without the cavity and nozzle sprue orifices becoming misaligned. This provides a much broader temperature range within which to operate, and a wider range of possible polymer melt materials which can be used. However, in order for the nozzles mounted in the runner to transfer plastic at high pressure to the cavities without leakage, it is necessary to impose an opposing force to counteract the separation force generated by this high pressure. This is conventionally achieved by transmitting all or part of the force of the injection clamp through the runner system to the fixed platen. An alternative method is, to use the axial thermal expansion of the runner system to generate a compressive force on the runner between the fixed platen and the cavity plate. One difficulty with any of the above methods of compensating for this differential expansion is that they require close physical contact between the hot runner and the colder metal of the cavity plate and of the fixed platen. This close contact causes thermal variations in the runner. While such thermal gradients would be acceptable in a single layer runner system, the resulting differences in flow experience to each nozzle could for example result in a significant variation in the uniformity and location of a thin inner layer in multi-layer injection molding. This invention overcomes these problems by mounting the runner system with minimum contact between it and surrounding structure.

Other problems encountered in multi-cavity injection molding of articles relates to the formation of high-barrier multi-layer plastic containers. Such containers require that the leading edge of the internal barrier layer material be extended substantially uniformly into and about the marginal end portion of the side wall of the parison or container. This condition is difficult to obtain, because of the compressibility of polymeric melt materials and the long runners of multi-cavity machines which result in a delay in flow response which is accentuated the more remote the materials are from the sources of material displacement. In addition, there are the previously mentioned difficulties of achieving balanced annular flow and uniform time response due for example to variations in polymer and machine temperatures and in machining tolerances, and due to the intermittency of the flow process. These factors render it difficult to introduce a polymeric melt material uniformly and simultaneously over all points of its orifice in one co-injection nozzle, and likewise with respect to introducing the corresponding material through corresponding orifices in the plurality of co-injection nozzles. It has been found that such an introduction is important to extending the leading edge uniformly into the marginal end portion of a container side wall because the portion of the annulus of material first introduced into the central channel will first reach the marginal end portion of the parison or container side wall in the cavity, while the last introduced portion will trail and may not reach the marginal end portion. This condition, referred to as "time bias," has been found to be one cause of bias in the leading edge of the internal layer, which is unacceptable for, for example, quality, high oxygen barrier containers for highly oxygen sensitive food products.

Another problem is that even if the internal layer material is introduced without time bias into the central channel, there may still be bias in the leading edge of the internal layer material in the side wall of the injected article, if all portions of the annulus of the leading edge of the internal layer material are not introduced into or onto a flow stream in the central channel having a substantially uniform velocity about its circumference. This is difficult to achieve for one reason because the flow stream having a substantially uniform velocity about its circumference is not necessarily radially uniform. If this type of introduction occurs, there will be what is referred to as "velocity bias" in that the portions of the annulus in the central channel introduced onto a flow stream which has a high velocity will reach the marginal end portion of the side wall of the article in the cavity before those portions of the annulus introduced onto a flow stream having a lower velocity. Thus, in such case, other things being equal, even though there was no time bias in the introduction of the annulus of the internal layer material, a velocity bias in the central channel and cavity nevertheless resulted in a biased leading edge in the marginal end portion of the side wall of the injected article.

These and other problems associated with multi-layer unit and multi-coinjection nozzle injection molding and injection blow molding machines, processes and articles are overcome by the apparatus, methods and articles of this invention.

Accordingly, it is an object of this invention to provide methods and apparatus for commercially injection molding multi-layer, substantially rigid plastic parisons and containers, and for commercially injection blow molding multi-layer, substantially rigid plastic articles and containers by means of multi-cavity, co-injection nozzle machines.

It is another object of this invention to provide the above methods and apparatus for so molding said items by means of multi-cavity, multi-coinjection nozzle machines.

Another object of this invention is to provide and commercially manufacture, at high speeds, injection molded and injection blow molded, thin, substantially rigid, multi-layer, plastic articles, parisons, and containers.

Another object of this invention is to provide the above methods and apparatus for manufacturing the aforementioned articles, parisons and containers on a multi-cavity multi-coinjection nozzle basis, such that each item injected into and formed in each cavity has substantially identical characteristics.

Another object is to provide injection molding and blow molding methods and apparatus which overcome problems of long runners, variations in temperatures within structural components, variations in temperatures and characteristics of individual and corresponding polymer melts, and variations in machining tolerances which may occur with respect to multi-layer multi-cavity machines.

Another object of this invention is to provide methods and apparatus for providing a substantially equal flow path and experience for each corresponding polymer material flow scream displaced to each corresponding passageway of each co-injection nozzle for forming a corresponding layer of an aforementioned item to be injected.

Another object of this invention is to provide methods and apparatus for preventing bias in the leading edge of the internal layer in the marginal edge portions of the previously mentioned articles, and in the marginal end portion of the side walls of the above-mentioned articles, parisons and containers.

Another object of this invention is to provide methods and apparatus for forming such articles, parisons and containers wherein the leading edges of their internal layers are substantially uniformly extended into and about their marginal edge portions and the marginal end portions of their side walls.

Another object of this invention is to provide methods for positioning, controlling and for utilizing foldover of a portion of the marginal end portion of said internal layer or layers to reduce or eliminate bias and obtain said substantially uniformly extended leading edge of the internal layer or layers.

Another object is to provide methods of avoiding and overcoming time bias and velocity bias as causes of biased leading edges in articles formed by injection molding machines and processes.

Another object is to provide methods of pressurizing polymer melt materials in their passageways to improve their time responses, provide greater control over their flows, obtain substantially simultaneous and uniform onset flows of their melt streams substantially uniformly over all points of their respective nozzle orifices, and obtain substantially simultaneous and identical time responses and flows of corresponding melt streams of the materials in and through each of the multiplicity co-injection nozzles of multi-cavity injection molding and blow molding machines.

Another object is to provide separate valve means operative in the central channel of a co-injection nozzle to there block and unblock the nozzle orifices in various desired combinations and sequences, to control the flow and nonflow of the polymer melt materials through their orifices.

Another object is to provide the aforementioned valve means wherein they are commonly driven to be substantially simultaneously and substantially identically affected in each co-injection nozzle of a multi-coinjection nozzle injection molding machine.

Another object of this invention is to control the relative locations and thicknesses of the layers, particularly the internal layer(s) of the previously mentioned multi-layer injection molded or injection blow molded items.

Another object of this invention is to provide methods and apparatus for obtaining effective control of the polymer flow streams which are to form the respective layers of the injected items, in the passageways, orifices and combining areas of co-injection nozzles and in the injection cavities of multi-cavity injection molding and blow molding machines.

Another object of this invention is to provide co-injection nozzle means adapted to provide in co-injection nozzles, a controlled multi-layer melt material flow stream of thin, annular layers substantially uniformly radially distributed about a substantially radially uniform core flow stream.

Another object of this invention is to provide runner means for a multi-cavity, multi-coinjection nozzle injection molding machine, which splits each flow stream which is to form a layer of each injected item, into a plurality of branched flow streams, and directs each branched flow stream along substantially equal paths to each co-injection nozzle.

Yet another object of this invention is to provide the aforementioned runner means which includes a polymer flow stream redirecting and feeding device associated with each co-injection nozzle for redirecting the path of each branched flow stream for forming a layer of the item to be injected, and feeding them in a staggered pattern of streams to each co-injection nozzle.

Still another object is to provide apparatus for multi-layer, multi-coinjection nozzle injection molding machines, including floating runner means and a force compensation system, for compensating for injection back pressure and maintaining an on-line effective pressure contact seal between all co-injection nozzles and all cavities of the machines.

The foregoing and other objects, features and advantages of this invention will be further appreciated from the following description and the accompanying drawings and appendices.

SUMMARY OF THE INVENTION

The present invention is concerned with injection molded and injection blow molded articles, including containers, whose walls are multiple plies of different polymers. In a preferred embodiment, the article is a container for oxygen-sensitive products including food products, the walls of the container are thin and contain an internal, extremely thin, substantially continuous oxygen-barrier layer, preferably of ethylene vinyl alcohol, which is substantially completely encapsulated within outer layers. The invention includes apparatus and methods for high-speed manufacture of such articles, parisons and containers, and the articles, parisons and containers themselves. The apparatus includes co-injection nozzle structure and valve means associated with the nozzle for precisely controlling the flow of at least three polymer streams through the nozzle which facilitates continuous, high-speed manufacture in a multi-nozzle apparatus of multi-layer, thin wall articles, parisons and containers, particularly those having therein an extremely thin, substantially continuous and substantially completely encapsulated internal oxygen-barrier layer. The invention further comprises improved methods of producing such articles, parisons and containers.

The apparatus comprises a nozzle having a central channel open at one end and having a flow passageway in the nozzle for each polymer stream to be coinjected to form the multi-layer plastic articles from the polymer streams. Each of at least two of the nozzle passageways terminates at an exit orifice, preferably fixed and preferably annular, communicating with the nozzle central channel at locations close to its open end. At least two of the nozzle passageways each comprises a feed channel portion, a primary melt pool portion, a secondary melt pool portion, and a final melt pool portion a part of which forms a tapered, symmetrical reservoir of polymer. The nozzle orifices preferably are axially close to each other and close to the gate of the nozzle. Valve means, which may include sleeve means or pin and sleeve means, are carried in the nozzle central channel and are moveable to selected positions to block and unblock one or more of the orifices to prevent or permit flow of the polymer streams from the nozzle flow passageways into the nozzle central channel.

The valve means has at least one internal axial polymer flow passageway which communicates with the nozzle central channel and is adapted to communicate with one of the flow passageways in the nozzle. Movement of the valve means to selected positions brings the internal axial passageway into and out of communication with the nozzle passageway to permit or prevent flow of a polymer stream through that nozzle passageway and into the internal axial passageway of the valve means and then into the nozzle central channel.

When the valve means comprises sleeve means, or pin and sleeve means, it is preferred that communication from the internal axial passageway of the sleeve means to the passageway in the nozzle is through an aperture in the wall of the sleeve means. It is also preferred that the sleeve means fits closely within the nozzle central channel so there is no substantial cavity for polymer accumulation between the outside of the sleeve means and the central channel. Further, when the valve means is a sleeve means, it is preferred that the sleeve means have axial movement in the central channel of the nozzle (although it may also have rotational movement therein), so that when the sleeve is moved axially it blocks and unblocks one or more of the orifices. When it is rotatable and rotated, the aperture in the wall of the sleeve means is brought into and out of alignment with a nozzle passageway. Alternatively, the nozzle structure including that passageway may be rotated instead of rotating the sleeve means.

When the valve means comprises pin and sleeve means, the pin means preferably is moveable in the axial passageway of the sleeve means to block and unblock an aperture in the wall of the sleeve means so as to interrupt and restore communication between the internal axial passageway in the sleeve and a nozzle passageway for polymer flow. The valve means of this invention can include a fixed pin over which the sleeve reciprocates axially and whose forward end cooperates with the sleeve aperture. One sleeve embodiment of this invention has axially-stepped outer wall surface portions of different diameter for use in a nozzle central channel having cooperative axially-stepped cylindrical portions of different diameters.

The valve means are adapted to assist in knitting the polymer melt material for forming the internal layer with itself in the central channel, and/or to assist in encapsulating the internal layer with other polymeric material, and/or to substantially clear the central channel of polymer melt material when the valve means is moved axially forward through the central channel. In assisting in encapsulating the internal layer, the tip of the pin is partially withdrawn in the sleeve and accumulates the encapsulating material in front of it within the sleeve, and as the valve means is moved forward, the pin can be moved relatively faster forward to eject the accumulated material from the sleeve into the central channel.

The apparatus of the present invention further comprises, with the co-injection nozzle means, or the nozzle means and valve means of the present invention, the combination of polymer flow directing means in at least one of the nozzle passageways for balancing the flow of at least one polymer stream around the passageway in the nozzle and the exit orifice through which it flows. The polymer flow directing means comprises cut-out sections in the nozzles which cooperate with eccentric and concentric chokes to direct the polymer stream exiting from a feed channel on one side of the nozzle into an annular stream whose flow is substantially evenly balanced around the circumference of the nozzle and associated exit orifice. In a preferred embodiment, the combination just described further includes means for pressurizing that polymer stream to produce a pressurized reservoir of polymer in the nozzle passageway between the flow directing means and the orifice, whereby, when the valve means is moved to unblock the orifice, the start of flow of the polymer through the orifice is prompt and substantially uniform around the circumference of the orifice. Prompt and uniform start of flow of the polymer stream around the circumference of the orifice is important, particularly when the polymer stream whose flow is being thus controlled is the one which is to form an internal, thin, substantially continuous layer of the injection molded and injection blow molded article. Such prompt, uniform start of flow of the polymer to form an internal layer greatly facilitates the production of multi-layer injected articles in which an internal layer of the article extends substantially uniformly throughout the wall of the article particularly about the marginal end or edge portion of the article at the conclusion of polymer movement in the injection cavity. This is particularly important in the production of articles which are to be containers for oxygen-sensitive food products where the internal, thin, oxygen-barrier layer must be substantially continuous throughout the wall of the container.

The apparatus of this invention also includes a polymer flow stream redirecting and feeding device, preferably in the form of the feedblock of this invention, for receiving from a runner block a plurality of polymer flow streams separately directed at the device preferably at its periphery, and, while maintaining them separate, redirecting them to flow axially out of the forward end of the device into the multi-polymer co-injection nozzle of this invention. In a preferred embodiment, flow streams enter radially into inlets in the periphery, travel about a portion of the circumference of the device, then inward through a channel toward the axis of the device and then axially forward and communicate with exit holes in the forward end portion of the device. The forward end portion has a stepped channel for receiving the shells of the nozzle assembly of this invention.

This invention further includes drive means which include common moving means for substantially simultaneously and identically driving each of the plurality of separate valve means through each co-injection nozzle and feedblock mounted in the multi-nozzle, multi-polymer injection molding machine, and provide in each nozzle, simultaneous identical control over the initiation, regulation and termination of flow of polymer materials through the nozzles. The drive means includes shuttles for the valve means and the common moving means includes cam bars for moving the respective shuttles, and hydraulic cylinders for moving the cam bars. Control means are provided for moving the common moving means in a desired mode which provides the substantially simultaneous and identical movements and flow controls.

The apparatus of this invention further includes polymer stream flow channel splitter devices adapted for use in conjunction with runner structures of multi-coinjection nozzle injection molding machines. The splitter devices include the runner extensions, T-splitters and Y-splitters of this invention and embodiments thereof, which split each flow channel for a polymer melt material into first and second branched exit flow channels of substantially equal length which exit the devices through first and second sets of axially-aligned spaced, exit ports, each set being located in a different surface portion of the device for communication with corresponding polymer stream flow channel entrances in a runner block of the machine. Preferred embodiments of the T and Y-splitters are cylindrical in shape, wherein the flow channels enter the devices radially and transaxially and their first and second branched exit flow channels extend in opposite directions and exit the device through exit ports at an angle greater than 90° relative to the flow channel from which they are split. In the preferred runner extension the flow channels enter axially into the rearward end of the device in a spread quincuncial pattern, and proceed to the forward end portion of the device where the flow channels are split at axially-spaced branched points into first and second branched exit flow channels of equal length, which proceed in opposite directions and exit the device through a set of axially-spaced first exit ports in one surface portion of the device, and a set of axially-spaced exit ports in another surface portion, about 180° removed from the first exit ports. The splitter devices include isolation means preferably in the form of expandable piston rings for isolating the polymer flow streams from one another as they enter and exit the device.

This invention also includes free-floating, force compensating apparatus and methods for a multi-coinjection nozzle injection molding machine. Runner means are mounted preferably on its axial center line, on support means by mounting means in a manner which enables the runner means, including the runner block and the runner extension, to float or thermally grow axially and radially on the support means while the machine is in operation. Means, preferably hydraulic are included for providing a forward force to the runner means sufficient to offset any rearward force from axial floatation due to injection back pressure, and sufficient to provide and maintain an effective pressure contact seal between the co-injection nozzle sprue faces and the cavity sprue faces during operation of the machine. A gap is provided between the runner block and runner extension and adjacent structure to allow for their floatation and to prevent loss of heat to the adjacent structure.

The apparatus of the present invention further comprises a multi-nozzle machine for making multi-layer injected articles in which each nozzle co-injects at least three polymer streams and in which the polymeric material for each corresponding stream is furnished to each of the nozzles in a separate, substantially equal and symmetrical flow path. The purpose and function of this flow path system is to ensure that each particle of a particular material for a particular layer of the article to be formed that reaches the central channel of any one of the nozzles has experienced substantially the same length of flow path, substantially the same change in direction of flow path, substantially the same rate of flow and change in rate of flow, and substantially the same pressure and change of pressure as is experienced by each corresponding particle of the same material which reaches any one of the remaining nozzles. This simplifies and facilitates precise control over the flow of each of a plurality of materials to a plurality of injection nozzles in a multi-cavity injection apparatus.

The apparatus of this invention further includes the use of valve means with fewer polymer melt material displacement means than there are layers in the article to be formed, whereby one displacement means, displaces material for two layers, and the valve means partially blocks one of the nozzle orifices for one of the two layer materials and thereby controls the relative flows of the two layers.

The present invention provides improved methods of injection molding a multi-layer article having at least three layers and preferably having a side wall. In a preferred method, the valve means is moved in the nozzle means of the present invention to a first position to prevent flow of all polymer streams through the central channel of the nozzle. The valve means is then moved to a second position to permit the flow of a first polymer stream through the nozzle central channel. In a preferred embodiment, this first polymer stream will form one of the surface layers of the injection molded article, preferably the inside surface layer. The valve means is moved to a third position to permit continued flow of the first polymer stream and to permit flow of a second polymer stream into the nozzle central channel. In a preferred embodiment, this second polymer stream will form the other surface layer of the injection molded article, preferably the outside surface layer. The valve means may be moved, as just described, to permit the first polymer stream to begin to flow before the second polymer stream. Alternatively, flow of the first and second polymer streams may be commenced substantially simultaneously, meaning that the flows begin either at the same time or that a small time interval may exist after commencement of flow of the first polymer stream and before commencement of flow of the second polymer stream, or vice versa. Each of the alternatives is intended to be encompassed by movement of the valve means to the second and third positions. The valve means is then moved to a fourth position to permit continued flow of the first and second polymer streams, and to permit flow of a third polymer stream into the nozzle central channel between the first and second streams. In a preferred embodiment, the third polymer stream will form an internal layer in the injection molded article, between the inside surface layer and the outside surface layer. Precise and repeatable control of the flow of at least those three polymer streams through the central channel of each nozzle employed facilitates continuous, high-speed manufacture in a multi-nozzle machine of multi-layer, thin wall containers, particularly those in which there is an extremely thin, substantially continuous, internal layer such as an oxygen-barrier layer.

This invention includes methods of forming a plurality of substantially identical multi-layer injection molded plastic articles by injection of a substantially identical stream of polymeric materials from each of a plurality of co-injection nozzles, by feeding separately to each nozzle through the previously-mentioned substantially equal flow path feature, the melt material for each layer of the article to be formed, and substantially simultaneously positively effecting the blocking and unblocking of the nozzle orifices for the melt streams which form corresponding layers in the articles. While these corresponding streams are positively blocked and just prior to their being unblocked, they are pressurized with a common pressure source. The positive blocking and unblocking is effected with substantially identical valve means driven substantially simultaneously and identically in each co-injection nozzle.

This invention includes methods of forming a multi-polymer, multi-layer combined stream of materials in an injection nozzle such that the leading edges of the layers are substantially unbiased, by using the valve means in the central channel for independently and selectively controlling the flow from the orifices in various combinations, including to prevent flow from all of the orifices, prevent flow from the orifice for the internal layer or layers while allowing the flow of material for the inner layer from the third orifice, for the outer layer from the first orifice or from both of these orifices, and, while continuing to allow said flows, allowing material(s) for the internal layer or layers to flow. In addition, the flow through the third orifice may be reduced or prevented, and the flow through the second orifice may be terminated. The above methods can be successfully employed to form a container whose internal layer is encapsulated at the bottom of the container with a material for the outer layer which is the same as, interchangeable or compatible with the material for the inner layer.

The methods of this invention include utilizing polymer material melt stream flow directing or balancing means in nozzle flow stream passageways to control the thickness, uniformity and radial position of the layers in the combined stream in the nozzle.

The methods of this invention include forming a substantially concentric combined stream of at least three polymeric materials for injection as a shot continuously injected as it is formed into an injection cavity, to form a multi-layer article wherein the combined stream and shot have an outer melt stream layer of polymeric material for forming the outside layer of the article, a core melt stream of polymeric material for forming the inside layer of the article, and at least one intermediate melt stream layer of polymeric material for forming an internal layer of the article, by utilizing the valve means in the co-injection nozzle basically in the manners of the methods described above.

An alternative method of forming such a substantially concentric combined stream for injection as a shot continually injected as it is formed, involves utilizing the valve means in the nozzle means for preventing flow of polymer material from all of the orifices, preventing flow of polymer material through the second orifice while allowing flow of structural material through the first, the third or both the first and third orifices, then, allowing flow of polymer material through the second orifice while allowing material to flow through the third orifice, restricting the flow of polymer material through the third orifice while allowing the flow of material through the second orifice, and restricting the flow of polymer material through the second orifice while allowing flow of polymer material through the first or third orifices or both the first and third orifices to knit the intermediate layer material with itself through the core material and substantially encapsulate the intermediate layer in the combined stream and in the shot.

Another method of utilizing the valve means for forming an at-least-three layer combined stream in a nozzle involves preventing flow of polymer material through the intermediate or internal orifice while allowing flow of polymer structural material through the first orifice, the third orifice or both the first and third orifices, then allowing flow of polymer material through the second orifice while allowing material to flow through the third orifice, reducing the flow of polymer material through the third orifice while allowing polymer material to flow through the second orifice, terminating the flow of polymer material through the second orifice, and allowing flow of polymer material only through the first orifice while preventing flow of polymer material from the second and third orifices to substantially encapsulate the intermediate polymer material in the combined stream.

Another method included within the scope of this invention is injection molding, by use of a multi-coinjection nozzle, multi-cavity injection molding apparatus, an at-least three layer multi-material plastic container having a sidewall thickness below its marginal end portion of from about 0.010 inch to about 0.035 inch, preferably from about 0.012 inch to about 0.030 inch.

In the preferred embodiments of this invention wherein an even number of at least four co-injection nozzles are provided in the runner means of this invention, one at each corner of a substantially square or rectangular pattern, the methods include the steps of bringing the separate polymer material streams close to each other in a pattern in substantially the same horizontal and axial plane wherein they are transaxially offset from each other and axially offset just to the rear of and between the four nozzles and directing each flow stream to each of the four respective nozzles.

In the methods of this invention wherein the apparatus includes eight nozzles, and they are aligned in a pattern of two rows each having four nozzles therein, each of the respective rows being positioned along one of the elongated sides of a rectangular pattern, the steps preferably include bringing the separate flow streams of polymer material into substantially horizontal alignment along a plane centered in the rectangle axially offset and just to the rear of and between the parallel rows of four nozzles, then into horizontally and axially respectively displaced alignment, then outward towards the narrow ends of the rectangle to the center of each of the upper and lower patterns of four nozzles, T-splitting at each side center each of the polymer streams into two opposite horizontal streams each of which extends to a point between the point at which the streams were T-split and the respective adjacent two nozzles on either side of the pattern, and, at such latter point Y-splitting the respective streams into a Y-pattern of diagonal streams, and directing each stream to each of respective co-injection nozzles of the eight co-injection nozzles injection molding apparatus.

Another method of this invention for forming a five layer plastic container having a side wall of the aforementioned thickness comprises, providing a source of supply for each polymer material which is to form a layer of the container, providing a means for moving each polymer material to each of the nozzles, moving each material that is to form a layer of the article from the moving means to the respective nozzles, combining the separately moved materials in each of the respective nozzles, and injecting the combined flow stream through each injection nozzle into a juxtaposed cavity to form the multi-layer, multi-material container. Still another method of forming such a container having such a side wall thickness comprises, providing a source of supply and a source of polymer flow movement for each polymer melt material, channelling each polymer material flow stream from its source of flow movement separately to each nozzle, and providing valve means operative in each of the respective co-injection nozzles and utilizing the valve means in each of said co-injection nozzles in the combining of the separately channelled flow streams.

In preferred practices of the present methods, the production of such containers and other desired containers is greatly enhanced by imparting pressure to at least the third polymer stream prior to, or concurrently with, moving the valve means to the fourth position. In a further preferred practice of the method of the present invention, pressure is also imparted to at least one of the first and second polymer streams, and, prior to or concurrent with moving the valve means to the fourth position, the pressure of one or more of the first, second and third polymer streams is adjusted so that the pressure of the third stream is greater than the pressure of at least one of the first and second streams. In a particularly preferred practice of the method of the present invention, pressure is imparted to the first, second and third polymer streams, and, prior to or concurrent with moving the valve means to the fourth position, the pressure of the third polymer stream is increased and the pressure of at least one of the first and second streams is reduced, whereby the pressure of the third polymer stream is greater than the pressure of at least one of the first and second streams when the valve means is moved to the fourth position. The method of the present invention induces a sufficient initial rate of flow of the polymer streams, and particularly of the annular polymer stream (or streams) which forms an internal layer (or layers) in the injection molded article, substantially uniformly around the circumference of the orifice through which the polymer flows into the central channel of the nozzle.

This invention includes methods of initiating the flow of a melt stream of polymeric material substantially simultaneously from all portions of an annular passageway orifice into the central channel of a multi-material co-injection nozzle, comprising, providing a polymeric melt material in the passageway while preventing the material from flowing through the orifice into the central channel (preferably with physical means such as the valve means of this invention), flowing a melt stream of another polymeric material through the central channel past the orifice, subjecting the melt material in the passageway to pressure which at all points about the orifice is greater than the ambient pressure of the flowing stream at circumferential positions which correspond to the points about the orifice, the pressure being sufficient to obtain a simultaneous onset flow of the pressurized melt material from all portions of the annular orifice, and, allowing the pressurized material to flow through the orifice to obtain said simultaneous onset flow. Preferably, the material pressurized is that which will form the internal layer of a multi-layer article injected from the nozzle, the subjected pressure is uniform at all points about the orifice, and the orifice has a center line which is substantially perpendicular to the axis of the central channel. During the allowing step there is preferably included the step of continuing to subject the material in the passageway to a pressure sufficient to establish and maintain a substantially uniform and continuous steady flow rate of material simultaneously over all points of the orifice into the central channel. The subjected pressure is sufficient to provide the onset flow of the internal layer material with a leading edge sufficiently thick at every point about its annulus that the internal layer in the marginal end portion of the side wall of the article formed is at least 1% of the total thickness of the side wall at the marginal end portion. These methods can be employed for pressurizing the runner system of a multi-material co-injection nozzle, multi-polymer injection molding machine having a runner system for polymer melt materials which extends from sources of polymeric material displacement to the orifices of a multi-material co-injection nozzle. In pressurizing the runner system, the pressure subjecting step is preferably effected in two stages, first by providing a residual pressure lower than the desired pressure at which the material is to flow through the blocked orifice, and then before or upon effecting the allowing step, raising the level of pressure to the desired pressure at which the internal layer material is to flow through the orifice. The pressure raising step may be executed gradually but preferably rapidly, just prior to or upon effecting the allowing step.

This invention includes methods of prepressurizing the runner system of a unit-cavity or multi-cavity multi-polymer injection molding machine for forming injection molded articles, having a runner system for polymer melt materials which extends from sources of polymer melt material displacement to the orifices of a co-injection nozzle having polymer melt material passageways in communication with the orifices which, in turn, communicate with a central channel in the nozzle, which in some embodiments basically comprises, blocking an orifice with physical means to prevent material in the passageway of the orifice from flowing into the central channel, and, while so blocking the orifice, retracting the polymer melt material displacement means, filling the resulting volume in the runner system with polymer melt material from a source upstream relative to the polymer melt material displacement means and external to the runner system, the amount of retraction and the pressure of the polymer melt with which the volume is filled being calculated to be just sufficient to provide that layer's portion of the next injection molded article and the pressure of the volume-filling melt being designed to generate in the runner system a residual pressure sufficient to increase the time response of the polymer melt material in the runner system to subsequent movements of the source of polymer melt material displacement means, and prior to unblocking the orifice, displacing the polymer melt material displacement means towards the orifice to compress the material further and raise the pressure in the runner system to a level greater than the residual pressure and sufficient to cause when the orifice is unblocked, the simultaneous onset flow. These methods can also be effected while the orifice is blocked, by moving melt material into the portion of the runner system extending to the blocked orifice, discerning the level of residual pressure of the polymer melt material moved into said portion of the runner system, and displacing the melt material in the runner system towards the orifice to compress the material and raise the pressure in the runner system to a level greater than the residual pressure and sufficient to cause the simultaneous and preferably uniformly thick onset flow.

Another prepressurization method of this invention is for forming a multi-layer plastic article having a marginal edge or end portion, first and second surface layers, and at least one internal layer therebetween, in an injection cavity of an injection molding machine such that the leading edge of the internal layer extends substantially uniformly into and about the marginal edge or end portion, by applying the aforementioned method of prepressurizing the internal layer material, flowing the first surface layer material through the central channel while blocking the internal layer material orifice, flowing the second surface layer material as an annular stream about the first surface layer material, unblocking the orifice, and flowing the prepressurized internal layer material into the central channel into or onto the interface of the flowing first and second surface materials such that the internal layer material has a rapid initial and simultaneous onset flow over all points of its orifice and forms an annulus about the flowing first surface layer material between it and the second surface layer material, and such that the leading edge of the annulus of the internal layer material lies in a plane substantially perpendicular to the axis of the central channel, and, injecting the combined flow stream of the inner, second and internal layer materials into the injection cavity in a manner that places the leading edge of the internal layer material substantially uniformly into and about the marginal edge portion of the article. The method can include increasing the rate of displacement of the internal layer polymer melt material as its orifice is unblocked to approach and maintain a substantially steady flow rate of it through the orifice. This method can place the leading edge within the marginal edge or end portion of articles, parisons and containers.

Another method utilizes pressurization for controlling the final lateral location of the internal layer material within the multi-layer wall of an injected parison, by positively controlling the flow and non-flow of the streams which form the outer and internal layers through their orifices by moving the streams past flow balancing means in the nozzle passageways for there selectively and respectively providing desired design flows for each of said streams of polymeric materials, and displacing the respective outer and internal layer materials and the inner layer materials through their respective passageways to thereby achieve their respective desired design flows, to place the annuluses of the respective materials uniformly radially in the combining area, and to thereby control the radial location of the internal layer material in the combined injected material flow stream in the combining area of each nozzle and in each injection cavity. This method can include physically blocking the orifices of the outer and internal layer materials, prepressurizing the outer and internal layer materials in their passageways while their orifices are blocked such that when the orifices are unblocked, the transient times required to reach the desired design flows are reduced and the volumetric flows of the outer and internal structural materials into the combining area are controlled. With respect to this method, a uniform start of the flow of the outer structural material and the internal layer material past all points of its passageway orifice into the nozzle central channel can be effected. By practicing these methods, there can be maintained a continuous flow in terms of velocity and volumetric rate of all of the materials during most of the injection cycle. The pressurizing step can be effected during the displacing step by utilizing a source of material displacement for subjecting the polymer melt material for the outer layer while it is in its blocked passageway to a first pressure which would be sufficient to cause the material to flow into the central channel if its orifice was unblocked, and prior to allowing flow of the outer layer material through its orifice, moving the source of polymer displacement and thereby subjecting said outer layer material to a second pressure greater than the first pressure and sufficient to create, when its orifice is unblocked, a surge of said material and a uniform onset of annular flow of polymer material over all points of its orifice into the central channel when the flow stream is considered relative to a plane perpendicular to the axis of the central channel, said second pressure being less than that which would cause leakage of polymer material past the means which is blocking flow of material into the channel, and, during and after the unblocking of the orifice for the material which is to form the outer layer, changing the rate of movement of the source of polymer displacement to approach and maintain a desired design substantially steady flow rate of said material through the first orifice into the central channel. This method can also include leaving the orifice for the outer structural material unblocked for a time sufficient for effecting and maintaining a continuous, uniform rate and volume of flow of the outer material during 90% of the injection cycle.

This invention includes methods of pressurization which are effected without the use of physical means for blocking an orifice, to obtain a substantially uniform onset flow over the orifice. One method comprises subjecting the internal layer material to a pressure equal to or just below the ambient pressure of the materials flowing in the central channel, and effecting a rapid change in pressure between the pressure of that material relative to the ambient pressure, to cause the internal layer material to establish the desired substantially uniform onset flow.

A method of pressurizing included in this invention involves preventing a condensed phase polymeric material from flowing through an orifice, and prior to allowing the material to flow through the orifice, subjecting the material to a high initial pressure at least about 20% greater than necessary to cause it to flow into the central channel and sufficient to densify the material adjacent the orifice to a density of about 2% to about 5% or more greater than atmospheric density. The level of prepressurization imparted can be greater than, preferably about 20% or more higher than the ambient pressure of the materials flowing in the central channel.

This invention includes methods of utilizing pressurization in combination with flow directing and balancing means to control the radial location of an internal layer in the article. A prepressurized material is allowed to flow at a controlled rate past flow directing means such that the material achieves its desired design flow and places the leading annulus of the material uniformly radially in the combining area of the central channel and in the side wall of the injected article.

This invention includes methods of pressurization wherein during and after the unblocking of an orifice of a prepressurized material, the rate of movement of the ram for the flowing material is increased to approach and maintain a desired design steady flow rate of the material through the orifice into the central channel.

This invention includes methods of providing and maintaining uniform thickness about and along the annuluses of the materials flowing in the nozzle central channel by subjecting the material in its passageway to a first pressure sufficient to cause the material to flow into the central channel if its orifice was not blocked, subjecting the material to a second pressure greater than the first and sufficient to provide substantially uniform onset flow over the orifice, unblocking the orifice to provide an onset flow whose leading edge is in a vertical plane relative to the axis of the central channel, and maintaining the second pressure for preferably from about 10 to about 40 centiseconds to maintain a steady flow of the material into the central channel.

This invention includes methods of co-injecting a multi-layer flow stream comprised of at least three layers into an injection cavity in which the speed of flow of the layered stream is highest on the fast flow streamline positioned intermediate the boundaries of the layered stream. The methods include establishing the flow of material of a first layer and the flow of a second layer of the flow stream adjacent to the first to form an interface between the flowing materials, positioning the interface at a first location not coincident with the fast flow streamline, interposing the flow of material of a third layer of the flow stream between the first and second layers at a location not coincident with the fast flow streamline, and moving the location of the third layer to a second location which is either relatively more proximate to, or substantially coincident with the fast flow streamline, or which is across from and not substantially coincident with the fast flow streamline. The moving of the third layer to the second location can be effected at or shortly after the interposition of the third layer between the first and second layers, preferably at substantially all places across the breadth of the layered stream. The rates of flow of the first and second layer materials may be selected to position their interface to be non-coincident with the fast flow streamline, and after interposing the flow stream of the third layer in the interface, the relative rates of flow of the first and second layer materials may be adjusted to move the third layer to a location more proximate to, or substantially coincident with the fast flow streamline, or across the fast flow streamline to a location not coincident with the fast flow streamline. The third layer material may be moved from a fast flow streamline in the central channel that does not correspond to the fast flow streamline, to, relatively more proximate to, or across the fast flow streamline that, does correspond to the fast flow streamline in the injection cavity. In the preferred method of this aspect of the invention, the interface is annular and the interposition of the third layer material is at substantially all places around the circumference of the annular interface.

This invention includes various methods of preventing, reducing and overcoming bias of portions of the terminal end of the internal layer during the formation of a multi-layer injection blow molded container, which, in certain embodiments involve folding over the biased portion of the terminal end to provide a substantially unbiased overall leading edge of said internal layer, such that the folded over portion and the unfolded portion of the marginal end portion is finally positioned in the side wall of the article in a substantially unbiased plane relative to the axis of the container.

The methods of preventing, reducing and overcoming bias include methods of preventing, reducing and overcoming time bias and velocity flow bias.

This invention includes injection molded multi-layer rigid plastic articles, parisons and containers and injection blow molded multi-layer rigid plastic articles and containers, made by the foldover methods of this invention. A terminal end portion of the internal layer is folded over within the article, usually within its side wall, and preferably its flange. The foldover can be towards the inside or outside of the article, parison or container. The container having the folded over internal layer may be open-ended or have an end closure or flexible lid secured thereto. Preferably, the leading edge of the internal layer is in a plane which is substantially unbiased relative to the axis of the container. In the containers of this invention, the terminal end of the internal layer is more removed from the terminal end of the container than is another adjacent directionally related marginal end portion of the internal layer. The containers of this invention include those wherein the terminal end of the folded over portion of the internal layer is more removed than the fold line is from the terminal end of the container, wherein there is less variation in the distance from the fold line to the terminal end of the container than from the terminal end of the internal layer to the terminal end of the container, and wherein the terminal end of the internal layer is more removed than the fold line is from the terminal end of the container.

This invention also includes injection molded multi-layer substantially rigid plastic articles including parisons and containers, and injection blow molded multi-layer substantially rigid plastic articles, including containers having side and bottom walls, and having at least five layers comprised of an outside surface layer, an inside surface layer, an internal layer, and first and second intermediate layers one on either side of the internal layer, wherein the terminal end of the internal layer encapsulated by intermediate layer material, whether it be solely or primarily by first or by both first and second intermediate layer material.

This invention further includes multi-layer injection molded or injection blow molded plastic containers whose side wall is comprised of at least three layers, wherein—the ratio of the internal layer thickness in the bottom wall relative to the total bottom wall thickness is on the average greater than the ratio of the internal layer thickness in the side wall relative to the total side wall thickness,—the bottom wall total thickness is less than the side wall total thickness and the thickness of the internal layer in the bottom wall is at least equal to the average thickness of the internal layer in the side wall,—the bottom wall total thickness is less than the total thickness of the side wall, and, in a central portion of the bottom wall, the internal layer thickness is greater than the average thickness of the internal layer in the side wall, or—the average bottom wall total thickness is less than the average side wall total thickness, and at least a portion of the internal layer is thicker in the bottom wall than the average thickness of the internal layer in the side wall.

BRIEF DESCRIPTION OF THE DRAWINGS

FIG. 3 is an enlarged horizontal section taken along line 3—3 of FIG. 2A.

FIG. 4 is an enlarged view of a vertical section taken through a portion of the bottom wall and side wall of the container of FIG. 2A.

FIG. 5 is a schematic enlarged vertical section as might be taken through a marginal end portion of the container of FIG. 2.

FIG. 8A is an enlarged schematic vertical section with layers not shown and with portions broken away, of the bottom of a container of this invention.

FIG. 9 is an enlarged vertical section through a marginal end portion of a container of this invention having an end closure double seamed thereto.

FIGS. 9A through 9D are enlarged vertical sections through various embodiments of multi-layer plastic containers of this invention whose marginal end portions have an end closure double seamed thereto.

FIG. 9A shows the marginal end portion of the internal layer or layers folded over in the flange toward the outside of the container.

FIG. 9B shows the marginal end portion of the internal layer or layers folded over in the flange toward the inside of the container.

FIG. 9C shows the marginal end portion of the internal layer or layers in the arcuate portion of the top end of the container side wall, folded over toward the outside of the container.

FIG. 9D shows the marginal end portion of the internal layer or layers in the marginal end portion of the container side wall near the bottom of the double seam, folded over toward the outside of the container.

FIGS. 10 and 10A show enlarged vertical sections through embodiments of the multi-layer plastic containers of this invention having a flexible lid sealed to the container flange.

FIG. 10 shows the marginal end portion of the internal layer or layers in the flange folded over toward the inside of the container.

FIG. 10A shows the marginal end portion of the internal layer or layers in the flange folded over toward the outside of the container.

FIG. 15 is an elevational view basically as would be seen along line 15—15 of FIG. 14.

FIG. 16 is a vertical section taken along line 16—16 of FIG. 15.

FIG. 29A' is a vertical section taken along line 29A'—29A' of FIG. 29A.

FIG. 33 is a top plan view of the T-splitter shown in FIGS. 29, 30 and 32.

FIG. 34 is a side elevational view of the T-splitter shown in FIGS. 30, 32 and 33.

FIG. 34A is an elevational view of pins and set screw which fit within bores in the left side of the T-splitter of FIGS. 33 and 34.

FIG. 37 is a side elevational view of the Y-splitter shown in FIG. 32.

FIG. 38 is a top plan view of a Y-splitter having its entrance holes aligned at the six o'clock position.

FIG. 39 is a vertical section taken along line 39—39 of FIG. 38.

FIG. 40 is a vertical section taken along line 40—40 of FIG. 38.

FIG. 49AA is an end view of the nozzle assembly as would be seen along line 49AA—49AA of FIG. 49A.

FIG. 56 is a vertical section taken along line 56—56 of FIG. 55.

FIG. 57 is an end view of the rear face of the third shell as would be seen along line 57—57 of FIG. 55.

FIG. 62 is an end view of the rear face of the second shell of FIG. 58.

FIG. 64 is a top plan view with portions broken away showing the port in the upper wall of the second shell of FIG. 58, taken along line 64—64 of FIG. 63.

FIG. 71 is a side elevational view of the nozzle cap of the nozzle assembly of FIG. 50.

FIG. 74 is a rear elevational view of the nozzle cap of FIG. 71.

FIG. 79 is a front elevational view of the sleeve of FIG. 78.

FIG. 80 is in part a vertical section taken along line 80—80 of FIG. 79, and in part a vertical section taken along line 80—80 of FIG. 78.

FIG. 81 is a side elevational view of the preferred solid shut-off pin of the preferred valve means of this invention which cooperates with the sleeve of FIG. 81 and the nozzle assembly of FIG. 50.

FIG. 82 is a side elevational view of the solid pin shuttle of this invention.

FIG. 83 is a rear elevational view of the solid pin shuttle of FIG. 82.

FIG. 84 is a front elevational view of the solid pin shuttle of FIG. 82.

FIG. 85 is a side elevational view of the solid pin cam bar which cooperates with the solid pin shuttle of FIGS. 83–85.

FIG. 85A is a top plan view as would be seen along line 85A—85A of FIG. 85.

FIG. 86 is an exploded perspective view of the solid pin, and solid pin shuttle and solid pin cam bars of FIGS. 83–85A.

FIG. 87 is a perspective view of the solid pin in the solid pin shuttle in turn mounted within the pair of solid pin cam bars shown in FIG. 86.

FIG. 88 is a top plan view of the sleeve shuttle of this invention.

FIG. 89 is a side elevational view of the solid pin shuttle of FIG. 88.

Figure 88:
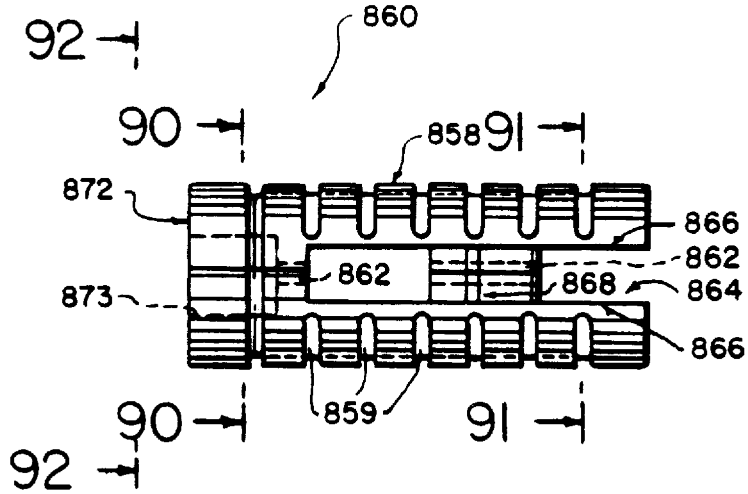
Figure 89:
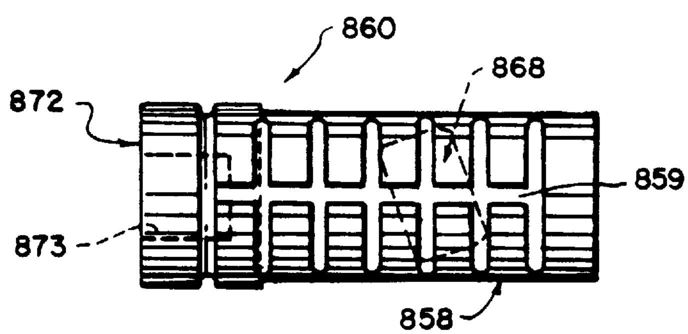
Figure 90:
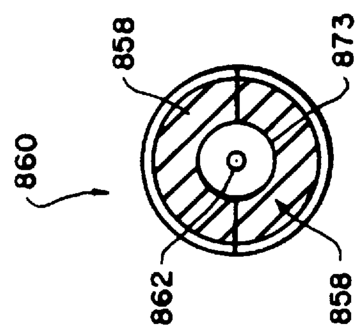

FIG. 90 is a vertical section taken along line 90—90 of FIG. 88.

Figure 91:
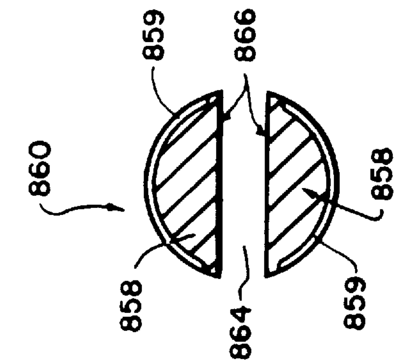

FIG. 91 is a vertical section taken along line 91—91 of FIG. 88.

Figure 92:
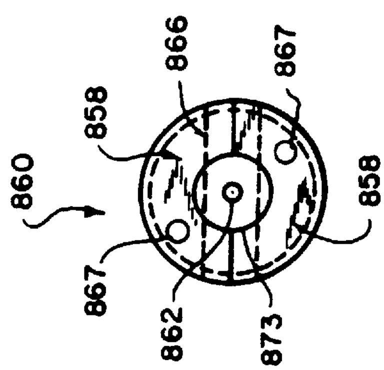

FIG. 92 is a front elevational view of the solid pin shuttle of FIG. 88.

Figure 93:
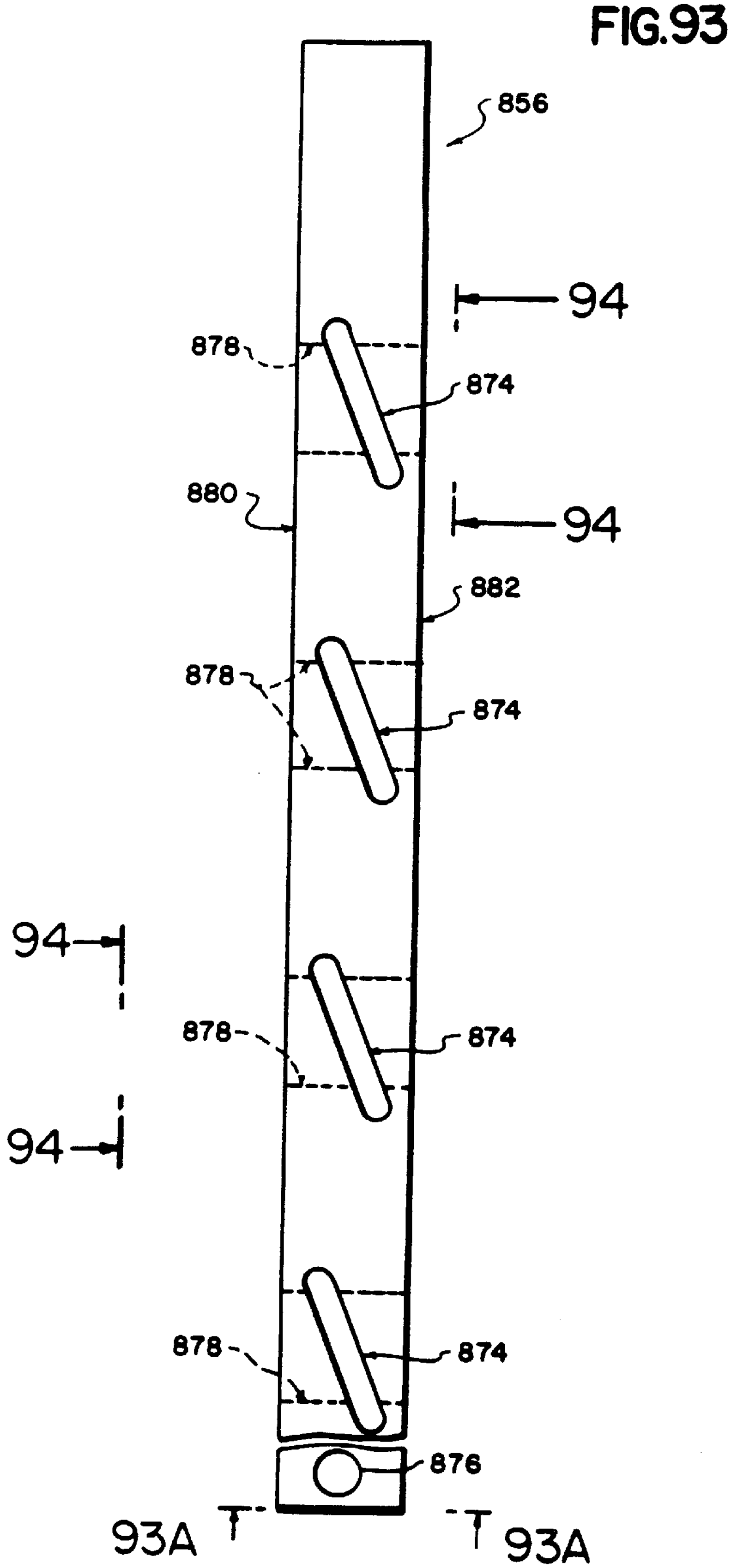

FIG. 93 is a side elevational view with portions broken away of the sleeve cam bar upon which is mounted the sleeve shuttle of FIGS. 88–92.

FIG. 93A is a plan view of the bottom of the sleeve cam bar as would be seen along line 93A—93A of FIG. 93.

FIG. 94 is a front elevational view of a portion of the sleeve cam bar as would be seen along line 94—94 of FIG. 93.

Figure 95:
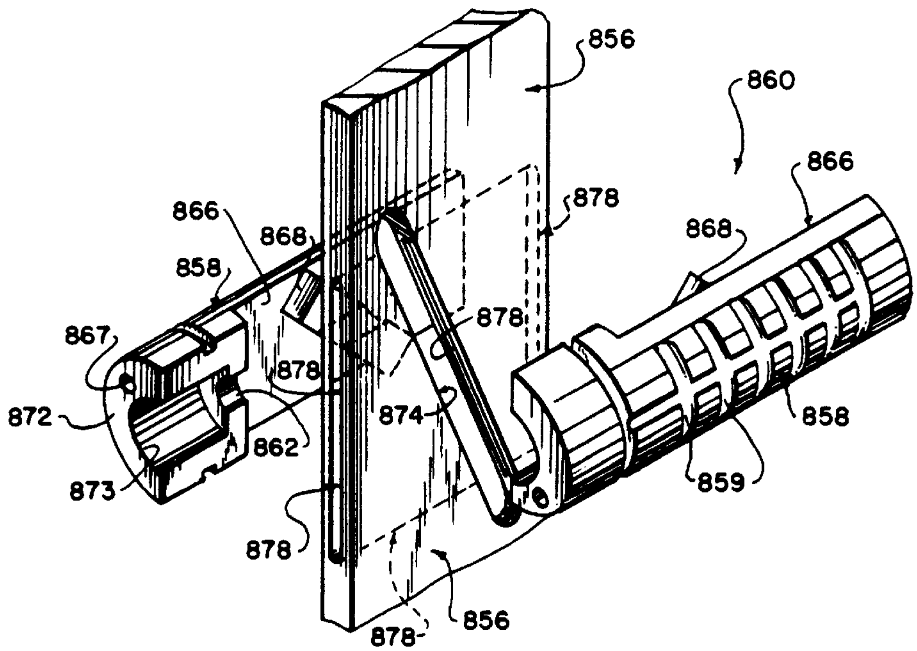

FIG. 95 is an exploded perspective view with portions broken away of the two halves of the sleeve shuttle positioned one on either side of the sleeve cam bar of FIG. 93.

Figure 96:
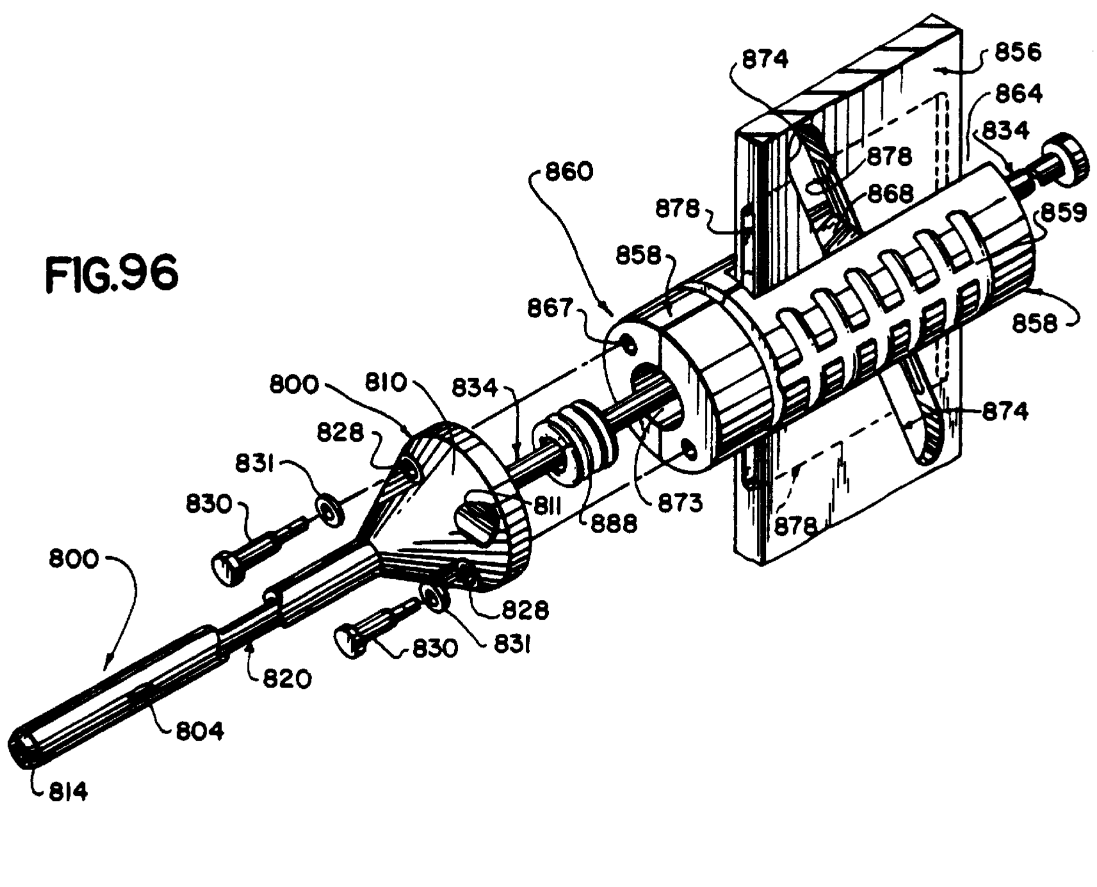

FIG. 96 is a perspective view with portions broken away and portions exploded showing the sleeve shuttle mounted onto the sleeve cam bar, with the sleeve ready for mounting onto the shuttle.

Figure 97:
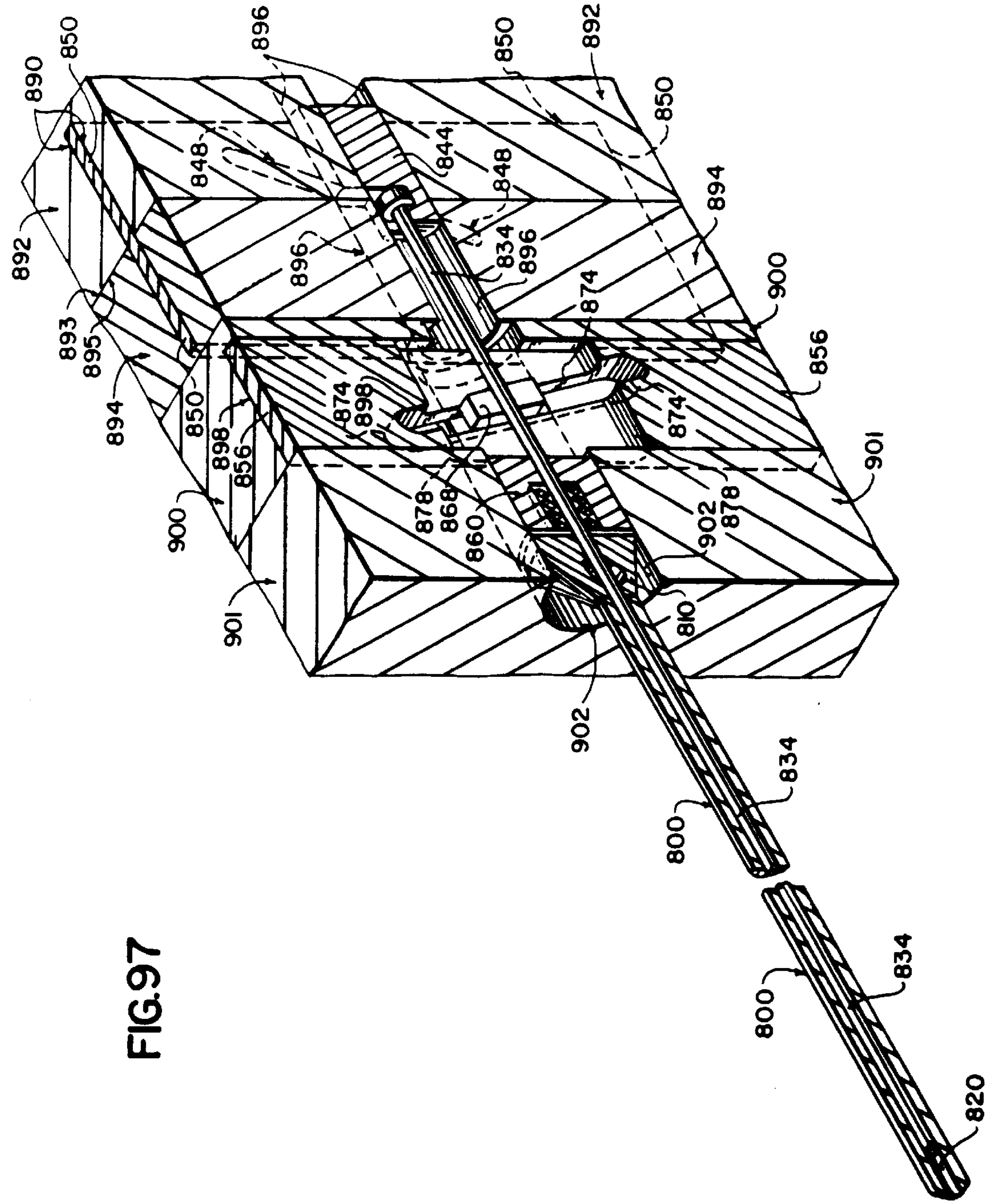

FIG. 97 is a vertical section with portions broken away as would be taken through the nozzle shut-off assembly, and through the sleeve and shuttle components, showing the mounting and relationships of the sleeve, its shuttle, and the pin and its shuttle.

Figure 98:
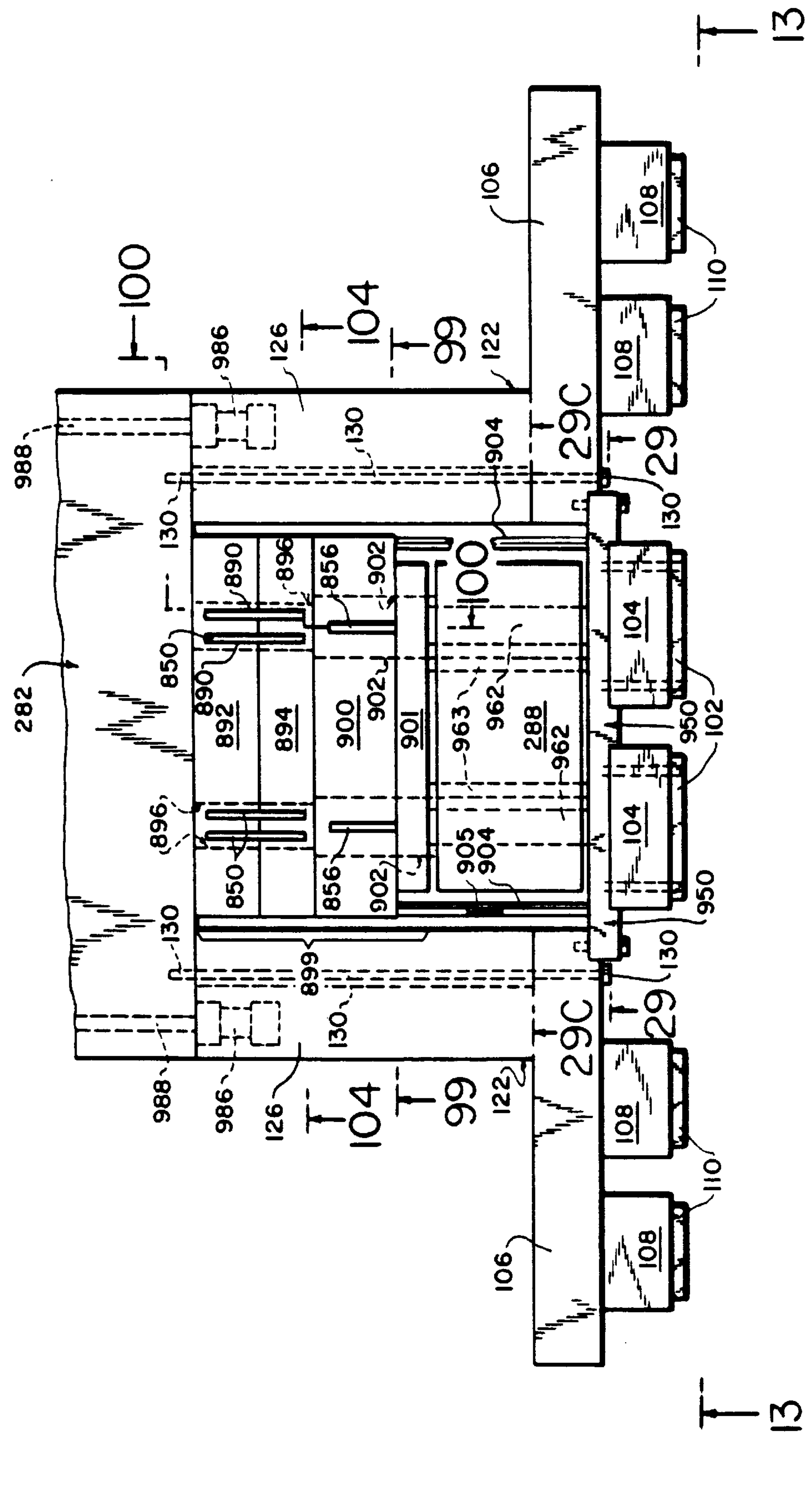

FIG. 98 is an enlarged schematic top plan view with portions broken away showing the front portion of a preferred embodiment of the multi-layer multi-cavity injection machine of this invention.

Figure 99:
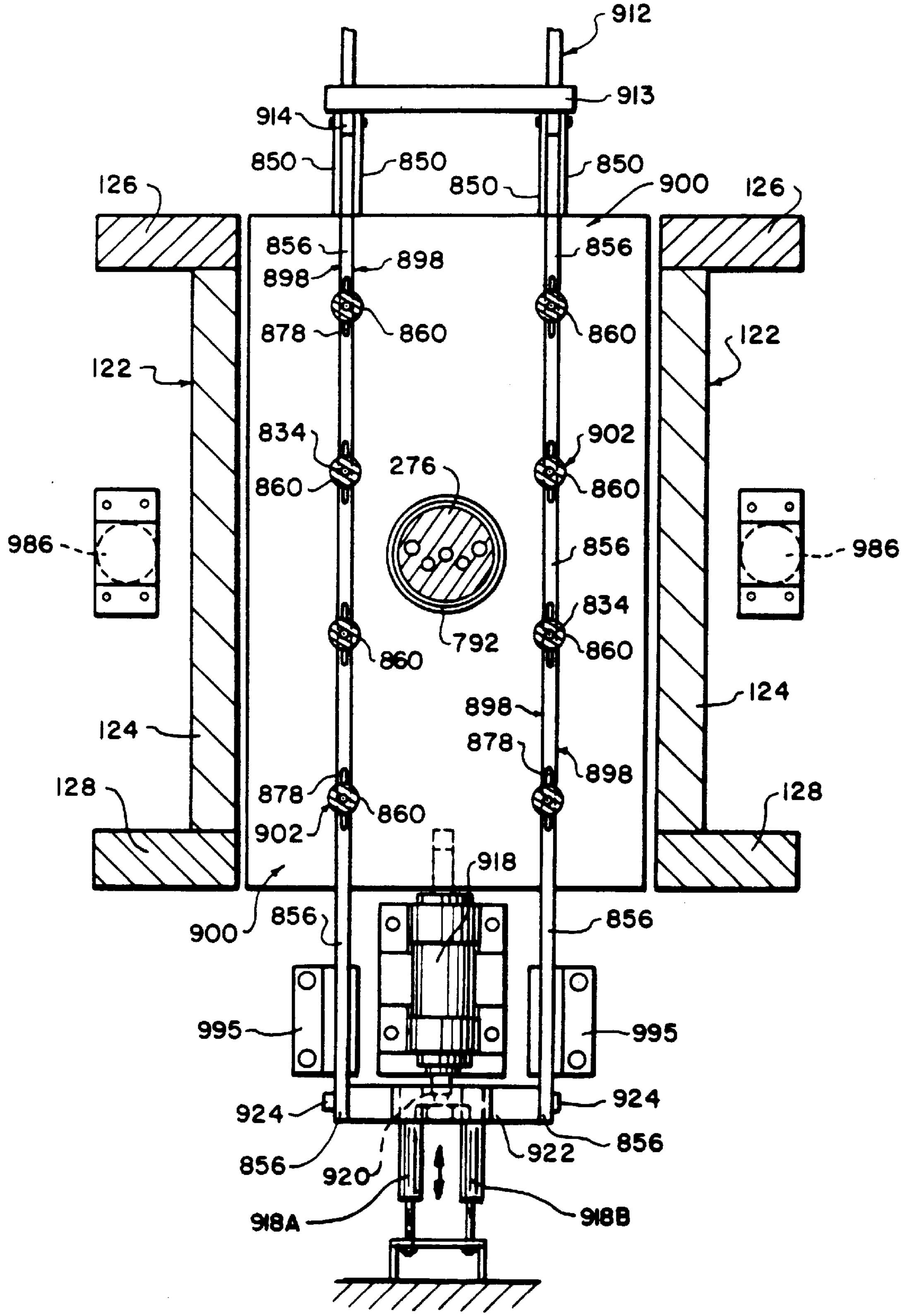

FIG. 99 is a view with portions in vertical section, in front elevation and with portions broken away, as would be seen along line 99—99 of FIG. 98.

Figure 100:
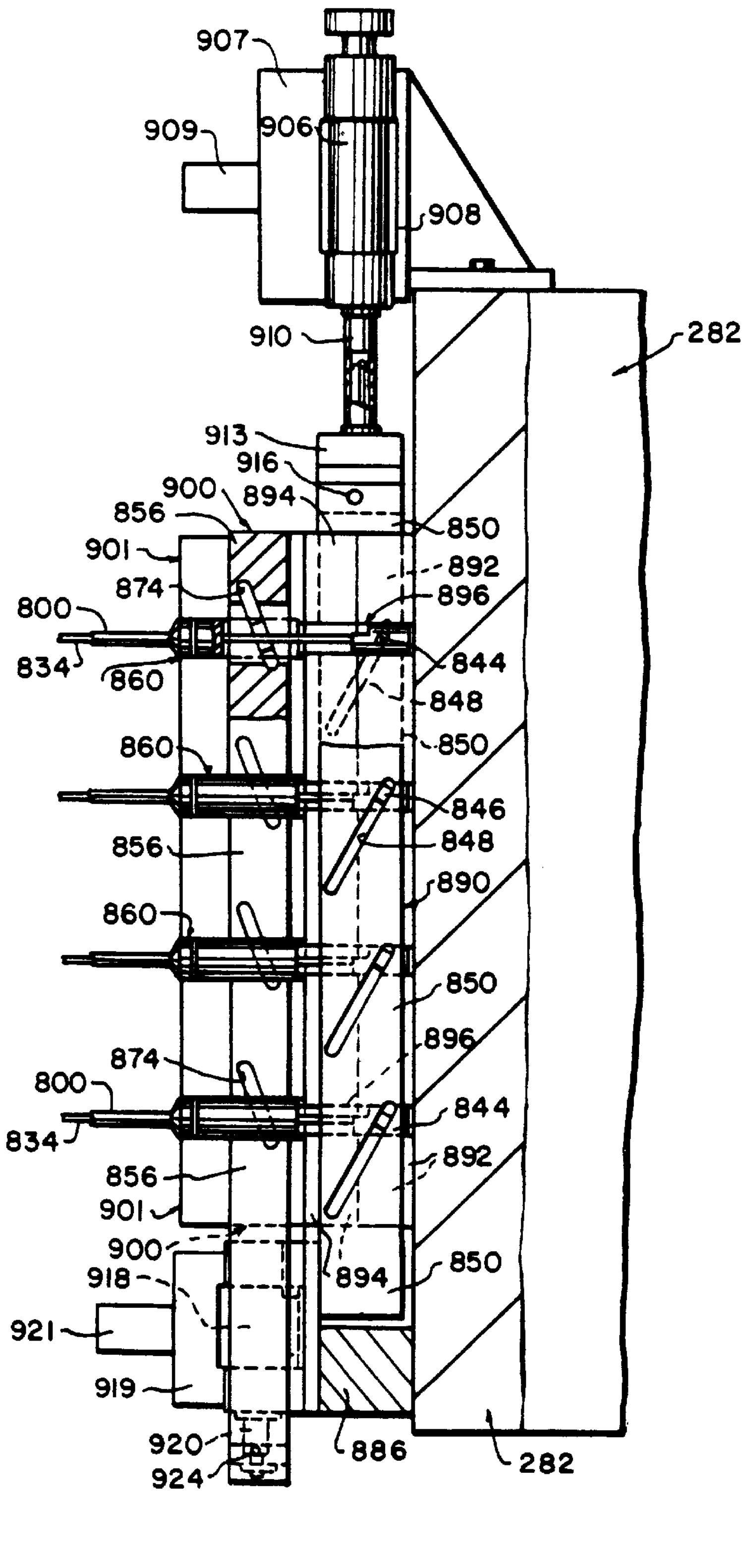

FIG. 100 is a view with portions in vertical section, in side elevation and with portions such as transducers not shown, as would be seen substantially along line 100—100 of FIG. 98.

Figure 30:
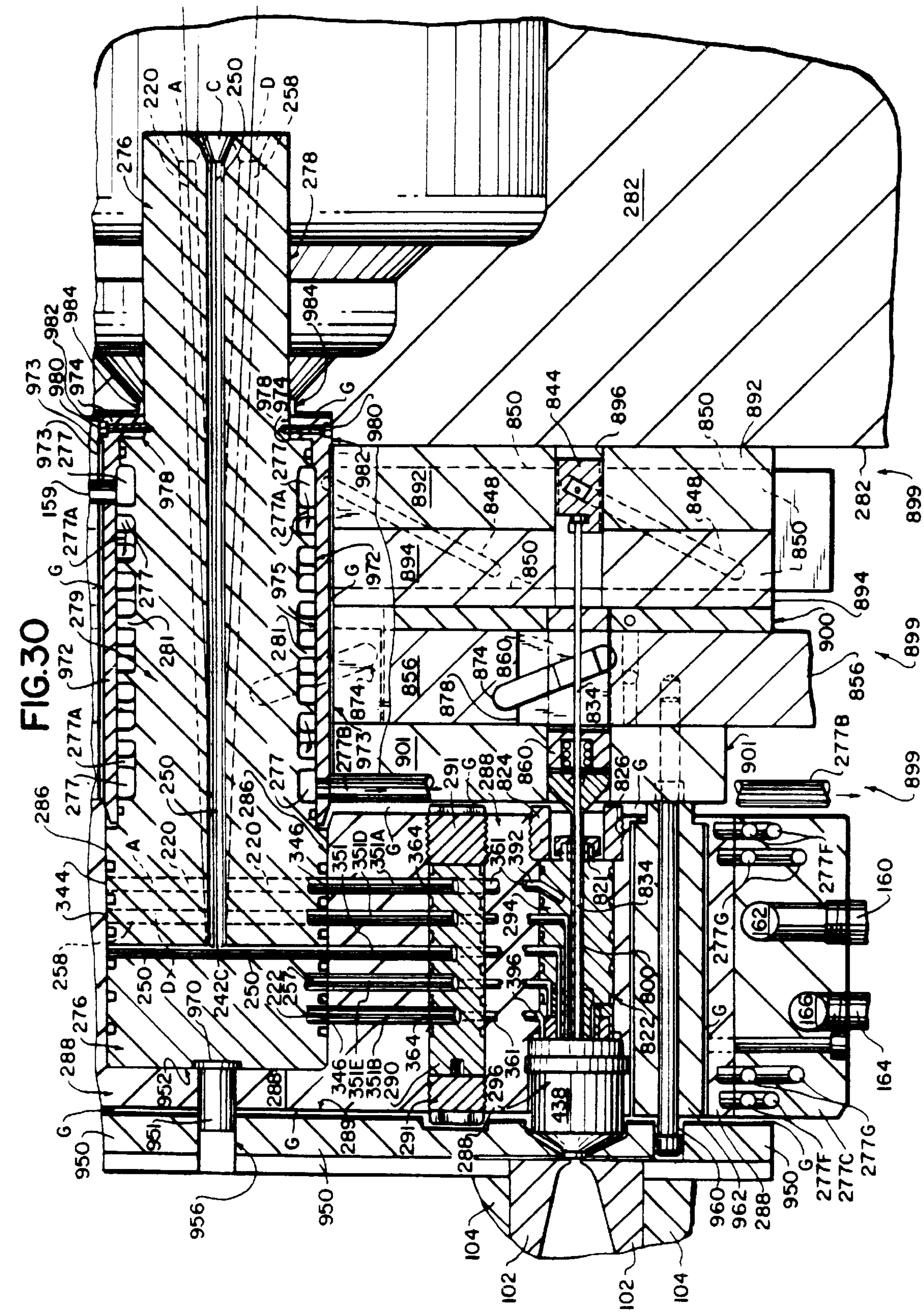
FIG. 30 is a vertical section taken substantially along line 30—30 of FIG. 29, showing the forward portion of the apparatus of this invention.
Figure 101:
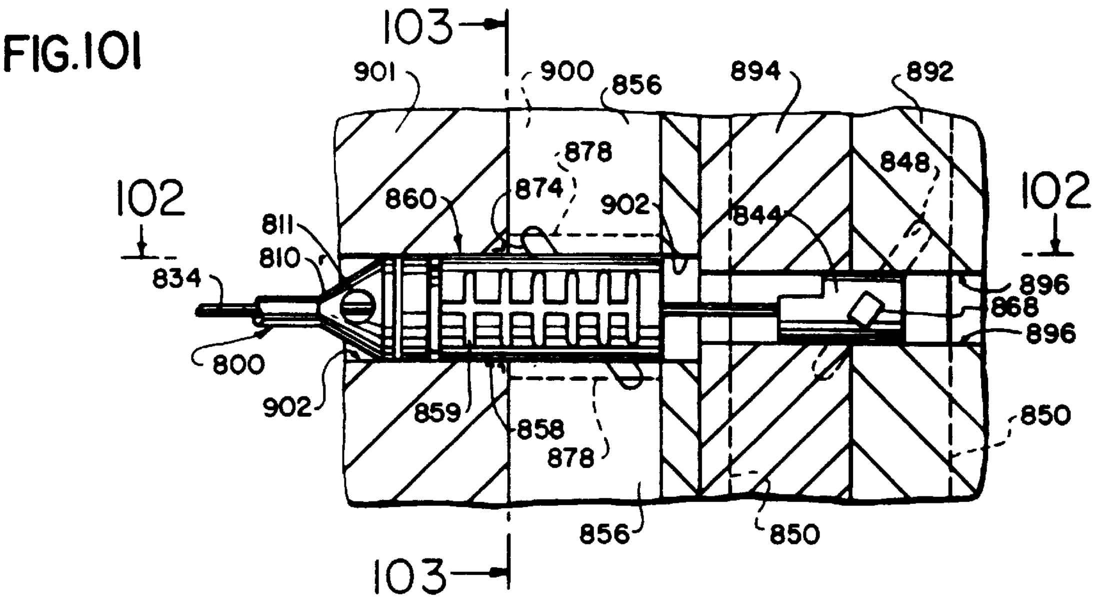

FIG. 101 is an enlarged vertical section with portions broken away and portions shown in side elevation, of a portion of FIG. 30, showing the sleeve and pin mounted on their shuttles and on their respective cam bars in the nozzle shut-off assembly.

Figure 102:
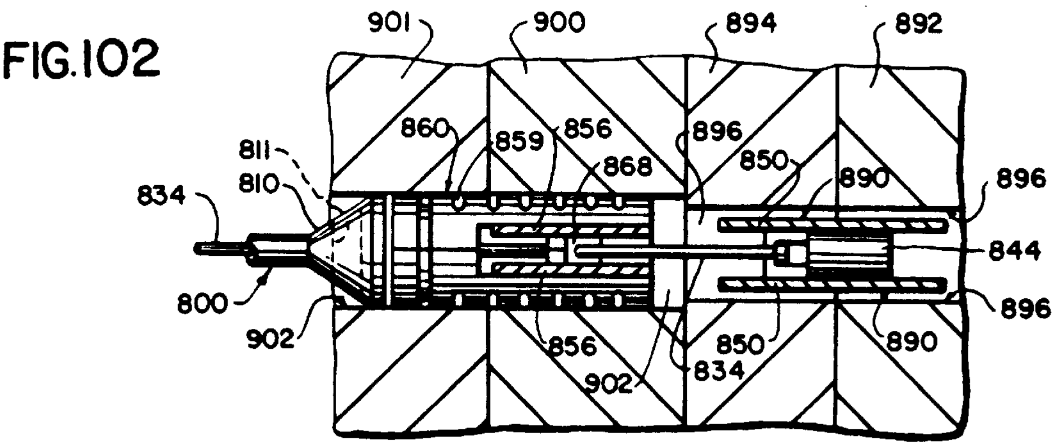

FIG. 102 is a horizontal section with portions shown in top plan view as would be seen substantially along line 102—102 of FIG. 101.

Figure 103:
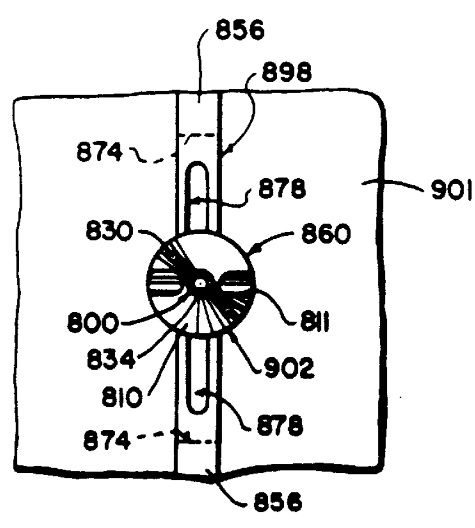

FIG. 103 is a front elevational view with portions in vertical section and portions broken away, as would be seen substantially along line 103—103 of FIG. 101.

FIG. 104 is a front elevational view with portions shown in vertical section and portions broken away, as would be seen substantially along line 104—104 of FIG. 98.

FIG. 105 is an enlarged front elevational view as would be seen of a portion of FIG. 104 with the pin shuttle and pin cam bars removed.

Figure 106:
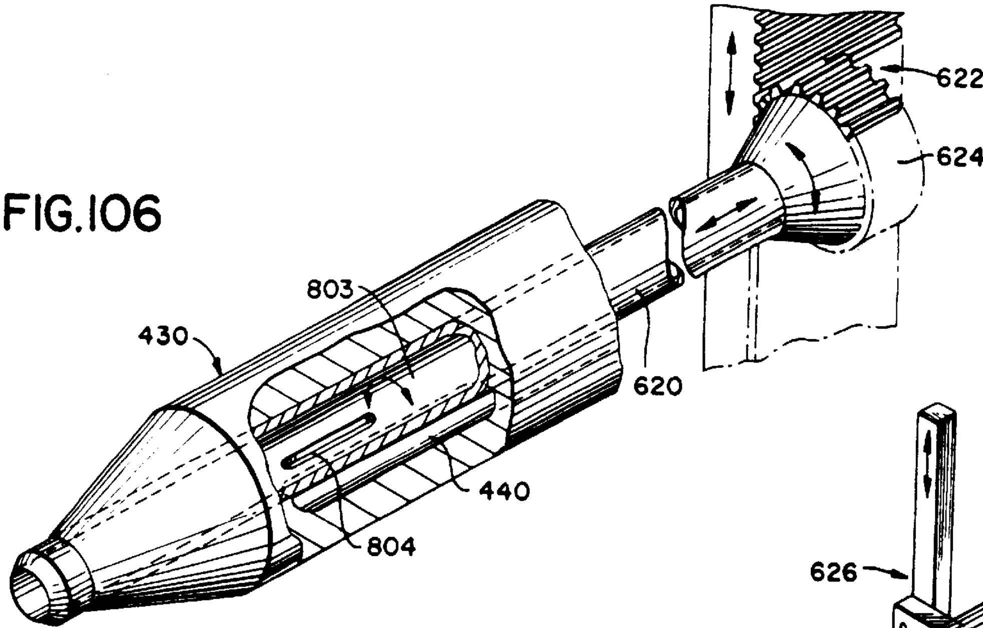

FIG. 106 is an enlarged perspective view with portions broken away, portions in cross-section and portions in phantom, showing alternative valve means mounted in a nozzle shell, and alternative drive means of this invention.

Figure 107:
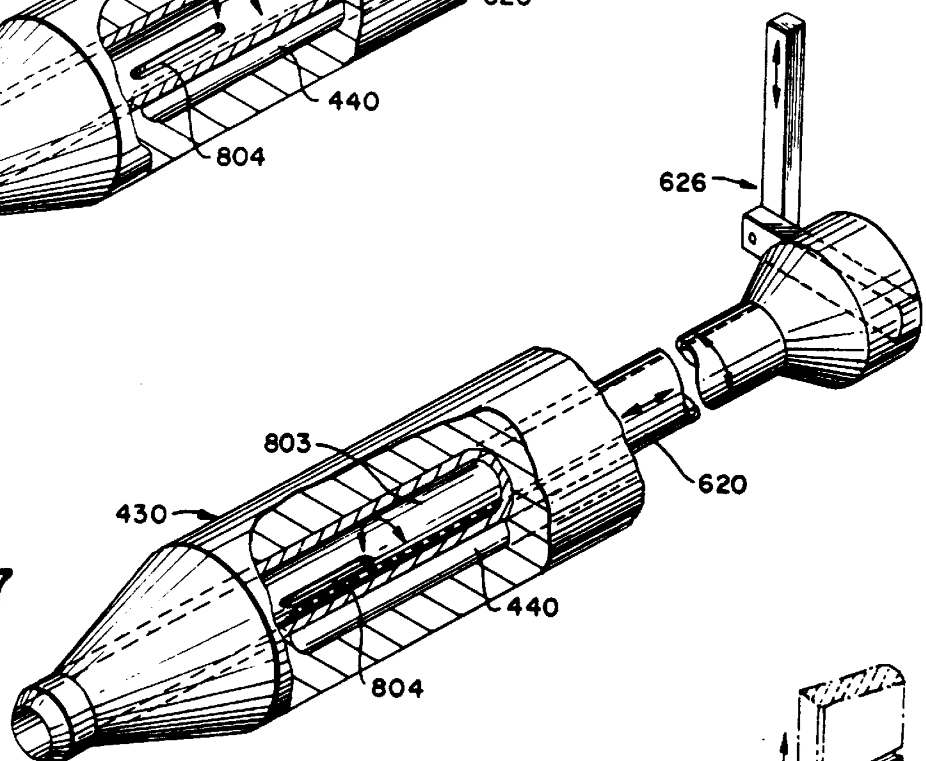

FIG. 107 is an enlarged perspective view with portions broken away and portions in cross-section showing alternative valve means mounted in the central channel of a nozzle shell, and alternative drive means of this invention.

Figure 108:
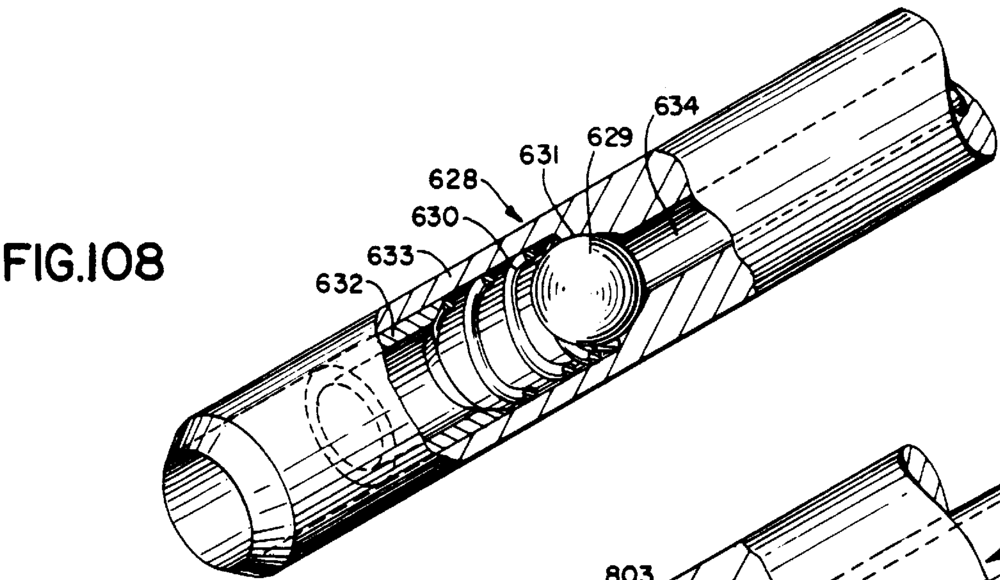

FIG. 108 is an enlarged perspective view with portions broken away and portions in cross-section showing alternative valve means of this invention.

Figure 109:
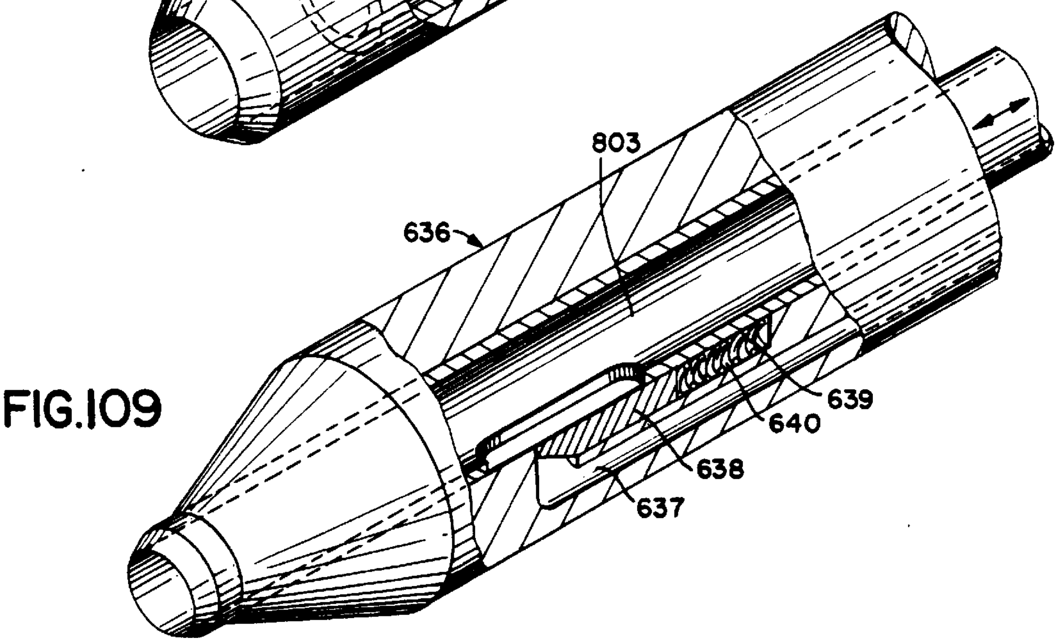

FIG. 109 is an enlarged perspective view with portions broken away and portions in cross-section showing an alternative embodiment of valve means mounted within the central channel of a nozzle shell.

Figure 110:
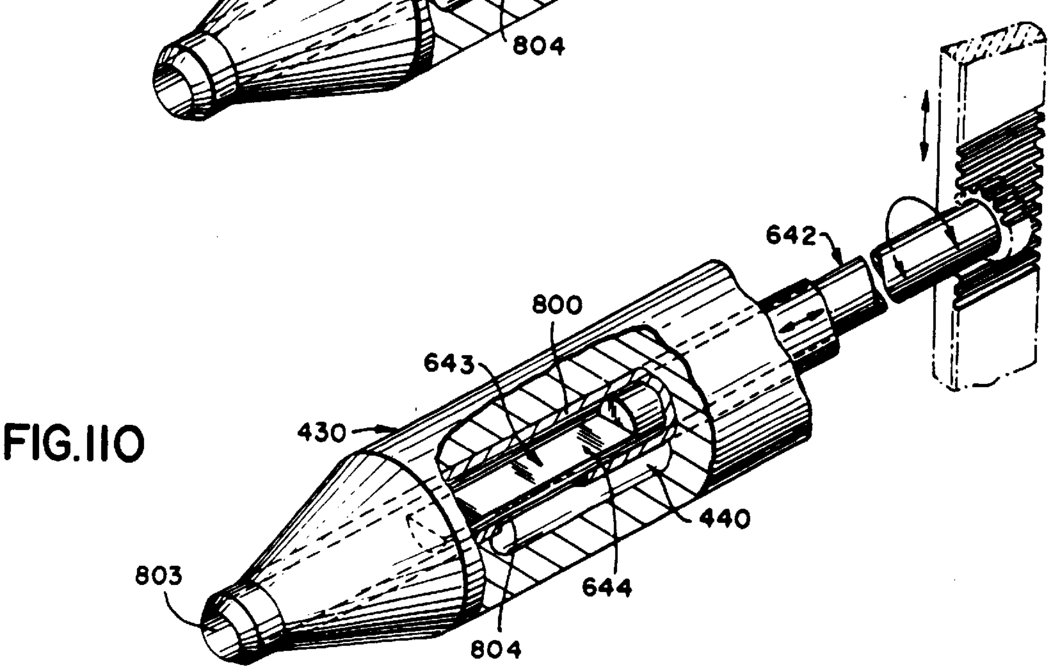

FIG. 110 is a perspective view with portions broken away and portions in cross-section showing another embodiment of valve means mounted within the central channel of a nozzle shell, and of alternative drive means of this invention.

Figure 111:
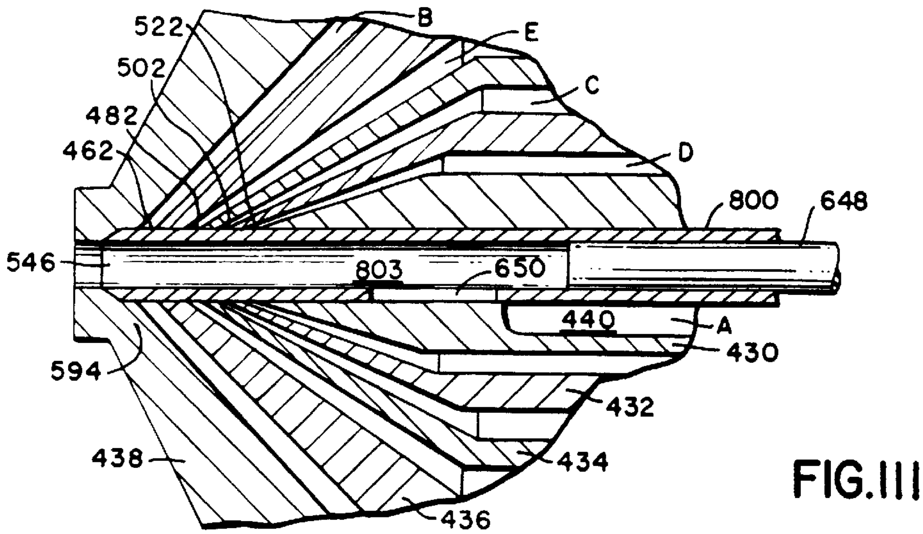
Figure 112:
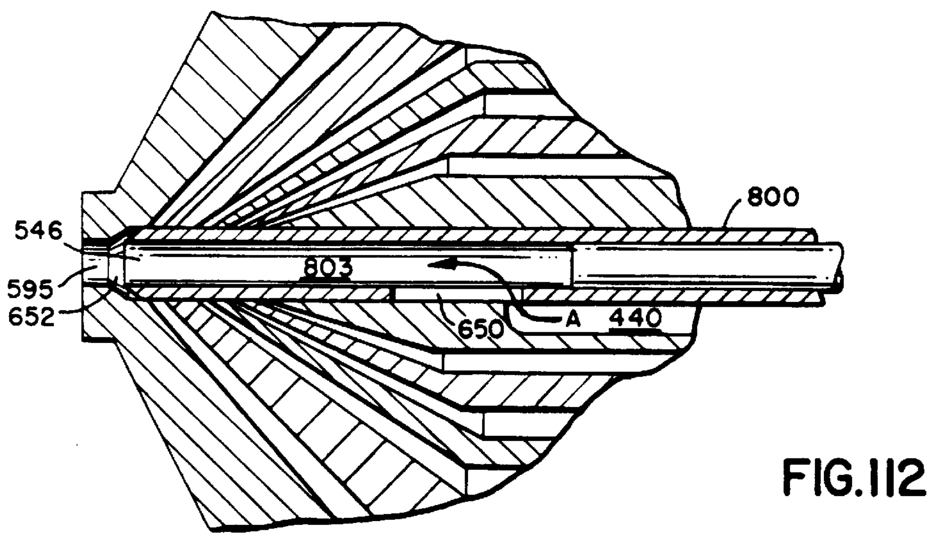
Figure 113:
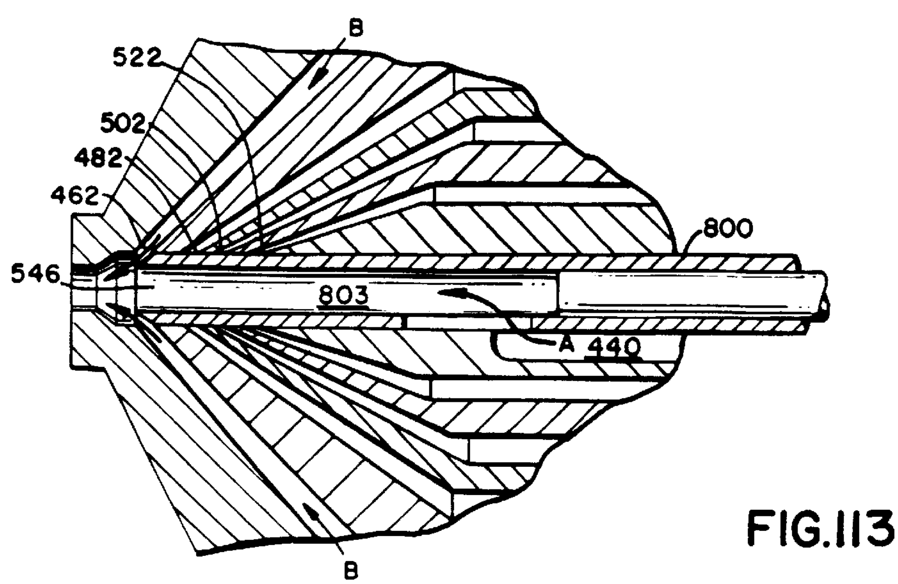
Figure 114:
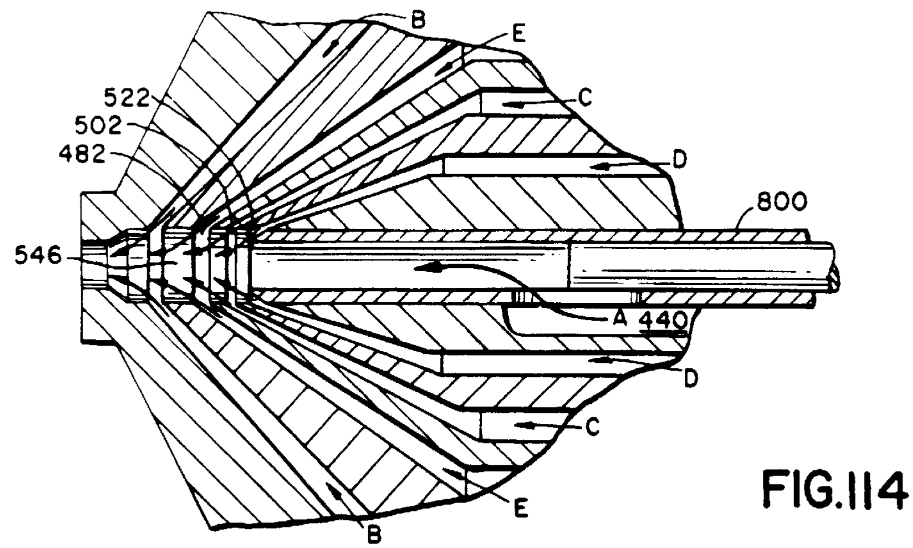
Figure 115:
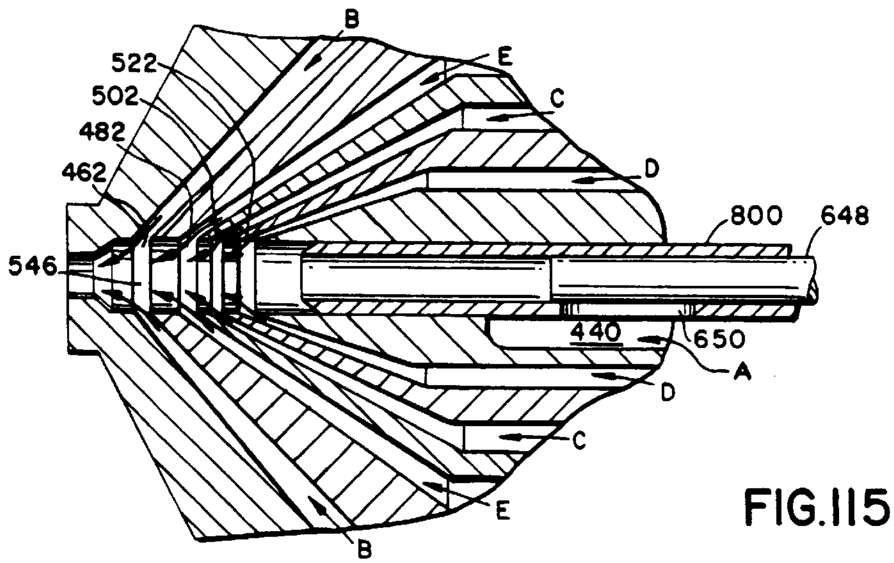
Figure 116:
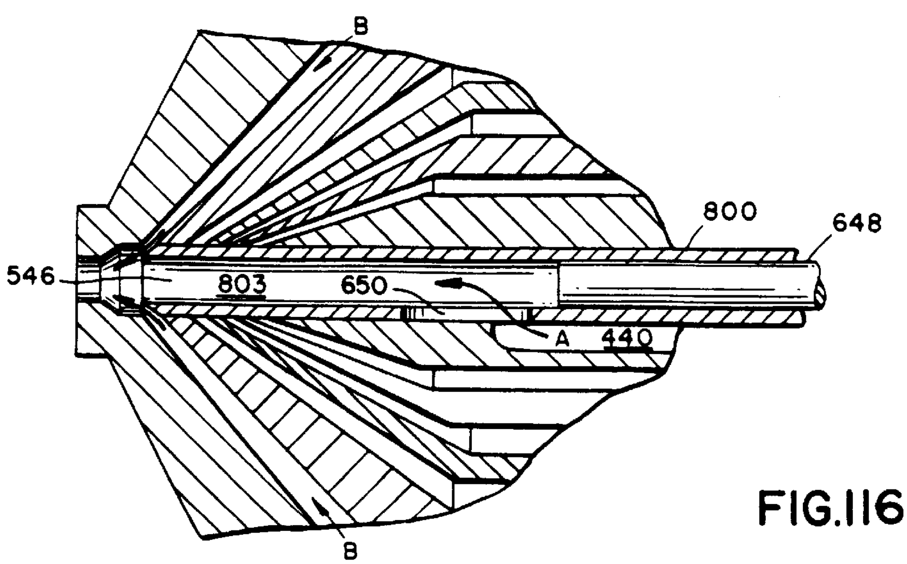

FIGS. 111 through 116 are enlarged vertical sections with portions broken away and portions shown in side elevation taken through the forward portion of a preferred embodiment of co-injection nozzle means of this invention wherein the valve means includes a fixed pin. FIG. 111 shows the first position or mode of the sleeve, FIG. 112 shows the second, FIG. 113 the third, FIG. 114 the fourth, FIG. 115 the fifth and FIG. 116 the sixth position or mode of the sleeve in an injection cycle.

Figure 117:
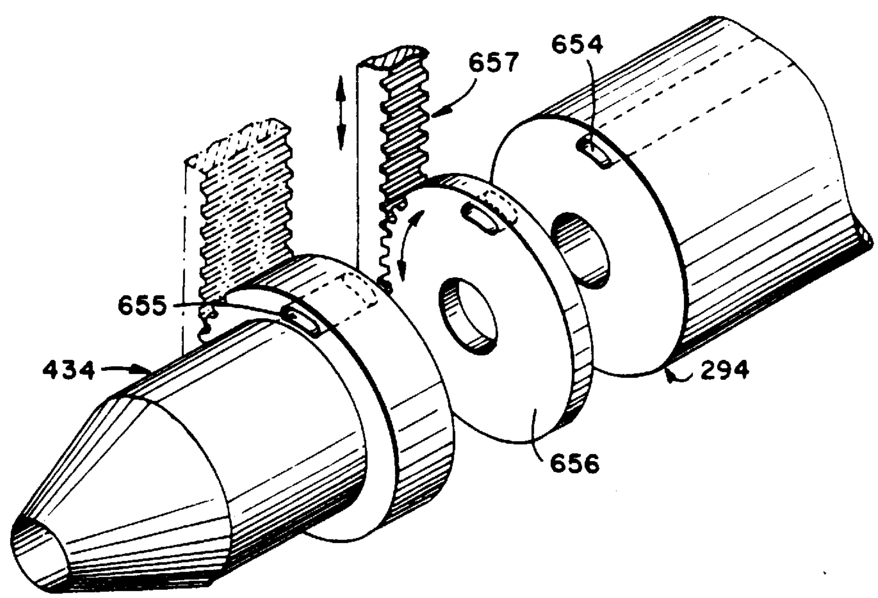

FIG. 117 is an enlarged exploded perspective view with portions shown in section, portions broken away and portions shown in phantom, showing still another embodiment of the valve means and drive means of this invention.

Figure 118:
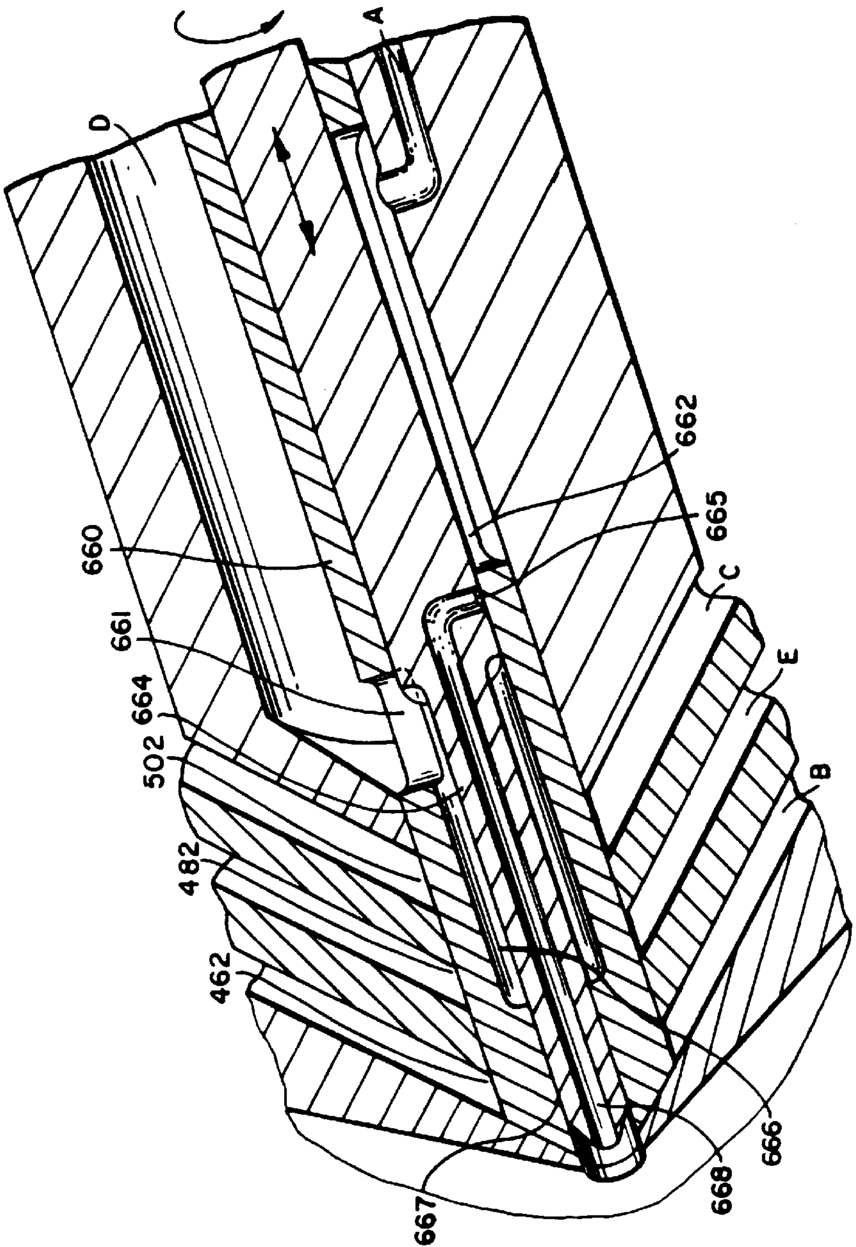

FIG. 118 is an enlarged perspective view with portions in vertical section and portions broken away, showing the forward portion of another embodiment of co-injection nozzle means of this invention.

Figure 118A:
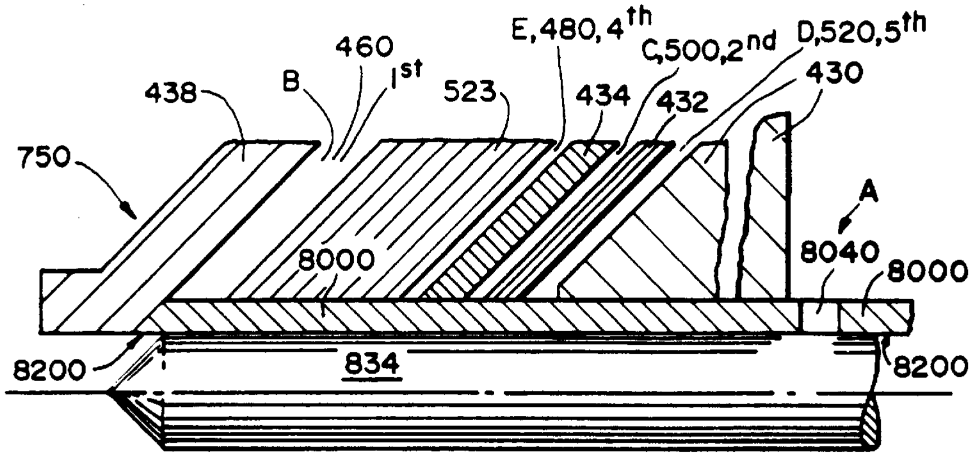

FIG. 118A is an enlarged schematic view with portions in vertical section, portions in side elevation and portions broken away showing a portion of an alternative nozzle assembly of this invention.

Figure 118B:
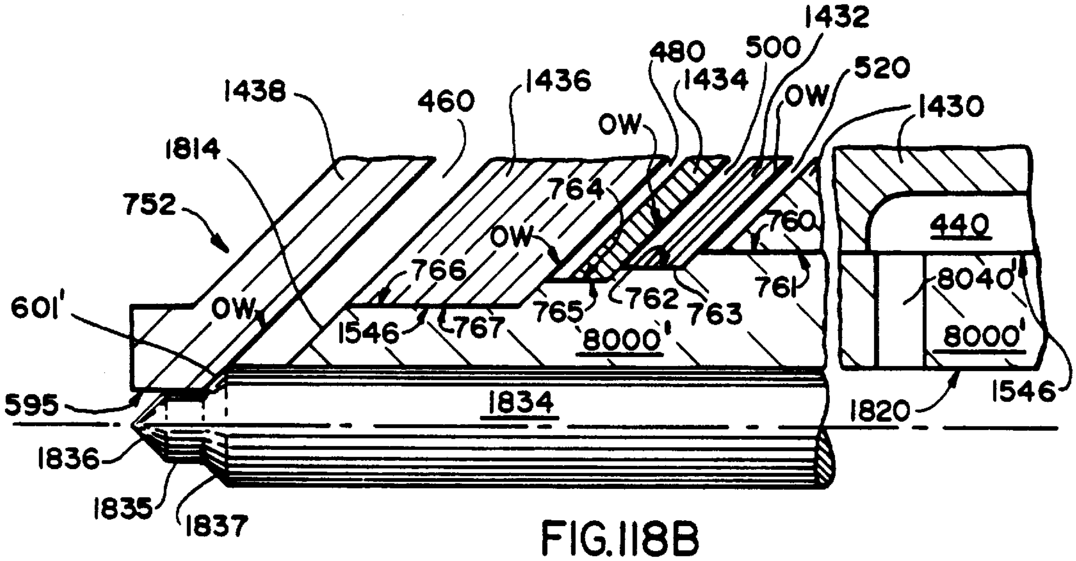

FIG. 118B is an enlarged perspective view with portions shown in vertical section, in side elevation and portions broken away, showing alternative valve means in the form of a stepped sleeve and modified pin nose.

Figure 118C:
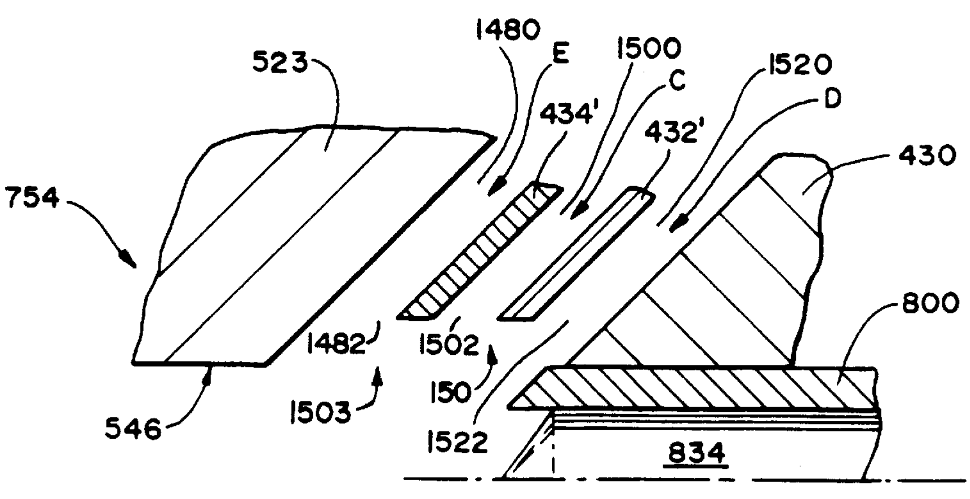

FIG. 118C is an enlarged schematic view with portions in vertical section, portions in side elevation and portions broken away showing an embodiment of the co-injection nozzle assembly having modified passageways and orifices for internal layer materials.

Figure 118E:
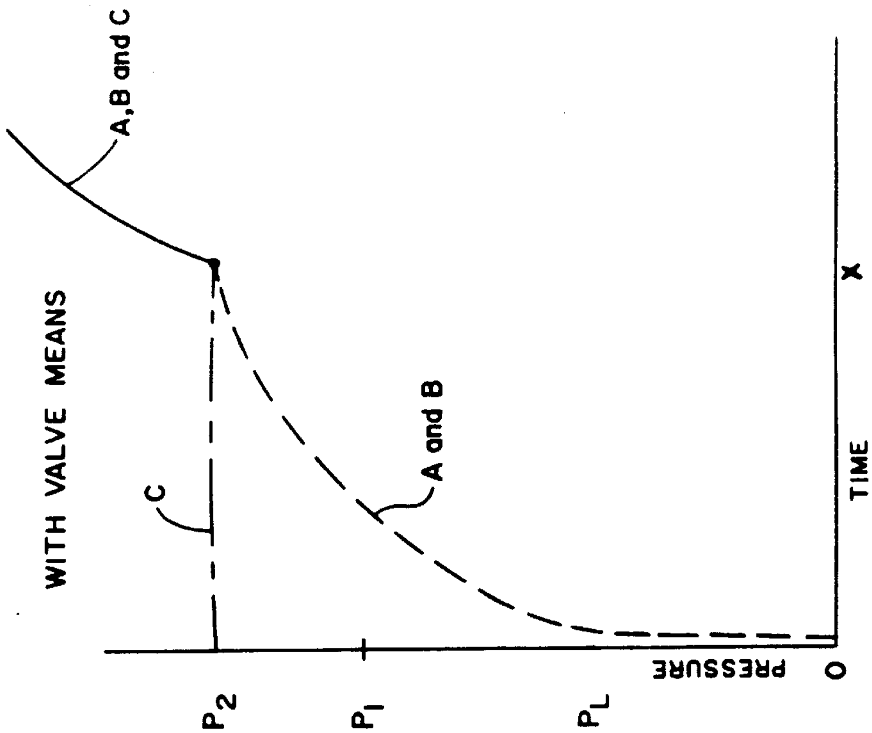
Figure 118D:
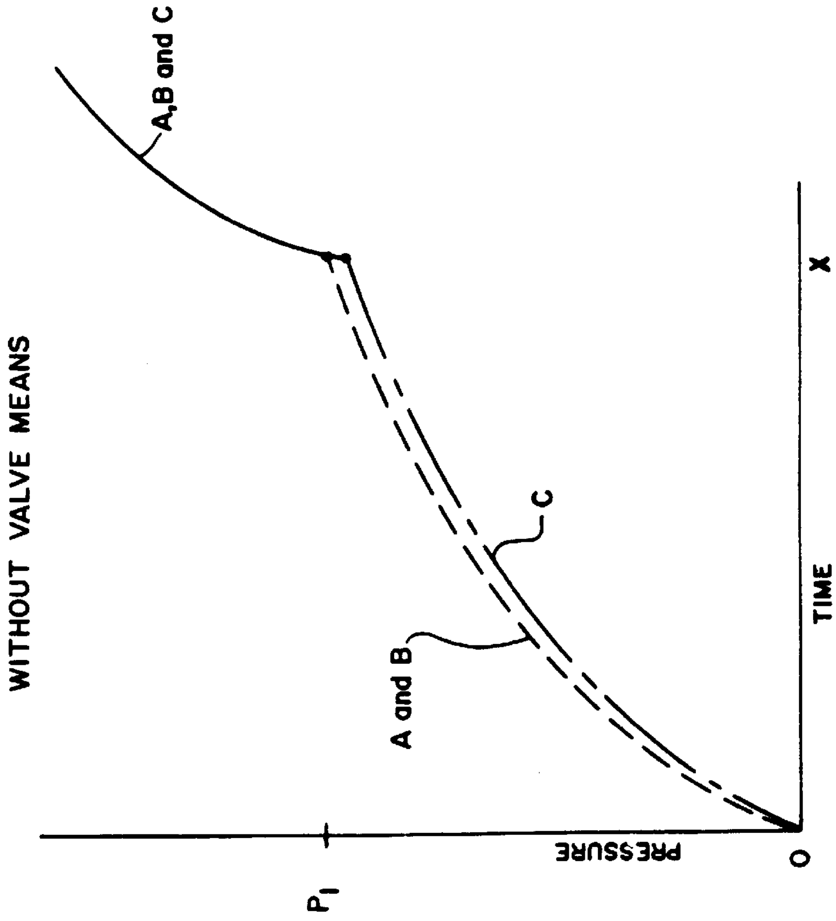

FIG. 118D is a schematic plot of pressure in the combining area of a co-injection nozzle without valve means, as a function of time.

FIG. 118E is a schematic plot of pressure in the combining area of a co-injection nozzle with valve means, as a function of time.

Figure 118F:
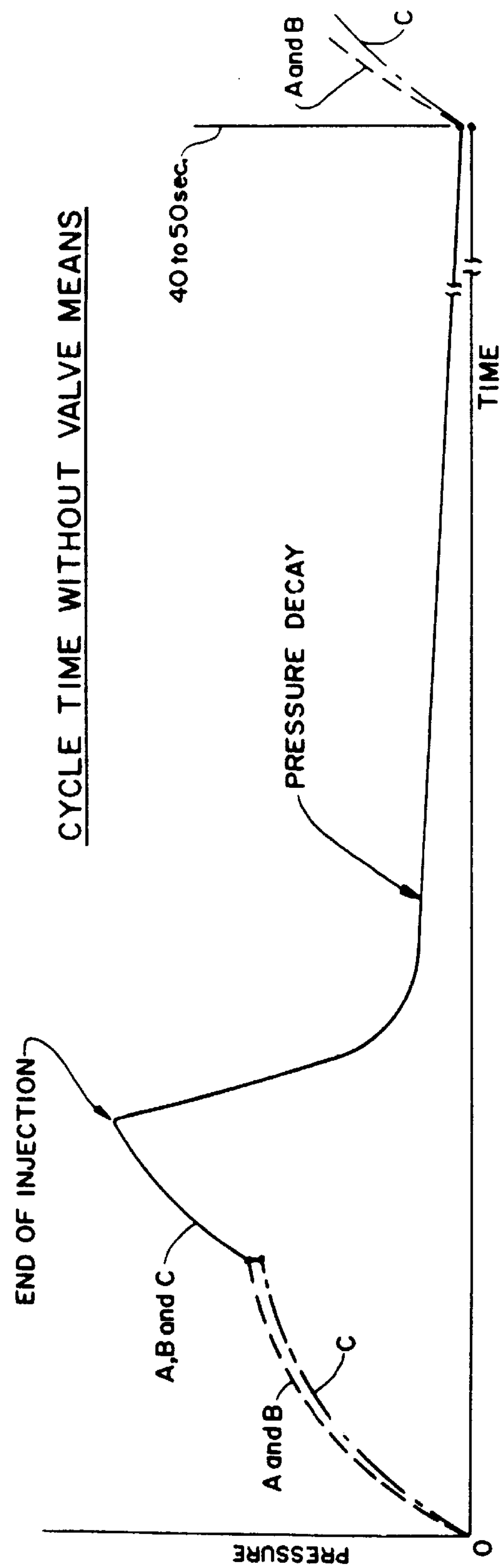

FIG. 118F is a schematic plot showing pressure as a function of injection cycle time without the benefit of the valve means of this invention.

Figure 118G:
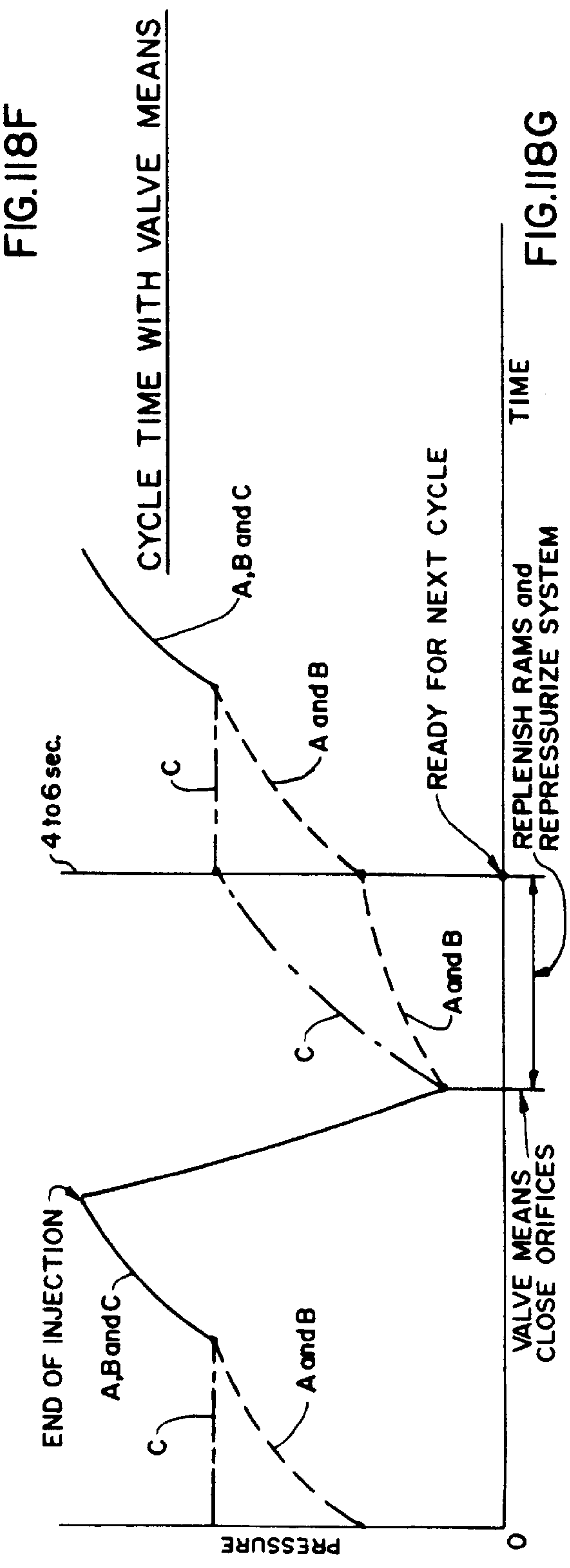

FIG. 118G is a schematic plot of pressure versus injection cycle time with the benefit of the valve means of this invention.

Figure 119:
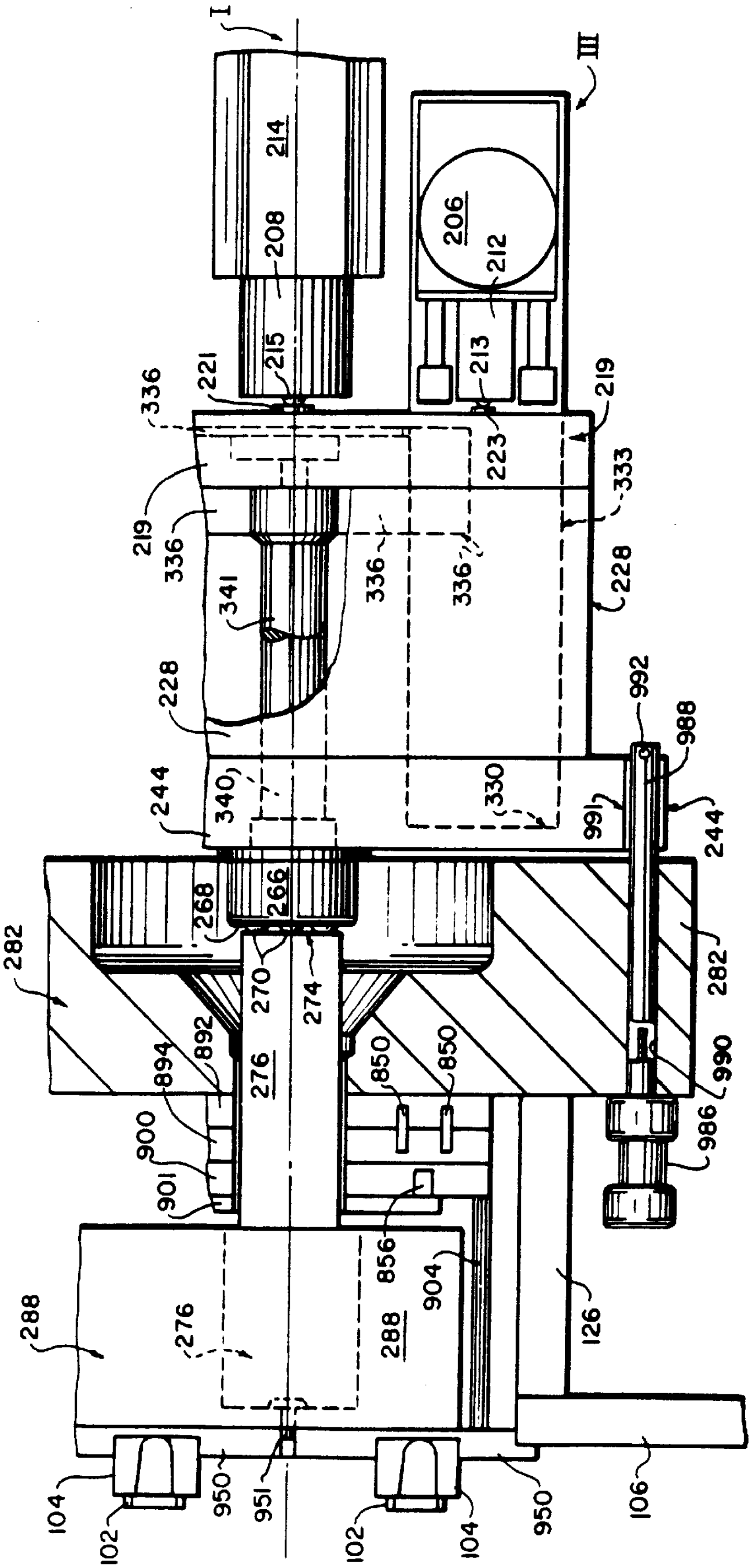

FIG. 119 is a schematic view with portions shown in horizontal section and portions broken away, showing the left-hand portion of the apparatus of this invention which provides the effective pressure contact seal between the injection cavity sprue and nozzle orifices of this invention.

Figure 120:
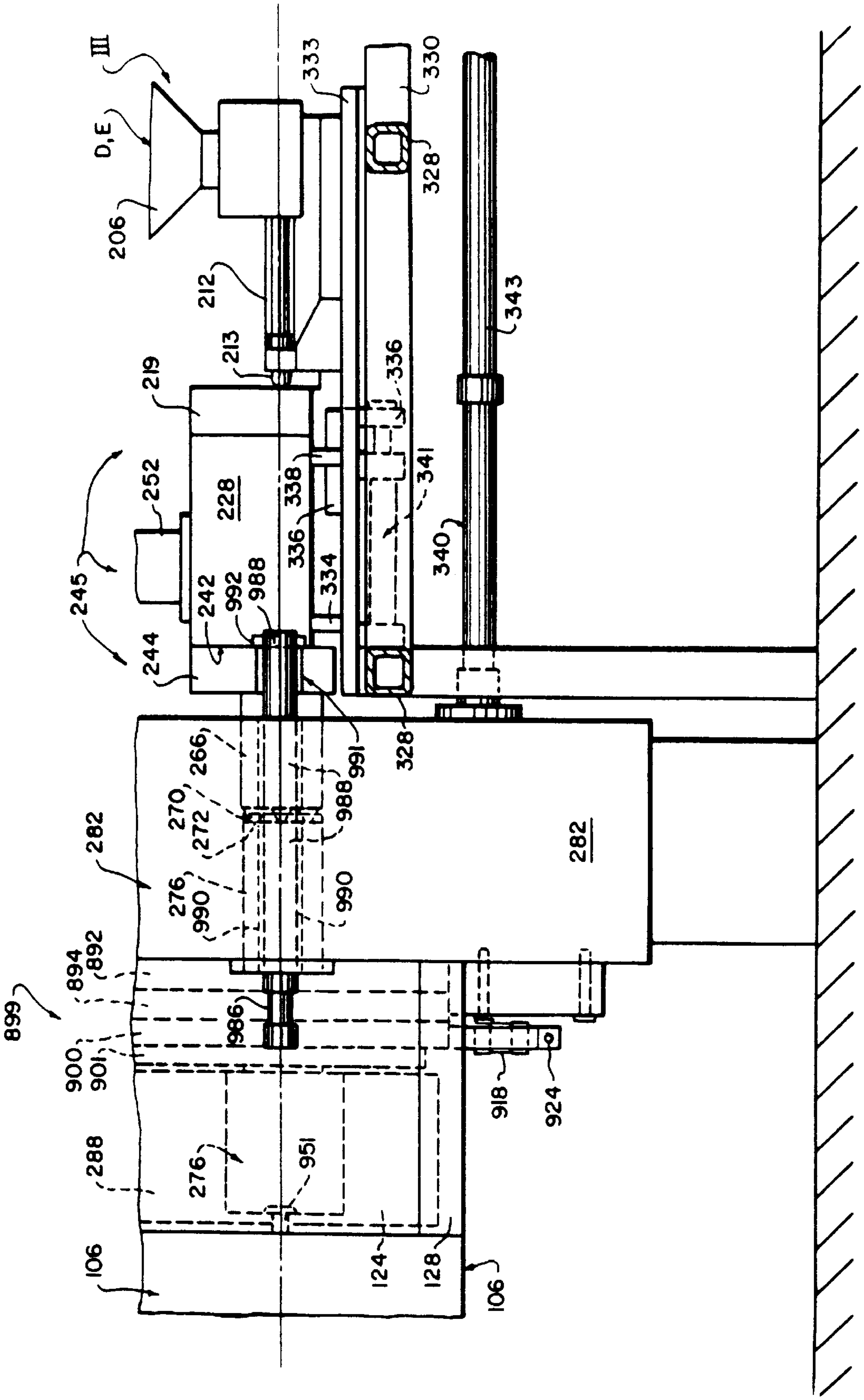

FIG. 120 is an enlarged side elevational view with portions shown in section and portions broken away, of the apparatus of FIG. 119.

Figure 121:
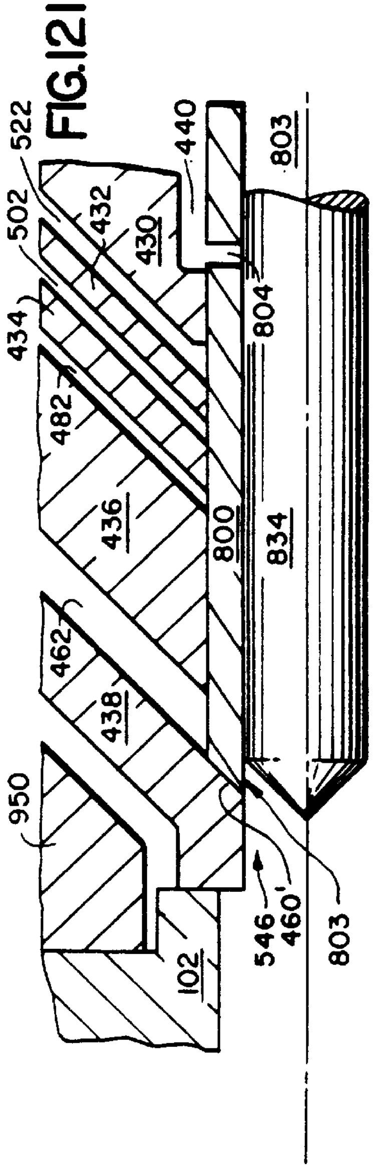
Figure 122:
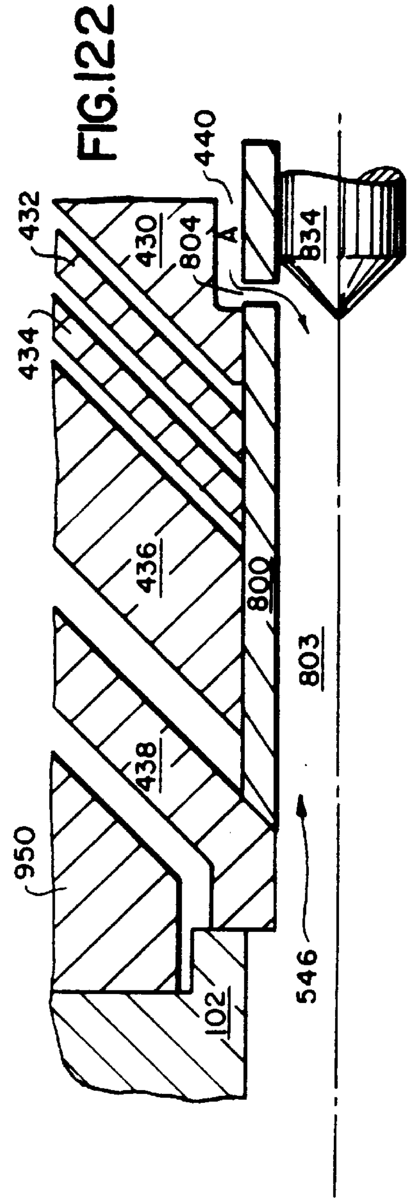

FIGS. 121 through 126 are enlarged schematic views with portions in vertical section and in side elevation, and with portions broken away, showing the preferred selected positions or modes of the preferred valve means of this invention. FIG. 121 shows the first mode, FIG. 122 the second, FIG. 123 the third, FIG. 124 the fourth, FIG. 125 the fifth and FIG. 126 the sixth mode.

Figure 127:
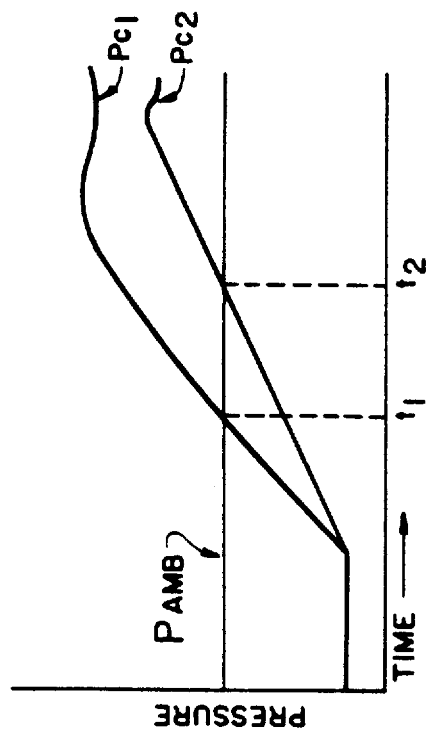

FIG. 127 is a plot of melt pressure versus time showing a relatively slow rate of buildup of pressure of the C layer material.

Figure 128:
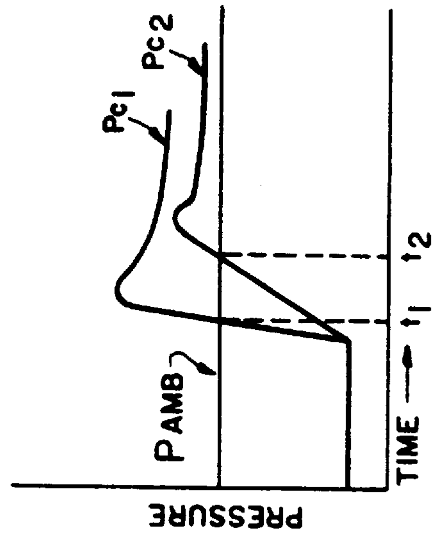

FIG. 128 is a plot of melt pressure versus time with a relatively increased rate of pressure buildup of the C layer material.

Figure 129:
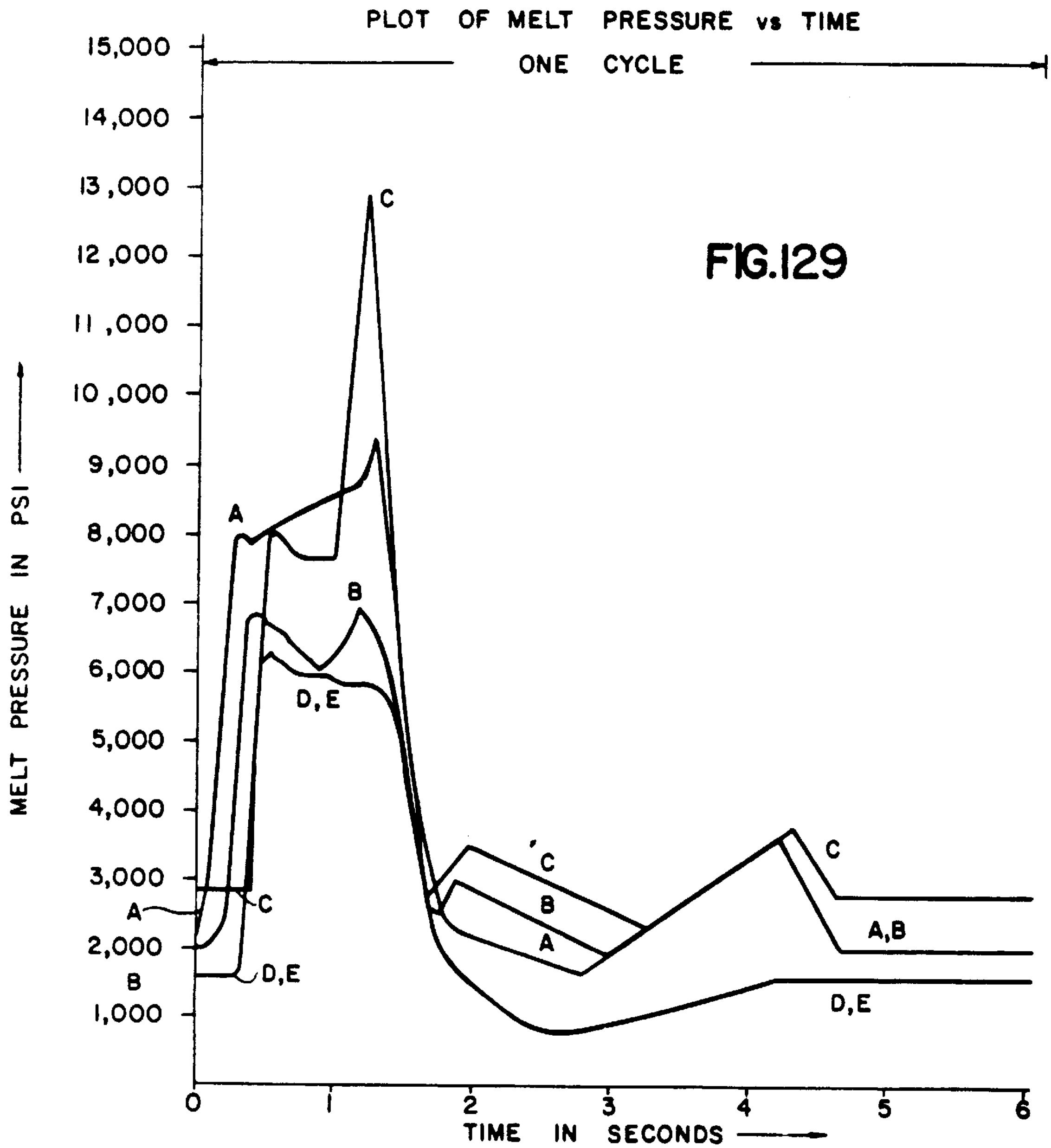

FIG. 129 is a plot of the melt pressure of five polymer flow streams of this invention as a function of time for the eight cavity injection machine of this invention.

Figure 130:
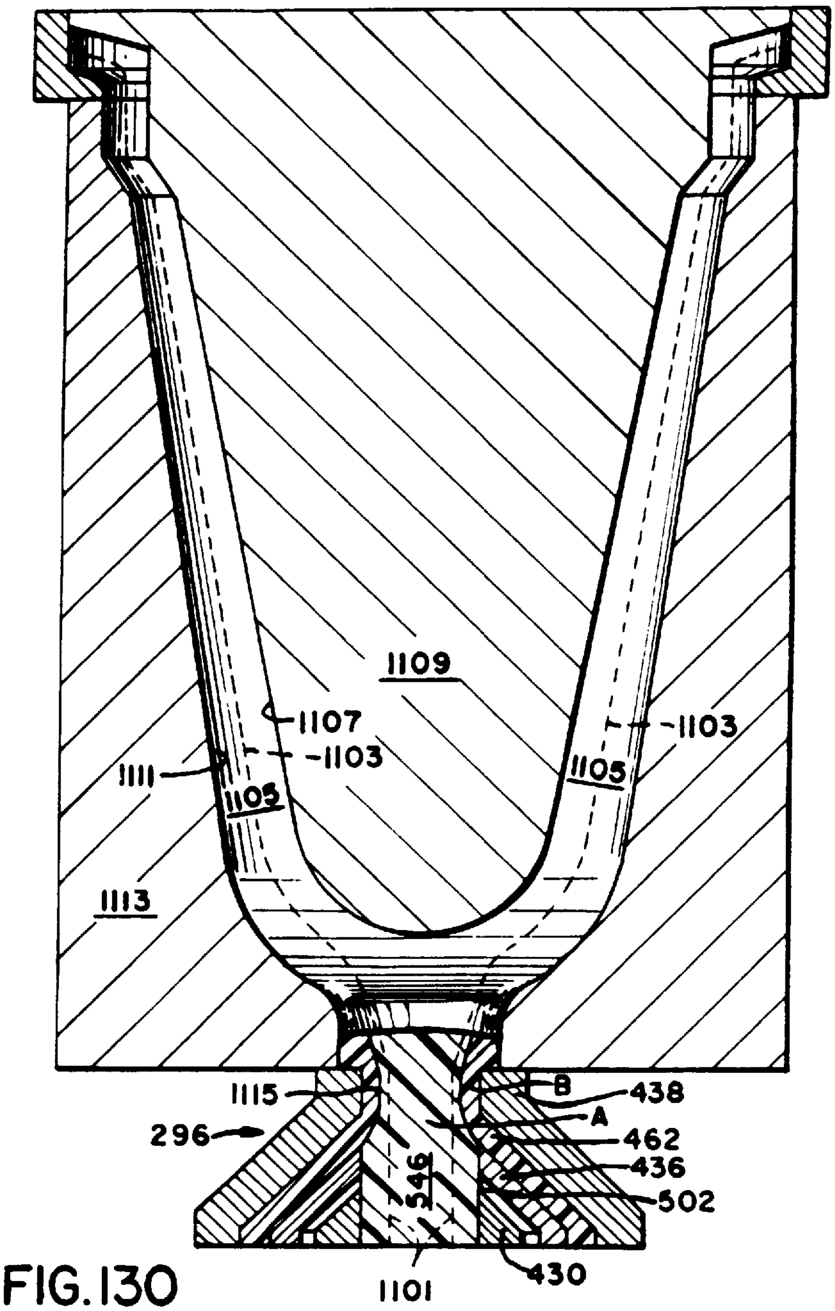
Figure 131:
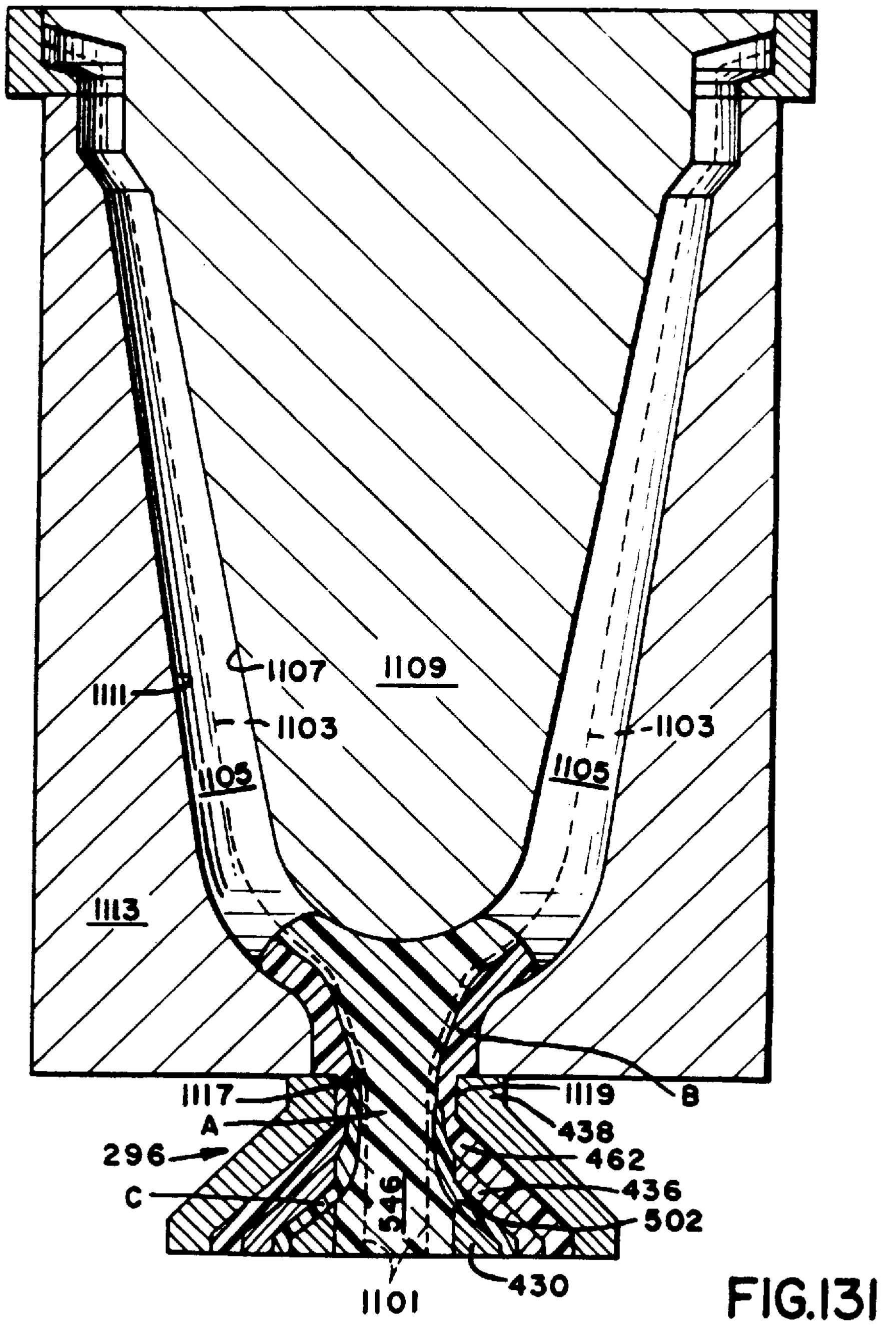

FIGS. 130 through 137 are enlarged schematic vertical sectional views of the forward portion of a co-injection nozzle assembly in communication with an injection cavity sprue, showing the foldover injection method of this invention. FIG. 131 shows time bias in the initial flow of C layer material, FIG. 132 the C layer material moved across the fast flow streamline, and FIG. 133 the marginal end portion of the C layer material folded over within a flow stream moving into the injection cavity sprue.

Figure 134:
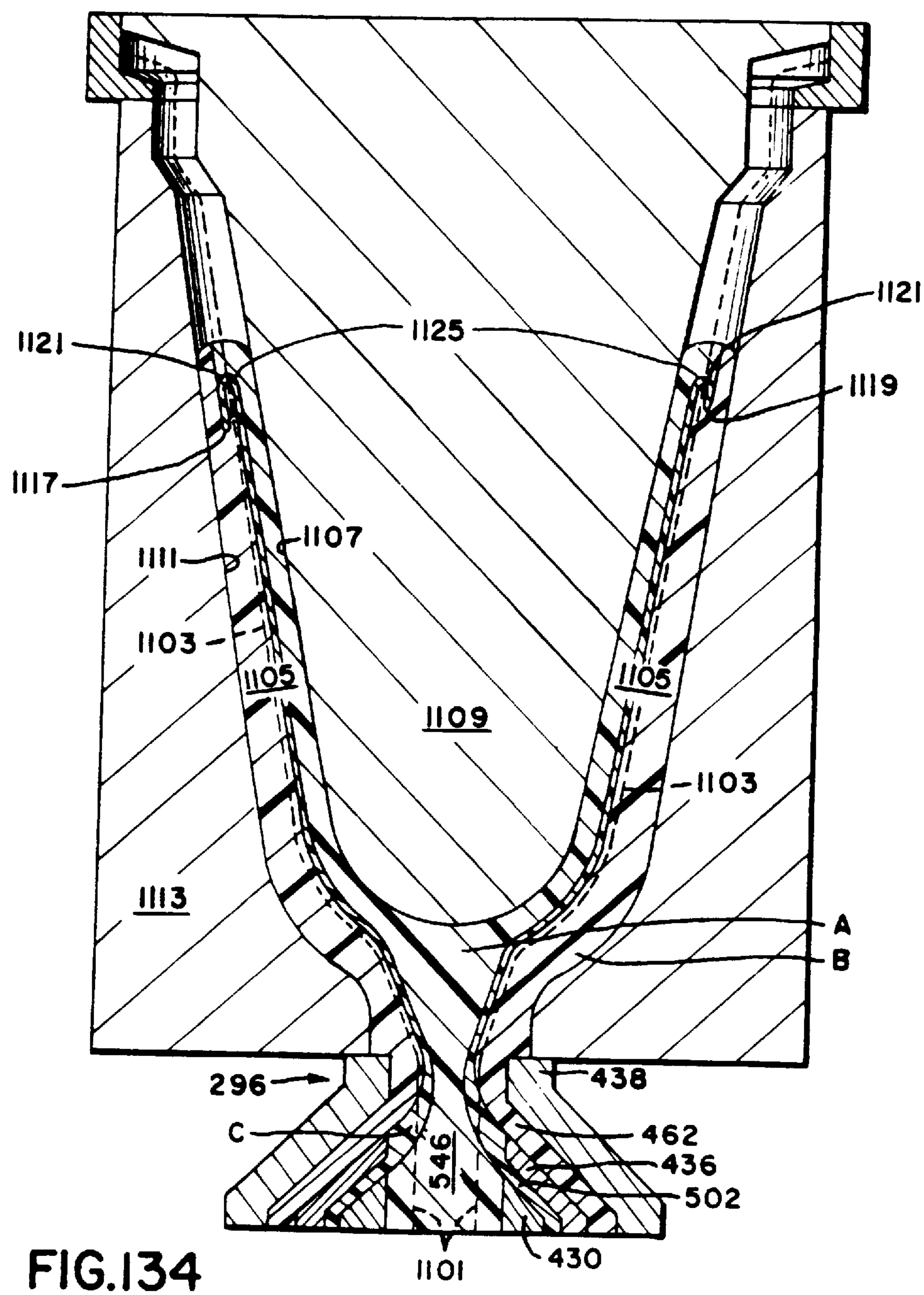

FIG. 134 shows the polymer melt material moving up into the cavity.

Figure 135:
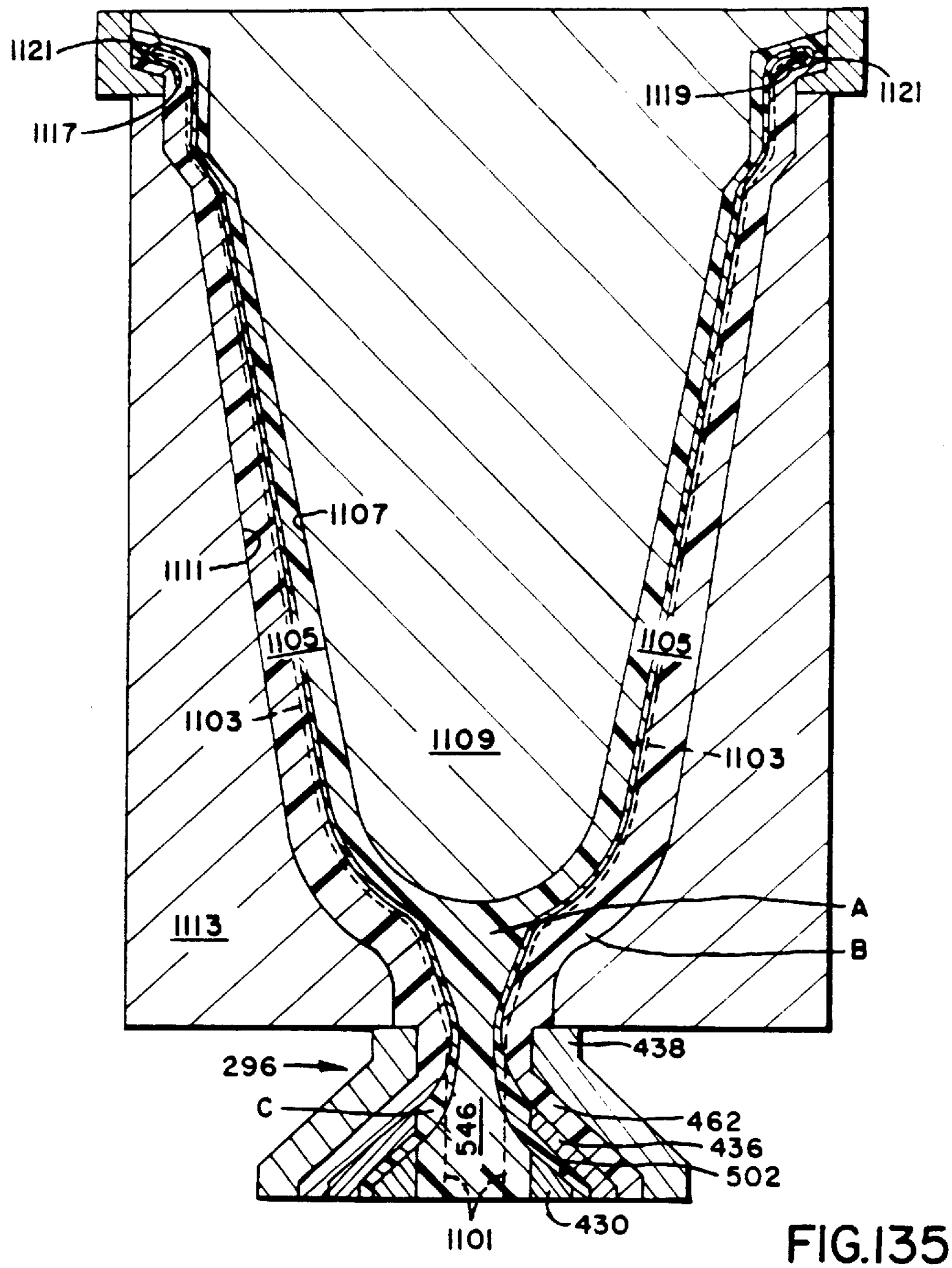

FIG. 135 shows the leading edge of the folded over internal layer in the flange of the injected parison and with substantially no axial bias.

Figure 136:
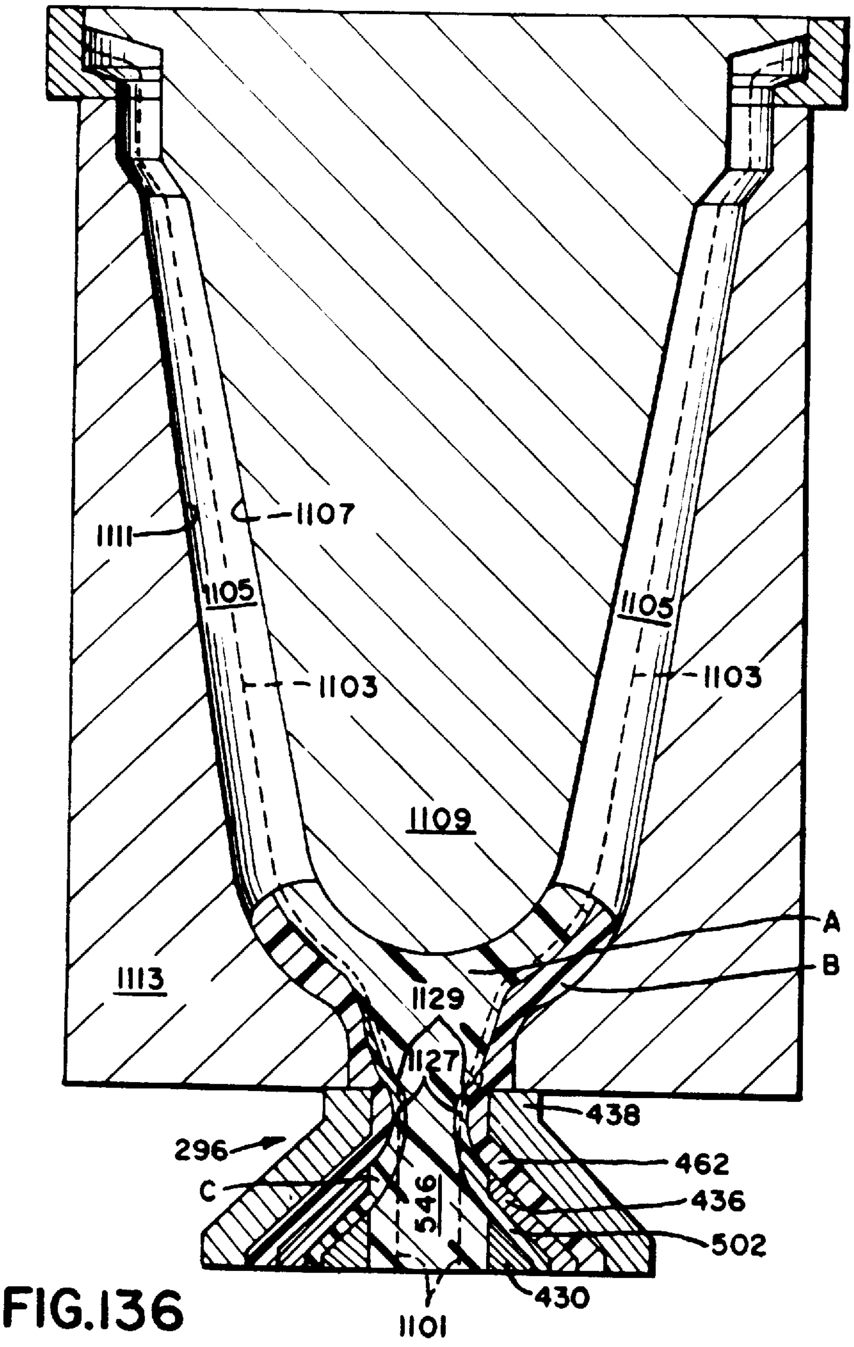
Figure 137:
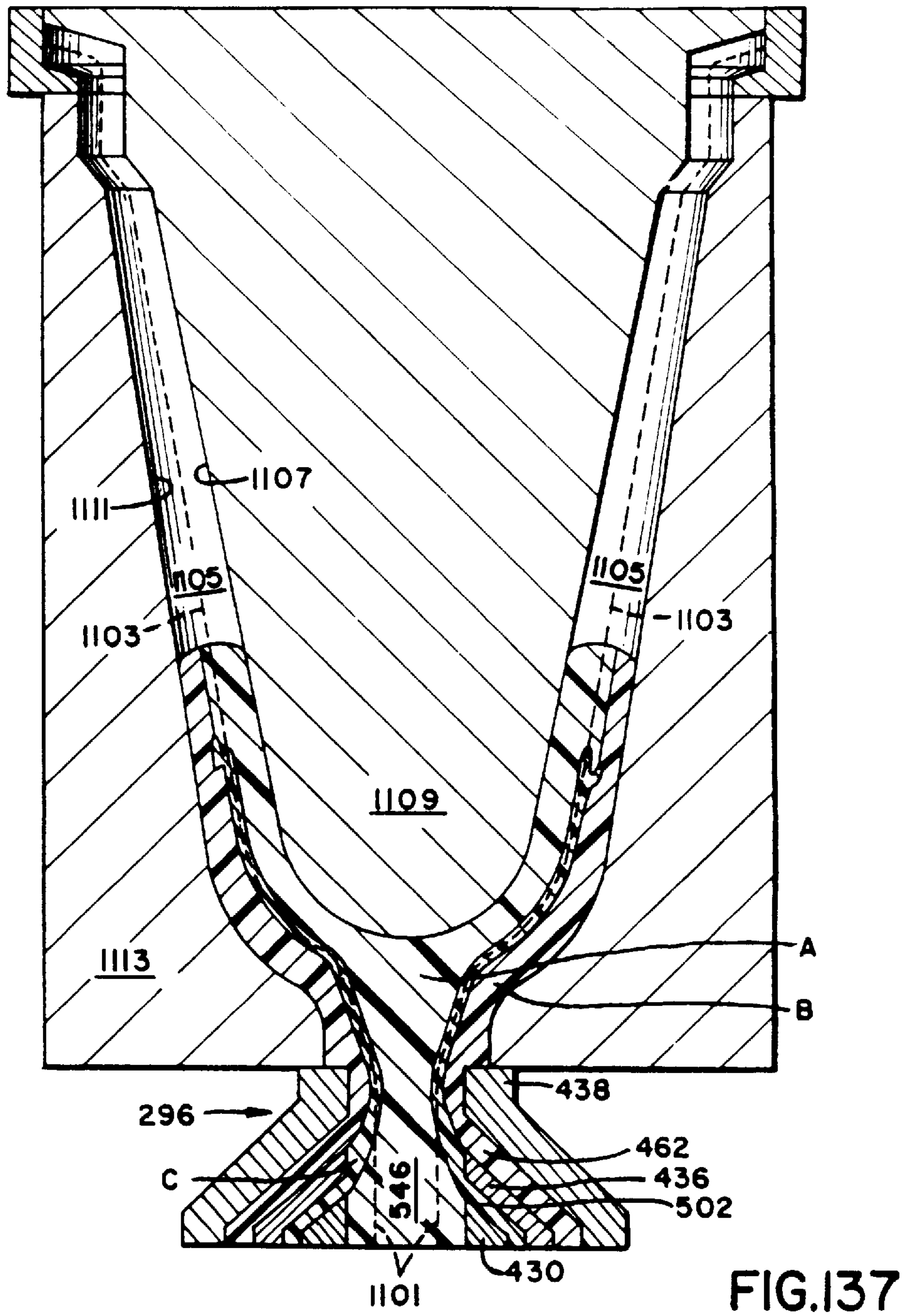

FIGS. 136 and 137 show another application of the foldover method of this invention.

Figure 124:
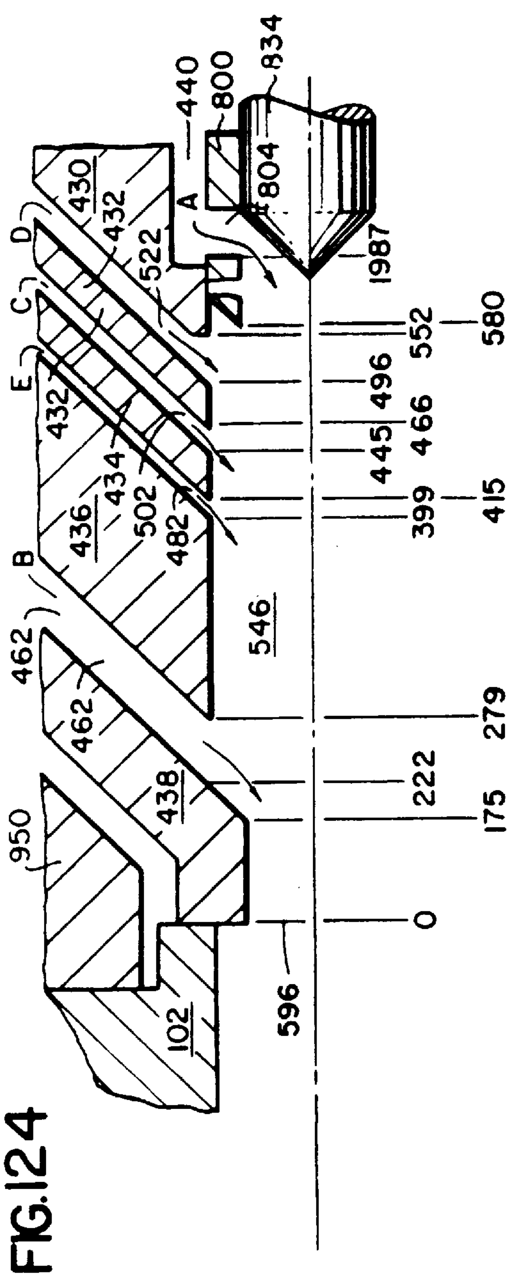
Figure 138:
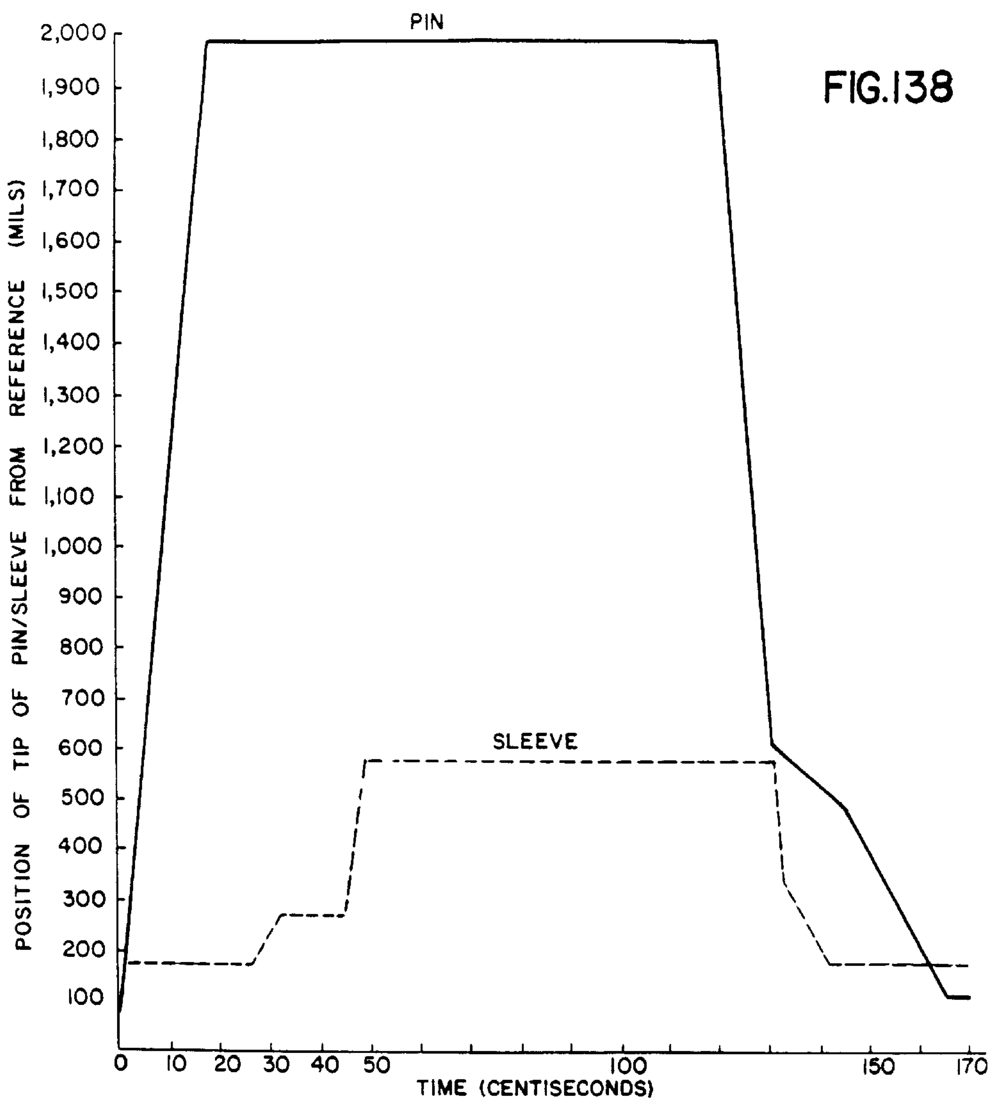

FIG. 138 is a plot of the position of the tip of the pin and sleeve as a function of time, relative to a reference point designated 0 in FIG. 124.

Figure 139:
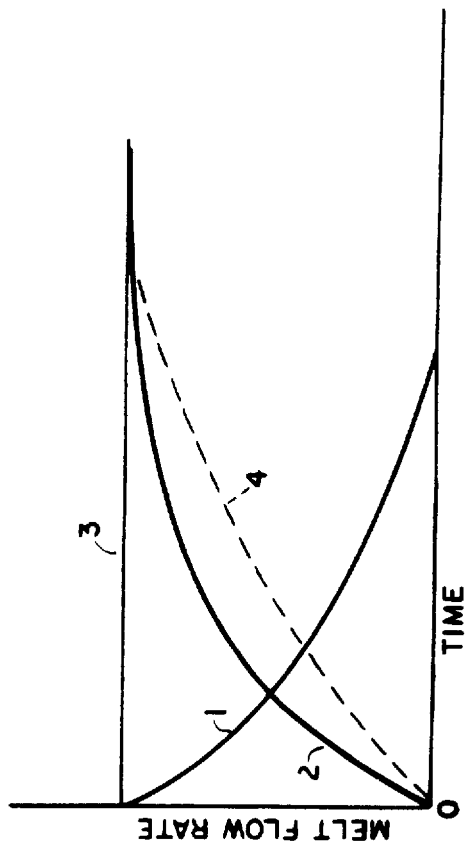

FIG. 139 is a graph schematically plotting a melt flow rate of polymer material into an injection cavity, as a function of time.

FIGS. 139A through 139E are schematic diagrams, not drawn to scale and with portions exaggerated for illustrative purposes, illustrating the effects of pressure with time upon a polymeric melt material in a passageway at its orifice prior to, upon, and after opening of the orifices.

Figure 139A:
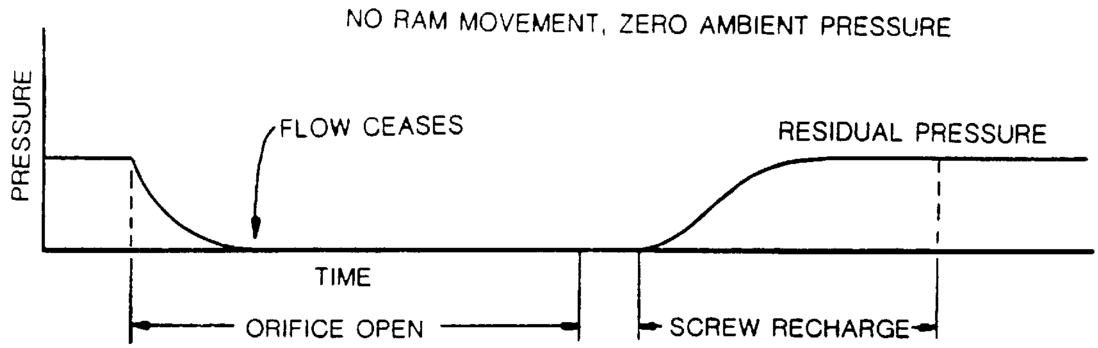
Figure 139B:
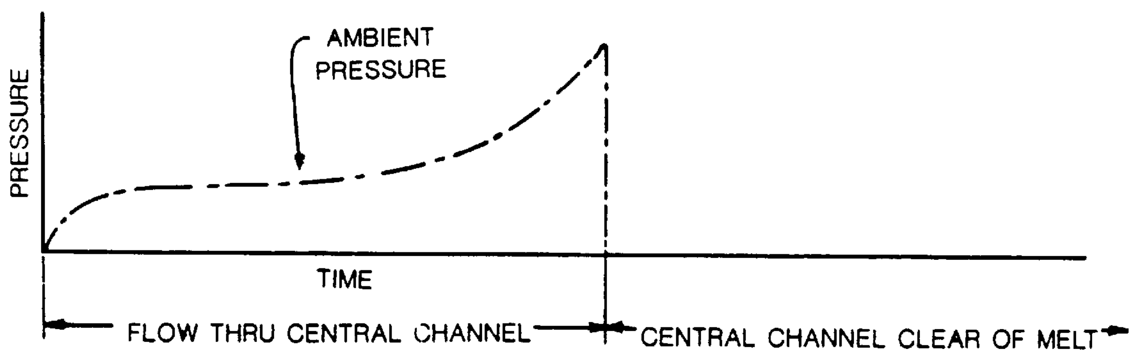
Figure 139C:
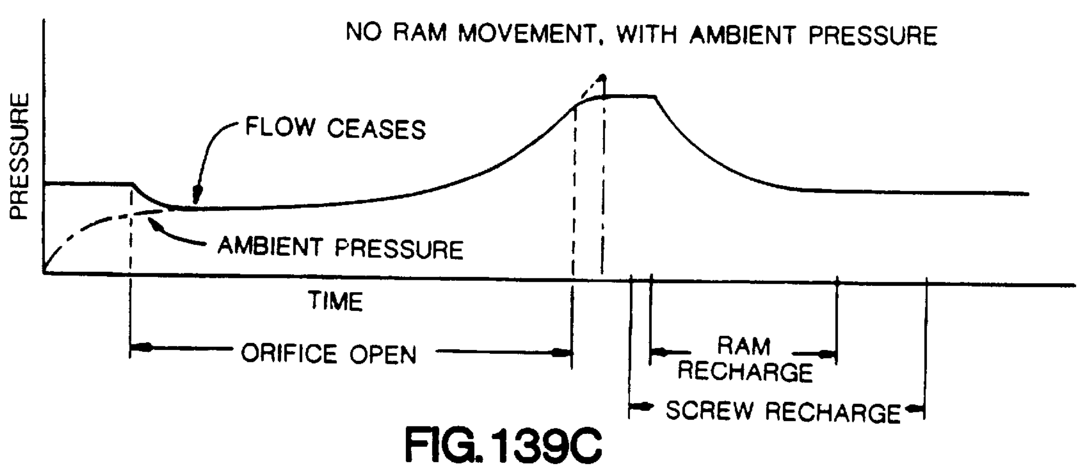
Figure 139D:
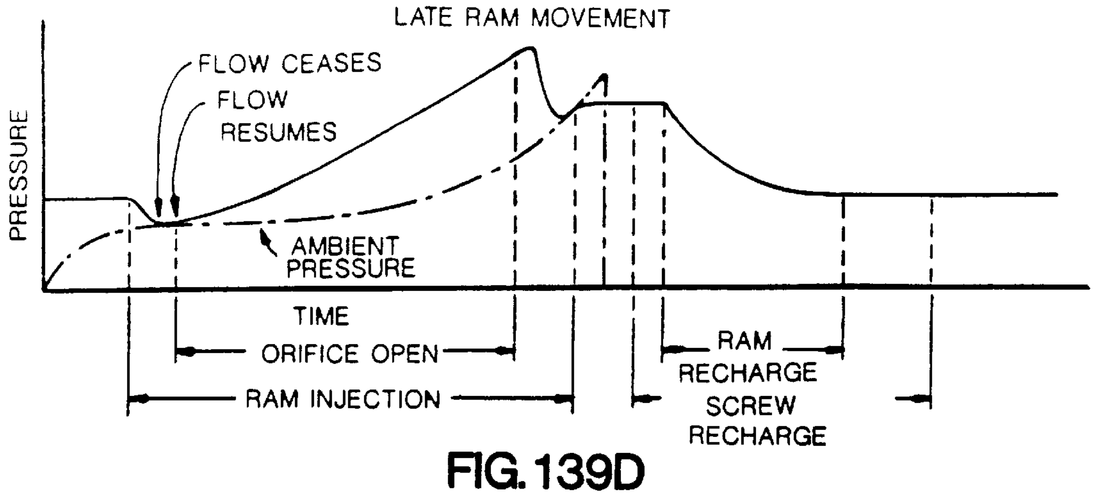
Figure 139E:
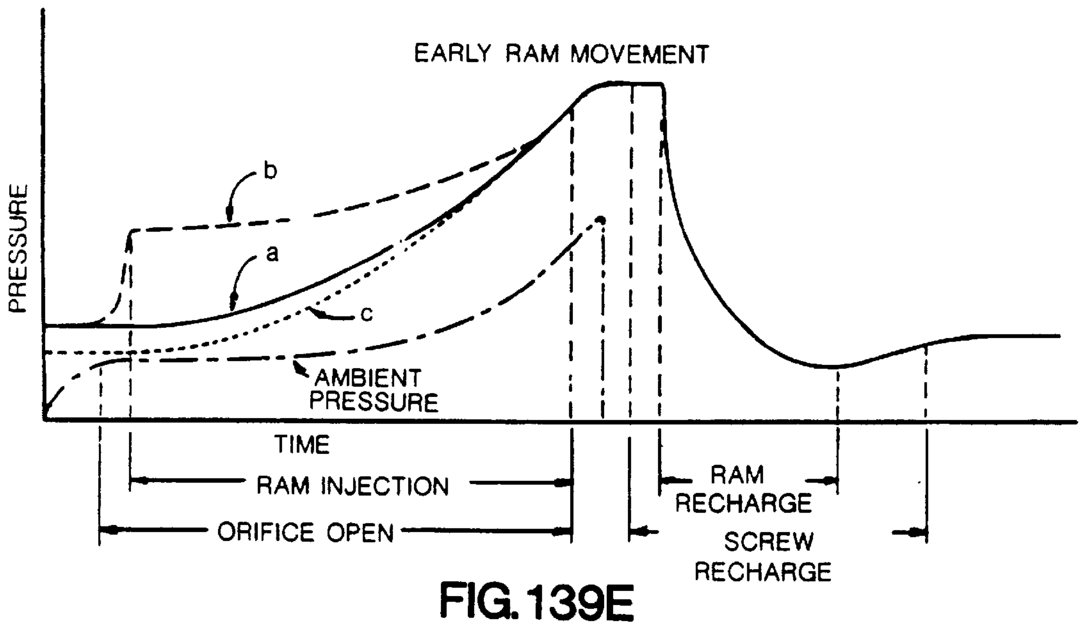
Figure 139F:
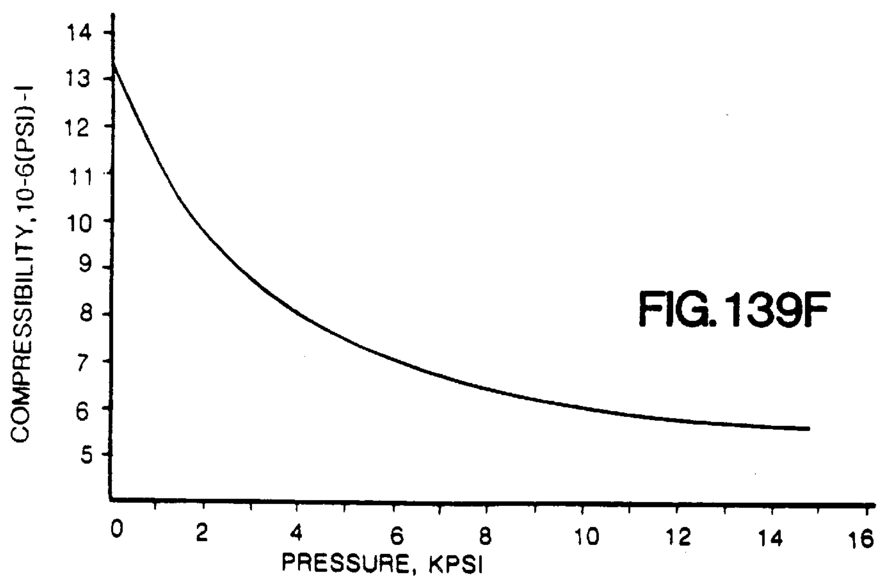

FIG. 139F is a plot of compressibility versus pressure for high density polyethylene at about 400° F., illustrating the effect of pressure upon response time of the material.

Figure 140:
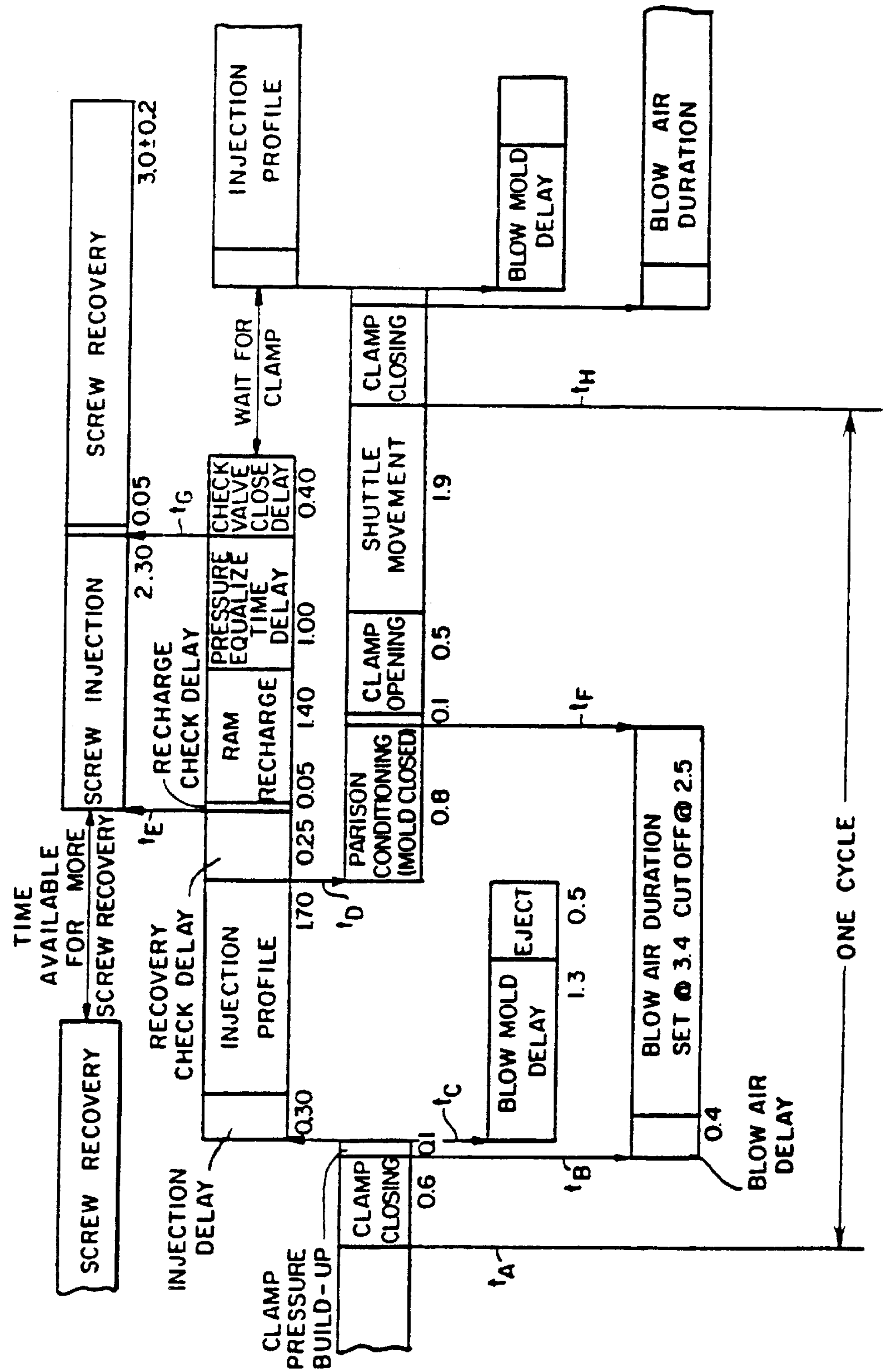

FIG. 140 is a flow chart showing the sequence of operations of the tasks performed in accordance with this invention, relative to an injection cycle.

Figure 141:
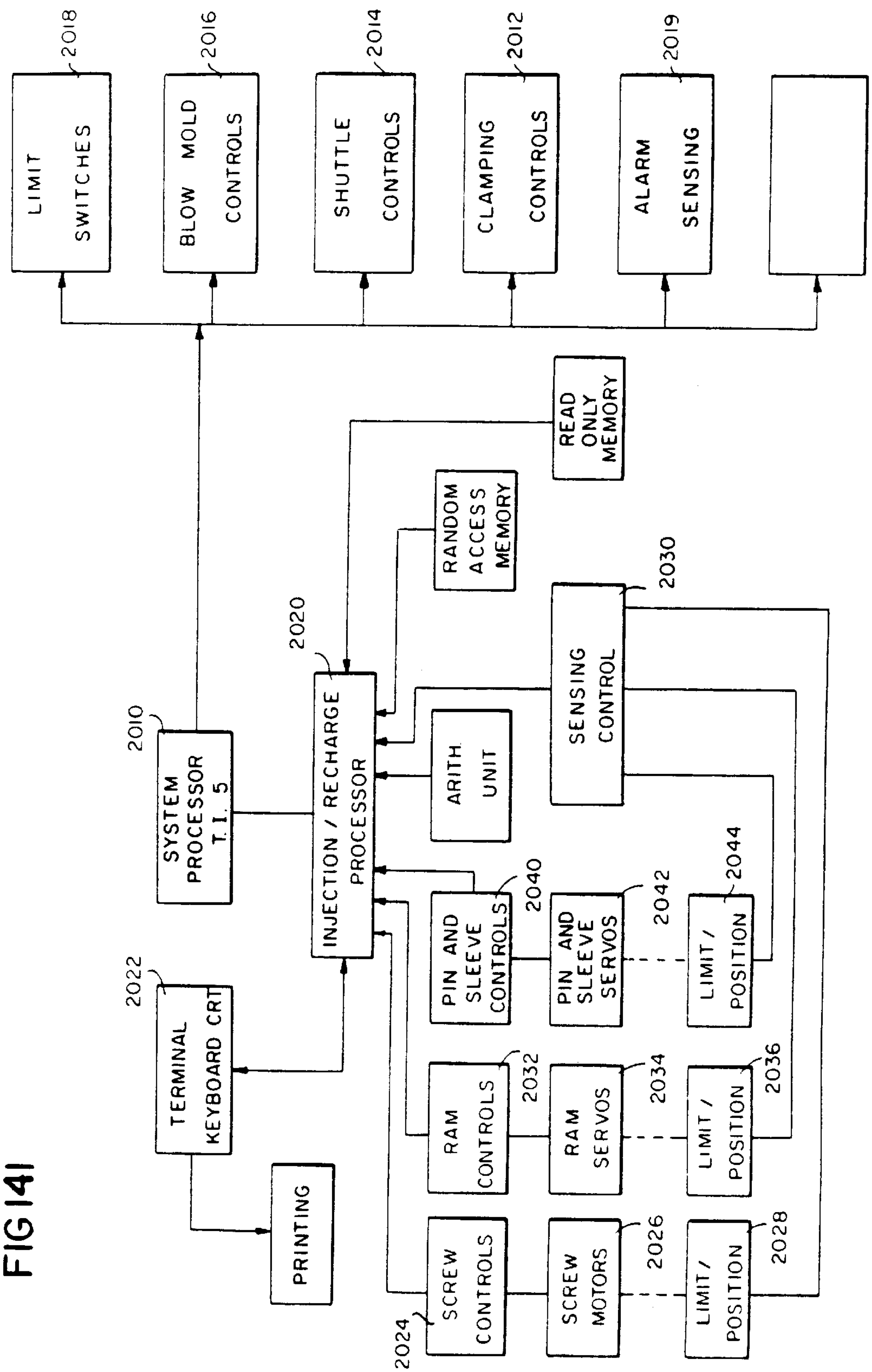

FIG. 141 is a general block diagram of the control system used in accordance with the sequence of FIG. 140.

Figure 142:
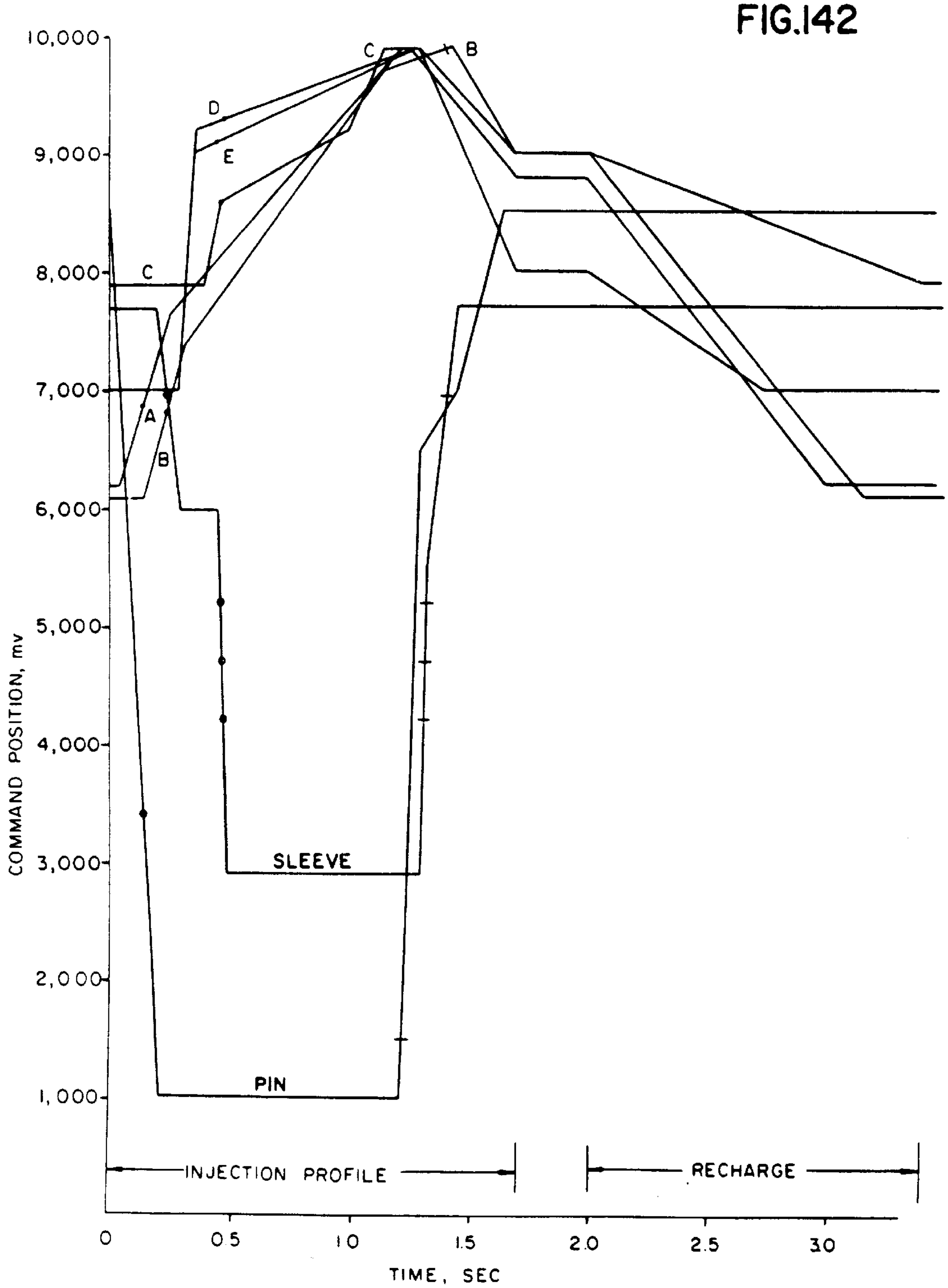

FIG. 142 is a graph of command voltages versus time for each servo.

Figure 143:
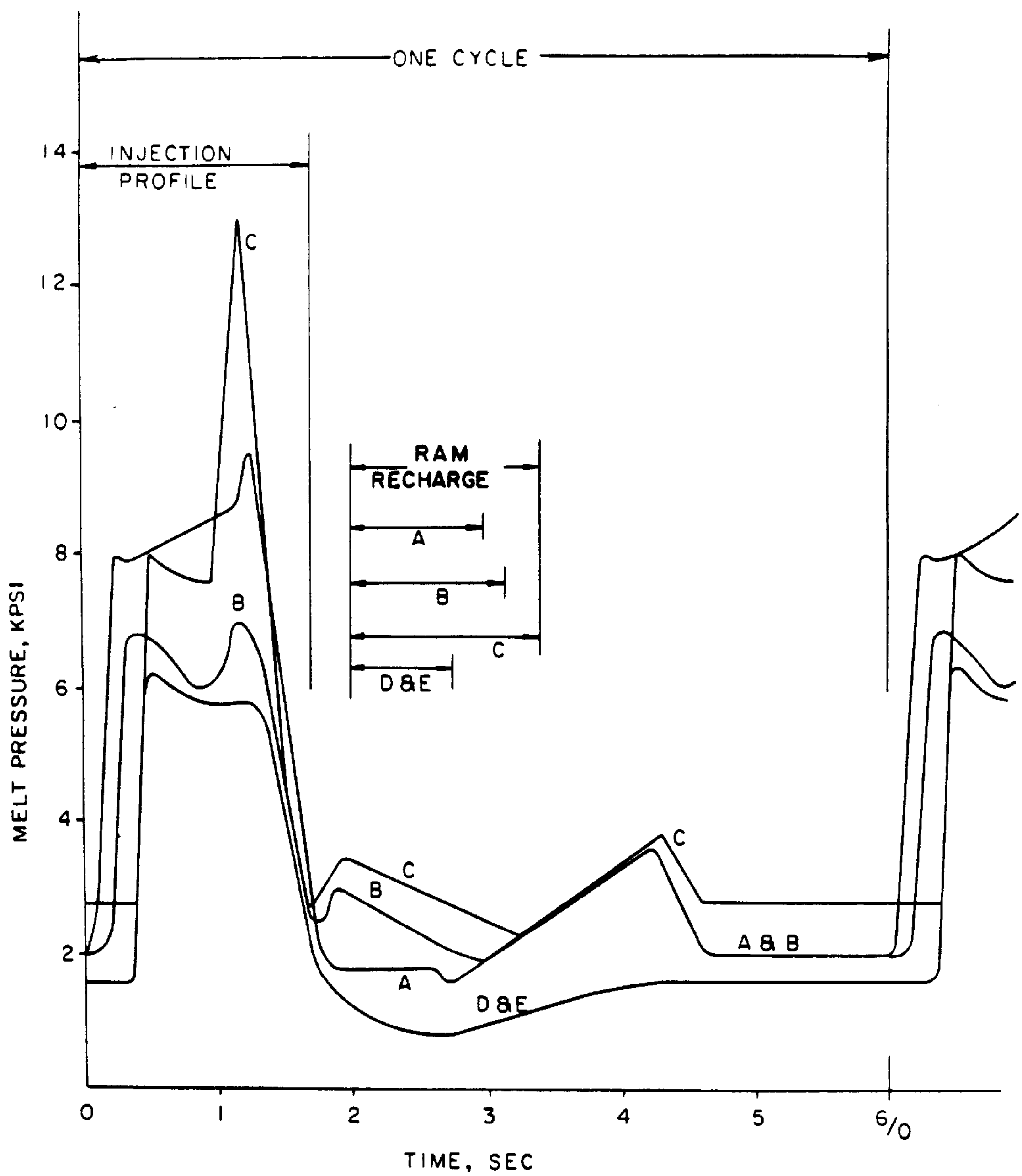

FIG. 143 is a pressure diagram resulting from the servo commands of FIG. 142.

Figure 144:
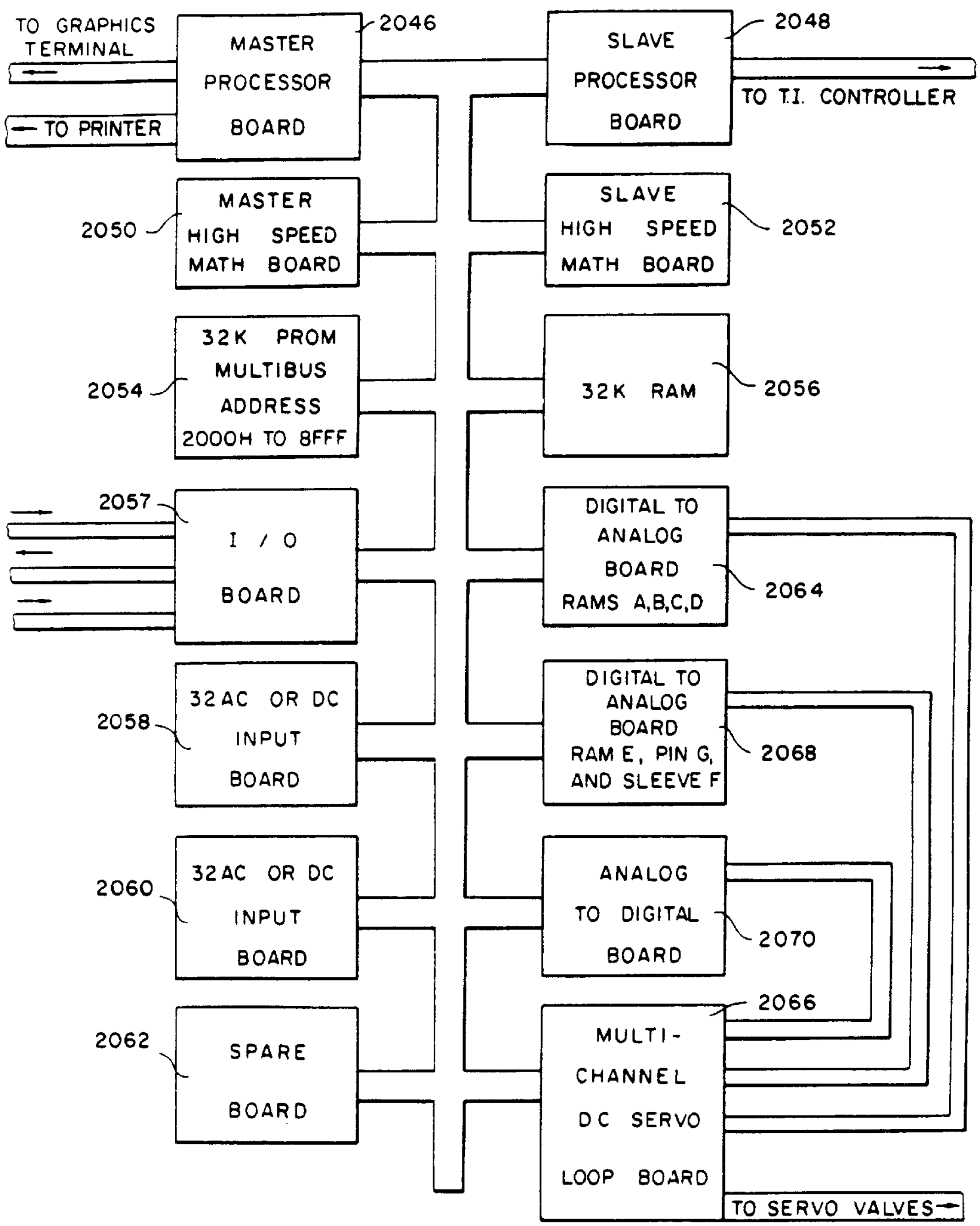

FIG. 144 is a block diagram of the principal control circuit boards used in FIG. 141 for injection/recharge control.

Figure 145:
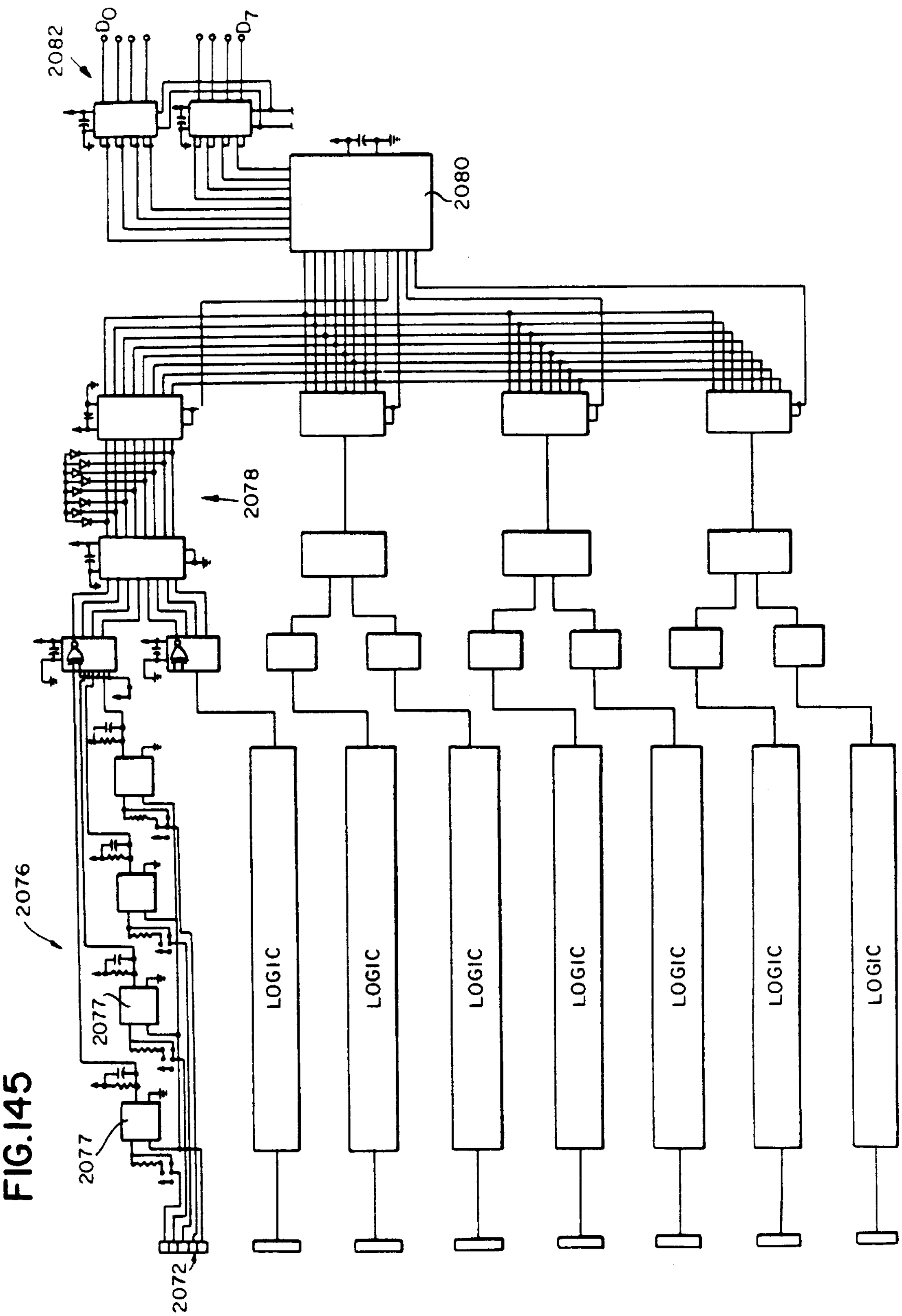

FIG. 145 is a signal input circuit used in conjunction with this invention.

Figure 146:
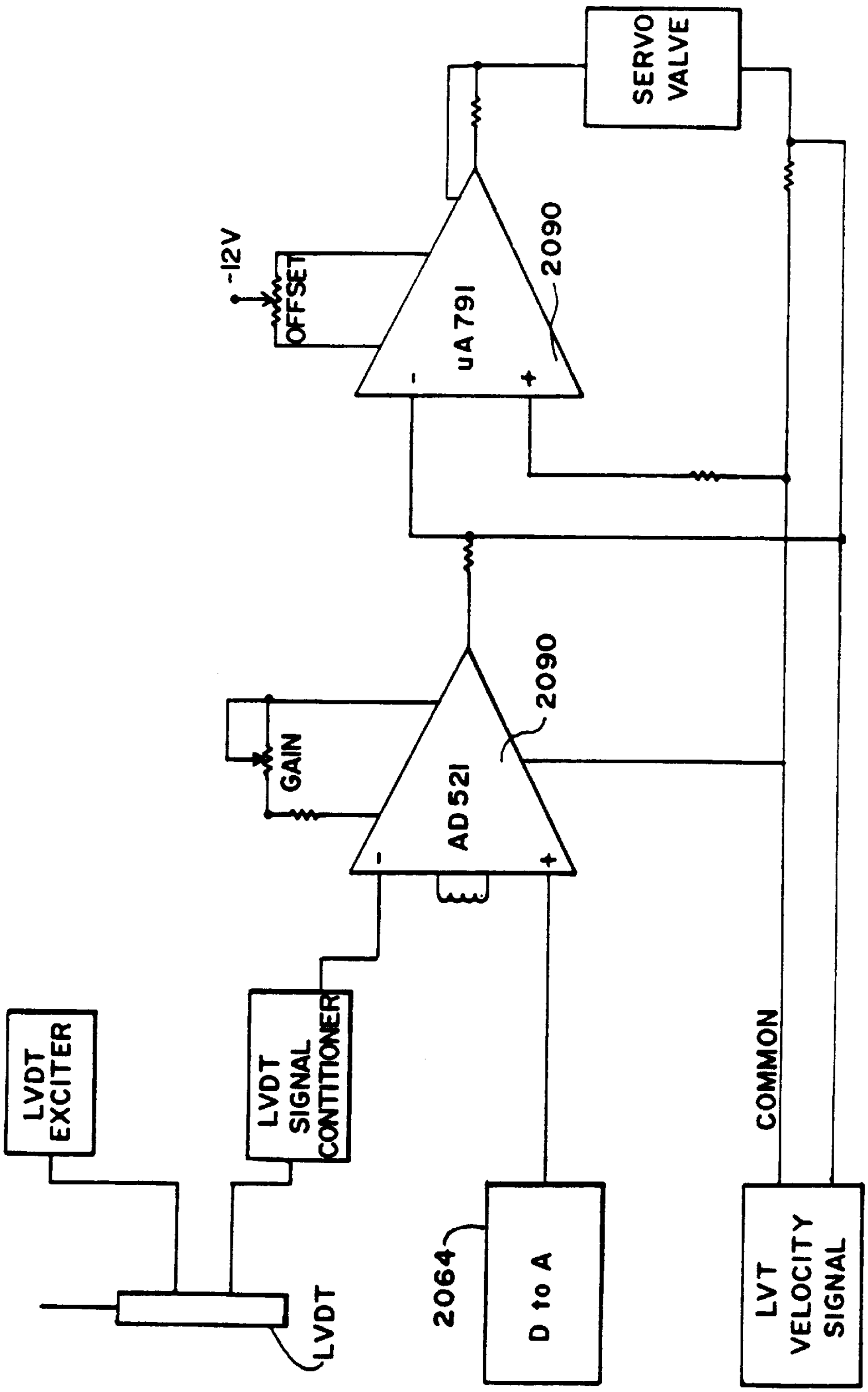

FIG. 146 is a detail of the servo loop circuitry.

Figure 147:
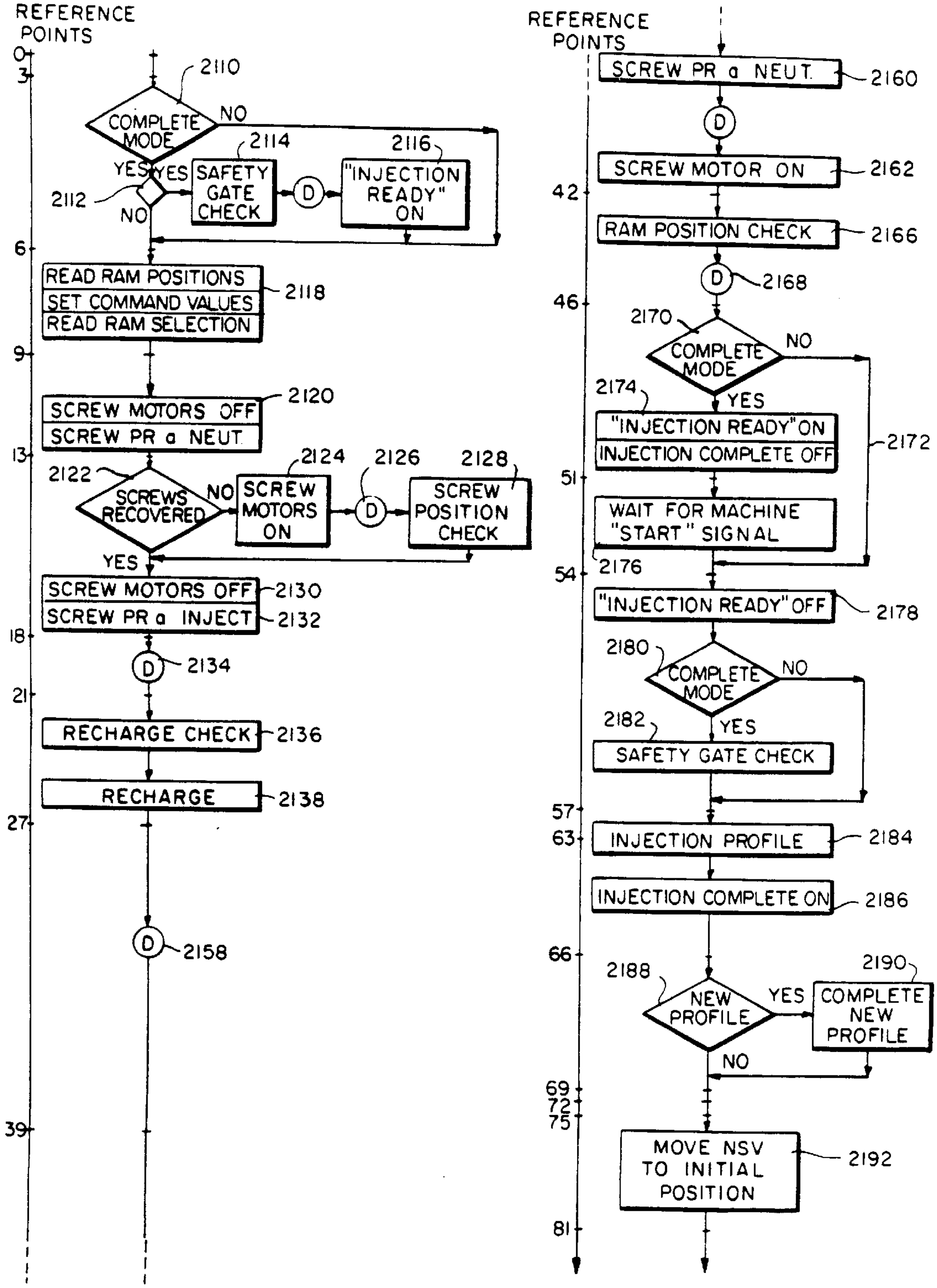

FIG. 147 is a flow chart in two vertical columns of the program employed in conjunction with the injection/recharge processor unit.

Figure 148:
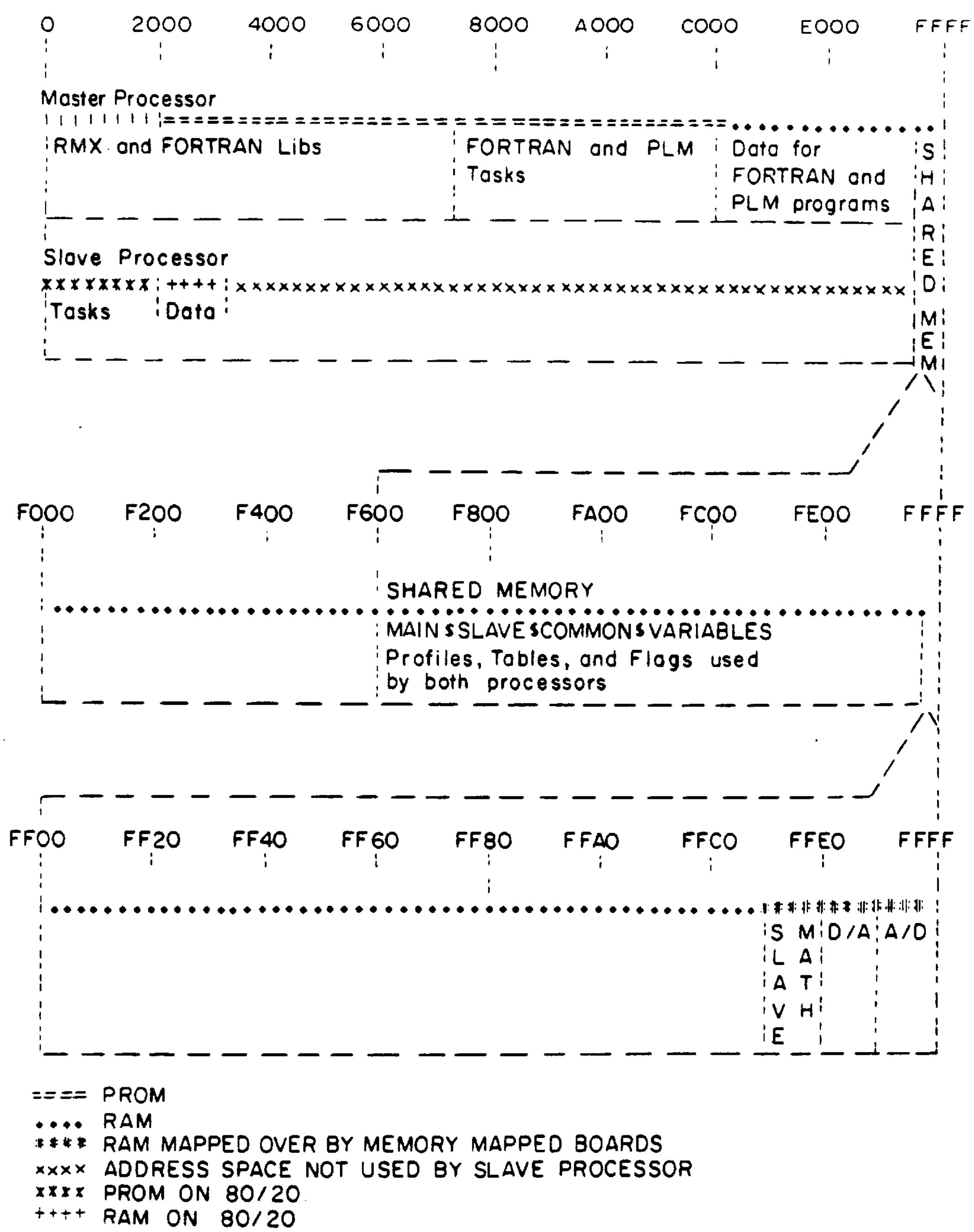

FIG. 148 is a memory map showing the location of items in the memory of the distributed processors employed in conjunction with this invention.

DETAILED DESCRIPTION OF THE INVENTION

The Article

Figure 1A:
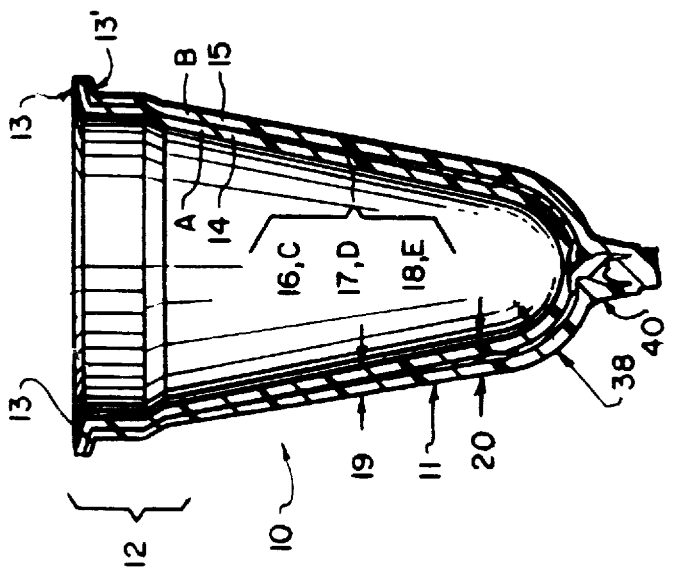
FIG. 1A is a vertical section taken along line 1A—1A of FIG. 1.
Figure 1:
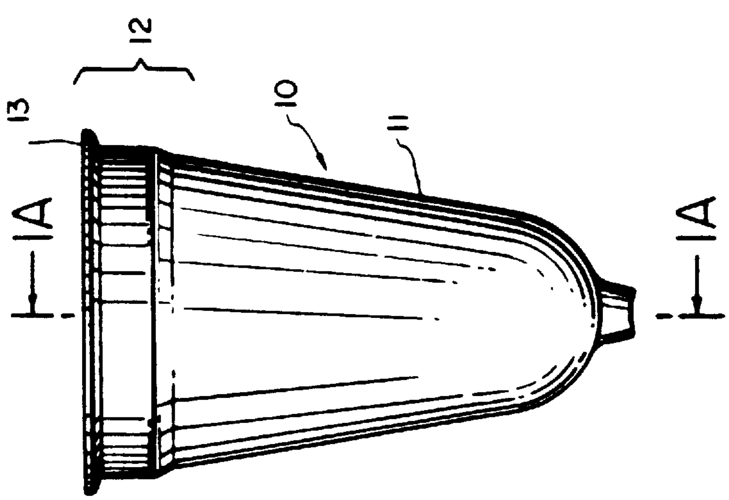
FIG. 1 is a front elevational view of an open ended plastic parison of this invention.

The multi-layer injection molded article or structure produced by the present invention may be in the form of a container, shown as a parison 10 in FIG. 1 and in the cross-section shown in FIG. 1A. The parison has a wall 11 with a marginal end portion 12, terminating in a outwardly-extending flange 13. In a preferred embodiment, the parison is of a size to form a 202×307 blow-molded container which when double seamed would have a nominal diameter of 2¹¹⁄₁₆ inches and a nominal height of 3⁷⁄₁₆ inches. Parisons of other sizes and shapes to form containers having the same or other dimensions are included within the scope of this invention. In the preferred embodiment, shown in FIGS. 1 and 1A, the parison wall 11 is comprised of five co-injected layers 14–18 of polymeric materials. For purposes of the description herein, the inside layer 14, referred to as layer A, is formed of polymer A and may also be referred to as the inside structural or surface layer, inside layer or inner layer. The outside layer 15, referred to as layer B, is formed of polymer B, and may also be referred to as the outside structural or surface layer, outside layer or outer layer. Polymer "A" may be the same material as polymer "B". Internal layer 16, referred to as layer C, is formed of polymer C, and may also be referred to as the internal layer or the buried layer. There may be one or more layers between layer A and layer C, and between layer B and layer C. Such layers may perform one or more of the functions of being adhesives or being carriers for other materials such as drying agents or oxygen-scavenging compounds. In the preferred embodiment, layer 17, located between layers A and C and sometimes referred to as layer D, is formed of polymer D, and may also be referred to as an intermediate or as an adhesive layer. Similarly, layer 18, located between layers B and C and sometimes referred to as layer E, is formed of polymer E, and may also be referred to as an intermediate or as an adhesive layer. Polymer "D" may be the same material as polymer "E". The multi-layer parison wall 11 may be comprised of three layers A, B and C. In a five layer embodiment, the layers 16, 17 and 18 may be referred to in combination as the internal layers or buried layers.

The articles, parisons and containers which can be formed in accordance with this invention are thin, and are preferably very thin.

The thicknesses in inches of layers A, B, C, D and E in parison 10 at the base 13' of flange 13, at approximately mid-length 19, at a location 20 closer to the bottom of the parison and at location 38 still closer to the bottom are as follows. Flange 13: A 0.0095; B 0.0113; C 0.0010; D 0.0005; E 0.0022. Mid-length 19: A 0.0350; B 0.0375; C 0.0028; D 0.0027; E 0.0030. Location 20 close to bottom: A 0.0396; B 0.0508; C 0.0040; D 0.0020; E 0.0026. Location 38 close to bottom: A 0.0363; B 0.0346; C 0.0073; D 0.0009; E 0.0009. The overall length of parison 10 is about 3 inches including the length of sprue 40.

The multi-layer, injection molded or blow-molded articles produced by the present invention may be in the form of the containers as broadly meant and represented by the parison embodiments shown in FIGS. 1 and 1A, and in the form of the containers represented by the embodiments shown in FIGS. 2 through 10A. Each of the containers 22 and 23, 50 and 56–62, and 68 has a multi-layer wall 25 having side wall 26 and bottom wall 27 portions. Side wall 26 has a marginal end portion 28 terminating in a flange 29. The lower portion of side wall 26 has an outwardly-extending contour 32. This contour tends to protect side wall labels (not shown) and enables the container to roll in processing equipment.

Comparing parison 10 with the finished containers, flanges 13 and 29 and the upper parts of the marginal end portions 12 and 28 are not substantially changed when the parison is inflated and are essentially formed in the injection process. The remainder of the multi-layer parison wall is stretched and thinned in the blow-molding process. In a preferred container such as designated 23 in FIG. 2A, inflated from a parison having approximately the thicknesses stated above, the thicknesses in inches of layers A, B, C, D and E at approximately mid-length 30 of side portion 26 (roughly corresponding to parison location 19), at lower portion 31 of side portion 26 (roughly corresponding to parison location 20) and at bottom portion 27 (roughly corresponding to parison location 38) are as follows. Mid-length 30: A 0.0165; B 0.0177; C 0.0013; D 0.0013; E 0.0014. Lower portion 31: A 0.0120 B 0.0154; C 0.0012.; D 0.0006; E 0.0008. Bottom portion 27': A 0.0085; B 0.0081; C 0.0017; D 0.0002; E 0.0002.

When the containers of the present invention are used for hot-filled food products, it is preferred that the thickness of the side wall be substantially uniform from the flange to the bottom radius 36, and that the bottom wall 27 be thinner than the side wall. Having the bottom wall thinner will cause it, rather than the side wall, to bow inwardly upon cool-down of the sealed, hot-filled container. Dimension for the bottom of a retortable container of the same size would be different.

Broadly, the present invention has utility with respect to materials which exhibit laminar flow which is important in maintaining the separateness of the layers of the materials in the injection nozzle central channel and in the injection cavity, as will be more fully described below. Materials and process conditions which lead to turbulent flow or to other forms of flow instability, for example melt fracture, are undesirable. The materials described below are, for the most part, polymers which form melt material flow streams at the conditions of elevated temperature and pressure which are preferred in the practice of the present invention. Those skilled in the art having read the present specification will appreciate that other equivalent materials may be used. The materials preferably are also condensed phase materials, that is, they do not foam when the material is not under pressure.

In a preferred embodiment, the polymers of structural layers A and B are polyolefins or blends of polyolefins, the polymer of internal layer C is an oxygen-barrier material, preferably a copolymer of ethylene and vinyl alcohol, and the polymers of internal layers D and E are adhesives whose function is to assist in adhering polyolefin layers A and B to the ethylene vinyl alcohol, oxygen-barrier layer C.

When the injection molded and injection blow molded article is to be used as a container for oxygen-sensitive food, the preferred polymeric material for each of the structural layers A and B is a polyolefin blend of 50% by weight of polypropylene homopolymer (Exxon Inc. PP. 5052; melt flow rate of 1.2) and 50% by weight of high density polyethylene (DuPont Alathon 7820; 0.960 density and a melt index 0.45); the preferred polymeric material for layer C is a copolymer of ethylene and vinyl alcohol ("EVOH") (Kuraray EVAL-EPF; melt index of 1.3), which functions as an oxygen-barrier layer; and the preferred polymeric material for layers D and E is an adhesive comprising a modified polypropylene in which maleic anhydride is grafted onto the polypropylene backbone (Mitsui Petrochemical Ind., Ltd., Admer-QB 530; melt flow rate of 1.4). Containers have been made from these materials and in which, per container, there is 0.616 gram EVOH, 0.796 gram of adhesive and 11.02 grams of polyolefin blend. The weight of blend in the inside A structural layer is about 5.40 grams; in the outside B structural layer, about 5.62 grams. The weight of adhesive in layer E is about 0.46 gram; in layer D, about 0.34 gram.

The principal requirements for the material of structural layers A and B are impact resistance, low moisture vapor transmission and a desired high degree of rigidity. Depending upon the desired end use of the container, alternative materials for the structural layers include high density polyethylene, polypropylenes, other blends of polypropylenes and polyethylenes, low density polyethylenes where a flexible container is desired, and polystyrenes, polyvinylchloride and thermoplastic polyesters such as polyethylene terephthalate or its copolymers. Suitable copolymers of polyethylene terephthalate are those in which a minor proportion, for example up to about 10% by weight, of the ethylene terephthalate units are replaced by compatible monomer units in which the glycol moiety of the monomer is replaced by aliphatic or alicyclic glycols. These suitable copolyesters based on polyethylene terephlhatate are generally prepared from terephthalic acid or its acid forming derivatives and ethylene glycol or its ester forming derivatives. They can be prepared from the condensation polymerization of a single diacid and two diols, or of two diacids and a single diol. Examples are glycol modified polyethylene terephthalate, referred to as PETC, made from dimethyl terephthalate, ethylene glycol and cyclohexane dimethanol, and one referred to as PTCA, made from dimethyl terephthalate and dimethyl isophthalate and cyclohexane dimethanol. Those skilled in the art will select appropriate and suitable materials depending on the end use of the product. For instance, although homopolymers of polypropylene by themselves may be too brittle when the article is to be used at low temperatures, suitable copolymers and impact modified grades of polypropylene may be employed. The structural layers may contain fillers, such as calcium carbonate or talc, or pigments, such as titanium dioxide.

Internal layer C forms the desired barrier, whether for oxygen or another gas or moisture or other barrier properties such as a barrier to radio frequencies. When oxygen barrier property is desired and the packaged product has high oxygen sensitivity, EVOH is the preferred material for layer C. High oxygen barrier property may be attained with a very thin layer of EVOH, on the order of about 0.001 inch thickness, which, in view of the relatively high cost of EVOH, is quite important from the economic standpoint of cost-effectiveness. The present invention provides for continuous, high-speed manufacture of multi-layer containers having such a thin layer of EVOH which is substantially continuous throughout the wall of the container. Where oxygen sensitivity of the packaged product exists, but is relatively low, other oxygen-barrier materials such as nylon, plasticized polyvinyl alcohol and polyvinylchloride may be used. Although most acrylonitrile and polyvinylidene chloride copolymers as currently produced probably would not be suitable, with appropriate modifications it is contemplated these might be employed. For certain packaged products a foam may be employed as an internal layer.

Adhesive layers D and E are preferably formed of the above-described maleic anhydride graft polymer when the barrier layer C material is EVOH and the material of the adjacent structural layer is polypropylene or is a blend of polypropylene and high density polyethylene. When high density polyethylene forms a structural layer adjacent an EVOH barrier layer, an adhesive between them may be employed in accordance with the teachings of the aforementioned applications, Ser. No. 059,374 and Ser. No. 059,375. Those applications disclose that a suitable adhesive for use with structural layers of polypropylene-polyethylene block copolymers, is a blend of ethylene vinyl acetate copolymer and a graft copolymer. They also disclose that a suitable adherent is the aforementioned blend wherein the graft copolymer is of high density polyethylene and a fused ring carboxylic acid anhydride.

As mentioned, EVOH is a relatively expensive material and, therefore, when it is employed as the polymer for oxygen-barrier layer C, it is highly desirable to keep the thickness of the layer to the minimum needed to impart oxygen-barrier property to the container's wall. The present invention facilitates reliable, high-speed manufacture of containers having an oxygen-barrier layer C as thin as 0.001 inch or less and which is substantially continuous throughout the wall and is substantially completely encapsulated by the inside and outside layers A and B.

When layer C is an EVOH oxygen-barrier polymer, its barrier properties may be protected against moisture-induced degradation by the incorporation of a drying agent into one or more of the layers, as is more fully described in Farrell et al. U.S. patent application Ser. No. 101,703, filed Dec. 10, 1979, which is incorporated herein by reference thereto. Further, one or more of the layers may incorporate oxygen-scavenging material, as is more fully described in Farrell et al. U.S. patent application Ser. No. 228,089, filed Jan. 23, 1981, and Continuation patent application Ser. No. 418,199, filed Sep. 15, 1982 which are incorporated herein by reference thereto.

In the preferred injection molded articles and injection blow-molded articles, the internal layer 16 and all internal layers are substantially continuous and substantially completely encapsulated within the outer layers 14, 15. Most preferably, there are no discontinuities or holes in the internal layer or in the encapsulating layers, and the terminal end 33 (FIG. 5) of the internal layer (sometimes referred to hereinafter as the leading edge of the internal layer or buried layer) extends sufficiently into the marginal end portion 12, 28 of the side wall 11, 26 of the parison and container, respectively, such that when the article is covered or sealed, the terminal end of the internal layer material is included within the cover or seal area, whereby there is a relatively long path through the wall of the article for permeation of unwanted material, e.g., gas. In a flanged container which is to be double seamed, the most preferred embodiment is one wherein the terminal end of the internal layer extends into the flange and the location of the terminal end is uniform about the circumference of the flange. For the present purposes, the term uniform encompasses a variation of about plus or minus 0.030 inch. Also, in the most preferred embodiment, the terminal end of the internal layer extends to at least half of the length of the flange. An acceptable container is also obtained when the terminal end of the internal layer extends to the base of the flange, such that when the double seam is formed, as shown in FIG. 9C, a portion of the double seam sufficiently overlaps the end portion 28 of the container side wall which contains internal layer that there remains a relatively long travel path for permeation of an unwanted material through the side wall structure. The less need there is for a completely continuous and completely encapsulated internal barrier layer, the more tolerable will be a lower reaching terminal end, non-uniformity of location of the terminal end, and, for example pinhole-sized discontinuities in the internal layer or in the outer surface layer. Thus, in many packaging applications, there are less stringent requirements with respect to barrier layer continuity, outer structural layer encapsulation of the barrier layer, and uniformity and extension of the barrier layer into the flange. In such applications, a container wherein the leading edge or fold line (e.g. 1121 in FIG. 9D) extends approximately to or just within the pinched wall thickness area formed during the double seaming operations, will suffice. Suitable containers could contain minor imperfections such as pin holes and relatively insignificant discontinuities in the barrier material or in the encapsulating material, and non-uniform leading edge 33 of the internal layer. The terms substantially continuous, substantially encapsulated and substantially uniform are intended to encompass such acceptable containers.

It is to be understood that with respect to all inventions disclosed and claimed herein, the terms "marginal end portion of a side wall" applies equally to the marginal edge or end portion of an article having no side wall, for example a phonograph record, a disc, or a blank.

Figure 2A:
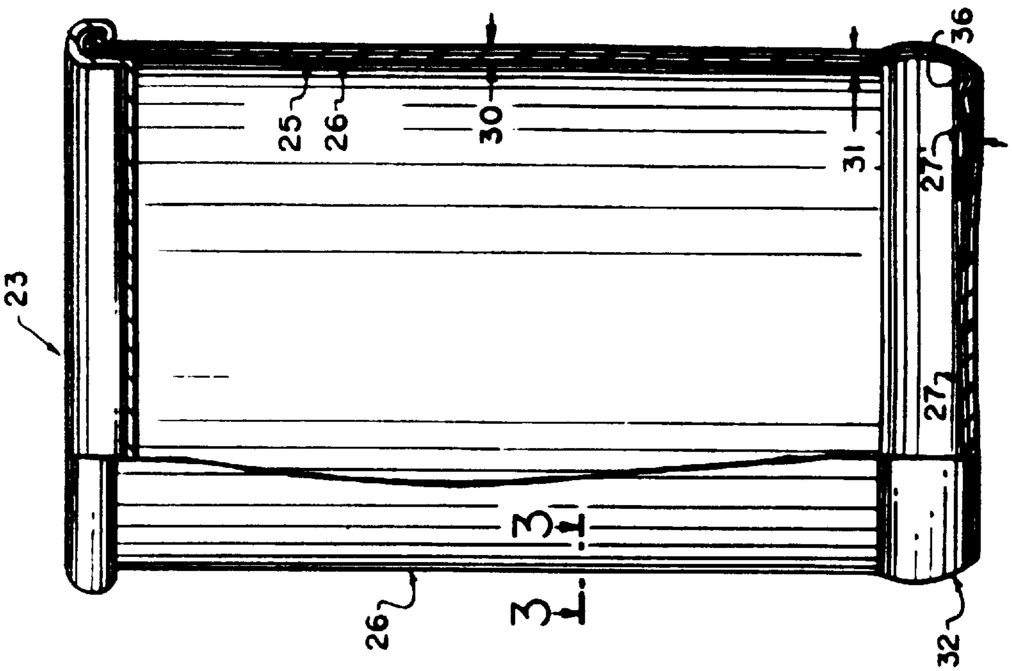
FIG. 2A is a front elevational view partially in vertical section and with portions broken away, showing the container of FIG. 2 having an end closure double seamed thereto.

FIG. 3, an enlarged portion broken away from side wall 26 on the left of container 23 of FIG. 2A, clearly shows the relative positions and thicknesses of the respective five layers of the preferred multi-layer injection molded or injection blow molded container of this invention.

FIG. 4, a vertical sectional view of an enlarged broken away portion of bottom wall 27 and of side wall 25 of the container of FIG. 2A, shows that in a preferred injection molded or injection blow molded container for oxygen sensitive food products which must be heat sterilized in the container, the bottom wall total thickness is on the average less than the side wall total thickness. Also, generally speaking, the thickness of the internal or barrier layer is on the average greater in the bottom wall than in the side wall. More particularly, the ratio of the thickness of the internal layer or barrier layer 16 in the bottom wall relative to the total thickness of the bottom wall, is greater than the ratio of the thickness of the internal layer in the side wall relative to the total thickness of the side wall. Preferably, the thickness of the internal layer in the bottom wall is at least the thickness of that layer in the side wall. FIG. 4 also shows that the total thickness of a central portion of the container, generally designated 40, which includes the sprue area, is thicker than the total thickness of other areas of the rest of the bottom wall, and that at least in central portion 40, the thickness of the internal layer is greater than the average thickness of the internal layer in the side wall. Central portion 40 includes downwardly depending trails or tails 42 of internal layer 16 and adhesive material 17, 18 encapsulated within outer structural layer B, 15.

Figure 2:
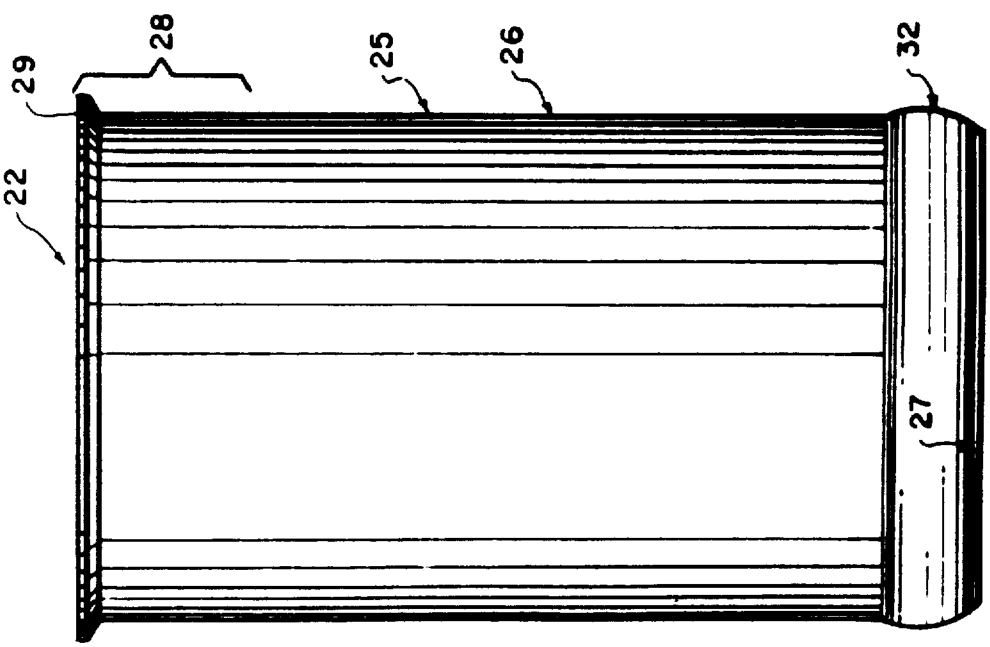
FIG. 2 is a front elevational view of an open ended plastic container of this invention.
Figure 6:
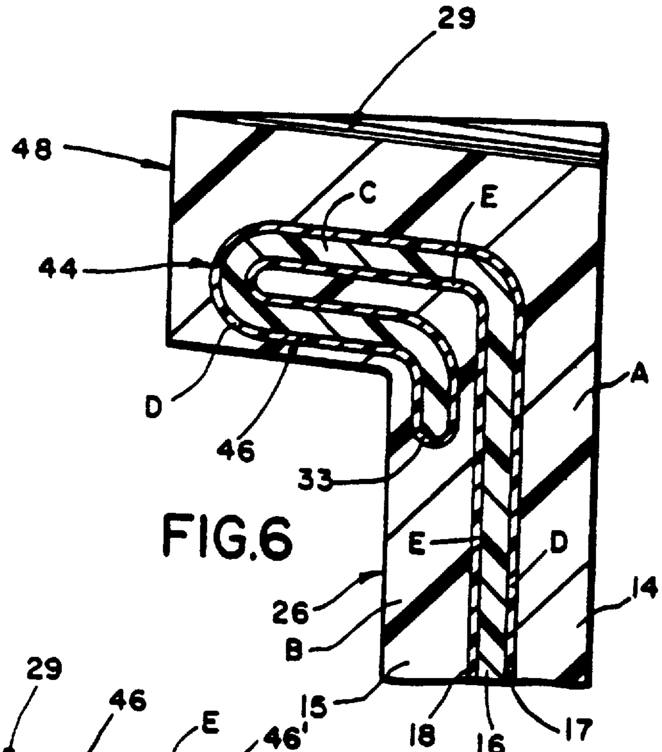
FIG. 6 is a schematic enlarged vertical section as might be taken through another marginal end portion of the container of FIG. 2 wherein the marginal end portion of the internal layer or layers folded over toward the outside of the container.
Figure 7:
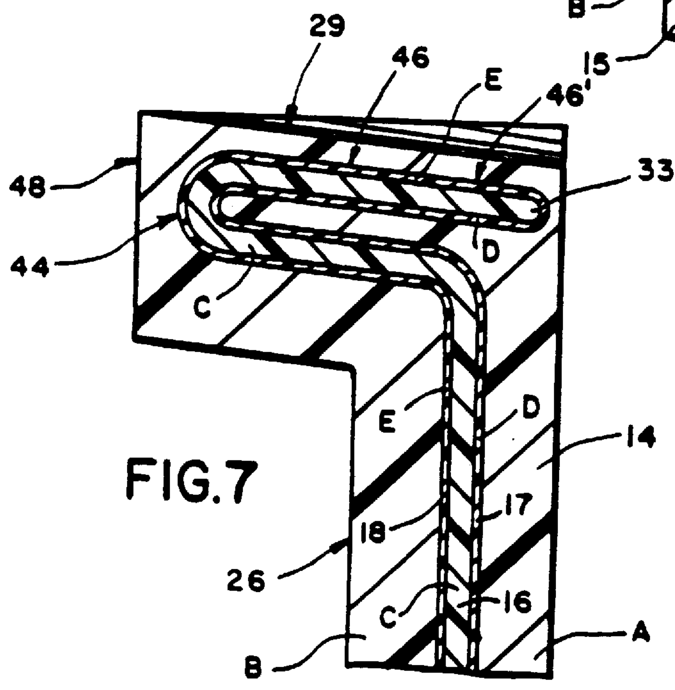
FIG. 7, a schematic enlarged vertical section similar to FIG. 6, shows another embodiment wherein the marginal end portion of the internal layer or layers is folded over toward the inside of the container.

FIGS. 5 through 7 are enlarged cross-sections as might be taken through various locations of the marginal end portion of a preferred injection molded or blow-molded five layer open ended plastic container such as the one shown in FIG. 2. More particlularly, FIG. 5 shows that the marginal end portion of the internal layer 16 extends into the container flange 29, and the terminal edge or terminal end 33 of the internal layer is encapsulated by intermediate layer material, which can be comprised of either or both of adhesive layers 17 and 18, also respectively designated the second and first intermediate layers. As will be explained, preferably, terminal end 33 of internal layer 16 is encapsulated primarily or entirely by first intermediate layer material, adhesive layer E, 18.

FIG. 6 also shows another embodiment wherein the terminal end 33 of internal layer 16 is encapsulated within intermediate or adhesive layer material in a portion of the marginal end portion of a container side wall. FIG. 6 shows a portion of the marginal end portion of the internal layer 16 or internal layers 16, 17, 18 folded over toward the outside of the container within the marginal end portion of the container side wall 26. The internal layer or layers are folded over along a fold line generally designated 44 near the terminal end 48 of the container flange 29. The folded over portion, designated 46 of the internal layer or layers, extends downwardly in outside layer B, 15 of the side wall. The terminal end portion of the internal layer is that portion of the marginal end portion which is near or adjacent the terminal end, usually, the terminal end portion is within the length of the folded over portion of the internal layer.

FIG. 7 shows another embodiment wherein the terminal end 33 of internal layer 16 is encapsulated within intermediate adhesive material. In FIG. 7, a portion of the marginal end portion of the internal layer 16 or layers 16, 17, 18 is folded over along a fold line 44 toward the inside of the container and the folded over portion and marginal end portion 46 is within flange 29.

In the articles of this invention having a portion of the internal layer or layers folded over, the leading edge of the internal layer in the marginal end portion, usually the flange, of article, parison or container, can be the fold line 44 or the terminal end 33 and as meant herein, its meaning encompasses the furthest extent of the internal layer from the bottom wall whether it be the fold line, the terminal end or some other portion of the internal layer. Preferably the leading edge or the plane along the leading edge of the internal layer is substantially unbiased relative to the axis of the containers on the terminal end 48 of the container side wall. In the articles of this invention, the terminal end of the internal layer or layers is more removed from the terminal end of the container, for example, terminal end 48 of flange 29, than is another adjacent directionally-related marginal end portion of the internal layer or layers. The terminal end of the folded over portion of the internal layer or layers is more removed than the fold line is from the terminal end of the container. Also, there is less variation in the distance from the fold line to the terminal end of the container than from the terminal end of the internal layer to the terminal end of the container. The folded over portion may but need not lie near another portion of the internal layer as shown. It could extend in a direction away from another portion of the internal layer, for example such that the terminal end of the folded over portion is further removed than any other folded over portion is from the folded over portion or the non-folded over portion of the internal layer. As contemplated herein, the folded over portion need not extend in a relatively straight line as shown, but it may have, curled, compressed or other configurations. It is to be noted that in a single container, the marginal end portion of the internal layer or layers may have different configurations at different circumferential locations about the container flange. For example, in one radial segment of an arc about the circumference of the flange, the marginal end portion of the internal layer or layers may not be folded over, as in FIG. 5, in another segment it may be folded over slightly, in another segment, it may be more folded over to the outside of the container, as in FIG. 6, and, still in another segment, it may be folded over to the inside of the container slightly, greatly, or moderately as shown in FIG. 7. Another possible configuration is one wherein the terminal end of the unfolded portion of the internal layer and the fold line are located in the terminal end portion of the container side wall. In FIG. 7, the terminal end of the folded over portion may extend downwardly within inside layer 14. Methods of forming articles having one or more folded over internal layers are disclosed later herein.

Figure 8:
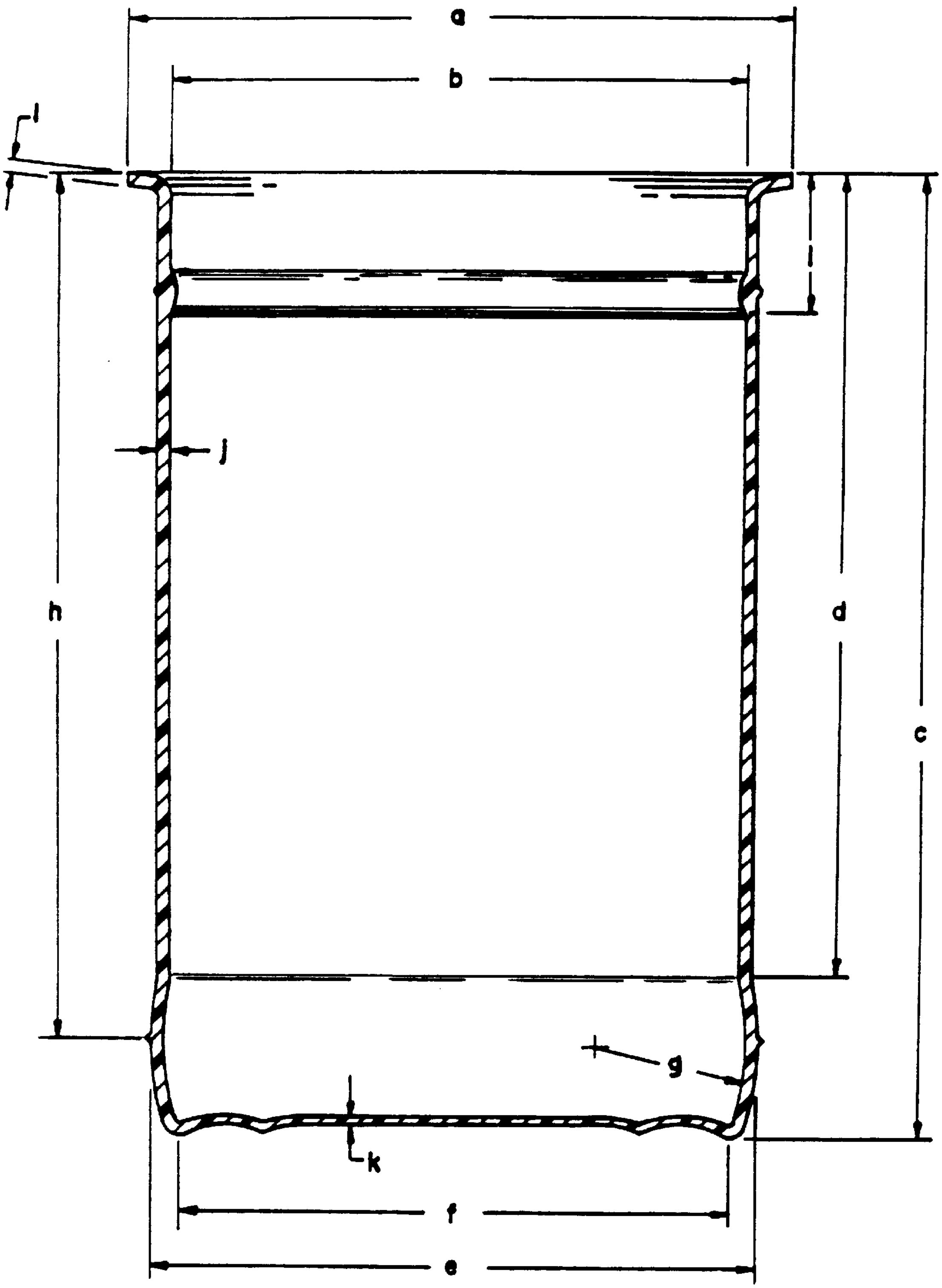
FIG. 8 is a schematic view of an enlarged vertical section as might be taken through a container of this invention with layers not shown and with letter designations representing the container's overall dimensions.

FIG. 8, a schematic vertical section through a multi-layer plastic container of this invention whose internal layers are not shown, represents an estimate of the overall dimensions of a typical 202 by 307 inch container, based upon the dimensions of the blow-mold cavity in which the container would be blown, considering some shrinkage of the container due to cooling upon removal from the blow-mold cavity. The dimensions represented by the letter designations are shown in the Table below.

TABLE

| DIMENSIONS FOR FIG. 8 | | |
|---|---|---|
| Letter | Dimension (inches) | |
| Designation | Typical | Range(±) |
| a | 2.28 | .010 |
| b | 2.08 | .010 |
| c | 3.40 | .010 |
| d | 2.95 | .010 |
| e | 2.19 | .010 |
| f | 1.90 | .010 |
| g | .55 | .010 |
| h | 3.08 | .010 |
| i | .027 | .003 |
| j | .031 | .010 |
| k | .020 | .010 |
| l | .37 | .010 |

FIG. 8A schematically shows the profile of the bottom of a plastic container of this invention whose internal layers are not shown. More particularly, FIG. 8A is a tracing of the bottom surface of an actual container, and is an approximation of the inside surface based upon thickness measurements taken at various points along the bottom. FIG. 8A shows that the thickness of the central portion of the bottom is greater than that of the rest of the bottom.

FIGS. 9 through 10A are enlarged vertical sections through various embodiments of closed multi-layer plastic containers of this invention having internal layers folded over in different configurations and at different locations within the marginal end portion of the container side wall.

In FIG. 9 there is shown a container 50 wherein the marginal end portion of the internal layer 16 (hereinafter, for FIGS. 9 through 10A, referring to the layer individually or collectively with layers 17 and 18) is not folded over, and the marginal end of the container side wall 26 has a container end closure 52 double seamed thereto. The double seam includes a suitable adherent material 54 between the container flange and the inside surface of the end closure portion which runs from its arcuate portion at the top of the container side wall, through the portion which forms the double seam, to the terminal edge of the end closure.

FIG. 9A shows another embodiment represented by another marginal end portion of either the container shown in FIG. 9 or another container having an end closure 52 double seamed thereto wherein a portion of the marginal end portion of internal layers 16 is folded over towards the outside of the container in container flange 29. The folded over configuration shown in FIG. 9A is preferred for a double seamed container for packaging oxygen sensitive foods.

FIG. 9B represents another embodiment of a container of this invention identical to those shown in FIGS. 9 and 9A, except that the folded over portion of the marginal end portion of the internal layer 16 in FIG. 9B is folded over toward the inside of the container.

In FIG. 9C, the folded over portion does not extend as far into container side wall flange 29 as it does in FIGS. 9A and 9B. Rather, it only extends to the arcuate portion of the top end of the container side wall beyond the point where adhesive 54 is positioned between the inside arcuate surface of the end closure and the convex upper portion of the container side wall. The location of the folded over portion of the internal layer in FIG. 9C does provide an acceptable barrier to unwanted substances. For example, when the internal layer 16 is an oxygen barrier material, the location of the folded over portion provides an adequate barrier since the travel path for oxygen is an extended one which requires the oxygen to travel up through the outer layer 15 over the folded over portion and back down through the inner layer 14 to reach the inside of the container.

In FIG. 9D, the fold over portion located in the marginal end portion of the container side wall is folded over toward the outside of the container, and fold line 44 which in this case is the leading edge of the internal layer extends to about the bottom of the double seam. While perhaps not providing an adequate barrier for the long shelf life for a highly oxygen sensitive food product this configuration and location of the folded over internal layer or layers would provide adequate barrier properties for less sensitive food products and products which are not oxygen sensitive. Preferably at least part of the folded over portion of the internal layer is in the flange.

FIGS. 10 and 10A show embodiments of the multi-layer plastic containers of this invention having a flexible lid sealed to the container flange. In FIG. 10, the folded over portion extends upward into and toward the inside of the container side wall. In FIG. 10A, the folded over portion extends downward and into the outside portion of the container side wall. Whereas FIGS. 9 through 10A show substantially rigid end closures double seamed, and flexible lids otherwise sealed to embodiments of the containers of this invention, other suitable end closures, lids and securements are contemplated to be within the scope of this invention. The end closures 52 which have successfully been double seamed to the marginal end portions of the containers of this invention were metal end closures made of aluminum, organically coated TFS steel and ETP steel and were double seamed to the container flanges by use of a conventional double seaming machine such as a Canco 400, 006 or 6R double seamer, modified with special seaming rolls. More particularly, the second operation rolls had different grooves, shorter axially and shallower diametrically then those commonly used for metal can bodies. Such rolls are currently used for double seaming metal end closures on plastic ham cans and on composite fiber cans. Any suitable metal end closure can be employed and the methods and means of securing or double seaming the ends to the containers are within the knowledge of those skilled in the art. Examples of suitable adherents 54 are sealing compounds sold under the trade designation SS A44 by Dewey & Almy, a Division of W. R. Grace & Company for packaging fruit and vegetable products, and made and sold under the trade designation M 261 by Whittaker Corp. for packaging meat products. Flexible lids such as shown in FIGS. 10 and 10A can comprise single or multi-layer plastic materials and can include one or more foil layers. The flexible lids 64 may be secured in any suitable manner to the container side wall, for example by heat sealing or by use of an adhesive. Suitable adhesives for flexible lids for packaging hot-filled food products include a hot melt material chosen to provide a peel strength sufficiently low in magnitude to permit easy removal by peeling lid 64 from the container 26 and to maintain a hermetic seal to protect product integrity. Flexible lids having a suitable adherent thereon can be obtained under the trade designation of SUN SEAL EFAH-123040 PET/ALU./PE/SEALANT AH, and of SUN SEAL EFKW-123020 PET/ALU./PE/SEALANT-KW from SANEH Chemical of Japan.

It is to be understood that although the aforementioned discussion refers to five layer containers, the articles contemplated to be within the scope of the inventions need not have a side wall, and they may be comprised of three layers, such as generally represented by FIG. 9D, or they may be comprised of more than three layers, for example seven or more layers.

The Apparatus

An injection blow molding line which includes the apparatus of this invention, suitable for forming the articles, parisons and containers of this invention according to the methods of this invention, will now be described. Having reference to FIGS. 11, 12, 13 and 14, the injection line, generally designated 200, includes three hoppers, 202, 204 and 206 which receive granulated polymeric material therein and pass it to three respective underlying heated injection cylinders 208, 210 and 212. Each cylinder contains a reciprocating injection screw rotatably driven by respective motors 214, 216, 218 to melt the granulated polymeric material. Each injection cylinder is located to the rear of rear injection manifold 219, a rectangular solid block formed of steel. Manifold 219 has polymer flow channels drilled in it and each injection cylinder has a nozzle which injects polymeric material into the opening of an associated flow channel in the manifold's rear face. The channels in the manifold divide in two, the flow streams from two cylinders, 208 and 212, so that five polymer flow streams are created and exit from the forward portion of manifold 219.

The rear injection manifold 219 is bolted by bolts 259 to ram block 228, a rectangular solid block of steel having polymer flow channels drilled therein. The five flow streams of polymeric materials pass out of manifold 219 and into the channels within the ram block 228. The channels within the ram block lead to the respective sources of polymeric material displacement which preferably are five rams, 232, 234, 252, 260 and 262, which are bolted to the top of the ram block (see FIG. 14). In accordance with a displacement-time schedule, described later, each ram is moved to force the material of each of five polymer flow streams through downstream channels drilled in the ram block 228, through channels drilled in a forward ram manifold 244 which is a rectangular steel block bolted by bolts 263 to the front of the ram block, through channels drilled in manifold extension 266 which is a cylindrical steel block bolted to the front face of the ram manifold, and through channels drilled in a runner extension 276 which is a cylindrical steel block whose front face 952 is bolted by bolt 174 to the runner block 288 (see FIG. 31). The runner extension passes through a bore 280 in a first fixed support means or fixed platen 282 and extends into a bore 286 drilled in runner block 288 in which the front end of the runner extension is supported. The polymers flow out of the channels of the runner extension and into channels drilled in the runner block. The channels in the runner block lead to two T-splitters 290 (see FIG. 28) inserted in the runner block, then through channels in the runner block to four Y-splitters 292 (see FIG. 28) inserted in the runner block, and then through channels in the runner block to eight feed blocks 294 (see FIGS. 32 and 41) inserted in the runner block, and, finally from the feed blocks to eight injection nozzle assemblies (also called nozzles or injection nozzles), generally designated 296, each nozzle assembly being mounted in the forward end of a feed block.

Figure 29:
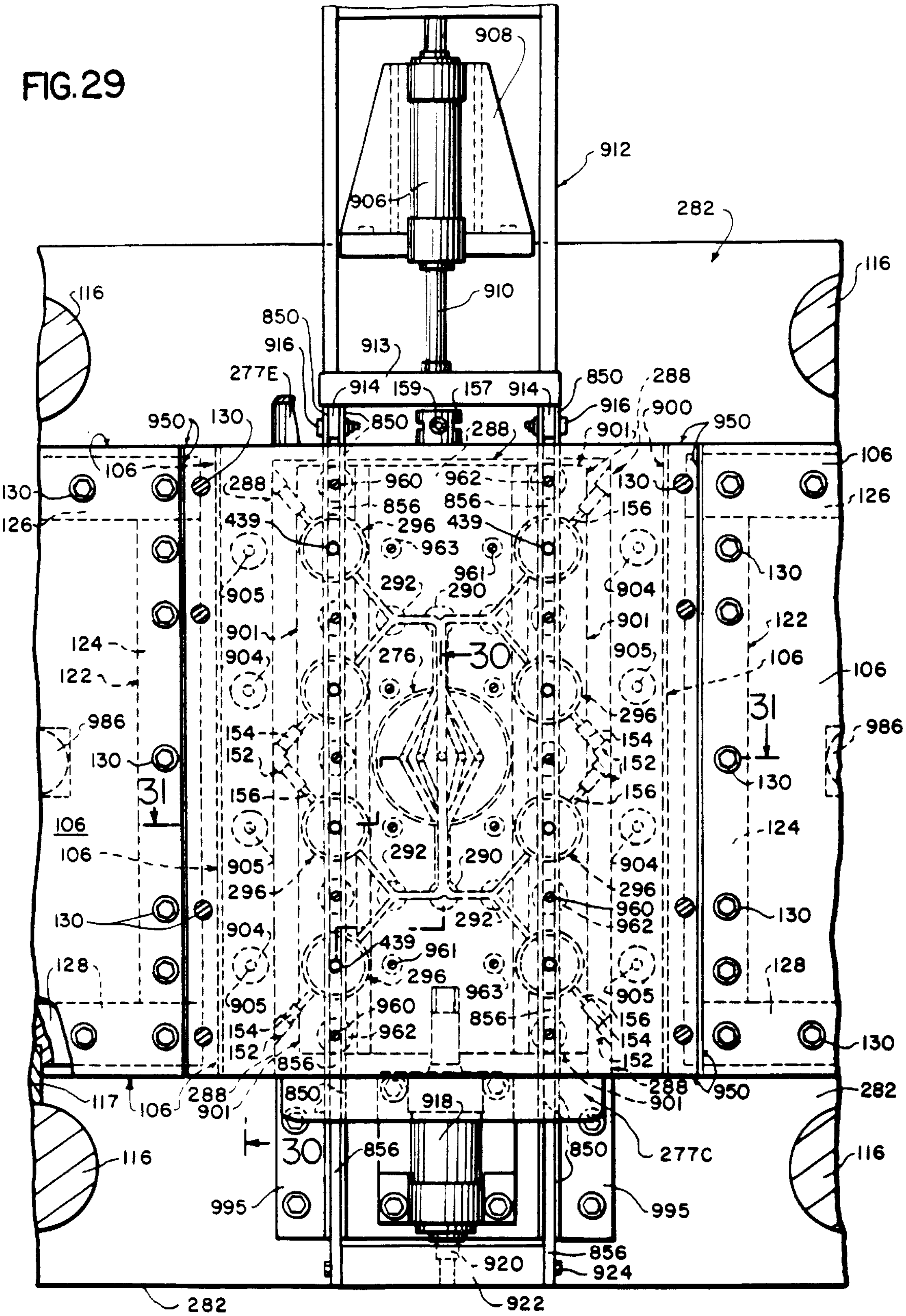
FIG. 29 is a front view partially in elevation, partially in vertical section (with section lines not shown for clarity), and with portions broken away, taken substantially along line 29—29 of FIG. 98.
Figure 29B:
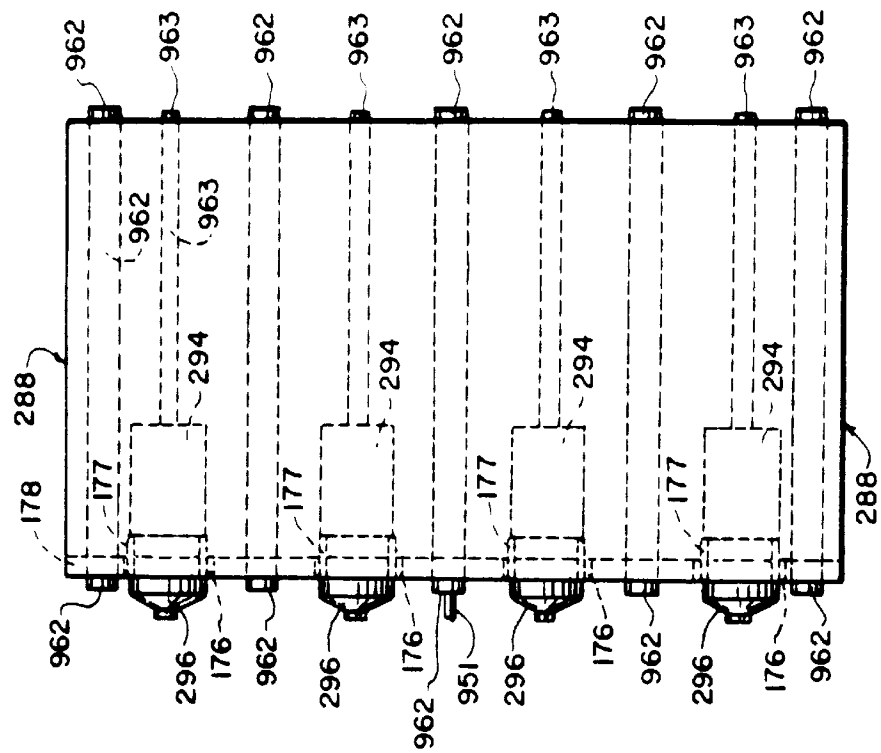
FIG. 29B is a side elevational view of the runner block of FIG. 29A.
Figure 29A:
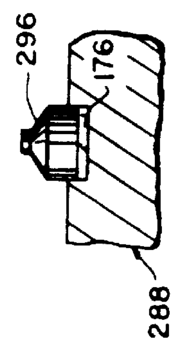
FIG. 29A is a front elevational view of the runner block of this invention having eight co-injection nozzles mounted therein, as would be seen in FIG. 98 with the injection cavity bolster plate 950 and its attached structure removed.
Figure 29A:
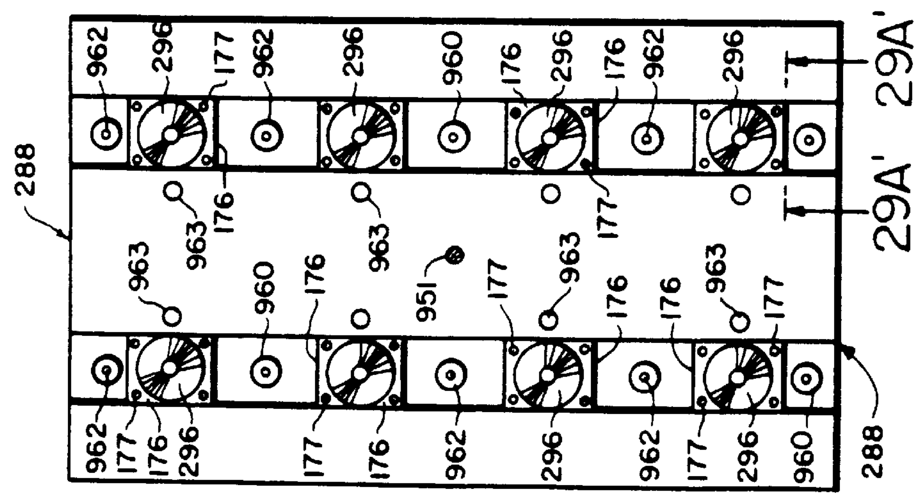

Eight nozzles are mounted in runner block 288 in a rectangular pattern of two columns of four nozzles each (see FIGS. 29A, 29B). Each nozzle 296 injects a multi-layer shot of polymeric materials into a juxtaposed injection cavity 102 mounted on injection cavity carrier block 104 in turn mounted on a fixed injection cavity bolster plate 950 (FIG. 98), to form a multi-layer parison.

A side-to-side moveable core carrier plate 112 mounted on an axially moveable platen 114 carried by tie bars 116 carries sixteen cores 118 in two eight-core sets and is moveable to align one set of eight cores and seat them within eight injection cavities 102. A cylinder (not shown) drives the carrier plate transaxially from side to side to position the cores respectively with the injection cavities 102 and blow-mold cavities 108. Suitable driving means known to the art, such as generally designated 119 and including drive cylinder 120, a housing, oil reservoir, hydraulic pump, filtering system and related electrical cabinets, moves the moveable platen along the tie bars to seat the set of eight cores in the injection cavities. This system designated 119 also drives all of the extruders 210, 212 and 214, and it drives core carrier plate 112. Concurrently with the injection forming of the eight parisons, eight parisons previously injected onto the other set of eight cores are positioned in associated blow-mold cavities 110, mounted in blow-mold carrier blocks 108, in turn mounted in blow-mold bolster plate 106 (see FIG. 13), for inflation into the desired container shape. When the injection cycle is completed (eight parisons are formed), the platen is moved rearwardly and the core carrier plate is reciprocated to the opposite side of the machine where, when the platen is moved forwardly, the eight cores carrying parisons are seated within an associated set of blow-mold cavities 110 in which the parisons are inflated.

Further details of the apparatus will now be described having particular reference to the portions thereof through which pass the melt streams of material for each of the layers comprising the injected articles. In the preferred embodiment, there are three sources of supply of polymer material, namely, hopper 202 of extruder unit "I" for supplying the polymer material which will form the inside and outside structural layers A and B, hopper 204 on extruder unit "II", for supplying the polymer material C which will form the internal layer C, and hopper 206 of extruder unit "III" for supplying adhesive polymer for forming adhesive layers D and E. It will be understood that in the illustrated embodiment the same polymeric material is used to form layers A and B and the same polymeric material is used to form layers D and E. When layers A and B are formed of different materials, separate extruder units Ia and Ib (not shown) are used. When layers D and E are formed of different materials, separate extruder units IIIa and IIIb (not shown) are used.

Figure 18:
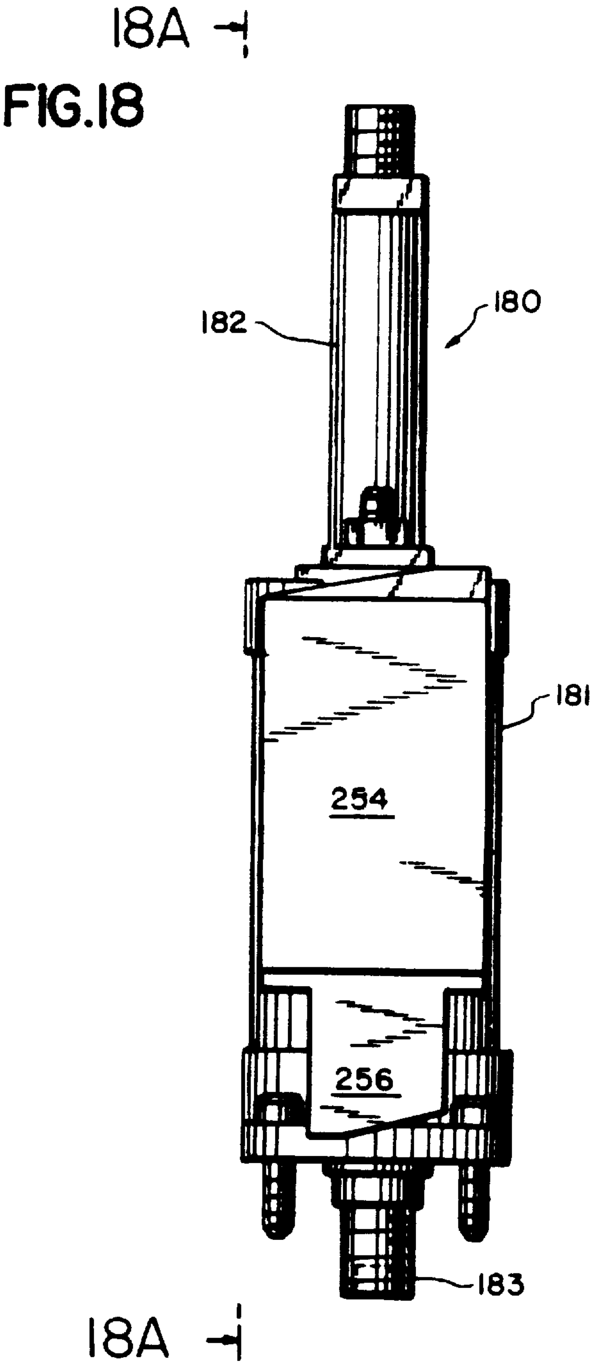
FIG. 18 is a side elevational view taken along line 18—18 of FIG. 17.
Figure 18A:
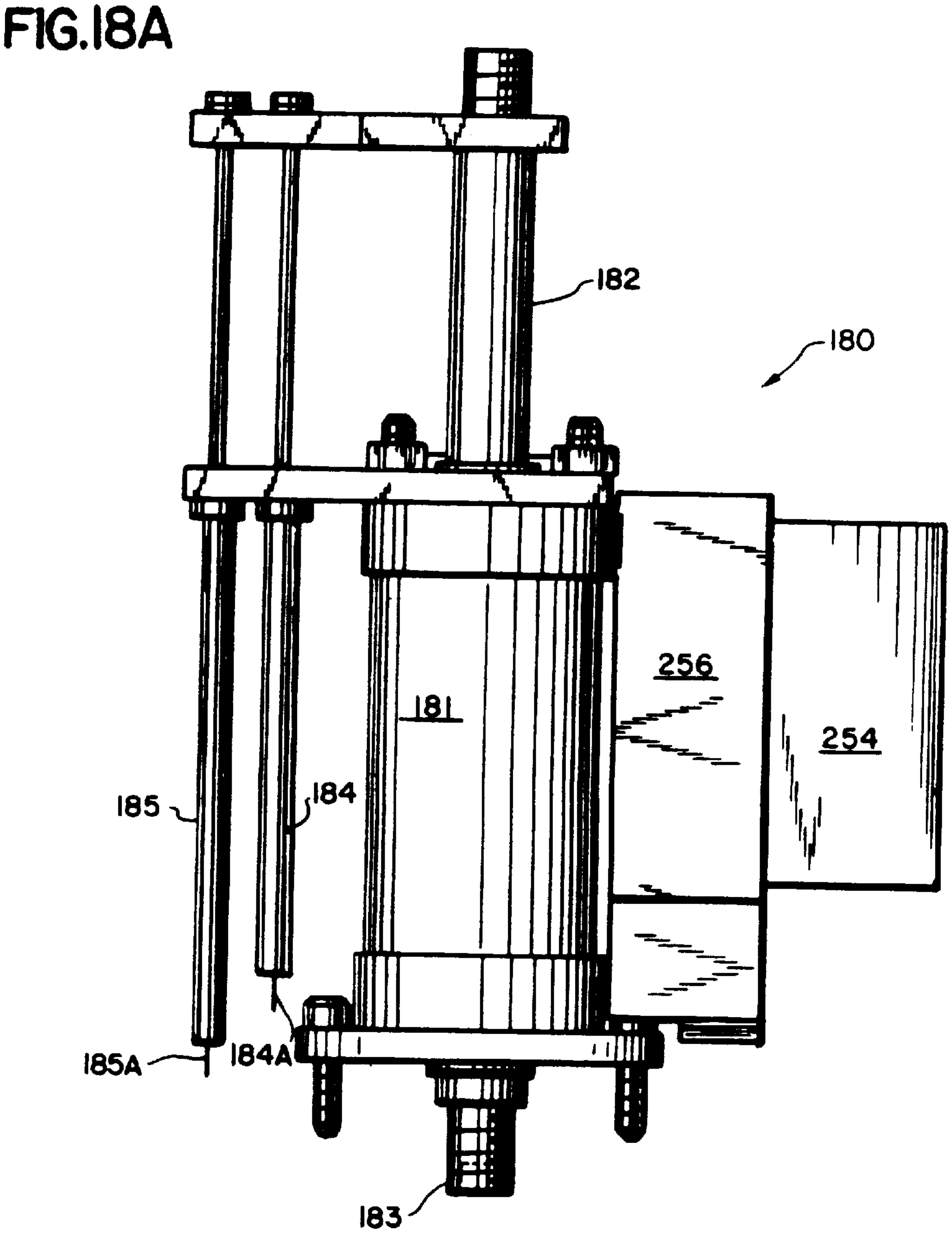
FIG. 18A is a side elevational view taken along line 18A—18A of FIG. 18.

Considering extruder unit I, the polymer melt flow stream is forced out of cylinder 208 by its reciprocating extruder screw which moves the polymer material through nozzle 215, sprue bushing 221 and into channel 217 drilled in rear injection manifold 219. The flow of the structural polymer melt material is divided in manifold 219 into two equal-distance channels 220, 222 drilled in the manifold and whose paths proceed in opposite horizontal directions. Channel 220, which is split to the right (upwards in FIG. 14), carries the polymer melt stream material which will form the A inside structural layer of the article to be formed. Channel 222, which carries the polymer melt stream which will form the B structural outside layer of the article, is split to the left and turns roughly 90° and passes axially and horizontally out of a hole in the forward face 224 of the rear manifold 219 and into an aligned channel drilled in the ram block 228. In ram block 228, each respective channel 220 and 222 communicates with a check valve 230 and then with the inlet to a source of polymer material displacement and pressurization, which, in the preferred embodiment, are rams 232, 234, each ram having connected thereto a servo controlled drive means or mechanism, here shown as including a servo manifold 236 and a servo valve 238. One of the servo controlled drive means, generally designated 180, for ram 252, and representative of the servo drive means for each of the rams employed in this invention, is shown in FIGS. 18, 18A and 18B. The servo system controls the displacement versus time movement of the rams.

Figure 14:
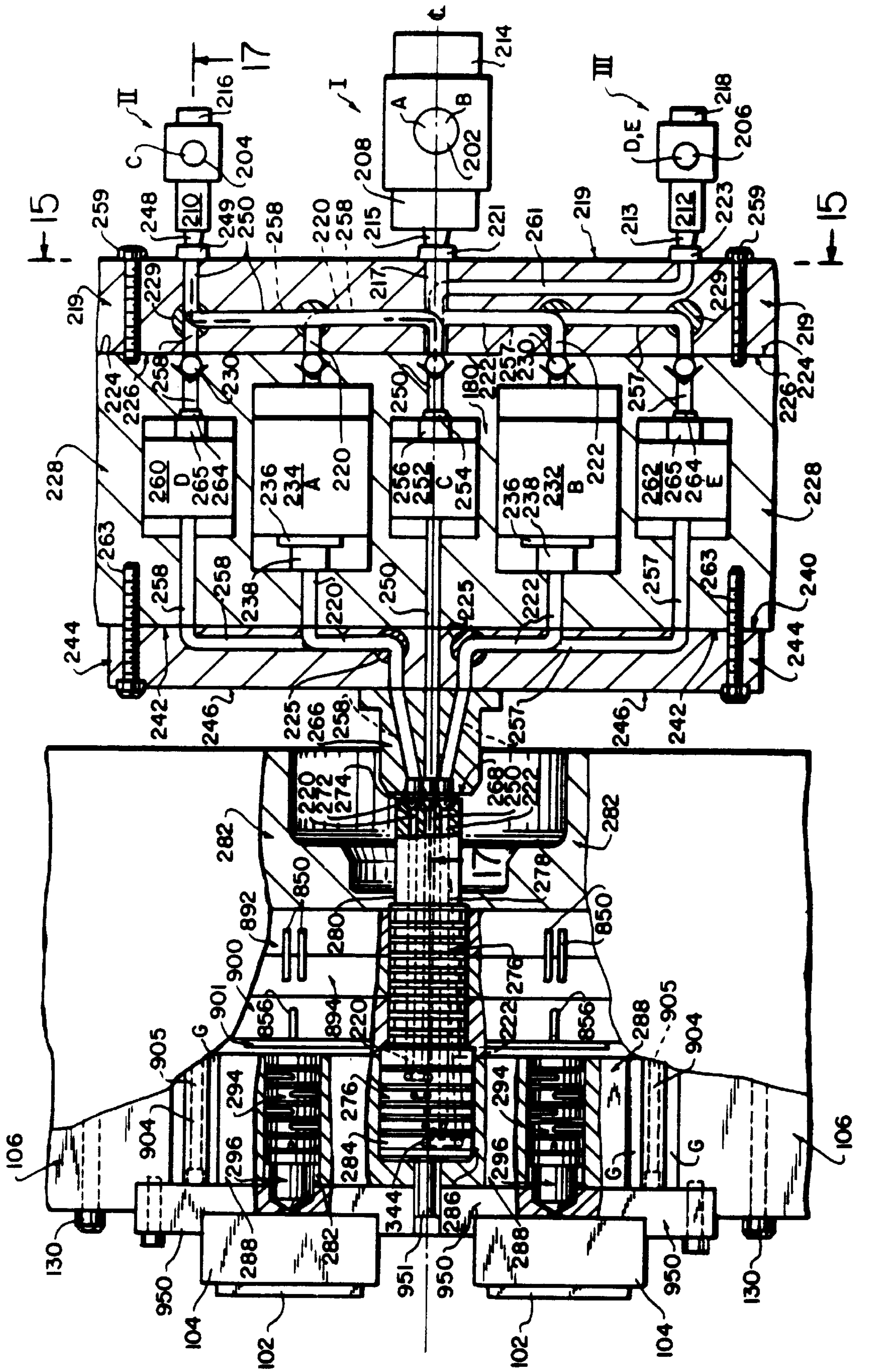
FIG. 14 is a top schematic view, with portions broken away and portions in horizontal cross-section at different levels, showing the right portion of the apparatus of FIG. 11.

With specific reference to FIG. 14, the operations of the five rams, 234, 232, 252, 260 and 262, are controlled by the selective application of drive signals to the five respective servo valves 238, 254 and 264 coupled to each of these rams. FIGS. 18, and 18A and 18B, show the conventional ram constructions employed and show, for ram 252, a hydraulically driven ram piston 253 and servo control means comprised of controllable servo valve 254 which provides hydraulic oil into double ended hydraulic cylinder 181 for driving the ram piston 253 into and out of position. Each of the rams is driven in accordance with a desired time sequence for providing appropriately dimensioned pressures for insuring the manufacture of the article with the proper configurations. As will be set forth in further detail below, major functions of the injection control are accomplished by virtue of a system processor which controls the overall movement of the various major segments of the apparatus for performing the injection sequence. Thus, a predetermined operational sequence is programmed into the system processor for moving the moveable core carrier plate along the tie bars for positioning the sixteen cores in their respective eight core sets. The processor drive acts to drive the moveable platen by energization of the hydraulic cylinder, generally represented as 119, as by opening a valve and permitting hydraulic oil to flow therein, so that the parisons previously described may be placed in the appropriate positions both for injection onto one set of eight cores and for blow-molding for inflation into the desired container shape from the other set of eight cores. The operations, including clamping, movement of the moveable platen, and other major injection cycling sequences are thereby controlled by the system processor in accordance with movements governed by means of various limit switches strategically placed at locations defining the limits of movements of these various apparatus segments within the general machine configuration. A second processor, suitably programmed, takes over the specific operation of carrying out the injection cycle when the moveable platen is properly positioned for an injection cycle on the injection cavities. This second processor directly controls the various rams by controlling the hydraulic fluid flow into the ram cylinders for purposes of applying pressure along the respective feed channel operatively connected to the ram. Since ram position is critical in determining ram pressure, appropriate feedback mechanisms are provided from each ram servo mechanism for feedback to the second processor and utilization in the program for purposes of accurately determining ram position. As shown in FIG. 18B, two transducers are employed, the first transducer 184 determining the position of the cylinder, and thereby the appropriate pressure, and the second transducer 185 determining the velocity of movement of the cylinder within the servo. Signals along appropriate lines 184A and 185A, are electrically conducted from the position transducers to the second processor for control purposes. Each of the servos shown in FIG. 14 is provided with corresponding transducers for accurately determining their respective positions. The relationship of ram position to pressure is shown in greater detail and described further below.

From the rams, each channel 220, 222 proceeds axially and horizontally through bores drilled in ram block 228 and, by means of respective holes in forward face 240 of the ram block and matched aligned holes in rear face 242 of forward ram manifold 244, channels 220 and 222 pass out of ram block 228 and into channels drilled in forward ram manifold 244. In forward ram manifold 244, each channel 220 and 222, for flow of the respective inside structural material A and outside structural material B, turn approximately 90° and run generally perpendicular to the axis of the machine to a point where the channels again turn 90° and again travel in the axial direction to holes in forward ram manifold forward face 246.

In similar fashion, the polymer material which is to form the internal layer C is forced out of injection cylinder 210 of extruder unit II by an extruder screw which moves the material forward from the extruder through a nozzle 248, sprue bushing 249, and into central flow channel 250, which enters the rear face of rear injection manifold 219, turns 90° and travels left (downward in FIG. 14) in a horizontal path above channel 220 until it reaches the axial center line of the rear injection manifold where channel 250 turns 90° and travels axially out of a hole in forward face 224 of the rear manifold 219 into a matched, aligned hole in the rear face 226 of ram block 228. In ram block 228, channel 250 communicates with a check valve 230 and then with the inlet to a source of polymer material displacement and pressurization, which, in the preferred embodiment, is ram 252 having servo 254 and manifold 256 connected thereto. From ram 252, channel 250 proceeds axially and horizontally to a hole in the forward face 240 of ram block 228. Channel 250 enters a hole in the rear face 242 of forward ram manifold 244 and passes through manifold 244 in an axial path to a hole in the forward face 246.

Extruder III forces the polymer material which is to form the internal D and E layers of the article through injection cylinder 212, through nozzle 213, sprue bushing 223 and into channel 261, which enters the rear face of rear injection manifold 219. In the rear manifold, channel 261 turns approximately 90° and travels on a plane below channel 217 in a horizontal path toward, and until the channel meets, the axial center line of the rear manifold 219. Channel 261 then turns approximately 90° and proceeds a short distance in the axial direction. It then splits into two oppositely directed horizontal channels 257, to the left, and 258, to the right (up in FIG. 14), which travel perpendicularly to the axis toward the opposing sides of the rear manifold, where they each again turn about 90° and travel axially, out of holes in the forward face 224 of the rear manifold. Flow channels 257 and 258 for the polymer of layers E and D are located in the rear injection manifold 219 below the flow channels for the polymer of layers B and A. Those holes communicate with matched aligned holes in the rear face 226 of ram block 228 which form continuations of channels 257, 258 in the ram block. Each of those channels communicates with a check valve 230 and then with the inlet to sources of polymer material displacement and pressurization, which, in the preferred embodiment, are rams 260, 262 each of which has a servo valve 264 and servo manifold 265 connected thereto. From rams 260, 262, the channels proceed forward in an axial, horizontal direction and communicate with matched, aligned holes in the ram block forward face 240 and in the forward manifold rear face 242. Channels 257, 258 continue axially, horizontally forward a short distance into forward manifold 244 where each again turns 90° and returns toward the axis until they reach respective points near but spaced from the axis where each turns 90° and travels again in the axial direction to where they communicate with holes in forward face 246 of the forward ram manifold 244. The rear and forward ram manifolds 219 and 244 are each attached to opposite faces of the ram block by respective bolts 259, and 263.

To prevent clogging of the melt flow channels, particularly those where the dimensional clearances are small, e.g. in the nozzle assemblies 296, appropriate filters may be placed in the flow channel of each melt material, preferably between the extruders and the rams. It is desirable that each flow stream prior to reaching the nozzles pass through a restricted area at least as restricted as the most restricted polymer flow stream path in the nozzles, to there remove any undesired matter from the polymer stream.

Channels 220, 222, 250, 257 and 258 then travel through bores drilled in manifold extension 266 connected to the forward face 246 of the forward ram manifold 244. On the forward face 268 of the manifold extension 266 are a plurality of nozzles 270, one for each channel which passes through the manifold extension. Each nozzle is seated in a pocket 272 at the rear face 274 of runner extension 276. The runner extension 276 is mounted at its rearward end portion 278 through a bore 280 in fixed platen 282, and at its forward end portion 284 through a bore 286 in runner block 288. As channels 220, 222, 250, 257 and 258 pass through manifold extension 266, they are rearranged (when viewed in vertical cross-section) from a spread out pentagonal or star pattern at its rearward portion to a more tightened pattern at its forward end portion, such as the quincuncial pattern shown. As the channels pass through runner extension 276, they are rearranged, when viewed in vertical cross section, from the pattern of the quincunx, at the rear end portion 278 of the runner extension, to a substantially flattened horizontal pattern near the forward end portion 284 of the runner extension. At the forward end portion 284, each channel is split into sub-channels, as will be more fully explained in conjunction with FIG. 29, and directed through channels in a runner or runner block 288 to two T-splitters 290, and then through channels in runner block 288 to four Y-splitters 292 and then through channels in runner block 288 to eight feed blocks 294 (two shown), each one of which is mated with a nozzle assembly, generally designated 296. Each feed block contains five passageways or feed channels, each of which carries a stream of polymer melt material which is to form a layer of the injected article.

Referring to FIG. 15, entrances designated 219 I, II and III to channels 217, 250 and 261 are cut into and through rear manifold 219 at different respective elevations and travel along horizontal paths. More particularly, entrance 219 II receives the polymer melt material that is to form internal layer C of the multi-layer plastic article to be formed. It communicates at the upper right corner of manifold 219 with central flow channel 250 which travels axially in the manifold, and then the channel turns approximately 90° and is directed toward the axis (from right to left in FIG. 15). Likewise, entrance 219 I near the center of the rear face of manifold 219 receives the polymer material which forms the respective inside and outside structural layers A and B of the multi-layer article to be formed. Entrance 219 I communicates with channel 217 which travels a short distance axially forward into the manifold and is then split into two channels 220, 222 (dashed lines in FIG. 15) which travel in right and left opposite horizontal directions each for a short equal distance to points wherein each channel turns substantially 90° and travels axially horizontally for short equal distances to holes where they exit the rear manifold's forward face 224. At the lower left corner of rear manifold 219, the polymer melt material which is to form internal layers D and E of the multi-layer article passes through entrance 219 III which communicates with channel 261 which passes a short axial distance horizontally into manifold 219, then makes a substantially 90° right turn and travels along a substantially horizontal path below and parallel to channels 220 and 250. At the axial center line of manifold 219, channel 261 turns at a substantially 90° angle and travels a short distance forward and into the manifold, where it then splits into two oppositely directed channels 257, 258 of equal length which run left and right perpendicularly outwardly away from the axial center line to where the respective channels again turn substantially 90° and travel axially forward into and through the short length of the ram manifold and edit through holes in the forward face 224 of rear manifold 219. The rear manifold has three metal plugs 225 each seated and located in a respective bore in the manifold by a locator pin 231 and each being pressure locked therein by a threaded set screw 229. The manifold has holes 302 therein for receiving bolts 259 (not shown) for bolting the rear ram manifold to the ram block and it has a threaded drill hole plug 303 for sealing channel 261. The rear manifold also contains oil flow channels 309 which run from side end to side end horizontally through the manifold for circulation of heated oil which maintains the manifold and the polymer melt streams running therethrough at the desired temperature.

Rear injection manifold 219 contains a metal plug 225, retained by set screw 229, having two portions of channel 227 drilled therein at right angles and with a ball end mill at the intersecting end of each portion. (See FIGS. 15 and 16). The ball end mills establish a spherical surface at the intersection of the channels which provides a smooth transition right angle turn to the polymer flow channel 222. Such a smooth transition turn prevents undesirable stagnation of polymer melt flow which otherwise tends to occur at sharp turns of a polymer melt stream flow channel. All turns of flow channels in the rear injection manifold 219, ram block 228, forward ram manifold 244, manifold extension 266, runner block 288, T-splitters 290 and Y-splitters 292, where drilled channels intersect to form the turn, are smooth transition turns to prevent polymer stagnation. The turns are formed by ball end mills or other suitable means either in the channels drilled in the injection manifold, ram block, etc., or, when the geometry requires it, in channels drilled in plugs 225 or plugs similar thereto.

Figure 17:
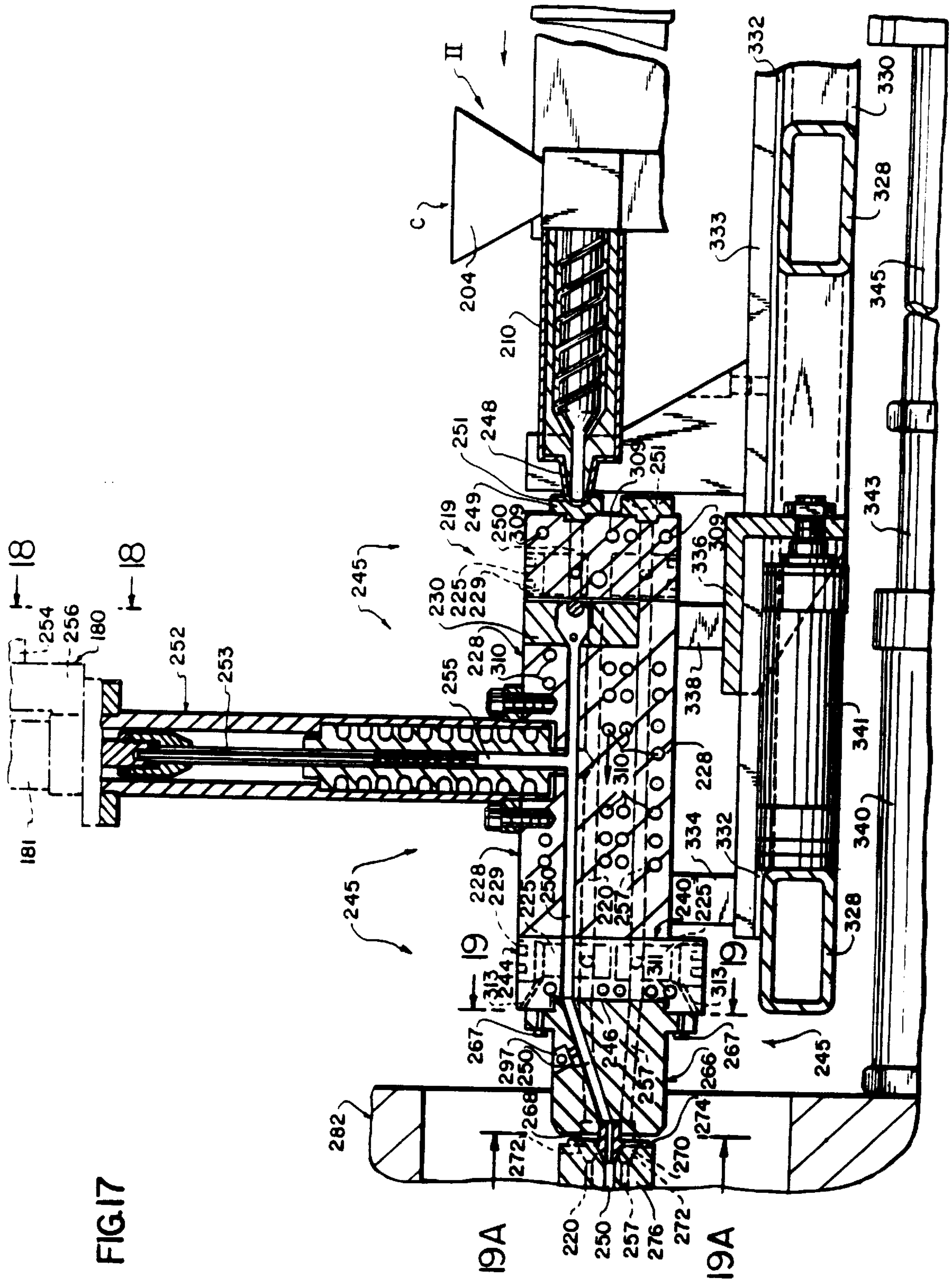
FIG. 17 is a vertical section taken along line 17—17 of FIG. 14.

Referring to FIG. 17, hopper 204 is supported on injection cylinder 210 of extruder unit II which plasticizes the polymer melt material which is to form internal layer C. Injection nozzle 248 at the forward end of the injection unit II is seated in and communicates with sprue bushing 249 having a nozzle seat 251 which in turn communicates with channel 250, for carrying polymer C, bored or cut horizontally through rear manifold 219. A ball check valve 230 communicating with channel 250 allows material to pass through the check valve in the foward direction but prevents the material from flowing back into rear manifold 219 from pressure exerted by injection ram 252 having a hollow chamber, and a vertically reciprocable piston 253 and an accumulator seated therein. Channel 250 in ram block 228 communicates with ram bore 255. Shown in phantom attached to the top of ram 252 is a conventional servo control mechanism generally designated 180 (more particularly described in relation to FIGS. 18 and 18A). Channel 250 for the C material is cut straight horizontally and axially through ram block 228 and communicates with a matched hole in forward face 240 of the ram block and in rear face 242 of the forward ram manifold (see FIG. 14), which in turn communicates with the continuation of channel 250 through forward ram manifold 244. Channels 250, 220, and 257 are directed horizontally forward through ram block 228 in separate, parallel paths at different elevations. As will be explained, the entire ram block, generally designated 245, which includes rear injection manifold 219, ram block 228, forward ram manifold 244, and manifold extension 266, is heated by suitable means, here shown as a plurality of bored and communicating oil flow channels running horizontally through the widths of its components for circulating a heated oil or another suitable heated fluid. The oil flow channels are designated 309 for the rear ram manifold, 310 for the ram block and 311 for the forward ram manifold. Forward ram manifold 244 has vent holes 313 therein for venting polymer material which has leaked from an interface of the manifold extension with an adjacent structure, and to prevent the material from blowing the plugs 225 out of the structure. Manifold extension 266 is bolted to the forward face 246 of forward ram manifold 244 by bolts 267. As will be explained, the manifold extension tightens the pattern of respective channels 250, 220 and 257 as well as those of the other channels not here shown, such that the channels are in a tight quincuncial pattern when viewed in vertical cross-section, for communication with runner extension 276. The respective flow channels continue from the manifold extension to runner extension 276 by means of nozzles 270 which are seated in pockets 272 in runner extension rear face 274.

Pressure transducer port 297 is located in the upper portion of manifold extension 266. It is at this location, approximately thirty-nine inches away from the tips of nozzles 296, that the pressure measurements of Table IV were made.

The support and drive mechanism for the entire ram block 245 will now be described. (See lower portion of FIG. 17.) Cross frames 328 and longitudinal frames 330 (one shown) support a pair of wear strips 332 and a pair of mounting sleds 333, which in turn support a long ram block stand-off 334, and a sled drive bracket 336 which in turn supports short ram block stand-off 338. A horizontally-mounted ram block sled drive cylinder 341 is connected to mounting sleds 333 and drive bracket 336, and which latter structures are bolted together, thereby drives entire ram block 245 rearward and forward to thereby bring the nozzles 270 on the manifold extension into and out of seated engagement with the pockets 272 in the rear face 274 of the runner extension 276. Main extruder carriage cylinder 340 is bolted at its forward end to fixed platen 282 and, through its cylinder rod 343 and rod extension 345, it is connected to and drives main extruder carriage 347 to which is attached main extruder unit I. As will be explained in conjunction with FIGS. 98, 105 and 106, once nozzles 270 are seated, the ram block sled drive cylinder 341 maintains sufficient force, in conjunction with clamp cylinders 986 and drive cylinder 340, to maintain a seated leak-proof engagement between the nozzles and the runner extension.

Referring to FIGS. 18 and 18A, one of the conventional servo control mechanisms 180 employed in this invention and which drives and controls ram 252 is comprised of a servo manifold 256, a servo valve 254, a double-ended hydraulic cylinder 181 having an upper rod 182 and a threaded lower rod extension 183 to which is connected ram piston 253, and velocity and position transducers, generally designated 184, 185, which as will be explained, communicate with and provide signals to microprocessor 2020 (FIG. 141). A separate servo control mechanism similar to the one generally designated 180 is connected to and drives each ram 260, 234, 252, 232 and 262.

Figure 19:
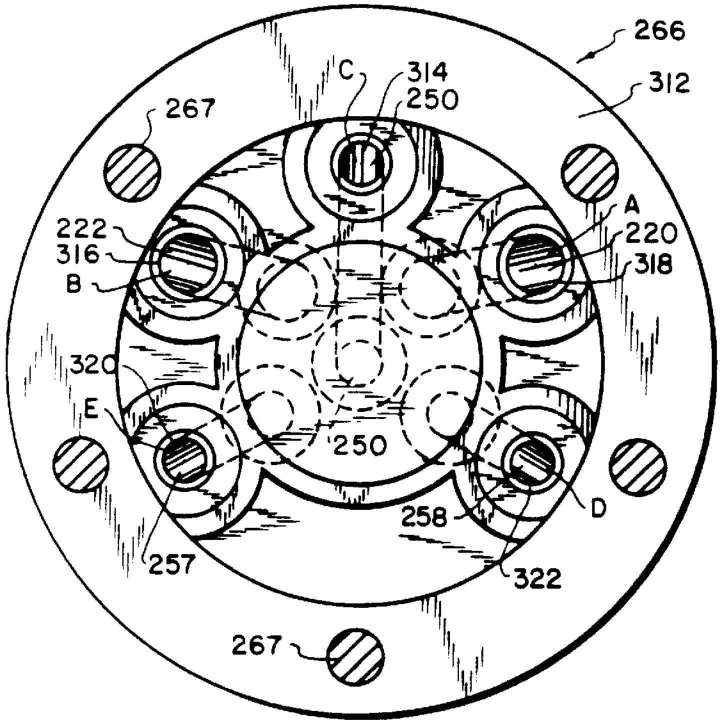
FIG. 19 is an elevational view with portions in section, taken along line 19—19 of FIG. 17.
Figure 19A:
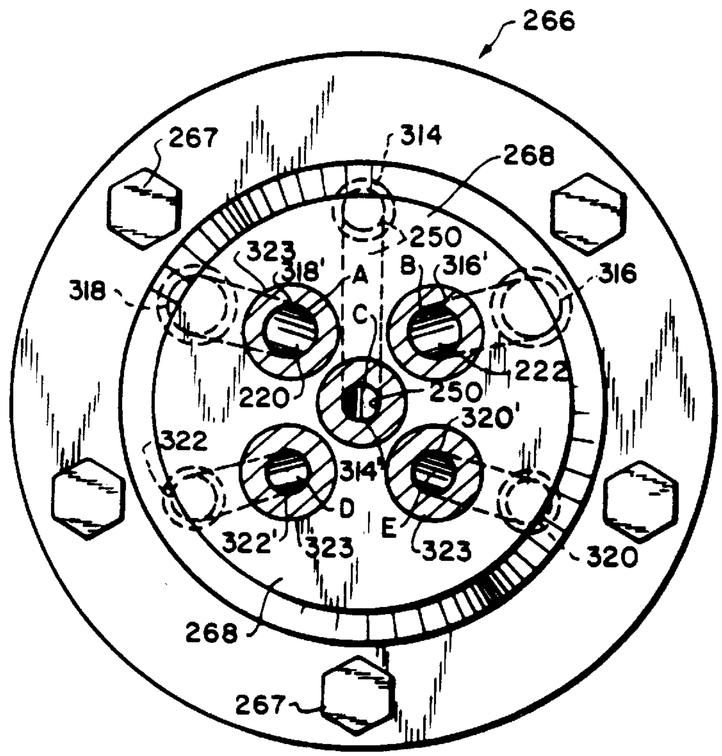
FIG. 19A is an elevational view with portions in section, taken along line 19A—19A of FIG. 17.

Referring to FIG. 19, a view of the rear of rear manifold extension 219 shows that the paths of channels 220, 222, 250, 257 and 258 which enter the rear of the manifold extension at holes 318, 316, 314, 320, 322 are arranged in a spread or enlarged, five-pointed star pattern. In manifold extension 266, the paths of channels 220, 222, 250, 257 and 258 are changed from their horizontal paths in forward ram manifold 244 to inwardly angled paths which tighten the quincuncial pattern such that the channels exit through holes 318', 316', 314', 320', and 322' which are arranged in a tighter four-pointed quincuncial pattern, relative to the central exit hole 314', for carrying the internal layer C material (see FIG. 19A, a view of the front face of the manifold extension). Nozzles 270 are seated in bores 323 in the front face 268 of manifold extension 266. The nozzles are connected to and communicate with respective manifold extension exit holes 314', 316', 318', 320' and 322'. Nozzles 270 protrude into and are seated in matching pockets 272 cut into the rear face of runner extension 276 where the sprue or mouth of each nozzle communicates with a matched, aligned entrance hole in the runner extension pockets, which holes in turn communicate with aligned continuations of the five polymer flow channels 220, 222, 250, 257 and 258 bored into the runner extension.

As is more fully described below, an important feature of the present invention is that it facilitates production of substantially uniform, multi-layer injected articles from each of a plurality of injection nozzles. This is achieved, in part, by having the flow and flow path and flow experience of each melt material from the material moving means, material displacement means, or source of material displacement, —the ram—, to the central channel of any one of the plurality of injection nozzles 296 (FIG. 14), be substantially the same as that of each of the corresponding melt materials in the other corresponding flow channels, as the material travels from that ram to the central channel of any of the other nozzles. The arrangement of the flow channels, branch points and exit ports in the polymer stream flow channel splitter devices of this invention, including runner extension 276, T-splitters 290 and Y-splitters 292, and other parts of the apparatus (see, e.g., FIGS. 28 and 29C), is designed to assist in providing such a flow system.

Figure 20:
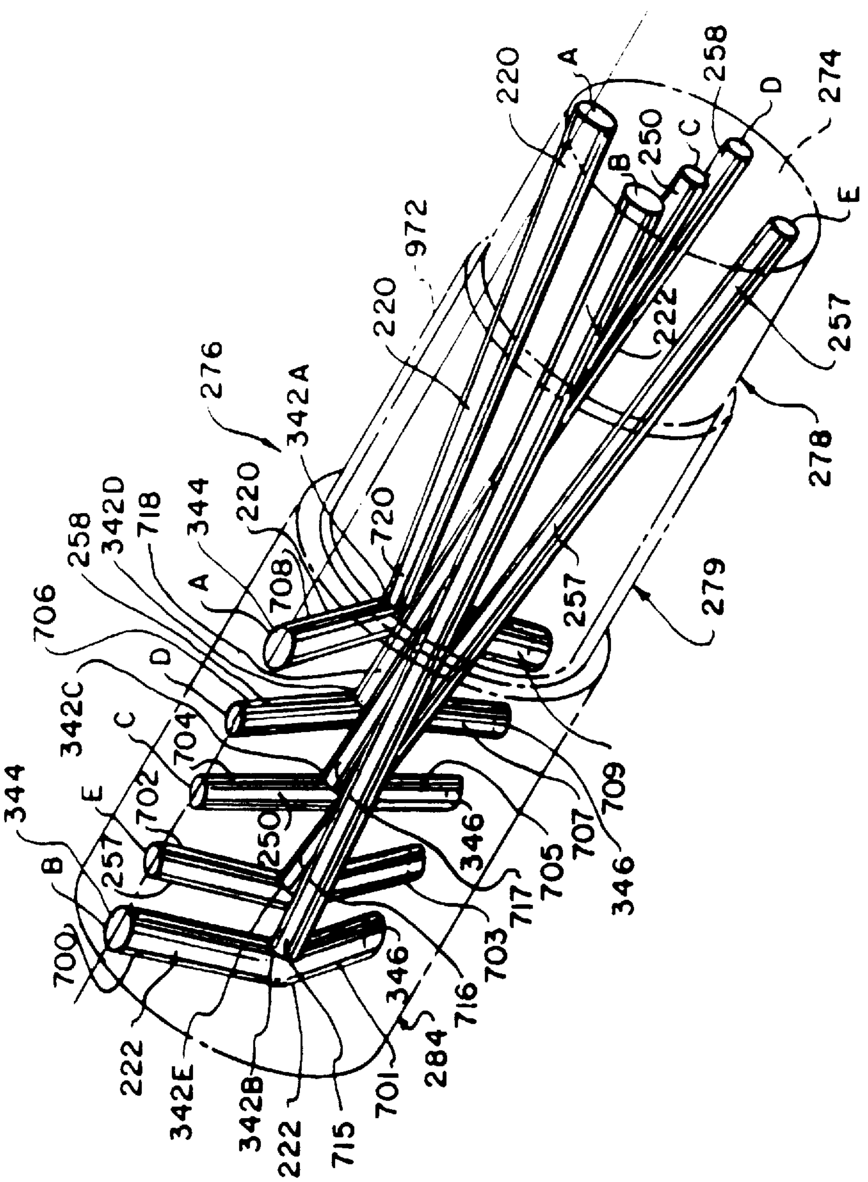
FIG. 20 is a perspective view, with portions broken away, of the runner extension shown in FIG. 14.

The flow pattern of the five flow channels 220, 222, 250, 257 and 258 is rearranged in the runner means of this invention which is a polymer flow stream splitting and distribution system, here including runner extension 276 from a tight-knit star pattern at the rearward end portion 278 of the runner extension to an axially-spaced, radially or horizontally offset pattern along the horizontal diameter in the forward end portion 284 of the runner extension (see FIG. 20). Thus, channel 250 for the polymer C material travels directly through the center line of the runner extension along its axis. Channels 220 and 222 for the respective structural layers A and B are drilled within the runner extension at an angle downward and outward relative to its axis (see FIGS. 20, 21 and 30). Channels 257 and 258 for the material for layers E and D, respectively, are drilled at an angle upwardly and slightly inwardly relative to the axis of the runner extension (see FIGS. 20 and 21).

The flow channel for each melt material is split or divided at a branch point, generally designated 342, in the forward end portion 284 of the runner extension. The locations of the branch points 342 are such that the flow and flow path of the melt material passing through any given branch point is, from there to any one of the injection nozzle assemblies, the same as from there to every other nozzle assembly. In the preferred embodiment, the branch points 342A, 342B, 342C, 342D and 342E for the respective materials forming layers A, B, C, D and E of the multi-layer injected article, preferably located in a common plane (a horizontal plane in this embodiment) but in different vertical planes, are spaced from each other horizontally and along the axis of the runner extension and are radially offset with respect to the axis of the runner extension, in the sense that other than branch point 342C, each is on a radius of a different length measured from the axis.

In the preferred embodiment of the injection nozzle assembly 296, described below, the melt stream for each of the layers of the injected article enters the central channel 546 of the nozzle at locations spaced from each other along the axis of channel 546 (see FIG. 50). The melt stream from which is formed the outside structural layer B of the injected article enters the nozzle central channel 546 at an axial location closest to the gate at the front face 596 of the nozzle. The melt stream from which is formed the inside structural layer A of the injected article enters the nozzle central channel 546 at an axial location farther from the gate of the nozzle than any of the melt streams which form the other layers of the injected article. The melt stream (or streams) which form the internal layer (or layers) of the injected article enter the nozzle central channel at an axial location (or set of axial locations) between the melt streams for layers B and A. In the preferred five-layer injected article, the locations at which the five melt streams for those layers enter the nozzle central channel 546 are in the order B, E, C, D, A. Preferably all orifices other than for the inside structural layer, here A, are axially as close as possible to the gate of the injection nozzle. The axial order of sequence, from front to rear, of the five branch points 342 in the runner extension is: 342B, 342E, 342C, 342D and 342A, respectively, for the materials from which are formed layers B, E, C, D and A of the injected article. At each branch point, the axial end portion of the primary flow channel is split into two branches, referred to as first and second branched flow channels which are bores equal in length and respectively directed at an angle upward and downward toward, and communicate with and terminate at, a plurality of first exit ports 344 and a plurality of second exit ports 346 (see FIGS. 20–28). Each plurality of exit ports is axially aligned and spaced in the same order along the respective top and bottom peripheral surface portions of forward end portion 284 of runner extension 276 for presentation to and communication with flow channels in runner block 288.

The amount of radial offset of branch point 342B from the axis of the runner extension is the same as for branch point 342A, and the radial offset for branch point 342E is the same as for branch point 342D. It is desired that the radial offsets for the branch points of the layer A and B materials, be similar to facilitate achievement of equal response time in each layer in each pair. The same applies to the respective flow channels in the entire ram block 245. It also applies to the layer D and E materials where it is desired to start flow of both substantially simultaneously into the nozzle central channel. It should be noted that, because of nozzle geometry, in which the orifice for the layer E material is located closer to the open end of the nozzle central channel than the orifice for the layer D material, as described later it is desirable to have a small time lag in the introduction of layer E material into the nozzle central channel to compensate for the axial difference in nozzle position of the orifices for the materials of layers E and D.

The construction of the preferred runner extension 276 and pattern of travel in it of each of the material flow channels can be more clearly understood by reference to FIGS. 20–28. Channels 220, 222, 257 and 258 are bores of circular cross-section drilled from the rearward end or rear face 274 generally axially, at a compound angle in and through a portion of the length of the cylindrical block of steel out of which the runner extension is made. Channel 250, also referred to as the central flow channel, is a circular bore drilled along the central axis of the runner extension. As the plurality of channels pass axially forward through the runner extension, they are gradually oriented or rearranged from a radial, tight star or quincuncial pattern, (FIG. 22) at the rear face 274 and rearward end 278, of the runner extension, where each channel passes through a common vertical plane, into a more flattened, substantially horizontal, axially spaced or offset pattern (FIG. 23) at the middle porton 279 of the runner extension. In the forward end portion 284 of the runner extension, the axial end portions 715, 716, 717, 718 and 720 of the flow channels are split or divided at spaced, horizontally coplanar branch points 342A, 342B, 342C, 342D and 342E, each in a different plane vertical to the axis of the runner extension, into two branches, referred to as first and second branched flow channels.

The branch point 342C for material C is formed at the intersection of axial end portion 717 of central flow channel 250, and is the bore portion drilled on the axis of the runner extension, at the intersection with a bore through the runner extension along a diameter thereof (see FIG. 26) and which forms first branched flow channel 704 and second branched flow channel 705. The other branch points are each formed at the intersection of two equal angular bores which form the branches or first and second branched flow channels, e.g. 700 and 701 for the first and second branched flow channels of channel 222 for material B (see FIG. 24), drilled into the runner extension from opposite diametral locations, to intersect with the generally-axial compound-angle bore for channel 222. Smooth transition turns are formed at each branch point by using a ball end mill to finish the bores.

In the embodiment just described, the axial end portions 715, 716, 717, 718 and 720 of flow channels 220, 222, 257 and 258 (for respective layers A, B, E and D) adjacent to and upstream of respective branch points 342A, 342B, 342E and 342D intersect the branch points at compound angles. As a result, the angle of intersection between the upstream portion of the channel, for example axial end portion 715 of channel 222 (FIG. 20), and one of the adjacent branches of the channel downstream of the branch point, for example the bore which forms branch 700 of channel 222 (FIG. 24), is substantially the same as but not identical to the angle of intersection between the upstream connecting channel portion and the other adjacent downstream branch, for example the bore which forms branch 701 of channel 222. This may cause a slight bias of flow at the branch point, generally favoring flow into the downstream branch having the larger angle of intersection with the upstream connective channel portion. In the above described embodiment, however, the angles of intersection are substantially the same, the maximum difference being three degrees off the perpendicular and satisfactory, multi-layer injected articles from a plurality of injection nozzles have been made, and the above-stated object of having substantially equal flow and flow path to each injection nozzle is achieved.

Where the manufacture of injected articles requires it, the previously-described slight flow bias may be substantially eliminated by having the angle of intersection be the same, as in the alternative embodiment of the runner extension described below.

In the first alternative embodiment of the runner extension (see FIGS. 28A–28H), the angle of intersection between the axial end portions of flow channels 220, 222, and 258 and the adjacent downstream two branches of the flow channel is the same. In this particular alternative embodiment, the axis of the axial end portion of each flow channel is either on or generally on the central axis of the runner extension. Thus, the axial end portion 717 of central flow channel 250 for the C layer material is on the central axis of the runner extension. Channel 222 for the B layer material has a connecting channel portion 710, adjacent to and upstream of branch point 342B', which is perpendicular to the central axis of the runner extension; channel 257 for the E layer material has a connecting channel portion 711, adjacent to and upstream of branch point 342E', which is perpendicular to the central axis; channel 258 for the D layer material has a connecting channel portion 712, adjacent to and upstream of branch point 342D', which is perpendicular to the central axis; and channel 220 for the A layer material has a connecting channel portion 714, adjacent to an upstream of branch point 342A', which is generally axial to the central axis. (See FIGS. 28G and 28H) Each of the upstream connecting channel portions 710, 711, 712, and 714 is long enough for the melt material flowing therethrough and entering the branch point to have largely forgotten the direction in which it was moving in the compound-angle channels prior to flowing into the connecting channel portion. Each of the branches or branched flow channels 700' and 701', 702' and 703', and 704' and 705' of flow channels 222, 257, and 250 which is adjacent to and downstream of respective branch points 342B', 342E', and 342C', is perpendicular to the respective upstream connecting channel portions 710, 711, and to axial end portion 717, and thus, for each of these flow channels, the angle of intersection between the adjacent upstream portion and each adjacent downstream branch is the same. Each of the adjacent branches or branched flow channels 706', 707' of flow channel 258 which is downstream of branch point 342D' intersects the upstream connecting channel portion 712 of channel 258 at the same angle; and, similarly, the intersection angles are the same between upstream connecting channel portion 714 in plug 725 (see FIG. 28G) of channel 220 and the branches or branched flow channels 708', 709' of channel 220 which are adjacent and downstream of branch point 342A'.

Figure 28:
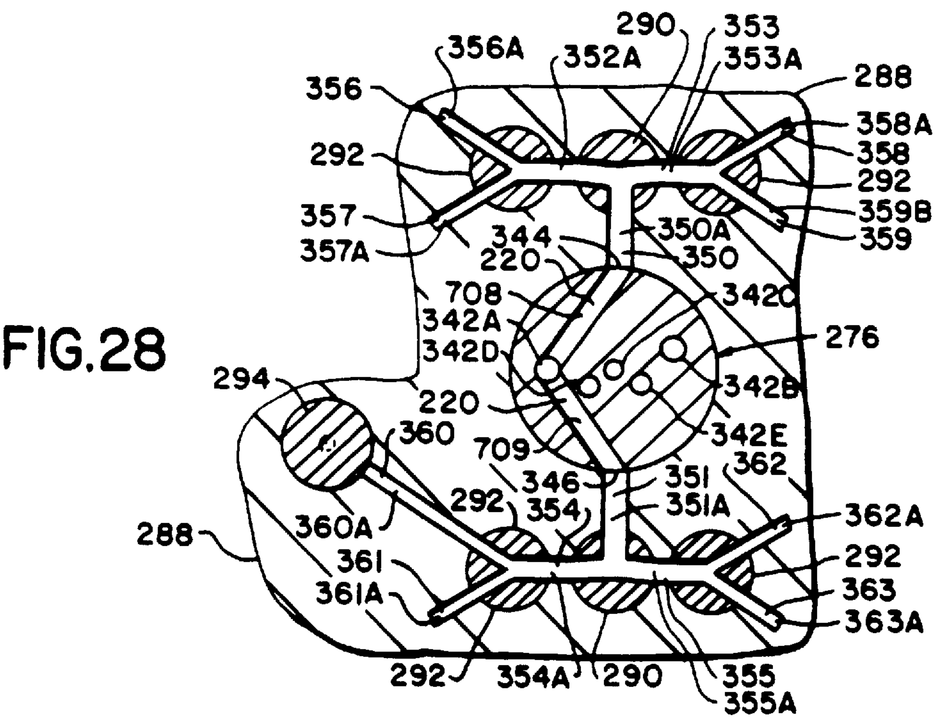
FIG. 28 is a vertical section taken substantially along line 28—28 of FIG. 21, but additionally shown within a vertical section (with portions broken away) of the runner block of this invention.
Figure 28A:
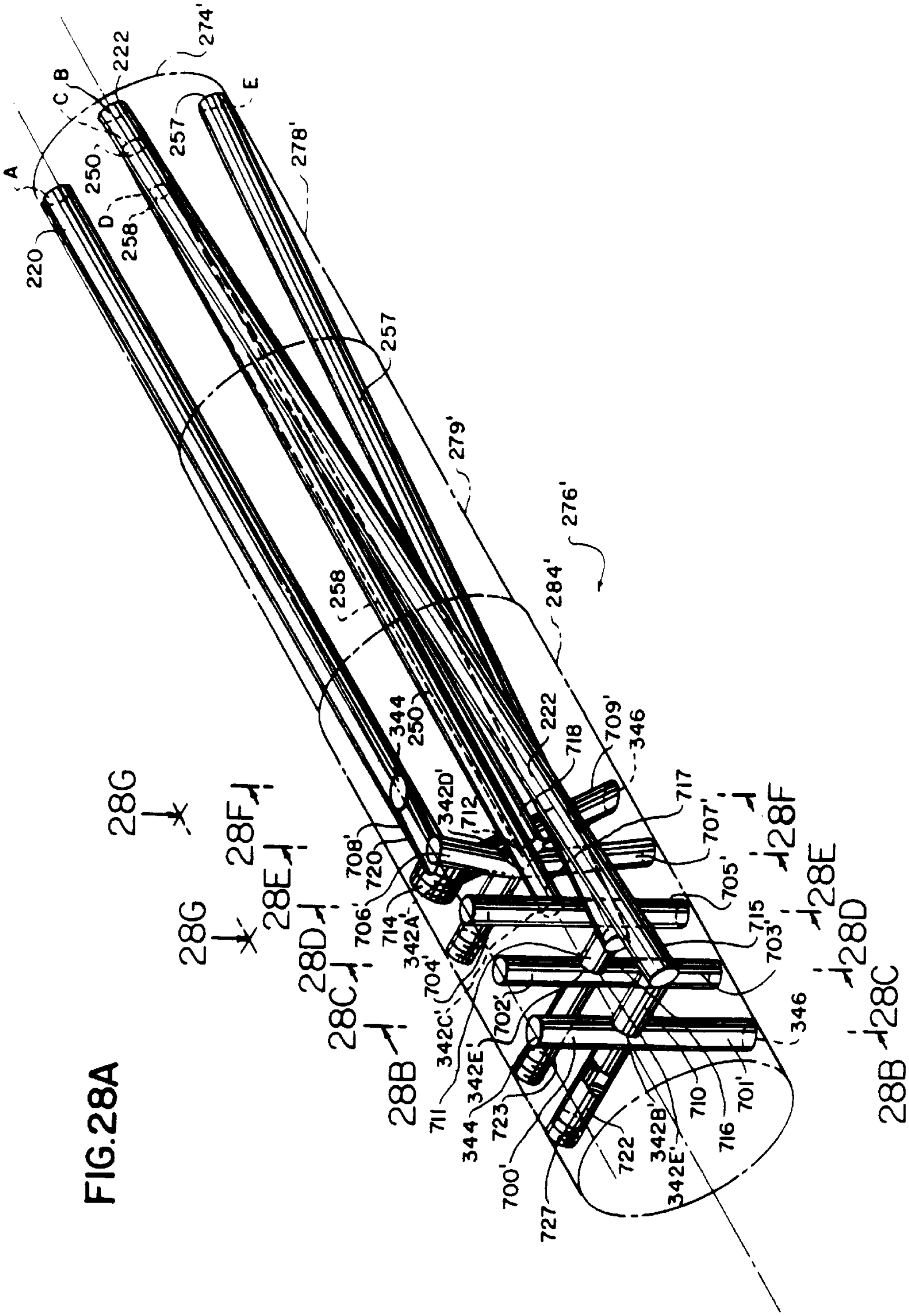
FIG. 28A is an enlarged perspective view of another embodiment of the runner extension of this invention.
Figure 28B:
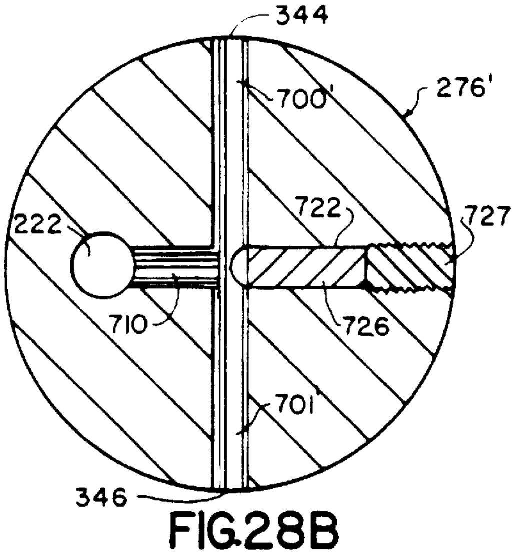
FIG. 28B is a vertical section taken along line 28B—28B of FIG. 28A.
Figure 28C:
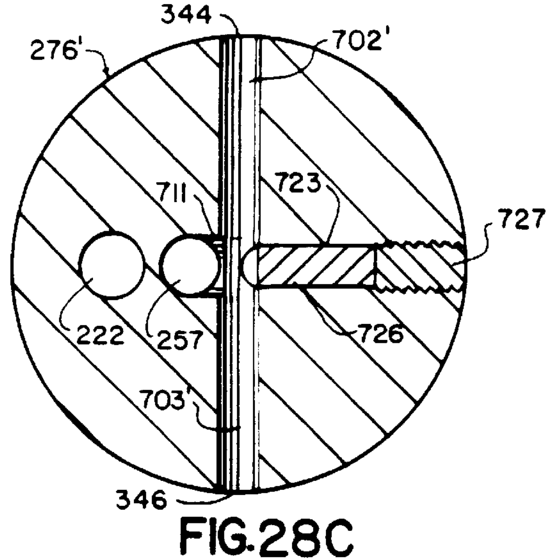
FIG. 28C is a vertical section taken along line 28C—28C of FIG. 28.
Figure 28D:
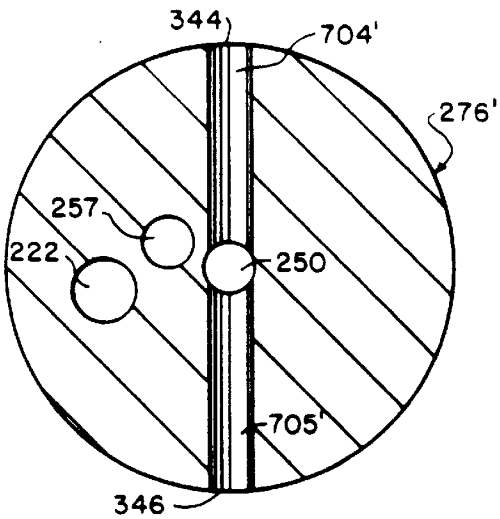
FIG. 28D is a vertical section taken along line 28D—28D of FIG. 28.
Figure 28E:
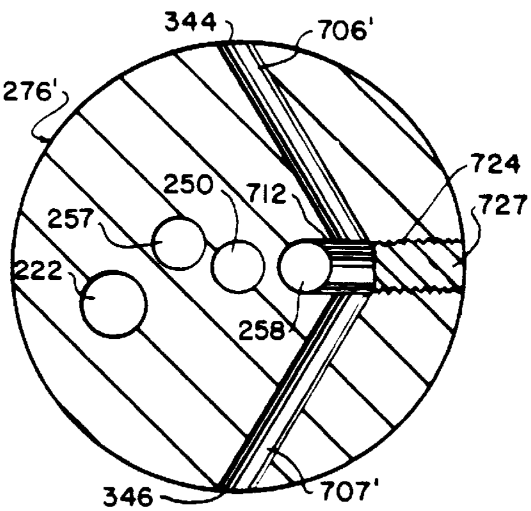
FIG. 28E is a vertical section taken along line 28E—28E of FIG. 28.
Figure 28F:
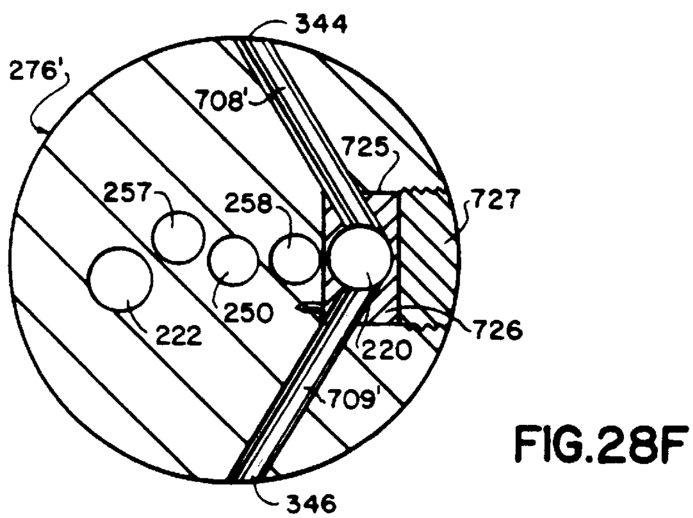
FIG. 28F is a vertical section taken along line 28F—28F of FIG. 28.
Figure 28G:
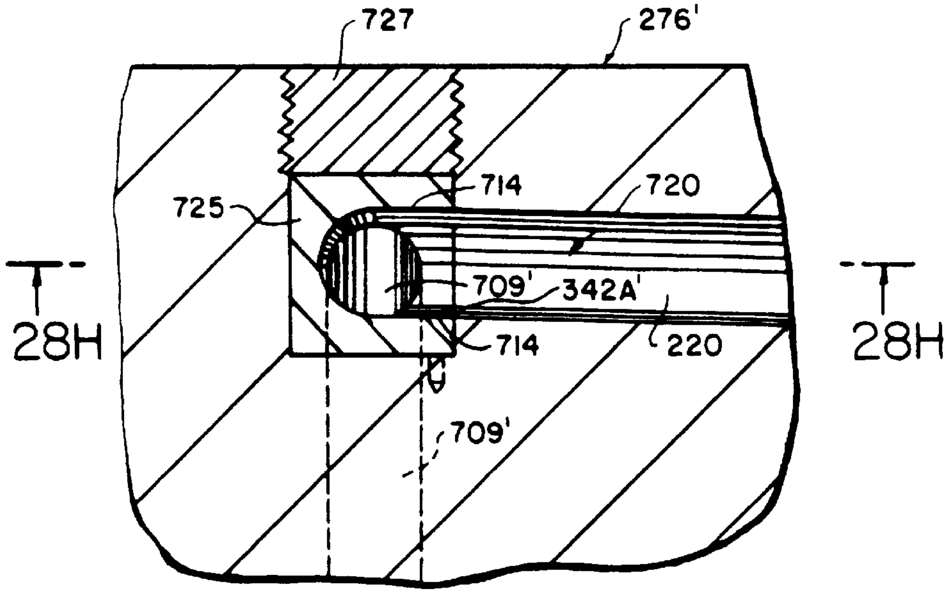
FIG. 28G is a horizontal diametrical section with portions broken away, taken substantially along a line represented by 28G—28G of FIG. 28.
Figure 28H:
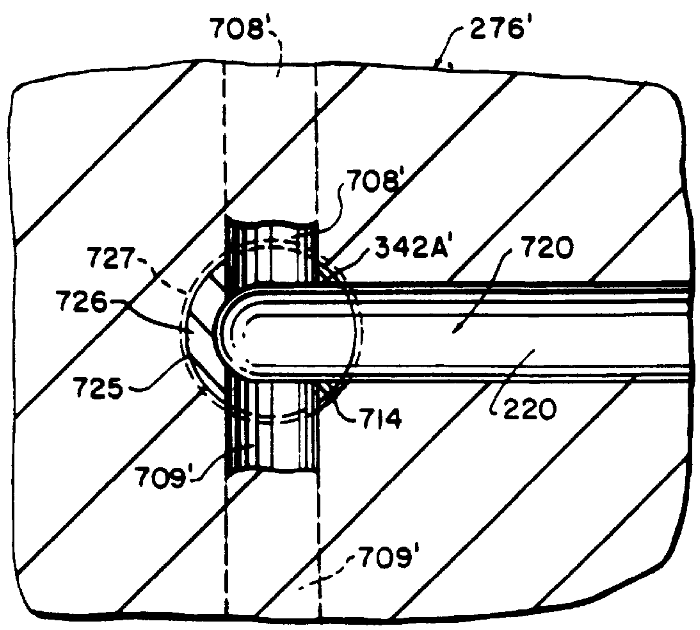
FIG. 28H is a vertical section with portions broken away taken along line 28H—28H of FIG. 28H.

This alternative embodiment of the runner extension shown in FIGS. 28A–28H is made by first drilling the bore for the axial channel 250 and the bores for generally-axial channels 220, 222, 257 and 258. Four parallel diametrical bores 722, 723, 724 (fully threaded), and 725 (see FIG. 28G) for forming connecting channels 710, 711 and 712, are drilled to intersect the bores for channels 222, 257, 258 and 220. A cylindrical metal insert or plug, generally designated 726, retained by a set screw 727, is inserted into diametrical bores 722, 723 and 725. Only a set screw 727 is employed in bore 724. Perpendicular bores are drilled on a diameter through the runner extension and the internal ends of the plugs to form the perpendicular branches or branched flow channels 700', 701' and 702', 703' of channels 222 and 257 which are adjacent to and downstream of branch points 342B' and 342E'. The plugs 727 may be temporarily removed, extract any severed ends of the plugs and any feathered edges. Equal angular bores are drilled through the runner extension and respectively into the plugs in bores 724 and 725, to form the branches or branched flow channels 706', 707' and 708', 709' of respective channels 258 and 220 which are adjacent to and downstream of branch points 342D' and 342A'. A ball end mill is used to form the branches 708' and 709' from connecting channel 714 in plug 727'. Though not shown in FIG. 28F, FIGS. 28G and 28H show that generally axial flow channel 220 has an axial end portion 720 which communicates with straight, connecting channel portion 714 in plug 725 which, in contrast with the other connecting channel portions of this embodiment, runs axial to the runner extension.

Figure 28I:
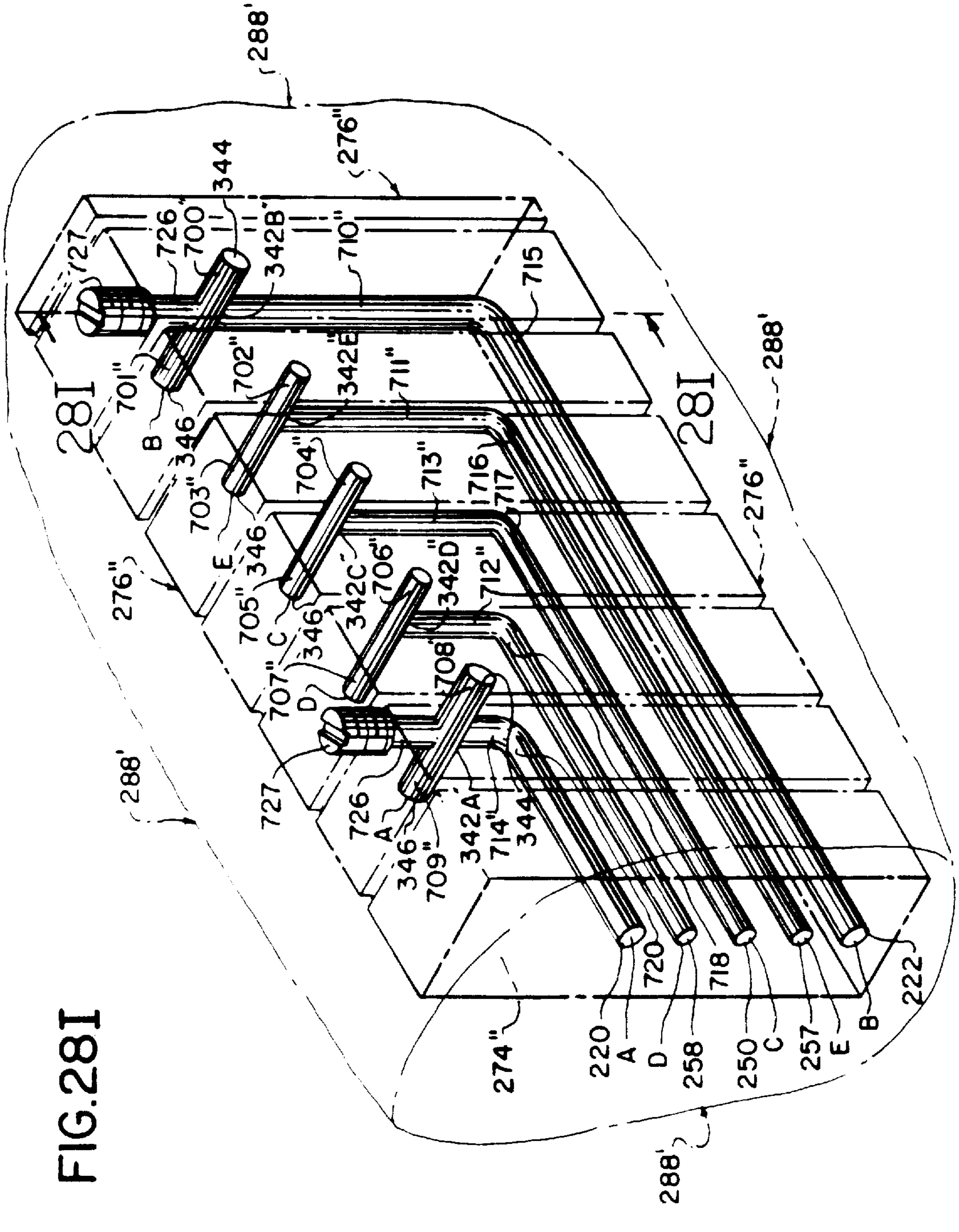
FIG. 28I is a perspective view of another embodiment of the runner extension of this invention, shown partially in phantom within a portion of a runner block, also shown in phantom.
Figure 28J:
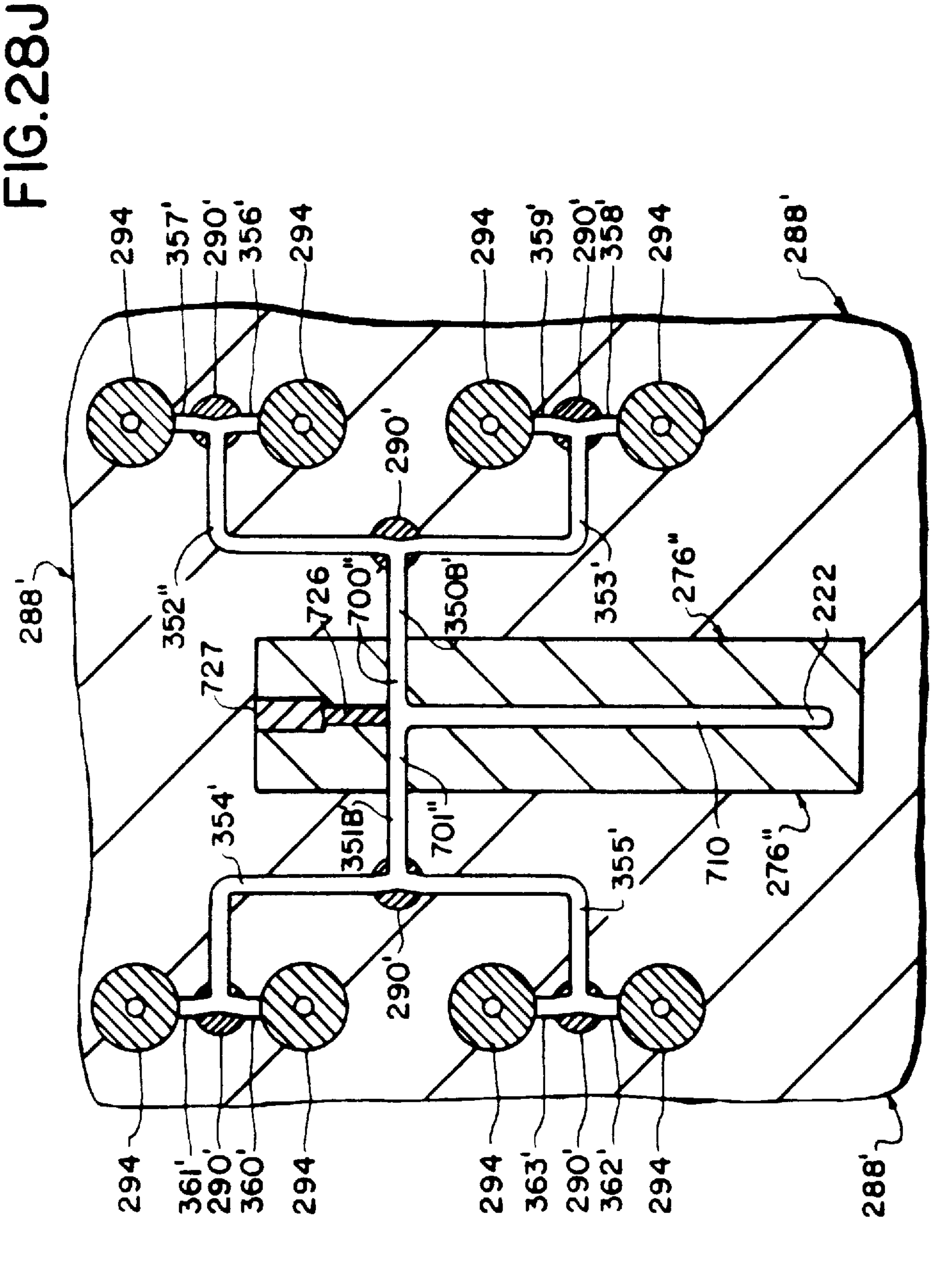
FIG. 28J is a vertical section with portions broken away showing the runner extension embodiment of FIG. 28I within a portion of a runner block of this invention.
Figure 28K:
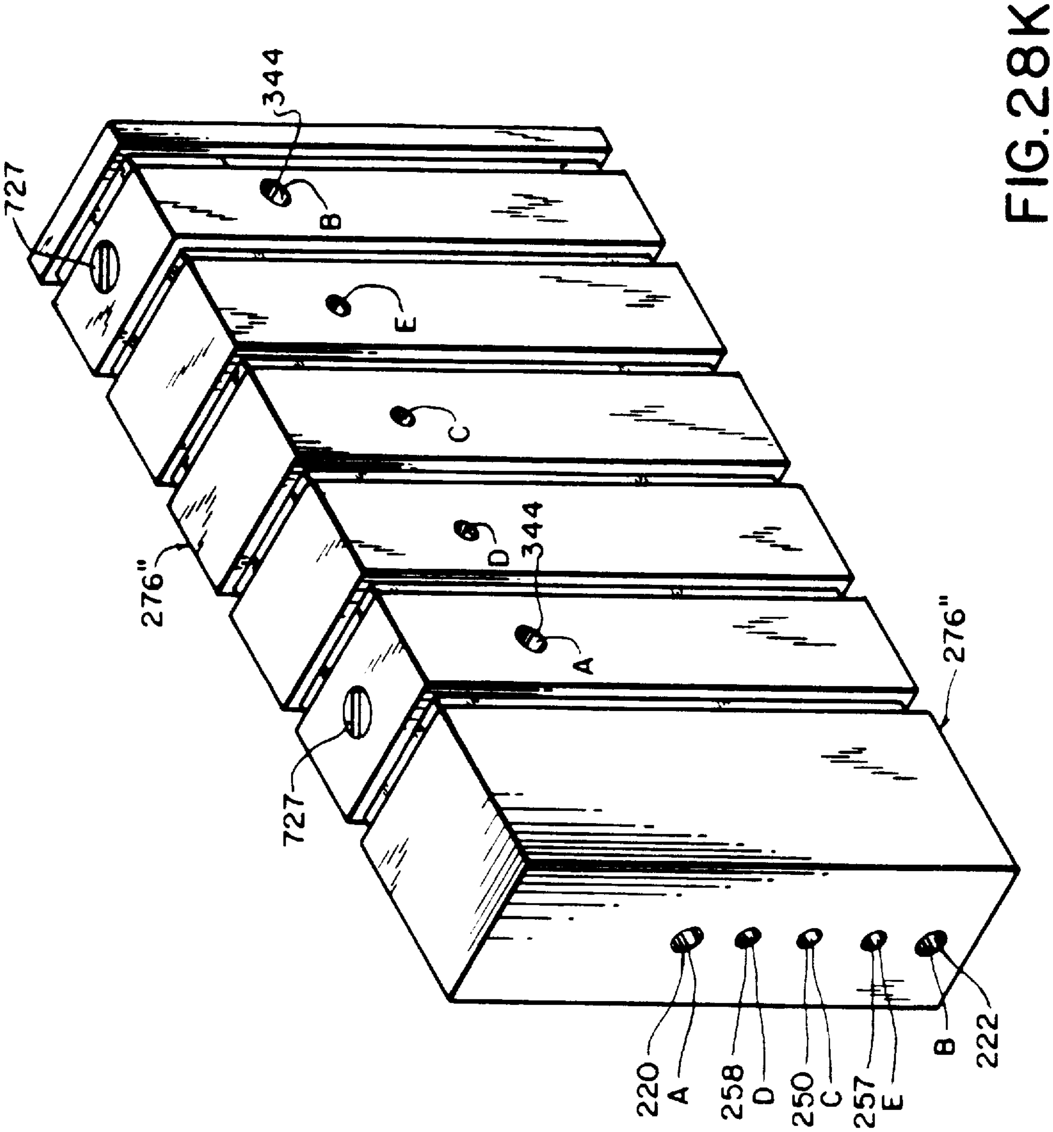
FIG. 28K is a perspective view of the runner extension embodiment of FIGS. 28I and 28J.

A second alternative embodiment of the polymer flow stream channel splitter device of this invention is runner extension 276" (see FIGS. 28H and 28I). In this embodiment, there is a plurality of spaced substantially vertically arranged polymer stream flow channels 222, 257, 250, 258 and 220, bored substantially axially through the runner extension 276". The flow channels each have an axial portion which terminates in an axial end portion 715, 716, 717, 718 and 720, each of which in turn communicates at rounded connecting points with connecting channel portions 710", 711", 713", 712" and 714". The connecting channel portions extend from the connecting points vertically within the runner extension 276" in an axially-spaced pattern and are connected at their downstream ends to, and then communicate with respective branch points 342B", 342E", 342C", 342D" and 342A". Each of the branch points is located in the forward end portion 284" of the runner extension in an axially-spaced, horizontally substantially coplanar pattern wherein each branch point is in a different vertical plane. At each branch point, the channel is split into branches, here designated first and second branched flow channels, 700" and 701", 702" and 703", 704" and 705", 706" and 707", and 708" and 709", each of which is equal in length and communicates with and terminates at respective first and second exit ports 344, 346, in different surface portions of the periphery of the forward end portion of the runner extension. The first and second exit ports for a flow channel are in the same vertical and horizontal plane, each of the first and second exit ports for each flow channel are in different vertical planes relative to the exit ports of each other flow channels, and the plurality of first exit ports 344 of the first branched flow channels and the plurality of second exit ports 346 for the second branched flow channels is each arranged in its own respective axially-aligned spaced pattern of exit ports along a common line in different peripheral surface portions of the runner extension, for presentation to and communication with corresponding flow channel entrance holes or channels in runner block 288 of the multi-coinjection nozzle, multi-polymer injection molding machine of this invention. The vertical bores which form the respective connecting channel portions 714" and 710", are commenced through the top periphery of the runner extension, said holes being sealed by cylindrical metal plugs 726 which are retained by set screws 727.

The respective polymer flow streams which form the respective layers of the article to be formed in accordance with this invention, in this embodiment, and which exit the periphery of the runner extension 276" through respective first and second exit ports 344 and 346, follow respective paths similar to each other in and through runners 350B' and 351B' in runner block 288' to two respective T-splitters 290', then through runners 352', 354' and 355' to four more respective T-splitters 290' and then through respective runners 356', 357', 358', 359', 360', 361', 362' and 363' to a respective feed block 294 each of which is associated with a respective one of the eight nozzles assemblies 296.

It is preferred that the materials flowing out of each exit port 344 be isolated from the other exit ports 344 and likewise with respect to exit ports 346. In the preferred embodiment and the first alternative embodiment of the runner extensions, the isolation means for isolating the polymer flow streams preferably include stepped cut expandable piston rings 348 (two of the six employed are shown) which seat in respective annular grooves 349 formed in forward end portion 284 of the runner extension 276 (see FIG. 21). The isolation means are sufficiently compressible to permit insertion and withdrawal of runner extension 276 into and from bore 286 in runner block 288 (see FIGS. 14 and 30), while still maintaining sealing engagement with the bore and the runner extension when the runner extension is in operating position within the runner block. Isolation means such as expandable mating cast iron strips are to be employed with runner extension 276". The middle portion 279 of the runner extension 276 contains a plurality of annular fins 281 which cooperate with the internal surface of a main bore 975 in oil retainer sleeve 972 (see FIG. 30) and with the interstices between the fins to provide channels 277, 277A for the flow of heating oil about the runner extension.

Preferably, sealing means are employed downstream of the foremost of the exit ports 344, 346, i.e., those most proximate to runner extension front face 952, and upstream of the rearmost exit ports, i.e., those most remote from front face 952, to substantially prevent polymer material which exits the ports, from flowing axially downstream of the foremost sealing means and upstream of the rearmost sealing means in the runner block bore 286 in which the runner extension sits. Preferably, the sealing means includes stepped cut piston rings 348 seated in annular grooves 349. All of the piston rings bear against and cooperate with the inner surface of bore 286 to provide the effective isolating and sealing functions.

Figure 21:
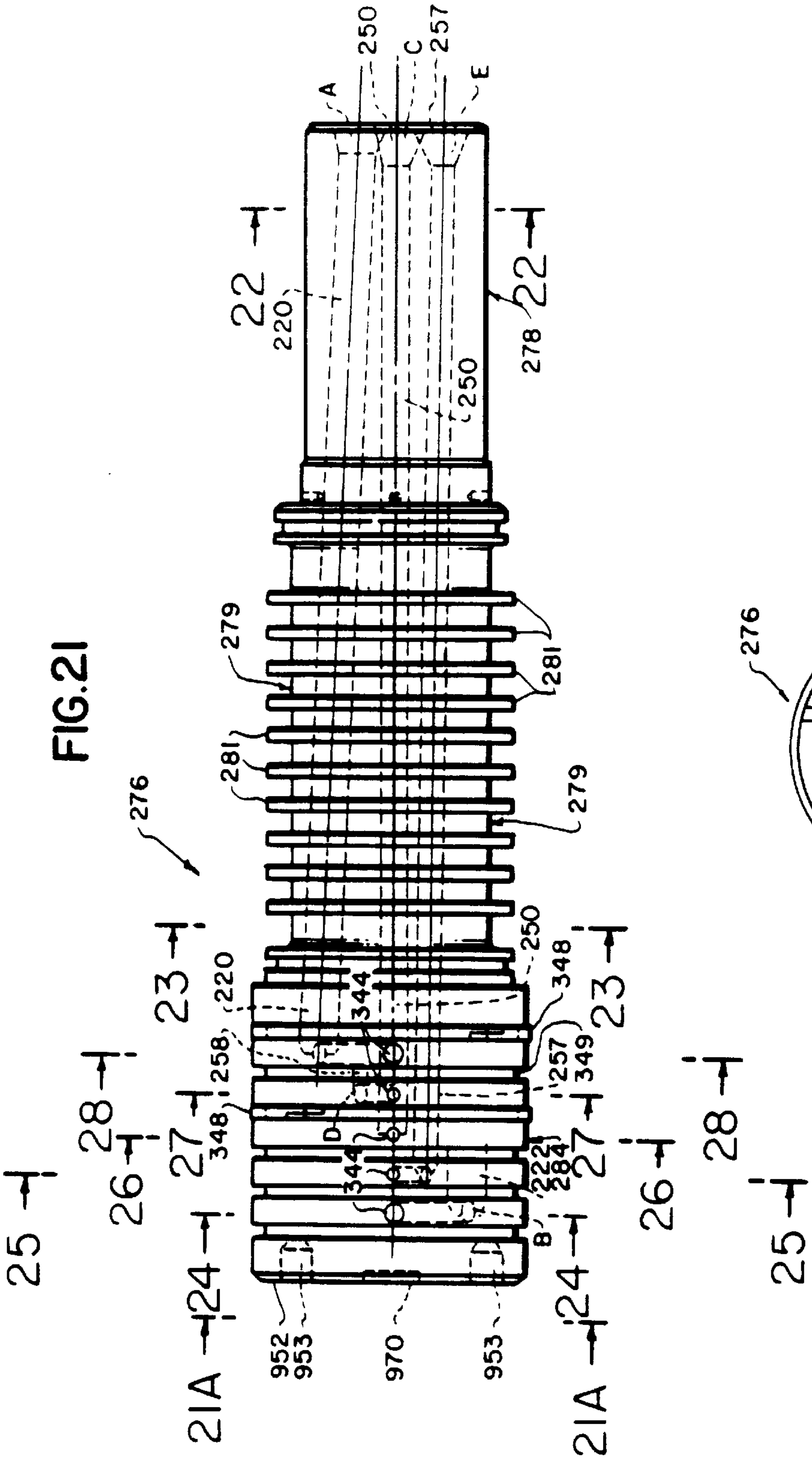
FIG. 21 is an enlarged top plan view of the runner extension shown in FIG. 14.
Figure 21A:
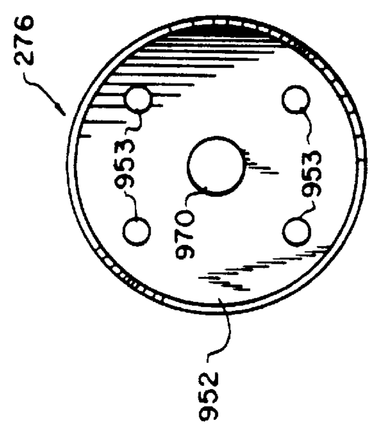
FIG. 21A is an end view of the forward end of the runner extension of FIG. 21.
Figure 22:
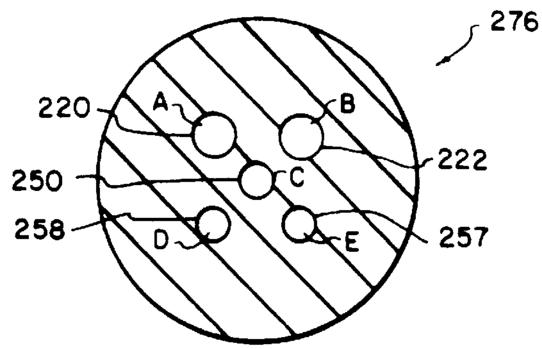
FIG. 22 is a vertical section taken along line 22—22 of FIG. 21.
Figure 23:
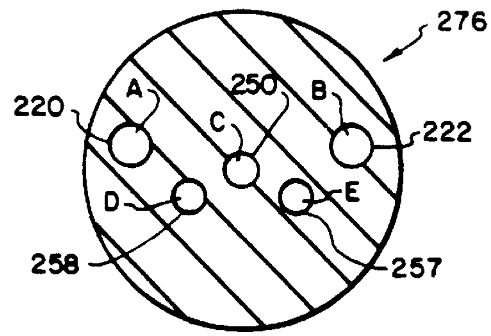
FIG. 23 is a vertical section taken substantially along line 23—23 of FIG. 21.
Figure 24:
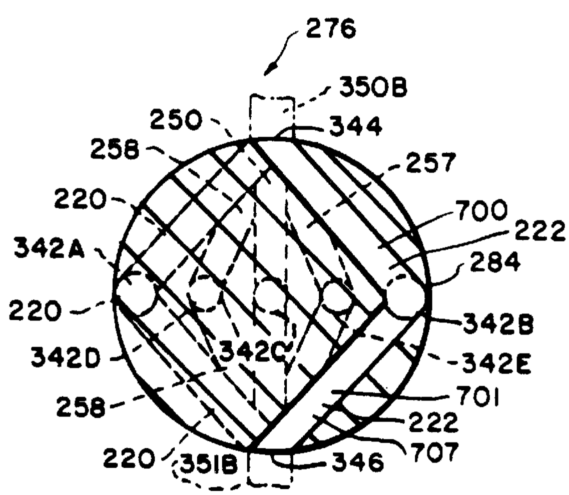
FIG. 24 is a vertical section taken substantially along line 24—24 of FIG. 21.
Figure 25:
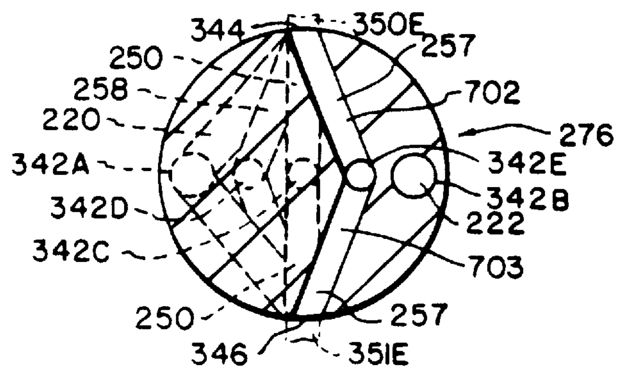
FIG. 25 is a vertical section taken substantially along line 25—25 of FIG. 21.
Figure 26:
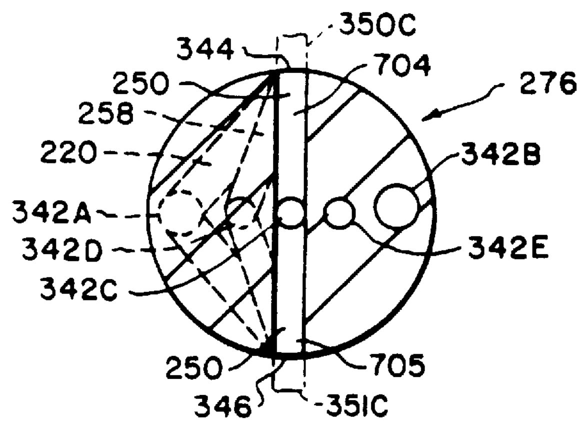
FIG. 26 is a vertical section taken substantially along line 26-26 of FIG. 21.
Figure 27:
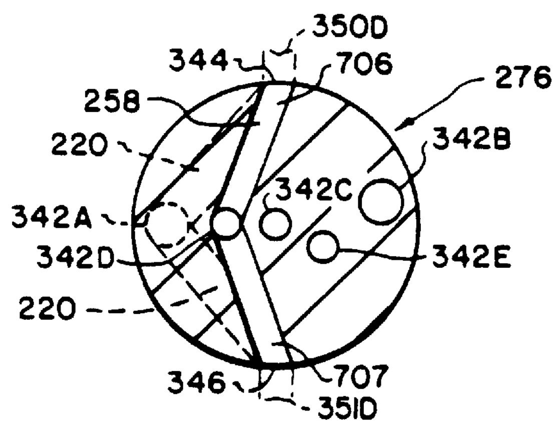
FIG. 27 is a vertical section taken substantially along line 27—27 of FIG. 21.

The paths of respective polymer flow streams A–E which form the respective layers of the article to be formed in accordance with this invention and the channels or runners through which they flow from the periphery of the runner extension 276 through respective top, first, and bottom second exit ports 344, 346 through the runner block 288, through runners 350, 351 to two T-splitters 290 then through runners 352–355 to four Y-splitters 292 and then through runners 356–363 to the respective feed block 294 for each of the eight nozzle assemblies 296, will now be described in reference to FIGS. 28, 28I, 29, and 29C through 31. FIG. 28, a vertical cross-section taken along line 28—28 of FIG. 21, shows the path of the A polymer material from the runner extension through the runner block, and FIG. 28I shows the same for the B material from the second runner extension embodiment 276". FIGS. 29 and 29C through 31 show various views of the runner block and its components 276, 290, 292, 294 and 296 in that portion of the injection molding machine of this invention which is located forward or downstream of manifold extension 266. FIG. 29 shows the front of the injection portion of the machine, absent injection cavities 102 and injection cavity carrier blocks 104 (see FIGS. 13 and 98), and through injection cavity bolster plate 950. The view shows the overall polymer stream flow path and channel pattern (dashed lines) for the B material through runner block 288 (dashed lines). FIG. 29 also shows the pattern of eight nozzle assemblies 296 arranged in two vertical columns of four assemblies in each column, and five stepped bores, generally designated 152, which enter the sides of runner block 288 at an angle and form the respective runners, four of which are plugged at their entrances by plugs, generally designated 154 (see FIG. 45A), each having a threaded head 155 and a nose 156. The tip of the nose 156 of each plug extends into the runner block to a point near the periphery of a feed block 294 (located behind a nozzle assembly 296). The nose of the fifth plug 154', one for each feed block, is elongated, fits closely into anti-rotational hole 158 in the feed block (see FIGS. 29C, 41, 45, 45A and 45B) and not only plugs the fifth bore but prevents the feed block from rotating in the runner block.

Figure 29C:
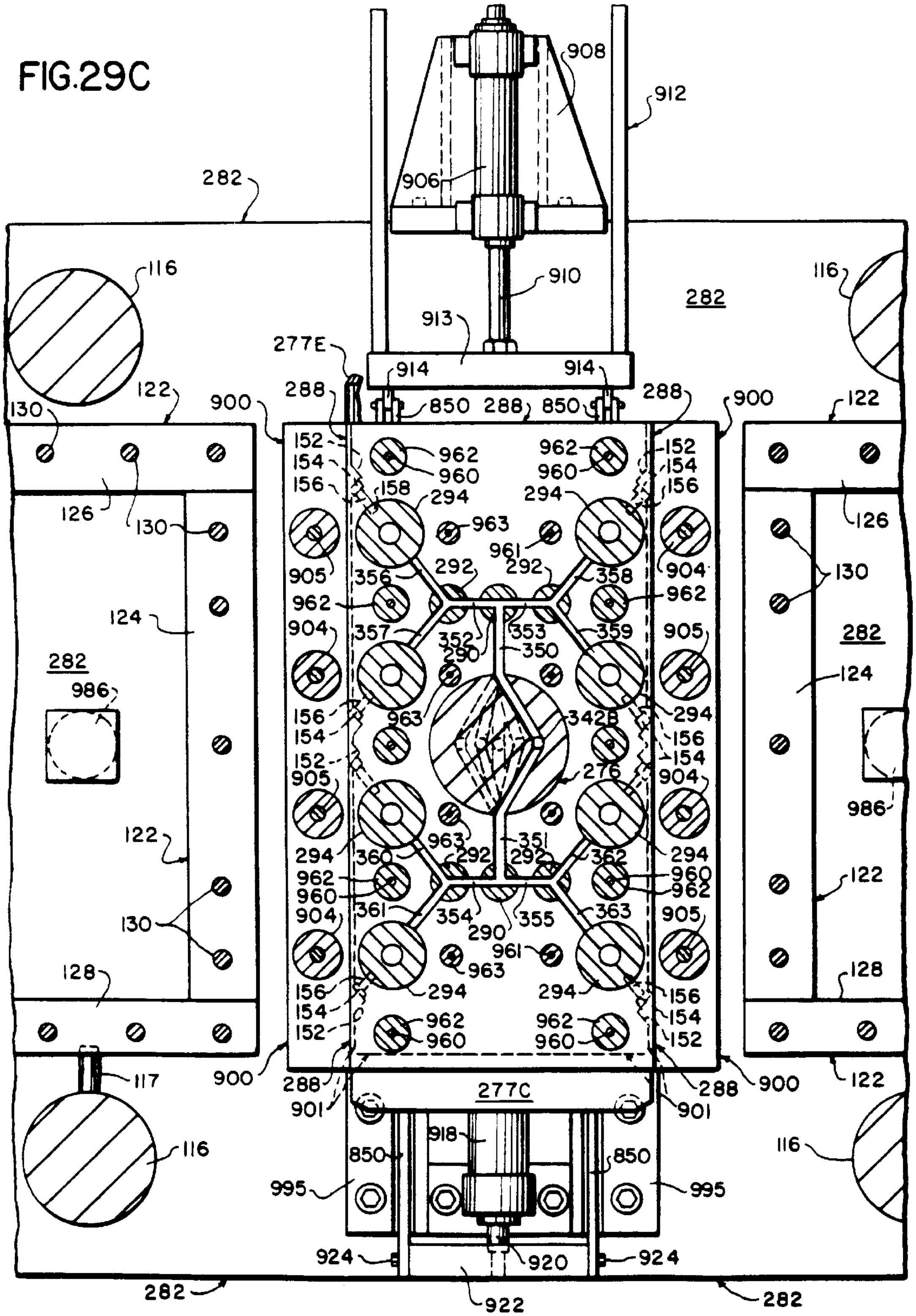
FIG. 29C is a front view with portions in elevation, portions in vertical section (with some section lines omitted for clarity) and portions broken away taken through the runner block along line 29C—29C of FIG. 98.

FIG. 29C, a vertical section taken along line 29C—29C of FIG. 98, shows the polymer stream flow paths in runner block 288 for the B polymer material. The vertical section is taken through C-standoff 122, through the runner block and through feed blocks 294. FIG. 29C also shows those plugs 154 in stepped bores 152 which have an elongated nose 156 whose tip is engaged in anti-rotational holes 158 in the feed blocks and thereby prevent the feed blocks from rotating in the runner bores in which they sit.

As shown in FIGS. 28, 28I, 29, and 29C through 31, and considering the preferred embodiment of the runner extension 276, and the runner block 288, each of the first exit ports 344 along the top periphery and each of the second exit ports 346 along the bottom periphery of the preferred runner extension 276, respectively communicates with runners 350, 351 which are holes or channels drilled or bored vertically through the runner block 288. Each of the polymer flow streams exit through the respective upper and lower exit ports 344, 346 directly into and through respective runners 350, 351 and then the flow streams (350B, 350E, 350C, 350D and 350A, and 351B, 315E, 351C, 351D, and 351A) (see FIG. 32) travel into an associated T-splitter 290 which splits each respective flow stream into two opposite but equal streams (352B–352A, 353B–353A, upper left and right (in FIG. 28) 354B–354A, 355B–355A, lower left and right), each of which flows through runners 352, 353, 354 and 355 which in turn lead into a Y-splitter 292. Each Y-splitter 292 takes each incoming flow stream and in turn splits it into two diagonally divergent, but equal, flow streams 356B–356A and 357B–357A (upper left in FIG. 28), 358B–358A and 359B–359A (upper right), 360B–360A and 361B–361A (lower left), 362B–362A and 363B–363A (lower right), each of which flows through runners 356, 357, 358, 359, 360, 361, 362, 363 in runner block 288 to a feed block 294 for a nozzle assembly 296. The feed block functions to receive each of the flow streams B, E, C, D, A and separately direct the appropriate one into the appropriate shell of the nozzle assembly, generally designated 296, and whose rear portion is seated within the forward end of the feed block.

The flow path for each of the polymeric materials B, E, C, D and A, which comprise the injected articles and injection blow molded articles of, and produced by, the present invention has been quickly traced from the source of its flow to an injection nozzle. It is an important feature of the present invention that the flow and flow path for each material, for a particular layer is substantially identical, for that material and layer, desirably from the source of flow of the material, extruder Units I, II and III, and preferably from the place where a flow channel is split, e.g., at a branch point in the runner extension, to and through the runner extension and to each of the nozzle assemblies. Thus, for example, the flow of material C splits at branch point 342C in runner extension 276 into two equal, symmetrically-directed and symmetrically-volumed flow paths 350C and 351C. The rate of flow of material C is the same in path 350C as in 351C. The flow of material C in path 351C is then again equally and symmetrically divided in T-splitter 290 into equal flow paths 354C and 355C, and path 354C is yet again equally and symmetrically divided in Y-splitter 292 into equal flow paths 360C and 361C, each of which enters a different feed block 294 and associated nozzle assembly 296. It is to be further noted that the materials A–E are maintained separate and isolated from each other, throughout the apparatus, from the first location where the A, B, D and E materials are split in ram manifold 219, up to the location where the material enters the central channel of the injection nozzle assembly 296. The purpose and function of this separate, equal and symmetrical flow path system is to ensure that each particular material (e.g., polymer C for layer C) that reaches the central channel of any one of the eight nozzles has experienced substantially the same length of flow path, substantially the same changes in direction of flow path, substantially the same rate of flow and change in rate of flow, and substantially the same pressure and change of pressure, as is experienced by each corresponding material for the same layer (e.g. polymer C for layer C) which reaches any one of the remaining seven nozzles. This simplifies and facilitates precise control over the flow of each of a plurality of materials to a plurality of co-injection nozzles in a multi-cavity or multi-coinjection nozzle injection molding apparatus, and provides substantially the same characteristics in the corresponding materials and layers in and of each layer of each of the eight multi-layer articles of and formed in accordance with this invention.

FIG. 30 is a vertical section taken along line 30—30 of FIG. 29. At the upper part of FIG. 30, the vertical section through the runner extension 276 shows channels 220 and 258 (in dashed lines) for the A and D material flow streams and (in solid lines) channel 250 for material C. FIG. 30 shows channel 250 passing through the axial center of the runner extension to branch point 242C where it communicates with straight up and down branched first and second flow channels 250. FIG. 30 also shows runner channels 351 in runner block 288 for flow streams 351B–351A, each of which channel at second exit port 346 respectively communicates directly with entrance ports 364 in T-splitter 290.

The vertical section shown in FIG. 30 does not show Y-splitter 292 but merely shows runners 361 broken away within the runner block and communicating with entrance ports 392 and 396 in the peripheral wall of the feed block 294. The polymer flow streams flow through the feed block into the nozzle assembly 296, at the bottom left in FIGS. 29, 29C and 32. It is to be noted that all inlets, and radial and axial feed channel portions are shown schematically, out of position.

Figure 31:
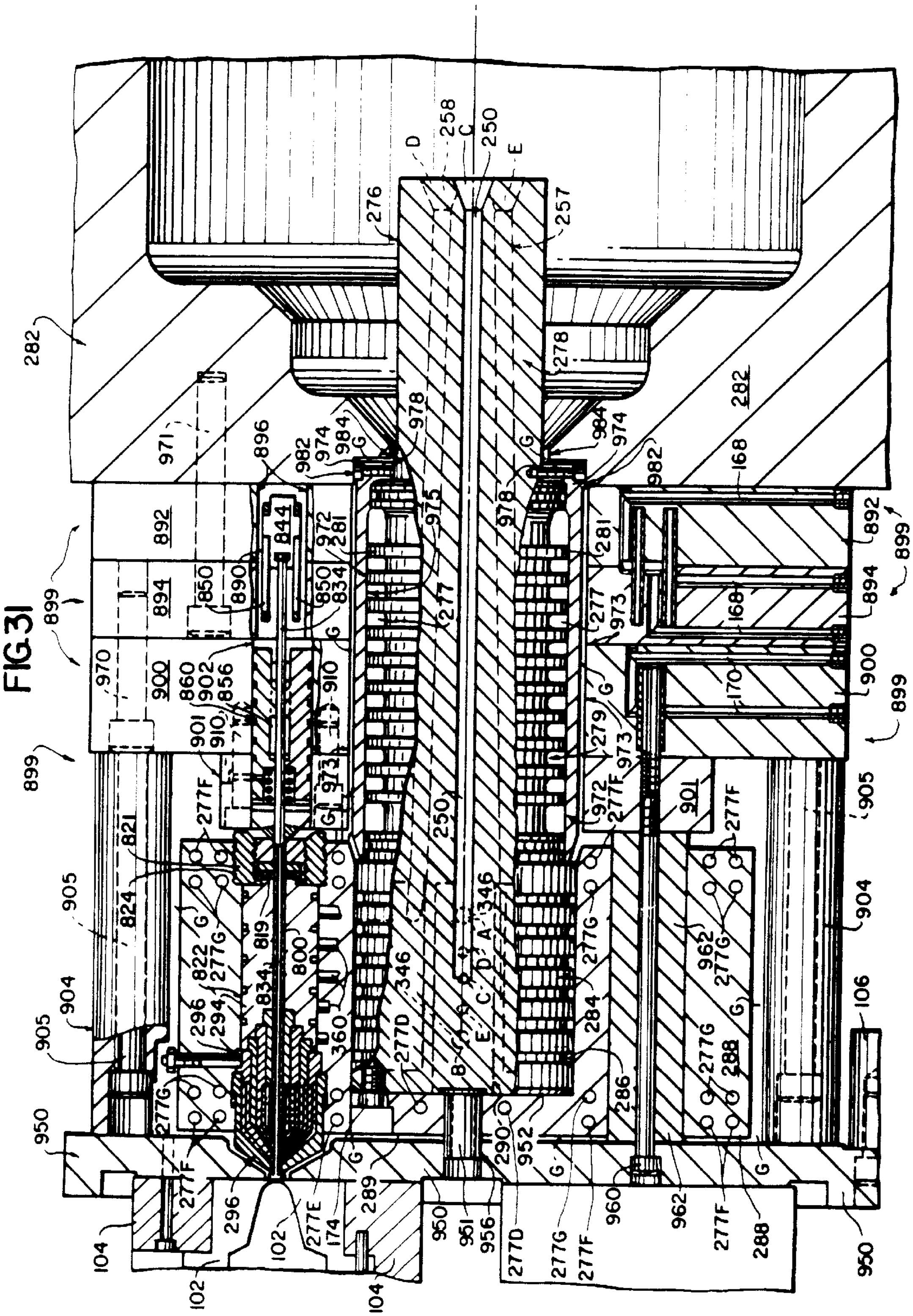
FIG. 31 is a top horizontal sectional view taken substantially along line 31—31 of FIG. 29, through the second from the bottom nozzle in the left column of nozzles in FIG. 29.

The injection cavity structure is shown schematically in FIGS. 30 and 31. The pro file is not accurate and details of the cavity, such as fins, etc., are not shown.

FIG. 31, a top view of a horizontal section taken along line 31—31 of FIG. 29, is a horizontal section taken diametrically through runner extension 276. FIG. 31 shows channel 250 (in solid lines) for internal layer C material and channels 258 and 257 (in dashed lines) respectively for carrying the polymer flow streams of the material which will form the D and E layers of the article to be formed in accordance with this invention. At the forward end portion 283 of runner extension 276, the axially-aligned spaced dashed lines indicate the bottom holes 346 for each of the polymer flow streams B, E, C, D and A, at the bottom of the runner extension. FIG. 31 shows runner portions 360 broken away but communicating with entrance holes in the periphery of the feed block 294 (located at the second from the bottom left in FIGS. 29 and 29C) which has mounted within the receiving chamber in its forward end portion section, a nozzle assembly 296.

FIG. 31 also shows a set of grease channels, generally designated 168, sealed at their entrance and exit ports by plugs, and extending through pin cam base 892 and pin cam base cover 894, for providing grease for lubrication of the drive means of this invention, more particularly, pin sleeve cam bars 850, for their reciprocation through pin cam bar slots 890. Likewise, grease channels 170, sealed at their entrance and exit ports by plugs and extending through sleeve cam base 900, provide for grease lubrication of sleeve cam bar 856 in sleeve cam bar slot 898, and sleeve 860 in bore 902 of the pin cam base. FIG. 31 does not show stepped bores 152 or plugs 154 therein.

Figure 32:
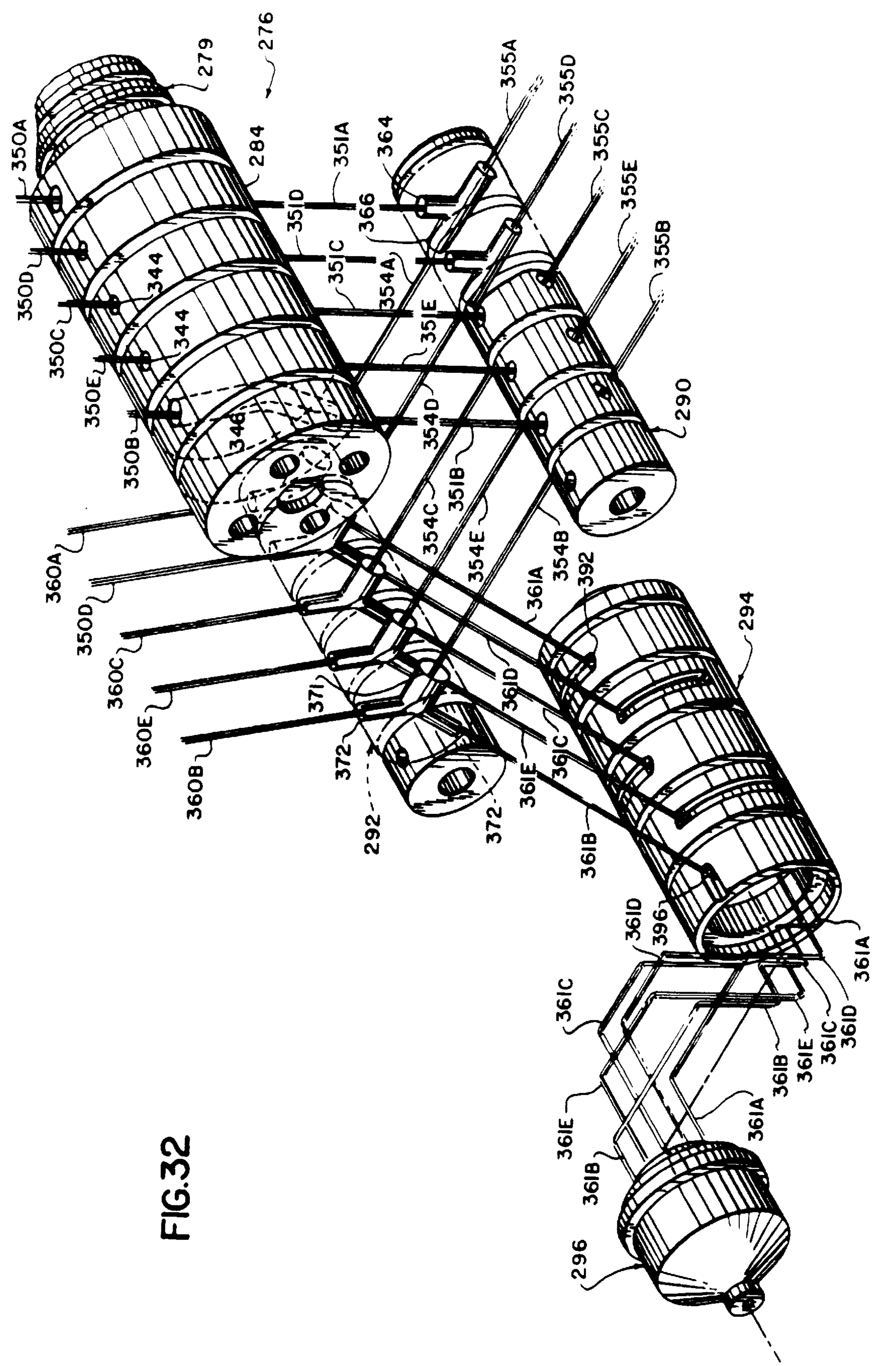
FIG. 32 is an exploded perspective view showing the positional relationship in a runner block (not shown) of the runner extension, the T-splitter, Y-splitter, and feed block, as shown in the lower left portion of FIG. 29C.

FIG. 32 shows the three preferred elongated cylindrical polymer stream channel splitter devices of the invention, runner extension 276, 276' and 276", T-splitter 290 and Y-splitter 292, for the multi-coinjection nozzle, multi-polymer injection molding machine of this invention. The devices are shown in axially parallel positions as they are mounted in the center and lower left portion of runner block 288 (not shown). Each device has a polymer stream entrance surface portion having a plurality of spaced, aligned flow channel entrance ports bored therein and communicating with a plurality of respective polymer flow channels bored into the device wherein each flow channel is split into branches or first and second branched flow channels which in a device are substantially equal in length and which communicate with and terminate at respective first and second exit ports, each positioned in a different polymer stream exit surface portions of the device, for presentation to and communication with corresponding flow channel entrances or holes in runner block 288.

The T-Splitter

Figure 33A:
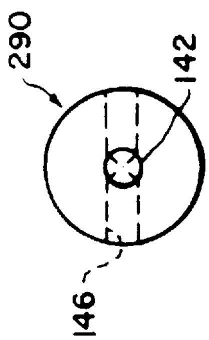
FIG. 33A is a view of the forward face of the T-splitter of FIG. 33.
Figure 36:
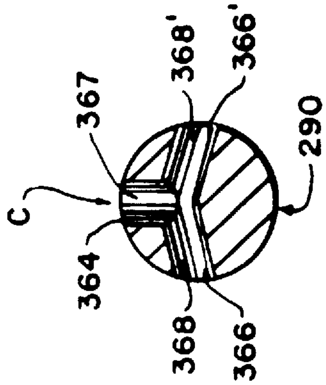
FIG. 36 is a vertical section taken along line 36—36 of FIG. 34.
Figure 35:
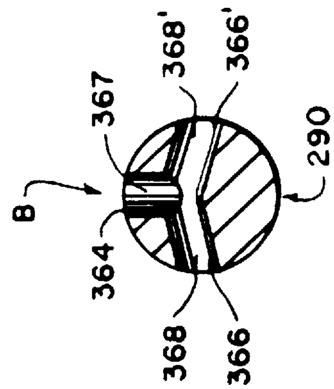
FIG. 35 is a vertical section taken along line 35—35 of FIG. 34.

The structure of T-splitter 290 will now be described (FIGS. 33–36). FIG. 33, a top plan view of the T-splitter shown in FIG. 32, and FIGS. 34–36 show that each T-splitter is a cylindrical steel block into whose top surface are drilled five axially-aligned entrance bores or ports 364 which communicate with and form entrance flow channels 367 each of which enters the device racially and transaxially to a branch point where the entrance channel intersects with and splits into two symmetrical bores forming first and second exit or branched flow channels 368, 368'. The axis of the entrance channel 367 intersects the axis of the branched flow channels 368 at a location above the central axis of the T-splitter. Each first branched flow channel communicates with and terminates at a first exit port 366, and each second branched flow channel communicates with and terminates at second exit port 366', the plurality of each of which set of exit ports is axially-aligned along a line and is respectively located about 90° around the circumference of the T-splitter from entrance port 364. In the T-splitter shown, the communicating entrance port, entering flow channel, branch point, first and second branched flow channels and first and second exit ports for a polymer material, are preferably all in a common vertical plane. The entrance channels at each end of the T-splitter are of the same diameter and are larger in diameter than the middle three entrance channels, which themselves are of the same size. The diameter of each branched flow channel 368, 368' is the same as the entrance channel which it intersects. Preferably, the axis of each branched flow channel, say 368, is drilled transaxially at an angle of about 15° to the horizontal center line, to meet the entrance channel and the opposing exit flow channel 368', at a point below the axial center line. Six annular grooves 370 are cut into the cylindrical surface of the T-splitter to serve as seats for stepped cut piston rings 369.

Rotation of the T-splitter within the bore in which it is seated in the runner block is prevented by locking pin means Located at one end of the T-splitter. The locking pin means comprises two cylindrical cone-pointed locking pins 144 carried within diametrical bore 146 in the shoulder at the end of the T-splitter. The outer end of each locking pin has a spherical or rounded surface and the inner end of each locking pin has a 45° conical surface. Rotation of cone point set screw 140 carried in axial tapped hole 143 at the end of the T-splitter causes the set screw to act as a wedge to drive the locking pins radially outwardly to press the spherically-surfaced end of each pin against the bore in the runner into which the T-splitter is inserted. The T-splitter is held in its axial position in the runner bore in which it is seated by threaded lock nuts 291 each of which is screwed into a threaded end portion of the bore, the T-splitter being wedged axially therebetween (see FIG. 30).

The Y-Splitter

The structure of the Y-splitter 292 will now be described (FIGS. 37–40). FIG. 37, is a side elevational view of the Y-splitter shown in FIG. 32, as would be seen along line 37—37 of FIG. 38, shows that each Y-splitter is a cylindrical steel block into whose peripheral surface are drilled five axially-aligned entrance bores or ports 371 which communicate with and form entrance flow channels 373 each of which enters the device radially and transaxially to a branched point where the entrance channel intersects with and forms two symmetrical bores forming first and second exit or branched flow channels 374, 374'. The axis of the entrance channel 373 intersects the axis of the first and second branched flow channels 374, 374' at the center line of the Y-splitter. FIG. 38, a side elevational view of the Y-splitter of FIG. 37 rotated 45° clockwise, shows that each first branched flow channel communicates with and terminates at a first branched exit port 372 and each second branched flow channel with a second branched exit port 372', the plurality of each set of exit ports of which is respectively axially-aligned along a line respectively located about 130° around the circumference of the Y-splitter from entrance port 371. The entrance channels at each end of the Y-splitter are of the same diameter (about one-half inch) and are larger in diameter than the three middle entrance channels, which themselves are of the same size (about three-eighths inch). The branched flow channels are all of the same diameter (about one-quarter inch) and are smaller than the entrance channels. Preferably, the axis of each of the first and second branched flow channels 374, 374' is at an angle of about 39° from the horizontal line and its junction is at the axial center line of the device. Six annular grooves 376 are cut into the cylindrical surface of the Y-splitter to serve as seats for stepped cut piston rings 375.

The materials flowing into and out of the T-splitters and Y-splitters are kept separate and isolated from each other by isolating means which, in the preferred embodiment, are expansion type stepped piston rings 369 (two of the six are shown) which seat in annular grooves 370 formed in the periphery of T-splitters 290, and step cut piston rings 375 (two of the six are shown) which seat in annular grooves 376 formed in the periphery of Y-splitters 292. The isolation means are sufficiently compressible to permit insertion and withdrawal of the T-splitters and Y-splitters into and from the bores in runner block 288 in which they are located, yet they are capable of still maintaining sealing engagement with the bores and the splitters when the splitters are in operating position within the runner block.

Preferably, sealing means, preferably also in the form expandable stepped piston rings 369 and annular grooves 370 in which the rings sit, with respect to the T-splitters, and, piston rings 375 and annular grooves 376 with respect to the Y-splitters, are respectively employed downstream of the foremost and upstream of the rearmost entrance ports 364, and of the foremost and rearmost first and second branched exit flow channels 368, 368' for the T-splitters, and downstream of the foremost and upstream of the rearmost of the entrance ports 371, and of the foremost and rearmost first and second branched exit flow channels 374, 374' for the Y-splitters, to substantially prevent polymer material which enters and exits the respective ports, from flowing axially downstream of the foremost sealing means and upstream of the rearmost sealing means in the runner extension bores in which the respective splitters sit.

As shown in FIG. 38, Y-splitter 292 is held in rotational position in the runner bore in which it is seated in the same manner as T-splitter 290 is held in its runner bore, a cone-pointed set screw 140 in axial hole 148 wedging or forcing a pair of cone-pointed pins 144 apart in diametrical bore 150 against the surface of the runner bore for the Y-splitter.

The Feed Block

The structure of the feed block 294 will now be described (FIGS. 41–48). The feed block is a cylindrical block of steel having at one end a threaded extension 378 having a bore 379 therein, extending axially from the rear face of the feed block. Sealing ring retaining cap 821 threads onto extension 378 and retains sealing rings 819 in bore 379. Cut into the opposite, forward or front face of the feed block is an axially extending co-injection nozzle or nozzle assembly receiving stepped chamber 380 having an axially innermost first shelf 382 and first annular wall 383, a second shelf 384 and second annular wall 385, and an axially outermost third shelf 386 and a third annular wall 387 which communicates with front face 388 of the feed block. The shelves are the transaxial portions and the annular walls are the axial portions of the steps. The feed block has a central channel 390 which communicates with bore 379 and, when the stepped rear portion of nozzle assembly 296 is inserted into chamber 380, is aligned with the central channel of the nozzle. In a preferred embodiment, the valve means for controlling the flow of materials A–E in the nozzle comprises pin and sleeve means which fit within and pass through retaining cap 821, bore 379, sealing rings 819 and central channel 390 of feed block 294, and extend forward and fit within the central channel of the nozzle assembly 296.

Each of the eight feed blocks 294 separately receives each separate polymer flow stream of the five passed to it through the appropriate five runners designated either 356, 357, 358, 359, 360, 362 or 363 extending from the Y-splitters. Thus, each feed block receives the five separate polymer flow streams (i.e., streams 361B, 361E, 361C, 361D and 361A, as shown in FIG. 32). While maintaining them separate, the feed block changes their overall direction of flow by about 90°, preferably in the manner described below, from radial entry to axial exit, and passes each of them separately and axially into an associated plurality of nozzle shells which together with a nozzle cap comprise the co-injection nozzle or co-injection nozzle assembly of this invention, generally designated 296.

Basically, each polymer flow stream is radially received in an inlet which communicates with a peripheral feed throat through which the stream flows along or about a portion of the periphery of the feed block. Most of the feed throats have a terminal end portion where the stream passes into a feed channel having a radial portion which runs radially into the feed block toward its central axis and turns and extends axially to an exit hole in the stepped receiving chamber through which the stream is passed axially to the appropriate nozzle channel.

Polymer flow stream inlets 392, 393, 394, 395 and 396 are rounded grooves cut radially inwardly into the outer periphery of the cylindrical feed block 294. Each of inlets 392–395 has a defining wall formed by a 0.156 inch radius extending from the inlet's center point. The center points for each of the inlets fall on a common center line which runs axially along the top of the feed block (see FIG. 32). The defining wall of each inlet is the origination of grooves or feed throats 398, 399, 400, 401 and 402 cut into and along the outer surface of the feed block.

Figure 45:
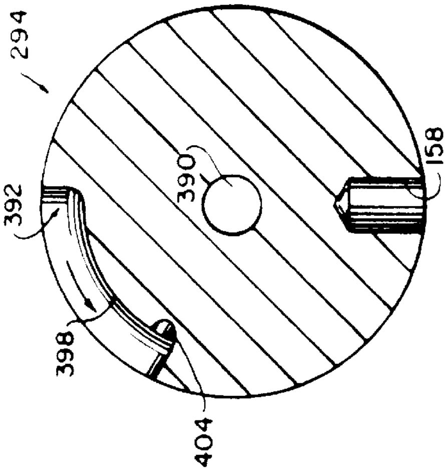
FIG. 45 is a vertical section taken along line 45—45 of FIG. 41.
Figure 45B:
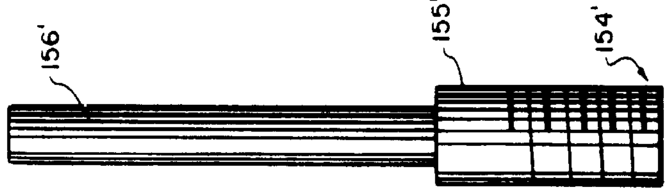
FIG. 45B is an enlarged side elevational view of another plug 154' similar to plug 154 in FIG. 45A but having a larger nose.
Figure 45A:
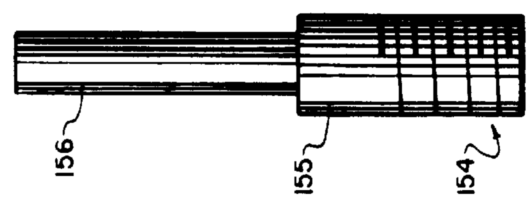
FIG. 45A is an enlarged side elevational view of a plug 154 for bore 152 in the runner block and hole 158 in the feed block.

The structure of feed block 294 through which passes the polymer A flow stream will now be described. Inlet 392 is the origination of a feed throat 398 (dashed lines in FIG. 41) cut approximately 0.196 inches deep by a 5/16 inch spherical ball end mill into a portion of the periphery of the feed block. Throat 398, when viewed in verticle section has a bottom wall and flat opposed side walls with rounded surfaces therebetween. Throat 398 runs a 60° circumferential arc counter-clockwise about the periphery of the feed block. (FIG. 45). At the end of the 60° arc, feed throat 398 communicates with a feed channel 404 cut radially and angularly in the forward direction (left in FIG. 41) into the feed block towards central channel 390. Prior to reaching the central channel, feed channel 404 turns axially into an axially-cut forwardly extended key slot 406 which communicates directly with the central channel along a portion of the length of its wall 391 (FIG. 43) and which terminates in a matching key slot exit hole 407 in the first shelf 382 in nozzle assembly receiving chamber 380 at the forward end portion of the feed block.

Figure 46:
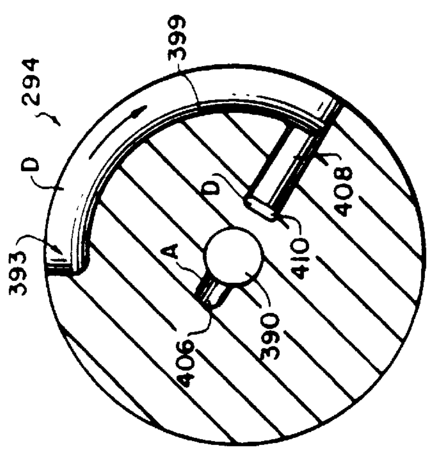
FIG. 46 is a vertical section taken along line 46—46 of FIG. 41.

The structure of feed block 294 through which passes the polymer D flow stream will now be described. Inlet 393 originates feed throat 399 cut into a portion of the outer periphery of the feed block in the same manner as that of feed throat 398. Throat 399 runs a clockwise circumferential arc of 120° about the periphery of the feed block (FIG. 46). At the end of the 120° arc, feed throat 399 communicates with a feed channel 408 cut radially directly into and straight toward the central axis of the feed block to a controlled depth which in this preferred embodiment is 0.298 inch from the central axis. There the feed channel communicates in a 90° turn with obloround feed channel 410 which is approximately 0.093 inch by 0.251 inch. Channel 410 passes axially through the feed block and terminates in a matching obloround exit hole 411 in the first shelf 382 in nozzle assembly receiving chamber 380 at the forward end portion of the feed block.

Figure 47:
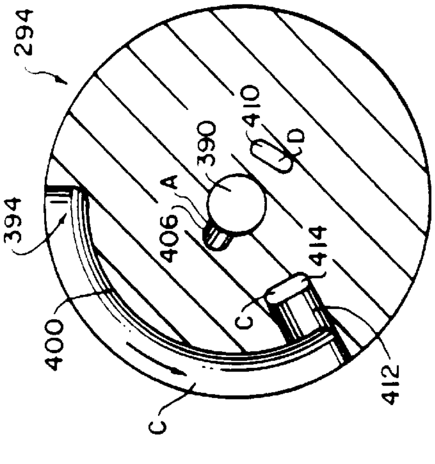
FIG. 47 is a vertical section taken along line 47—47 of FIG. 41.

The structure of feed block 294 through which passes the polymer C flow stream will now be described. Inlet 394 is the origination of feed throat 400 cut into a portion of the periphery of the feed block in the same manner as that of feed throat 398. Throat 400 runs a counter-clockwise circumferential arc of 120° about the periphery of the feed block (FIG. 47). At the end of the 120° arc, feed throat 400 communicates with a feed channel 412 cut radially directly towards the central axis of the feed block to a controlled depth which in this preferred embodiment is 0.516 inch from the central axis of the feed block. There the feed channel communicates in a 90° turn with obloround feed channel 414 which is approximately 0.125 inch by 0.251 inch. Channel 414 passes axially at that depth through the feed block and terminates in a matching obloround exit hole 415 in the second shelf 384 in nozzle assembly receiving chamber 380.

Figure 48:
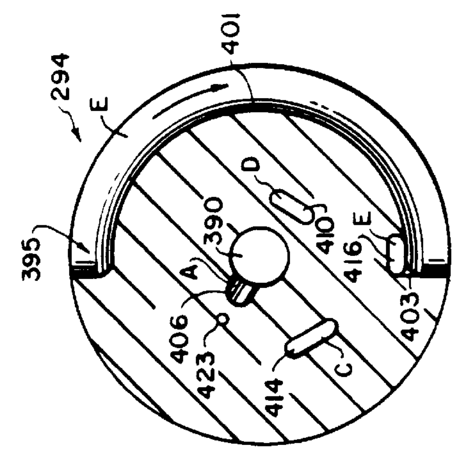
FIG. 48 is a vertical section taken along line 48—48 of FIG. 41.

The structure of feed block 294 through which passes the polymer E flow stream will now be described. Inlet 395 is the origination of feed throat 401 cut into a portion of the periphery of the feed block in the same manner as that of throat 398. Throat 401 runs a clockwise circumferential arc of 180° about the periphery of the feed block (FIG. 48). At the end of the 180° arc, feed throat 401 communicates with a feed channel 403 cut radially toward the central axis of the feed block to a controlled depth which in this preferred embodiment is 0.734 inch from the central axis of the feed block. There the feed channel communicates in a 90° turn with obloround feed channel 416 (dashed lines in FIG. 41) in which is approximately 0.125 inch by 0.251 inch. The center line of channel 416 is 0.734 inch from the central axis of the feed block. Channel 416 passes axially through the feed block and terminates in a matching obloround exit hole 417 in the third shelf 386 in nozzle assembly receiving chamber at the forward end portion of the feed block (FIG. 41).

The polymer B flow stream enters the feed block through inlet 396 which is the origination of feed throat 402 cut radially and into a portion of the outer periphery of the feed block. Throat 402 runs forwardly axially along the outer periphery of the feed block and cooperates with the surface of bore 822 in runner block 288 (FIG. 50), into which feed block 294 is seated, to form a passageway or channel 460 for the flow of polymer B to the forward end of the feed block, where the polymer exits at port 418 formed by channel 460 and bore 822. Throat 402 is 0.093 inch deep and 0.250 inch wide.

Figure 41:
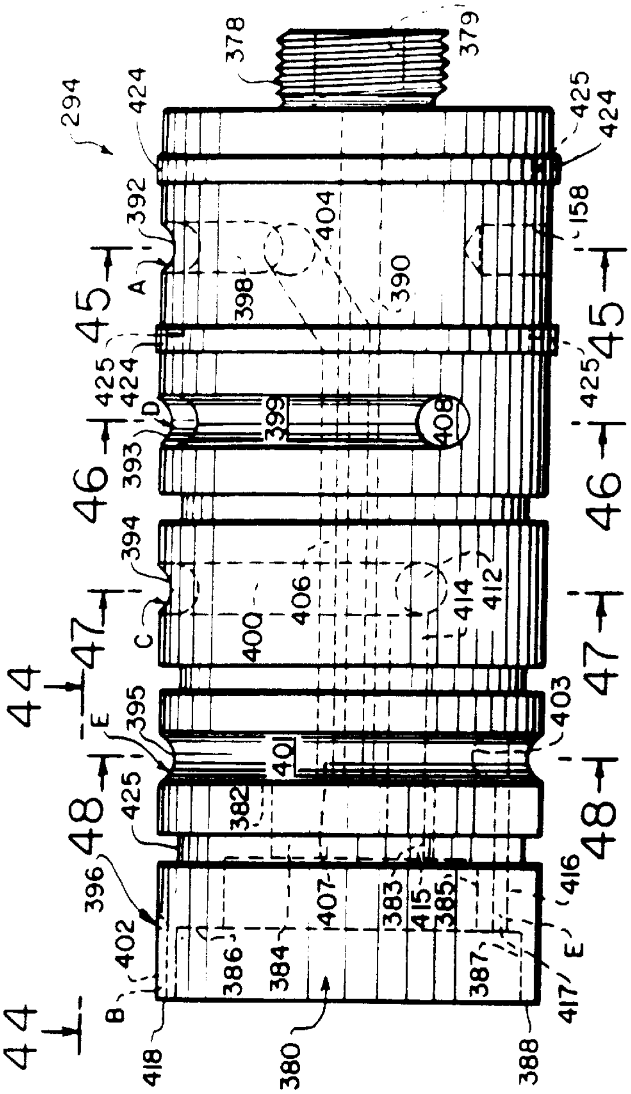
FIG. 41 is a side elevational view of the feed block shown in FIG. 32 rotated to have its inlets aligned at the twelve o'clock position.
Figure 42:
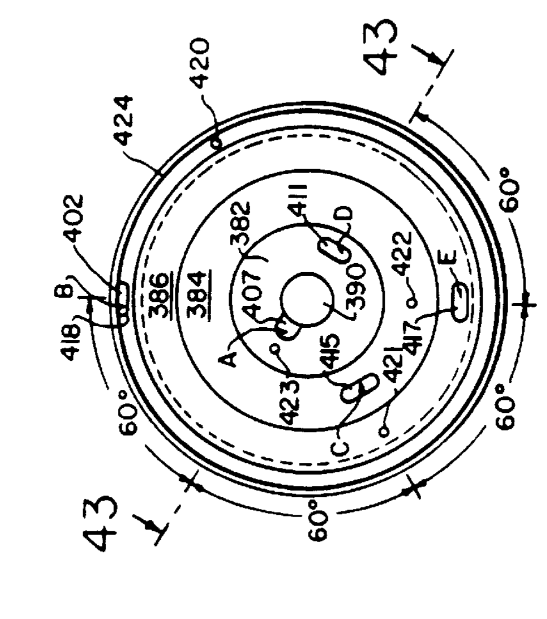
FIG. 42 is an end view of the forward end of the feed block of FIG. 41.

FIG. 42, an end view of the feed block of FIG. 41, shows the shelves, the exit holes previously described and their radially spaced arrangement. FIG. 42 also shows locator pin holes 420, bored into front face 388 of the feed block, and holes 421, 422 and 423 respectively bored in the third, second and first shelves of nozzle assembly receiving chamber 380. The holes receive locator pins (not shown) which extend into associated locator holes in the shells comprising the nozzle assembly, to maintain the positions of and facilitate proper alignment of feed block exit holes 407, 411, 415, 417 and 418 with associated inlets in the nozzle assembly.

With reference to the claims to the feed block, inlets 392–395 are referred to as the first inlets, inlet 396 is referred to as the second inlet, the feed throats 398–401 are referred to as the first feed throats and 402 as the second feed throat, and the exit holes 407, 415, 417, 421 are referred to as the first exit holes, and 418 as the second exit hole.

The B, E, C, D and A materials flowing into feed block 294 are kept separate and isolated from each other by isolating means, which preferably include sealing means, here, expandable stepped piston rings 424 (two are shown in FIG. 41) and annular grooves 425 in which the piston rings seat. Similar piston rings are employed in the annular seats cut into the periphery of the T-splitter, Y-splitter and runner extension. The clearance between the internal diameter of the bore in runner block 288, into which the feed block is inserted, and the feed block outer diameter is approximately 0.001 to 0.0025 inch. The expandable piston rings compensate for this gap and expand out to prevent intermixing of the materials flowing into the feed block. The isolating means are particularly important in the preferred practice of the method of the present invention wherein the materials are under high pressure. Without this or equivalent isolating means, there could occur inter-material mixing and contamination in the feed block, which might result in an intermixed flow of materials in the nozzle assembly, and lead to deleterious discontinuities of the layers of the multi-layer injected article. Preferably, sealing means such as just described, are also respectively employed upstream of the rearmost inlet 392 to substantially prevent polymer material directed at the feed block from flowing axially upstream of the sealing means in the runner block bore in which the feed block sits.

Referring to FIG. 42, and using as a reference a radial line from the central axis of the feed block through the center of exit port 418 and feed throat 402 for material B, the axis of key slot exit hole 407 and key slot 406 for material A is located 60° counter-clockwise from the reference, the center of exit hole 415 and channel 414 for material C is located 120° from the reference, the center of exit hole 417 and channel 416 for material E is located 180° from the reference and the center of exit hole 411 and channel 410 for material D is located 240° counter-clockwise from the reference. The exit holes for the polymer flow stream are provided in a radially-spread relatively balanced pattern to attempt to balance the heat distribution in the structure and prevent hot streaks therein, to provide relatively balanced overall pressure at the end of each nozzle assembly 296 (FIGS. 49A, 49AA, 50) and prevent the assembly from skewing as would be the case if say all the exit ports were in the top half of the end view. Any relatively balanced pattern which meets the above objectives is acceptable.

The Nozzle Assembly

Figure 49:
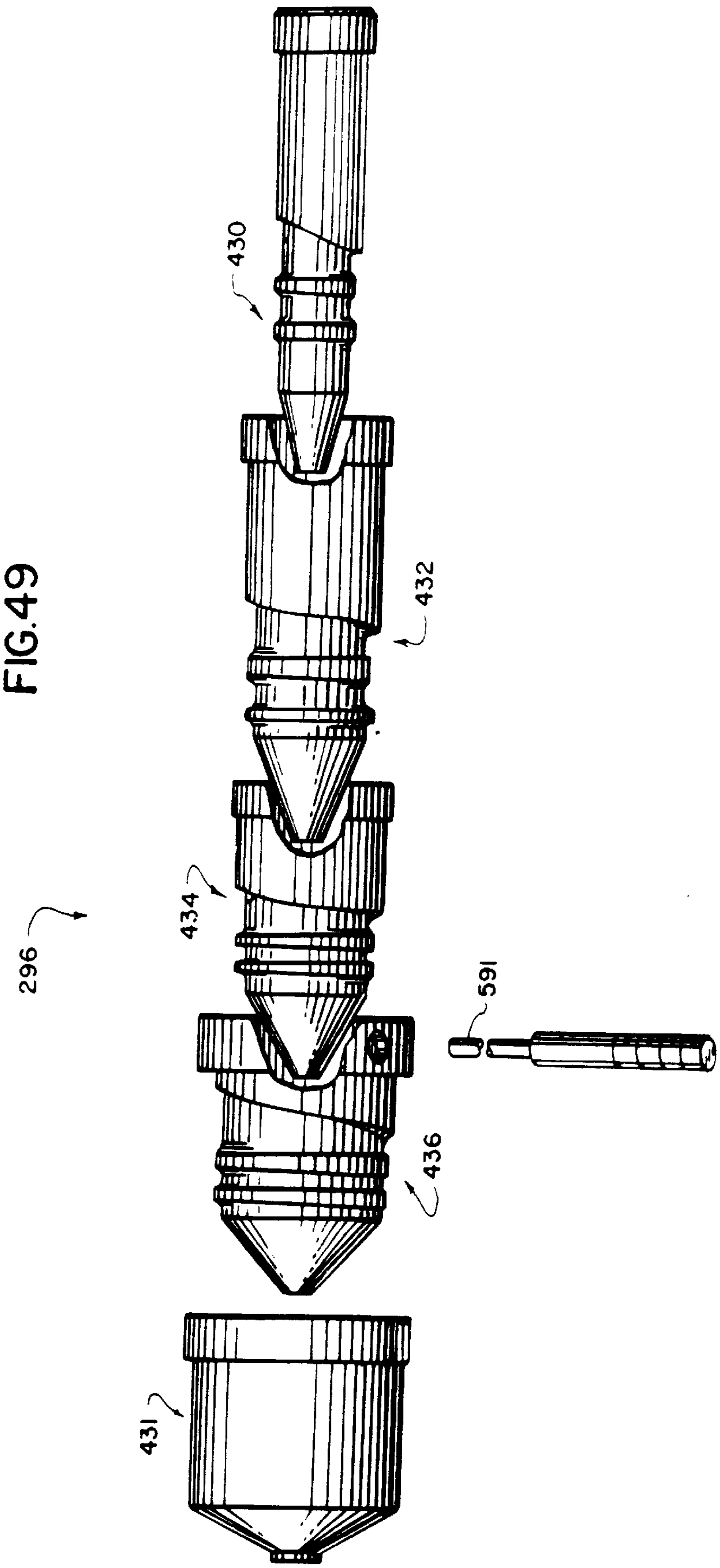
FIG. 49 is a side elevational exploded telescoped view with portions broken away, showing the nozzle shells and nozzle cap components which comprise the preferred nozzle assembly of this invention.
Figure 49A:
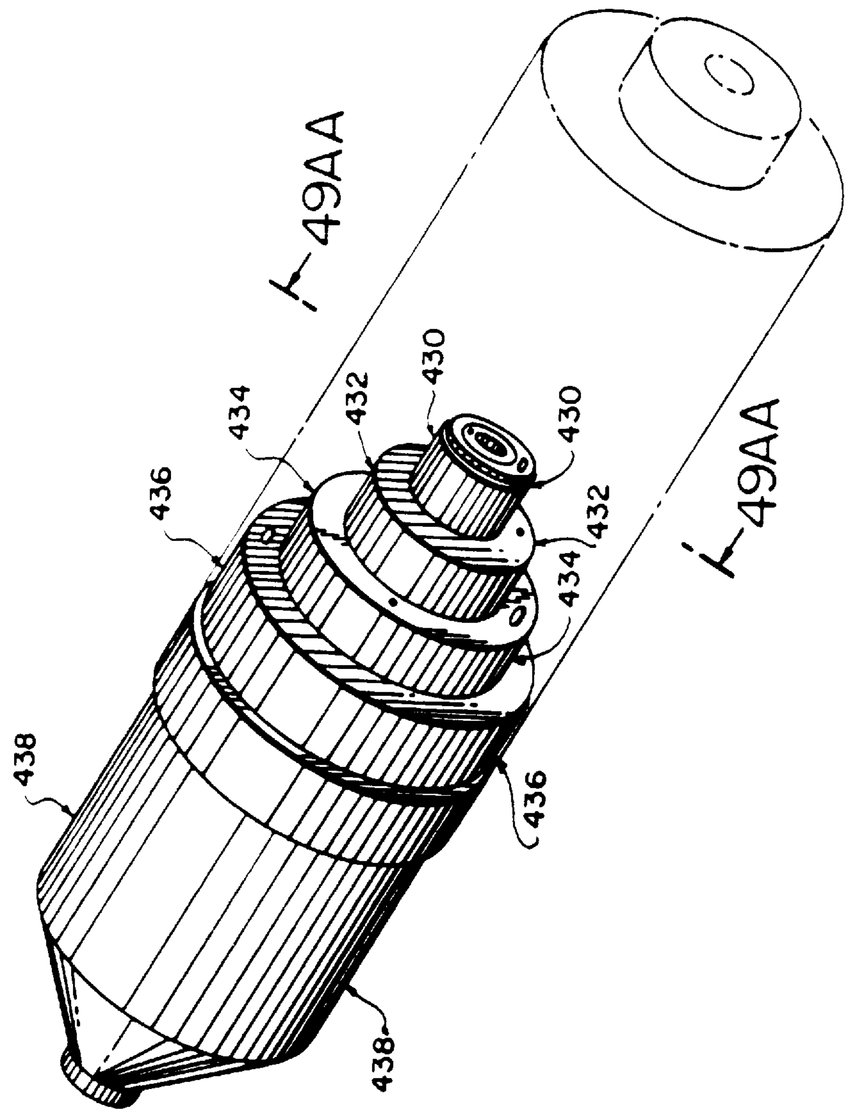
FIG. 49A is a perspective view showing the nozzle assembly mounted within the feed block of FIG. 41 (shown in phantom).
Figure 49A:
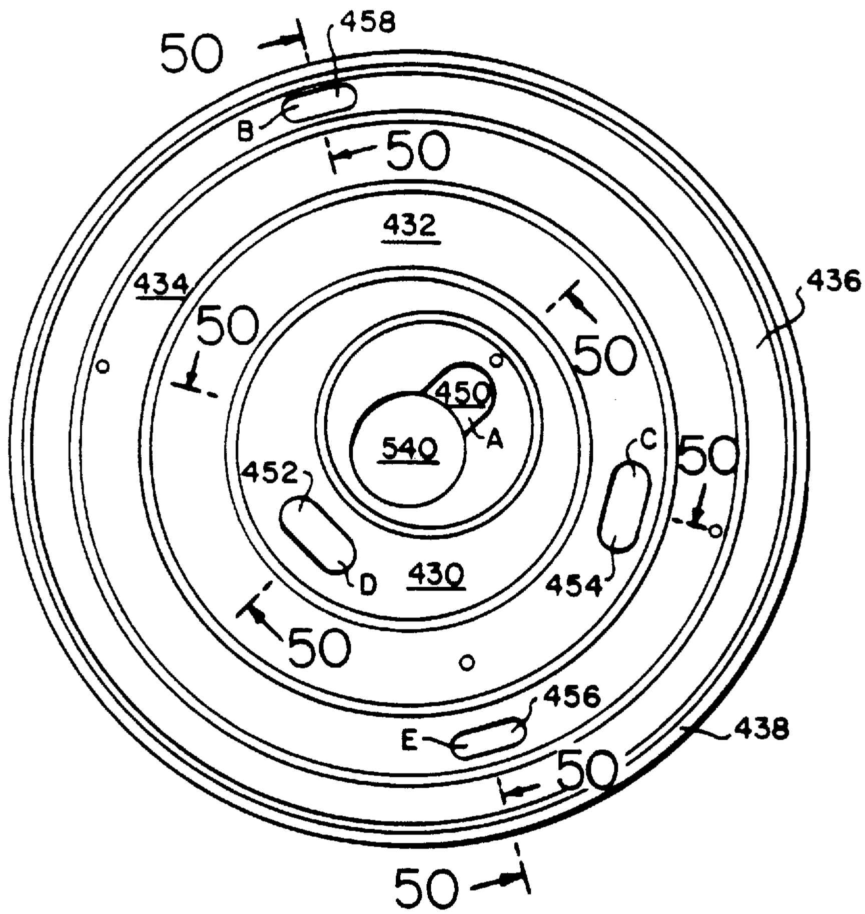
Figure 50:
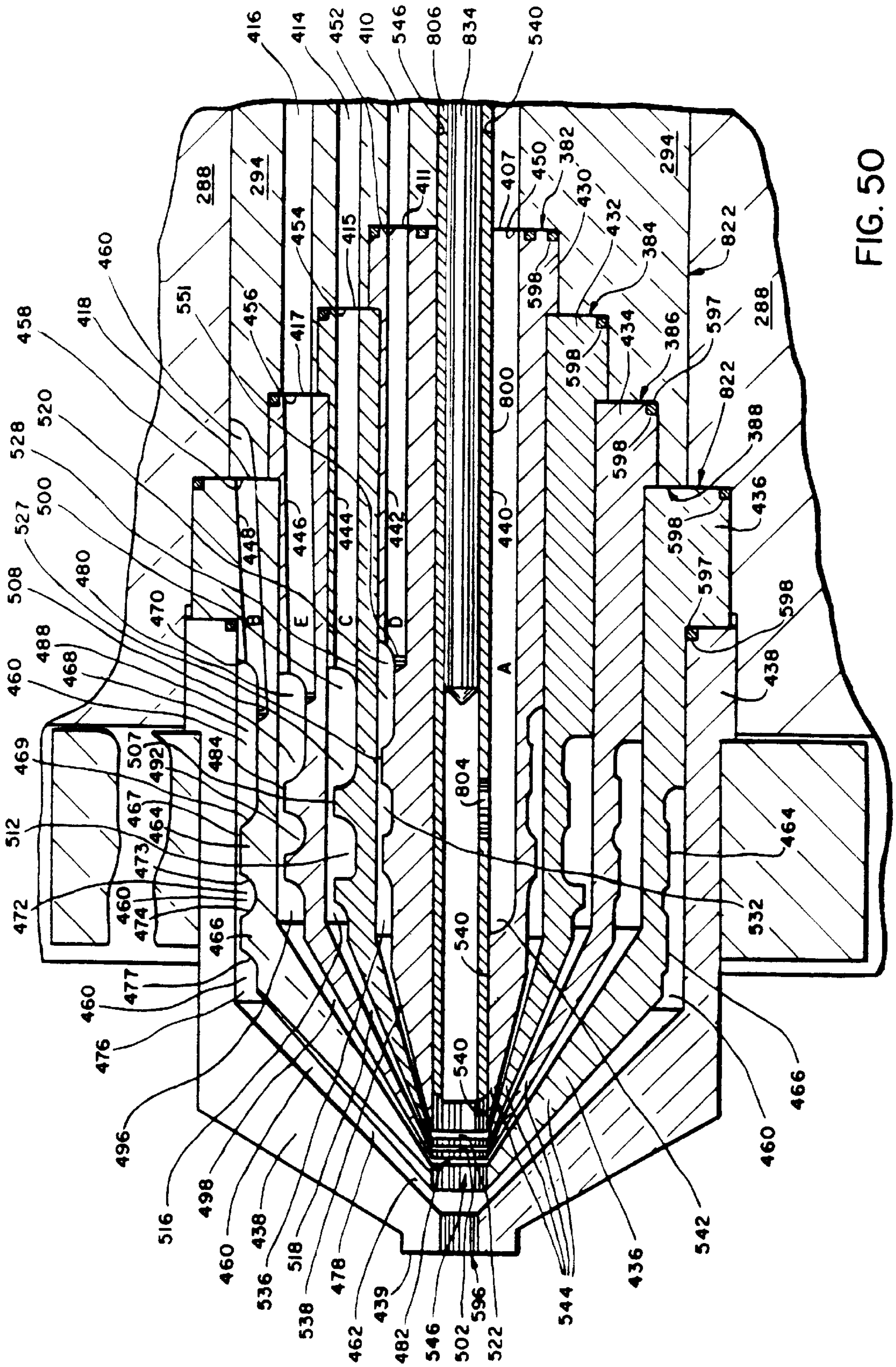
FIG. 50 is a vertical sectional view of the nozzle assembly taken along the various sets of lines 50—50 of FIG. 49AA.

Referring to FIGS. 49–77A and with particular reference to FIG. 50, the preferred embodiment of the nozzle assembly or co-injection nozzle or nozzle 296 of this invention comprises four interfitting nozzle shells 430, 432, 434 and 436, and nozzle cap 438 in which the nozzle shells fit. In actual assembly, the interfitted nozzle shells are arranged so that their feed channels 440, 442, 444, 446, 448 and feed channel entrance ports 450, 452, 454, 456, 458 are angularly offset as shown in FIGS. 49A and 49AA. Using as a reference a radial line from the central axis of the interfitted shells through the center of entrance port 458 and feed channel 448 for material B in nozzle shell 436, the axis of entrance port 456 and feed channel 446 in nozzle shell 434 is located 180° from the reference, the axis of entrance port 454 and feed channel 444 in nozzle shell 432 is located 120° from the reference, the axis of entrance port 452 and feed channel 442 in nozzle shell 430 is located 240° from the reference, and the axis of entrance port 450 and feed channel 440 in shell 430 is 60° from the reference. So arranged, the nozzle feed channel entrance ports are aligned with associated exit holes 407, 411, 415, 417, 418 in feed block 294. However, in order more clearly to show the structure of the shells and their inter-relationship to each other, FIGS. 49 and 50 depict the shells arranged with the centers of their feed channels located in a common plane.

As mentioned, the preferred nozzle is comprised of an assembly 296 of four interfitting nozzle shells enclosed within a nozzle cap. The outermost or first nozzle shell 436 contains a feed channel 448 for polymer B which communicates with an annular polymer flow passageway 460 formed between a portion of the inner surface of the nozzle cap and a portion of the outer surface of the nozzle insert shell. The passageway terminates at an annular exit orifice 462. The shell 436 is formed with first and second eccentric chokes 464, 466 extending into the passageway 460 and which restrict and direct the flow of polymer (FIGS. 50, 65, 67, 68 and 70). The flow restriction around the circumference of the first eccentric choke is greatest in the area 467 where the feed channel communicates with the polymer flow passageway. The eccentric chokes function to assist in evenly balancing and distributing the flow of polymer around the circumference of the polymer flow passageway and its exit orifice. The eccentric chokes for all nozzle shells are designed to achieve steady state flow. A primary melt pool 468 (FIG. 50) is formed in flow passageway 460 between the rear wall 469 of the first eccentric choke and a forwardly tapered or pitched wall 470. Wall 470 defines the rear of the primary melt pool 468 and is shaped approximately to conform to the streamlines that the polymer would follow in dividing from a solid stream, from the forward end of feed channel 448, to the cylinder that exits from orifice 462. The pattern or shape of wall 470 is intended to approximate the boundary between flow of polymer and no-flow of polymer which would otherwise become a pool of stagnant polymer. A secondary melt pool 472 is formed in flow passageway 460 between the forward wall 473 of the first eccentric choke and the rear wall 474 of second eccentric choke 466 (FIG. 50). A final melt pool 476 is formed in flow passageway 460 between the forward wall 477 of the second eccentric choke and the orifice 462 of flow passageway 460. The final melt pool 476 comprises a conical portion 478 which forms a tapered, symmetrical reservoir of polymer. The purpose of the tapered conical section is to increase the circumferential uniformity of the flow of polymer exiting from orifice 462. This is discussed below in reference to FIG. 77B, which shows a similar tapered conical flow channel.

Inserted within the first nozzle shell 436 is a second nozzle insert shell 434 having a feed channel 446 for polymer E (FIGS. 50, 58–64) which is angularly offset from the feed channel 448 of polymer B by 180°. The feed channel 446 for polymer E communicates with an annular polymer flow passageway 480 formed between a portion of the inner surface of the outer nozzle insert shell 436 and a portion of the outer surface of the second nozzle insert shell 434 (FIG. 50). The passageway terminates at an annular exit orifice 482. The second nozzle insert shell 434 is formed with first and second eccentric chokes 484, 486 (FIG. 63) extending into the passageway 480 and which restrict and direct the flow of polymer E for the purpose previously described. The flow restriction around the circumference of the first eccentric choke is greatest in the area 487 where the feed channel 446 communicates with the polymer flow passageway 480 (FIG. 50). A primary melt pool 488 (FIG. 50) is formed in flow passageway 480 between the rear wall 489 of the first eccentric choke 484 and a forwardly pitched wall 490 (FIGS. 58 and 63) which has the shape and function previously described with respect to wall 470. A secondary melt pool 492 is formed in flow passageway 480 between the forward wall 493 of the first eccentric choke 484 and the rear wall 494 of second eccentric choke 486 (FIG. 50). A final melt pool 496 is formed in flow passageway 480 between the forward wall 497 of the second eccentric choke 486 and the orifice 482 of flow passageway 480. The final melt pool comprises a conical portion 498 which forms a tapered, symmetrical reservoir of polymer for the purpose and function previously described.

Within the second nozzle insert shell 434 is a third nozzle insert shell 432 (FIGS. 50, 55–57A) having a feed channel 444 for polymer C which is angularly offset by 120° (counter-clockwise when viewed from the shell's formed end or tip) from the feed channel 448 for polymer B. The feed channel 444 for polymer C communicates with an annular polymer flow passageway 500 formed between a portion of the inner surface of the second nozzle insert shell 434 and a portion of the outer surface of the third nozzle insert shell 432 (FIG. 50). The passageway terminates at an annular exit orifice 502. The third nozzle insert shell 432 (FIGS. 55 and 57A) is formed with one eccentric choke 504 and one concentric choke 506 which restrict and direct the flow of polymer C for the purpose previously described. The flow restriction around the circumference of the eccentric choke is greatest in the area 507 where the feed channel 444 communicates with the polymer flow passageway 500. A primary melt pool 508 is formed in flow passageway 500 between the rear wall 509 of the eccentric choke 504 and a forwardly pitched wall 510 which has the shape and function previously described. A secondary melt pool 512 is formed in flow passageway 500 between the forward wall 513 of the eccentric choke 504 and the rear wall 514 of concentric choke 506. A final melt pool 516 is formed in flow passageway 500 between the forward wall 517 of the concentric choke 506 and the orifice 502 of flow passageway 500. The final melt pool comprises a conical portion 518 which forms a tapered, symmetrical reservoir of polymer for the purpose and function previously described.

Figures 51, 52, 53:
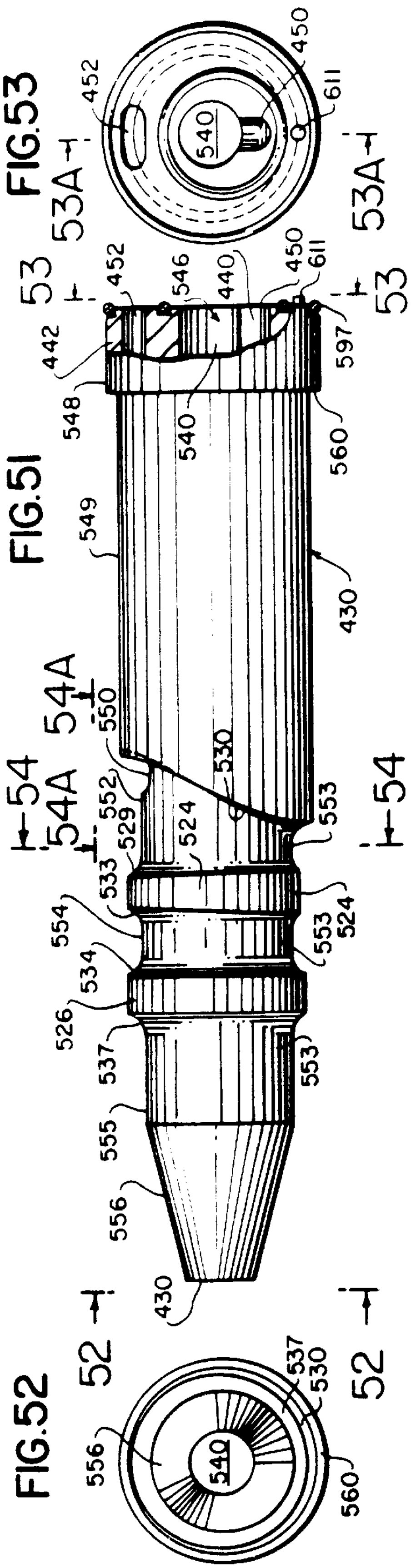
FIG. 51 is a side elevational view of the inner shell of the nozzle assembly.
FIG. 52 is a front end view of the inner shell of FIG. 50.
FIG. 53 is a rear end view of the inner shell shown in FIG. 50.

Fitted within the third nozzle insert shell 432 is the inner nozzle insert shell 430 (FIGS. 51–54A) having a feed channel 442 for polymer D which is angularly offset by 240° (counter-clockwise when viewed from the shell's forward end or tip) from the feed channel 448 for polymer B in the outer nozzle insert shell. A portion of the inner surface of the third nozzle insert shell 432 and a portion of the outer surface of the inner nozzle insert shell 430 form an annular polymer flow passageway 520 for polymer D (FIG. 50). The passageway 520 communicates with the feed channel 442 and terminates at an annular exit orifice 522. The inner nozzle insert shell 430 is formed with one eccentric choke 524 (FIGS. 50, 51 and 53A) and one concentric choke 526 which restrict and direct the flow of polymer D for the purpose previously described. The flow restriction around the circumference of the eccentric choke is greatest in the area 527 where the feed channel 442 communicates with the polymer flow passageway 520. A primary melt pool 528 is formed in flow passageway 520 between the rear wall 529 of the eccentric choke 524 and a forwardly pitched wall 530 which has the shape and function previously described (FIG. 51). A secondary melt pool 532 is formed in flow passageway 520 between the forward wall 533 of the eccentric choke 524 and the rear wall 534 of second concentric choke 526. A final melt pool 536 is formed in flow passageway 520 between the forward wall 537 of the concentric choke 526 and the orifice 522 of flow passageway 520. The final melt pool 536 comprises a conical portion 538 which forms a tapered, symmetrical reservoir of polymer for the purpose previously described.

Inner shell 430 contains a central channel 540 (FIG. 50) which is preferably cylindrical and through which passes, and in which is carried, the preferred nozzle valve control means which comprises hollow sleeve 800 and solid pin 834. Controlled, reciprocal movement of sleeve 800 selectively blocks and unblocks one or more exit orifices 462, 482, 502 and 522, selectively preventing and permitting the flow of one or more of polymers B, E, C and D from those respective orifices. Inner feed channel 440 elsewhere sometimes referred to as a third orifice, for polymer A in inner shell 430 is angularly offset by 60° (counter-clockwise when viewed from the shell's forward end or tip) from the feed channel 448 for polymer B in the outer shell 436. Feed channel 440 communicates with central channel 540, but flow of polymer A into channel 540 is prevented when the pin blocks the aperture 804 in the wall of the sleeve (FIG. 50) and as the sleeve 800 blocks feed channel 440. Flow of polymer A into channel 540 is permitted when the pin is withdrawn sufficiently to unblock aperture 804 in the wall of the sleeve or when the sleeve is withdrawn sufficiently to unblock the forward end 542 (FIG. 53A) of feed channel 440.

Thus, each polymer flow passageway 460, 480, 500 and 520 terminates at an exit orifice and the orifices are located close to each other and to the tip of the nozzle cap 438. The central channel 540 of the inner nozzle insert shell 430, together with the orifice-forming ends of the tapered, conical portions 544 at the forward end of each of the shells, form the central channel 546 of the nozzle, and each of the annular exit orifices 462, 482, 502 and 522 of the polymer flow passageways communicates with the central channel 546 of the nozzle in a central channel combining area at a location close to the open end thereof.

It is highly desirable to have uniformity of polymer temperature around the annular flow passageway for each polymer. Lack of annular temperature uniformity causes lack of viscosity uniformity which, in turn, leads to non-uniform flow of the polymer, producing a deleterious bias of the leading edge of the internal layers. Angularly offsetting the nozzle shell feed channels from each other, as shown in FIG. 49AA, and as described above, angularly distributes around the nozzle the heat from the entering polymer flow streams, promoting annular temperature uniformity and correlative uniformity of polymer flow. A secondary benefit of angularly offsetting the nozzle shell feed channels is a substantial radial pressure balance of polymer flow streams on each nozzle assembly.

Figures 53A, 53B, 53C, 54, 54A:
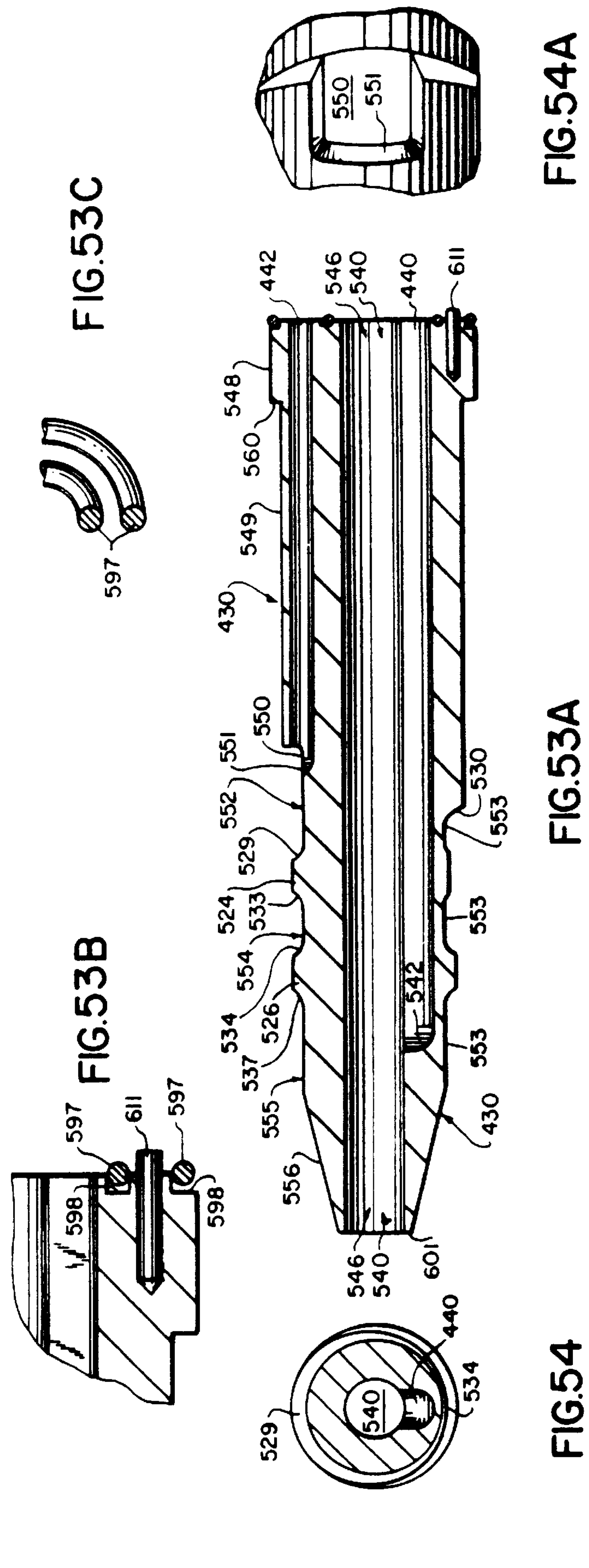
FIG. 53A is a vertical section taken along line 53A—53A of FIG. 53.
FIG. 53B is an enlarged view of the lower right portion of FIG. 53A.
FIG. 53C is an enlarged view with portions in section, and portions broken away, of the sealing rings shown in FIG. 53.
FIG. 54 is a vertical section taken along line 54—54 of FIG. 51.
FIG. 54A is an enlarged top plan view with portions broken away as would be seen along line 54A—54A of FIG. 51 showing the port in the wall of the inner shell.

Particular aspects of the nozzle shells will now be described. Referring now particularly to FIGS. 49A, 49AA and 50–54A, inner feed channel 440 in inner shell 430 is preferably a keyhole passageway (FIG. 54) which runs axially through the inner shell and communicates along its axial length with central channel 540 of the inner shell. The keyhole passageway running axially in communication with the central channel terminates at its forward end 542 in a forward terminal runout wall which is rounded so that the polymer material washes out of the keyhole and does not accumulate in any sharply cut corner. Keyhole exit port 407 in the first shelf 382 of feed block 294 communicates directly with a matched key slot entrance port 450 to inner feed channel 440. Key slot port 450 has a 5 mil chamfer to ensure proper alignment with exit port 407 in the feed block. The obloround exit port 411 in the first shelf of the feed block (FIGS. 41, 42 and 42A) communicates directly with a matched obloround entrance port 452 cut into the rear face of the inner shell, and which communicates directly with an obloround feed channel 442 (0.093 wide by 0.251" long) which runs axially through the approximately rear longitudinal half of the inner shell a uniform distance from the shoulder 548 (FIGS. 51 and 53A) and through the pilot 549 at least approximately 0.298 inch from the axial center of the inner shell. The obloround feed channel 442 terminates at its forward end in an obloround forward exit port, whose upper portion communicates directly with a cut-away area 550 in the outer surface of the inner shell, and whose lower portion terminates in a forward terminal runout wall portion 551 (FIG. 53A) having a rounded sloping surface to avoid material accumulation there. Cut-away area 550 is of the same open cross-sectional area as the forward end of the feed channel. Wall portion 551 is preferably at a 45° angle or less, as measured from the central axis of the shell. The inner shell has a forwardly pitched cut circumferential forward edge or wall 530 having a low point adjacent obloround forward exit port of channel 442 and a high point disposed 180° from the exit port. The obloround feed channel exit port and the obloround feed channel runout which exit adjacent the low point of wall 530 communicate directly with a primary melt pool cut-away section 552 formed and defined at its rear boundary by wall 530, at its forward boundary by the rounded rear wall 529 of eccentric choke ring 524 and on its lower boundary by the cylindrical inner axial base wall 553 cut into the periphery of the inner shell (FIG. 53A). Eccentric choke ring 524 is disposed perpendicular to the axis of the inner shell. The width of choke 524 is narrower adjacent the obloround exit port and runout than it is at the 180° opposite side of the shell adjacent the high point of wall 530. When viewed in cross-section, eccentric choke 524 is circular. However, the center point of the circle it forms is eccentrically located relative to the axis of the shell such that the height of the radial protuberance (as shown in FIG. 51) is greater in the area adjacent the obloround exit port and runout than it is adjacent the high point of the elliptical wall 530. The inner shell 430 also has a restricter in the form of a concentric choke 526 concentrically disposed perpendicular to the axis of the inner shell. The width of the concentric choke 526 is the same about its circumference and the radial distance from the axis of the shell to its outer surface is the same around the circumference of the shell (FIGS. 52 and 54). The walls 533, 534 of the respective eccentric and concentric chokes, together with the cylindrical inner axial base wall 553 form a secondary melt pool cut away section 554, 360° about the inner shell (FIG. 51). Forward of the concentric choke 526 is a final melt pool cut away section 555 formed by the forward wall 537 of the concentric choke, the cylindrical inner base wall 553 of the inner shell, and the frustoconical base wall 556 at the forward portion of the shell. The intersection of frustoconical wall 556 with central channel 540 in shell 430 has been ground to a flat annulus 601 (shown in exaggerated form in FIG. 53A), lying in a plane perpendicular to the longitudinal axis of the shell, to avoid breakage and wear which may occur when the acute angle intersection is a sharp edge. In the preferred embodiment, the radial thickness of the flat is 5 mils. The radial distance of the base wall 553 from the central axis of the shell is the same for the primary and secondary melt pools as well as for the rear portion of final melt pool section 555.

Figure 57A:
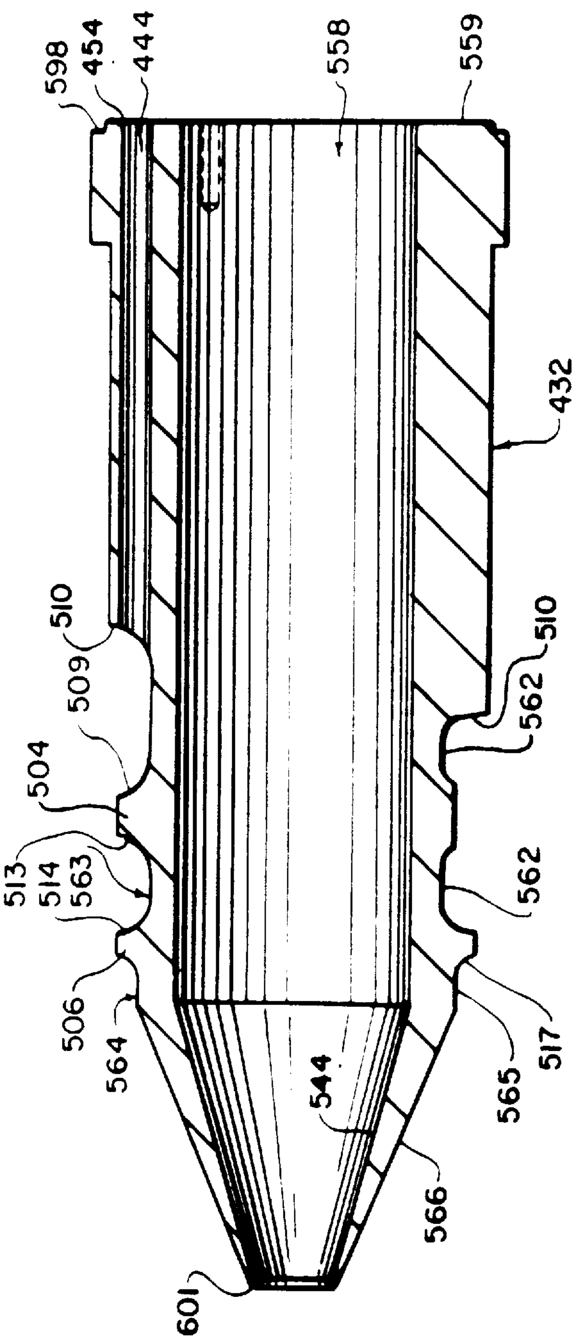
FIG. 57A is a vertical section taken along line 57A—57A of FIG. 57.

As shown in FIGS. 49, 49A, 49AA and 50, inner shell 430 is telescopingly seated in a close tolerance fit within the bore, generally designated 558 (FIG. 57A), of third shell 432 such that the rear face 559 of the third shell abuts against the forward face 560 (FIGS. 51 and 53A) of the inner shell's shoulder 548. The cylindrical wall portion of the bore 558 in the third shell 432 cooperates with the walls of the melt pool cut away sections and forms the radially outer boundary wall of the primary melt pool 528, and of the secondary melt pool 532, of polymer D. The cylindrical wall portion of bore 558 and the inner surface of the tapered, frustoconical portion 544 of shell 432 form the outer wall of a cylindrical portion of, and of the tapered conical portion of, the final melt pool 536 of polymer D (FIGS. 50 and 57A).

Figure 55:
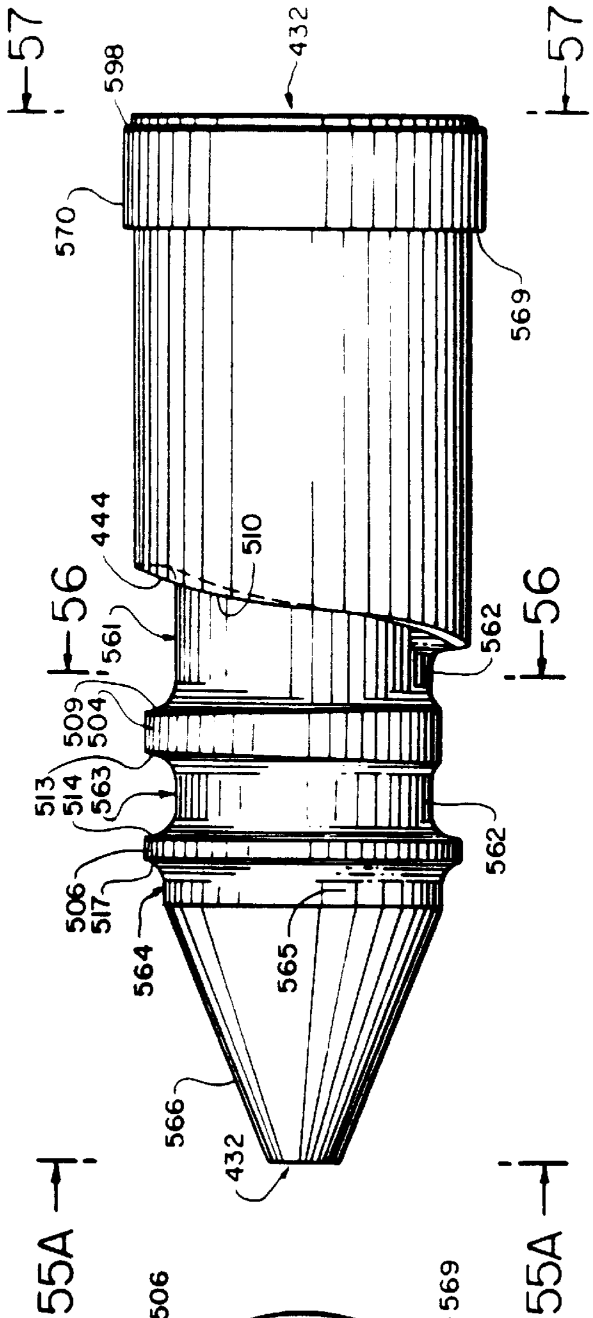
FIG. 55 is a side elevational view of the third shell of the nozzle assembly.
Figure 55A:
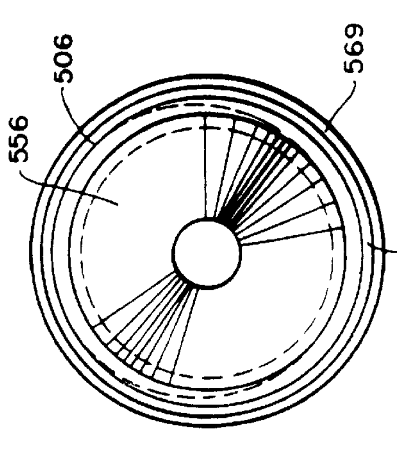
FIG. 55A is a view of the front end of the third shell as would be seen along line 55A—55A of FIG. 55.

The third shell 432 of the nozzle assembly of this invention is shown in FIGS. 50 and 55–57A. Obloround entrance port 454 communicates directly with a matched obloround exit port 415 in the second shelf 384 of the feed block 294 nozzle-receiving chamber 380. Port 454 communicates directly with a like obloround feed channel 444 (0.250 inch wide by about 0.109 inch high) which runs axially through the approximate rear longitudinal half of the third shell, the axis of channel 444 being located approximately 0.460 inch measured from the axial center line of the third shell. The third shell has a forwardly pitched cut circumferential forward edge or wall 510 (FIG. 55) having a low point adjacent the forward exit port of channel 444 and a high point disposed 180° from the exit port. Feed channel 444 terminates at its forward end in an obloround forward exit port which communicates directly with a primary melt pool cut-away section 561 and defined at its rear boundary by the wall 510, at its forward boundary by the rear wall 509 of the eccentric choke 504 and on its lower boundary by the cylindrical inner axial base wall 562 cut into the periphery of the third shell. The eccentric choke 504 has its circumferential center line in a plane perpendicular to the axis of the third shell. The width of the choke is uniform around its circumference. When viewed in cross-section (see FIG. 57A), eccentric choke 504 is circular, but the center of the circle it forms is eccentrically located relative to the axis of the third shell, such that the height of the radial protuberance (as also shown in FIG. 55) relative to the base wall 562 is greater in the area adjacent the obloround exit port than it is adjacent the high point of the elliptical wall 510. The third shell 432 also has, adjacent to but axially forward of eccentric choke ring 504, a restricter in the form of a concentric choke ring 506, concentrically disposed relative to, and having a plane through its circumferential center line perpendicular to, the axis of the third shell. The width of the concentric choke 506 is the same around its circumference and the radial distance from the axis of the shell to the outer surface of the choke is uniform. The walls 513, 514 of the respective eccentric and concentric chokes, together with the base wall 562 form a secondary melt pool cut away section 563, 360° about the shell. The radial distance of the base wall 562 from the central axis of the shell is the same for each of the primary and secondary melt pools. Forward of the eccentric choke 504 is a final melt pool cut away section 564, formed by the forward wall 517 of the concentric choke 506, the cylindrical inner base wall 565 portion of the shell and by the frustoconical base wall 566 at the forward portion of the third shell. To add strength to the forward portion of the shell, the radial distance of the base wall 565 from the central axis of the shell is greater than the distance of base wall 562.

Referring again to FIGS. 49, 49A and 50, the third shell 432 is telescopingly seated in a close tolerance fit within the bore, generally designated 567, of second shell 434 such that the rear face 568 of the second shell abuts against the forward face 569 of the third shell's shoulder 570. The cylindrical wall portion 602 of the bore 567 in the second shell 434 forms the radially outer boundary wall of the primary melt pool 508, and of the secondary melt pool 512, of polymer C. The cylindrical wall portion 602 of bore 567 and the inner surface 603 of the tapered, frustoconical portion 544 of shell 434 form the outer wall of a cylindrical portion of, and of the tapered conical portion of, the final melt pool 516 of polymer C.

Figure 58:
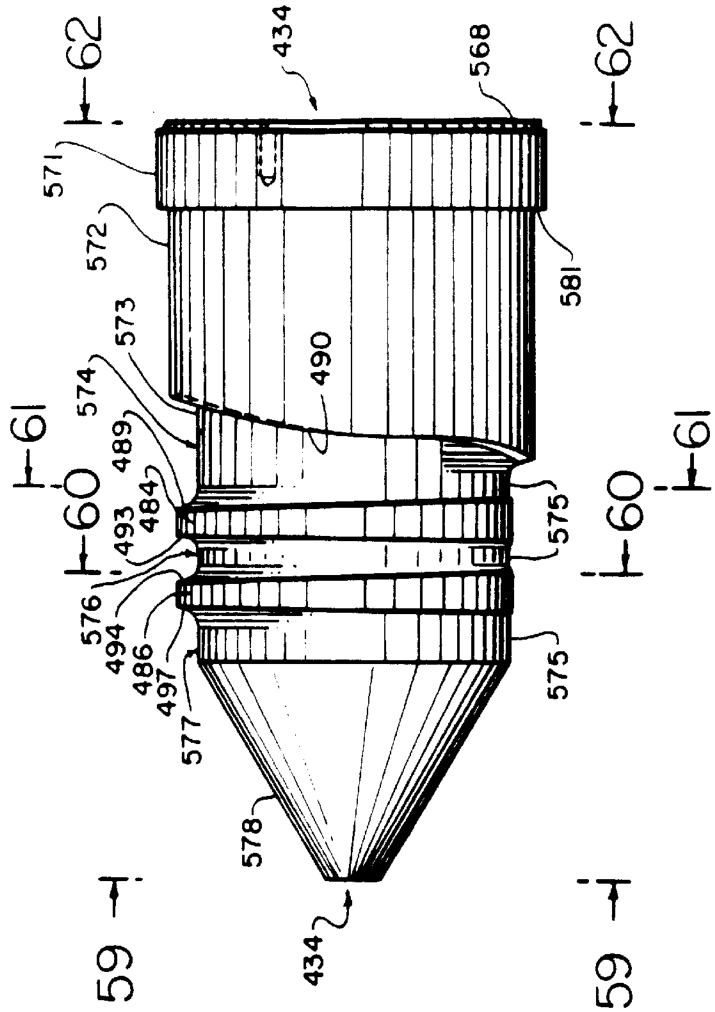
FIG. 58 is a side elevational view of the second shell of the nozzle assembly.
Figure 59:
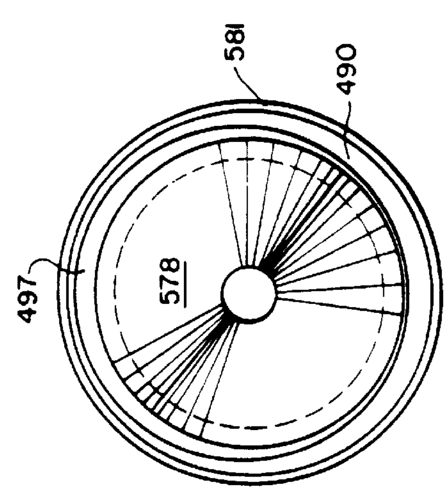
FIG. 59 is a front end view of the second shell taken along line 59—59 of FIG. 58.
Figure 61:
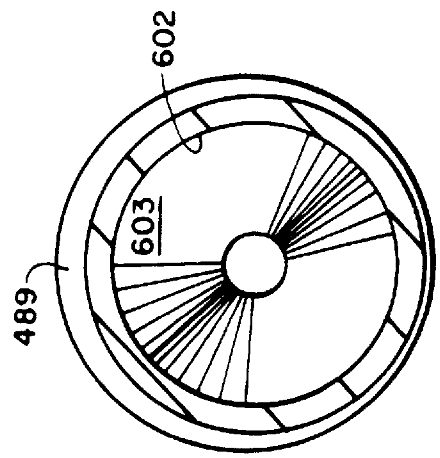
FIG. 61 is a vertical section taken along line 61—61 of FIG. 58.
Figure 60:
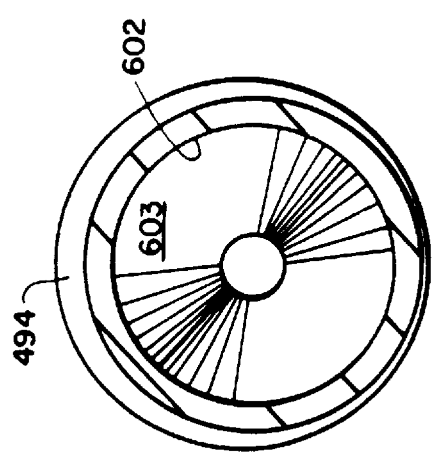
FIG. 60 is a vertical section taken along line 60—60 of FIG. 58.
Figure 63:
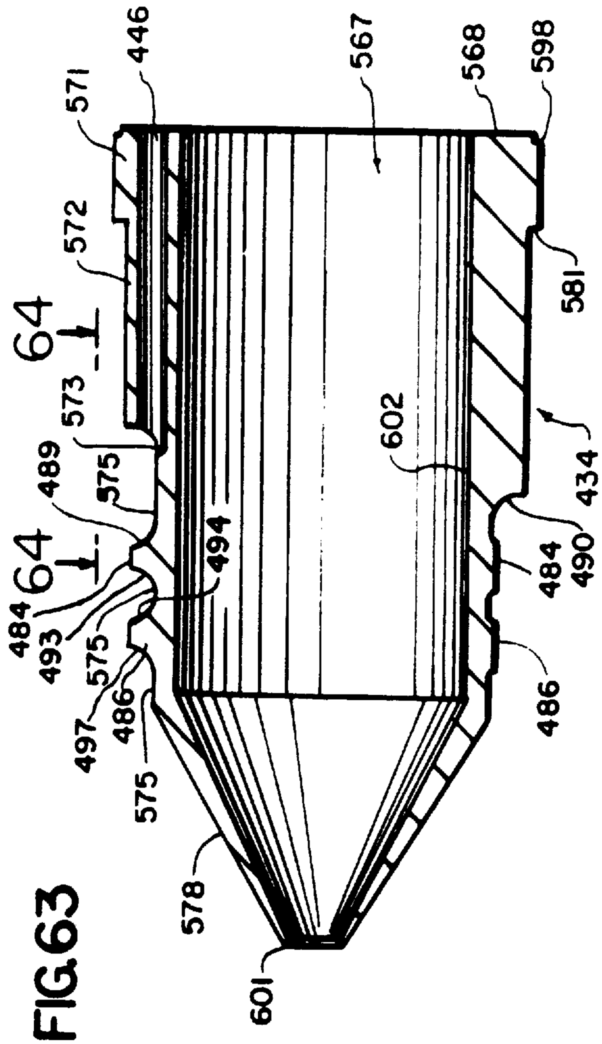
FIG. 63 is a vertical section taken along line 63—63 of FIG. 62.

The second shell 434 of the nozzle assembly of this invention is shown in FIGS. 58 through 62B. Obloround entrance port 456 communicates directly with a matched obloround exit port 417 in the third shelf 386 of the feed block 294 nozzle receiving chamber 380. Port 456 communicates directly with a like obloround feed channel 446 (0.093 inch high by 0.250 inch wide) which runs axially through the approximately rear longitudinal half of the shell from the rear face 568 of the shell, through the shoulder 571 and through the pilot 572 at a downward angle directed toward the axis of the shell to the forward end of the feed channel. The upper end portion of the exit port of feed channel 446 communicates directly with a cut-away area 573 in the outer surface of the shell. The lower portion of the feed channel obloround forward exit port terminates in a forward terminal run-out wall portion 605 having a rounded, sloping surface to avoid material accumulation therein. As in the case of the inner and third shells, the second shell likewise has an eccentrically cut circumferential forward edge or wall 490. Wall 490 has a low point adjacent the obloround forward exit port of channel 446 and a high point disposed 180° from the exit port. The exit port and run-out communicate directly with a primary melt pool cut-away section 574 formed and defined at its rear boundary by wall 490, at its forward boundary by the rounded side wall 489 of the eccentric choke ring 484, and on its lower boundary by the cylindrical inner axial base wall 575 cut into the periphery of the shell. Eccentric choke 484 is disposed perpendicular to the axis of the shell. The width of choke 484 is narrower adjacent exit port and run-out than it is at the 180° opposite side of the shell adjacent the high point of wall 490. When viewed in cross-section, eccentric choke 484 is circular. However, the center point of the circle it forms is eccentrically located relative to the axis of the shell such that the height of the protruding choke wall (as shown in FIG. 58) is greater in the area adjacent the obloround exit port and run-out than it is adjacent the high point of the elliptical wall 490. The second shell 434 also has, adjacent to but axially forward of eccentric choke 484, a second flow restricter in the form of another eccentric choke 486 disposed perpendicular to the axis of the shell. The width of eccentric choke 486 is non-uniform and like eccentric choke 484 is narrower in the portion of the circumference of the shell which is aligned with the exit port.

When viewed in cross-section, eccentric choke 486 is circular. However, the center point of the circle it forms is eccentrically located relative to the axis of the shell such that the height of the protruding choke wall relative to the base wall 575 (as shown in FIG. 58) is greater on the side of the shell where the feed channel 446 is located than it is on the side where the forward portion of the wall 490 is located. The walls 493, 494 of respective eccentric chokes 484, 486, together with the base wall 575, form a secondary melt pool cut away section 576, 360° about the shell. Forward of choke 486 is a final melt pool cut away section 577, formed by forward wall 497 of choke 486, the cylindrical base wall 575 portion of the shell and by the frustoconical base wall 578. The radial distance of base wall 575 from the central axis of the shell is the same for the primary and secondary melt pools and for the rear portion of the final melt pool.

Referring again to FIGS. 49, 49A and 50, the second shell 434 is telescopingly seated in a close tolerance fit within the bore, generally designated 579, of first shell 436 such that the rear face 580 of the first shell abuts against the forward face 581 of the second shell's shoulder 571. The cylindrical wall portion 606 of the bore 579 in the first shell 436 forms the radially outer boundary wall of the primary melt pool 488, and of the secondary melt pool 492, of polymer E. The cylindrical wall portion 606 of bore 579 and the inner surface 607 of the tapered, frustoconical portion 544 of shell 436 form the outer wall of a cylindrical portion of, and of the tapered conical portion of, the final melt pool 496 of polymer E.

Figure 65:
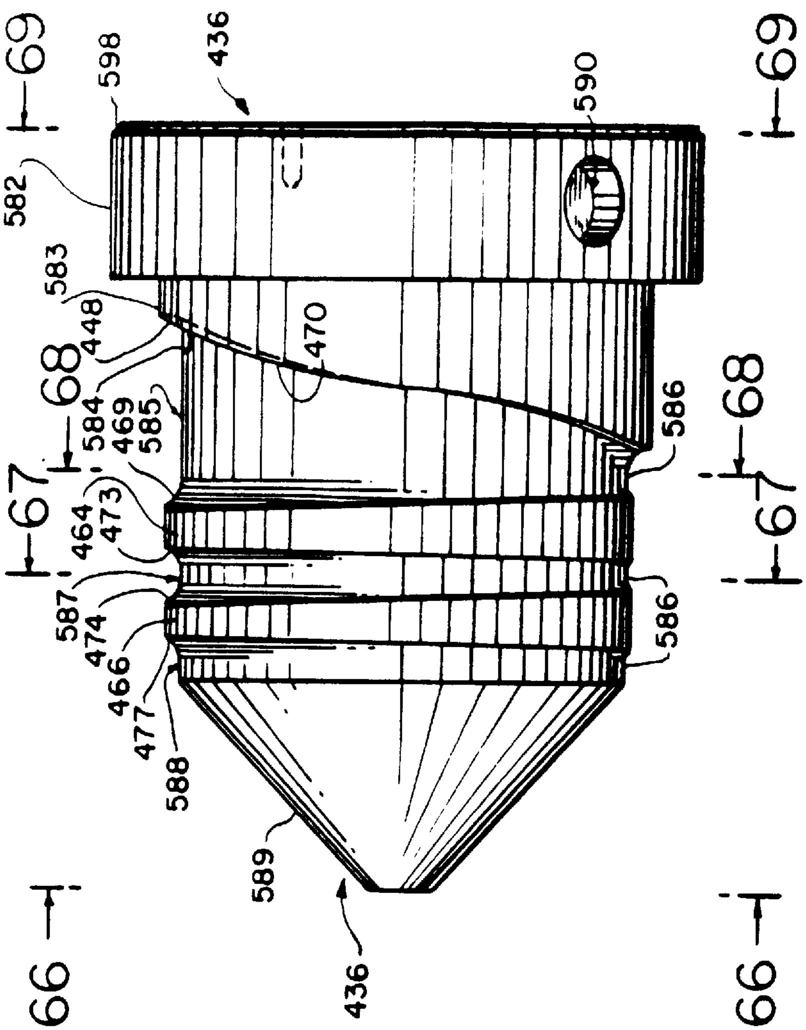
FIG. 65 is a side elevational view of the outer shell of the nozzle assembly of FIG. 50.
Figure 66:
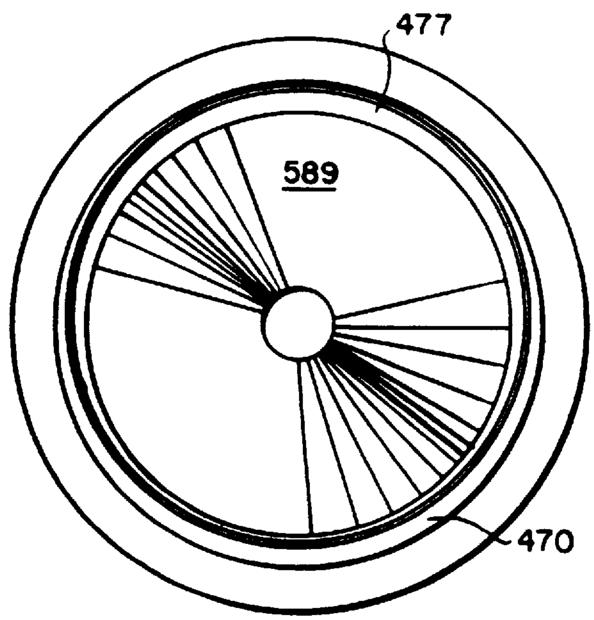
FIG. 66 is a front view of the outer shell as would be seen along line 66—66 of FIG. 65.
Figure 67:
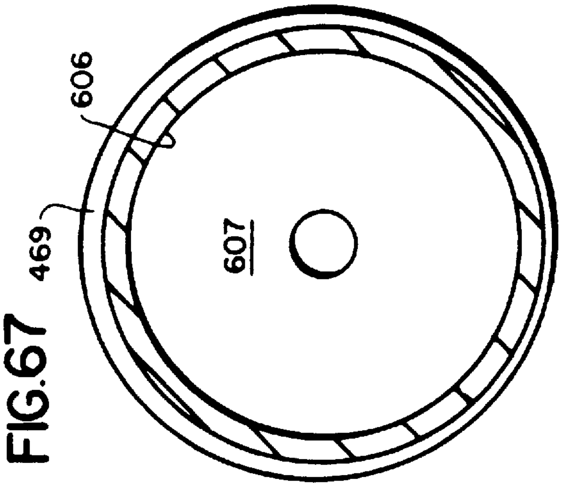
FIG. 67 is a vertical section taken along line 67—67 of FIG. 65.
Figure 68:
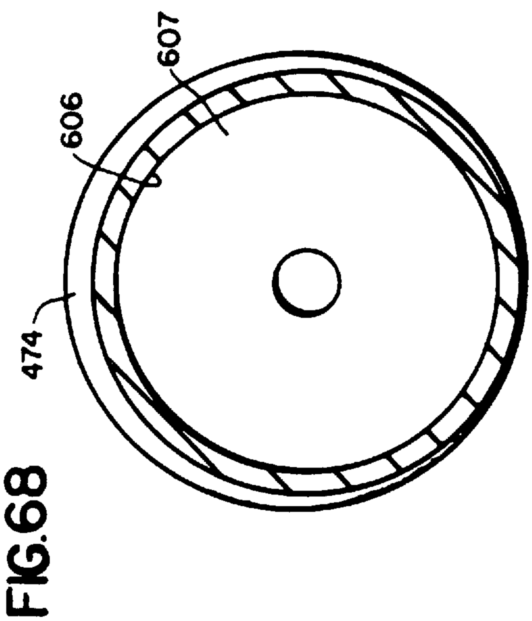
FIG. 68 is a vertical section taken along line 68—68 of FIG. 65.
Figure 69:
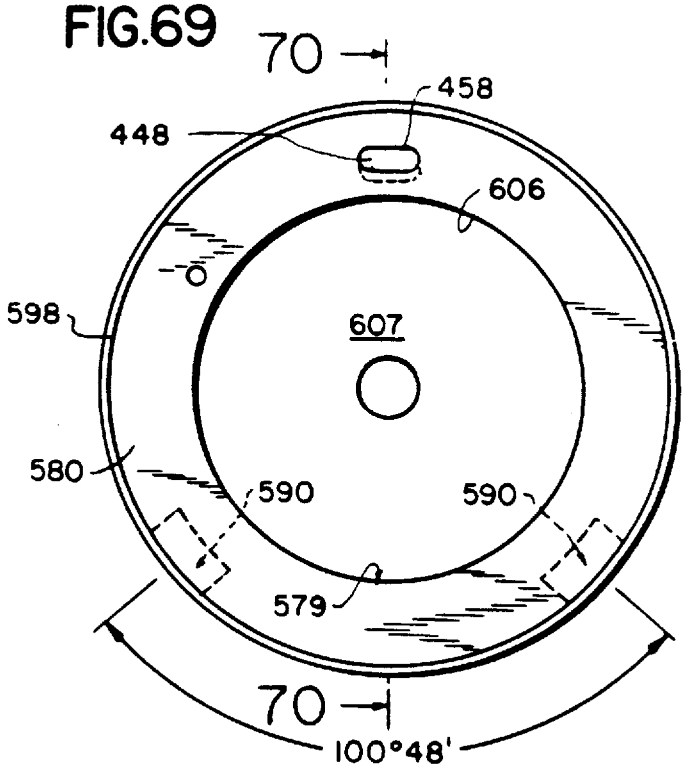
FIG. 69 is an end view of the rear face of the outer shell as would be seen along line 69—69 of FIG. 65.

The first shell 436 of the nozzle assembly of this invention is shown in FIGS. 65 through 70A. Obloround entrance port 458 communicates directly with a matched exit port 418 in the front face 388 of the feed block 294. Exit port 418 is the exit of feed throat 402 which is cut out of the periphery of feed block 294. The radially outer wall of feed throat 402 is the inside surface of the bore in the runner block into which is inserted the feed block 294. Port 458 communicates directly with a like obloround feed channel 448 (0.093 inch high by 0.250 inch wide) which runs axially through the approximately rear longitudinal third of the shell from the rear face 580 of the shell, through the shoulder 582 and through the pilot 583 at a downward angle directed toward the axis of the shell to the forward end of the feed channel. The upper end portion of the exit port of feed channel 448 communicates directly with a cut-away area 584 in the outer surface of the shell. The lower portion of the feed channel obloround forward exit port terminates in a forward terminal run-out wall portion 609 having a rounded, sloping surface to avoid material accumulation therein. As in the case of the previously mentioned shells, the first shell has an eccentrically cut circumferential forward edge or wall 470. Wall 470 has a low point adjacent the obloround forward exit port of channel 448 and a high point disposed 180° from the exit port. The exit port and run-out communicate directly with a primary melt pool cut-away section 585 formed and defined at its rear boundary by wall 470, at its forward boundary by the rounded side wall 469 of the eccentric choke ring 464, and on its lower boundary by the cylindrical inner axial base wall 586 cut into the periphery of the shell. Eccentric choke 464 is disposed perpendicular to the axis of the shell. The width of choke 464 is narrower adjacent exit port and run-out than it is at the 180° opposite side of the shell adjacent the high point of wall 470. When viewed in cross-section, eccentric choke 464 is circular. However, the center point of the circle it forms is eccentrically located relative to the axis of the shell such that the height of the protruding choke wall (as shown in FIG. 65) is greater in the area adjacent the obloround exit port and run-out than it is adjacent the high point of the elliptical wall 470. The first shell 436 also has, adjacent to but axially forward of eccentric choke 464, a second flow restricter in the form of another eccentric choke 466 disposed perpendicular to the axis of the shell. The width of eccentric choke 466 is non-uniform and like eccentric choke 464 is narrower in the portion of the circumference of the shell which is aligned with the exit port. When viewed in cross-section, eccentric choke 466 is circular. However, the center point of the circle it forms is eccentrically located relative to the axis of the shell such that the height of the protruding choke wall relative to the base wall 586 (as shown in FIG. 65) is greater on the side of the shell where the feed channel 448 is located than it is on the side where the forward portion of the wall 470 is located. Eccentric choke 464, in the preferred embodiment, is 10 mils radially larger than eccentric choke 466. The walls 473, 474 of respective eccentric chokes 464, 466, together with the base wall 586, form a secondary melt pool cut away section 587, 360° about the shell. Forward of choke 466 is a final melt pool cut away section 588, formed by forward wall 477 of choke 466, the cylindrical base wall 586 portion of the shell and by the frustoconical base wall 589. The radial distance of base wall 586 from the central axis of the shell is the same for the primary and secondary melt pools and for the rear portion of the final melt pool. Two holes 590 partially drilled into the shoulder 582 of shell 436 each receive the end portion of an anti-rotation pin 591 (see FIGS. 31 and 49) which extends through a channel bored in the runner and which serves to locate, and prevent rotation of, the shell.

The cone tip 601 of each of the four nozzle shells 430, 432, 434 and 436 is rounded to a radius of approximately 5 mils. This makes the tip less susceptible to fracture from melt stream pressure and from damages during handling of the shells and their assembly.

The first shell 436 is telescopingly seated within nozzle cap 438. The rear wall of shoulder 592 of the nozzle cap abuts against the forward wall of the first shell shoulder 582. The inner cylindrical surface 610 of the nozzle cap forms the outer boundary of the primary melt pool 468 and the secondary melt pool 472 and the rear portion of the final melt pool 476. The inner conical wall 593 of the nozzle cap forms the outer boundary of the conical portion 478 of the final melt pool 476. The length of the conical wall 593 of the nozzle cap is longer than any of the frustoconical walls of the shells, and the conical portion of the nozzle cap terminates at its forward end in a nozzle tip 594 having a centrally located channel 595 which communicates directly with the mouth or gate 596 at the forward most tip of the nozzle cap. The diameter of channel 595 is smaller than that of the sprue of the mold cavity. Pin 834, which is included in the nozzle valve means of the present invention, may be received within channel 595, in a close tolerance slip fit, at the end of each injection cycle for the purposes of assisting in preventing the flow of polymer B at the end of each injection cycle and clearing or purging substantially all polymeric material from the nozzle central channel 546 and channel 595 into the injection cavity at the end of each injection cycle.

Figure 43:
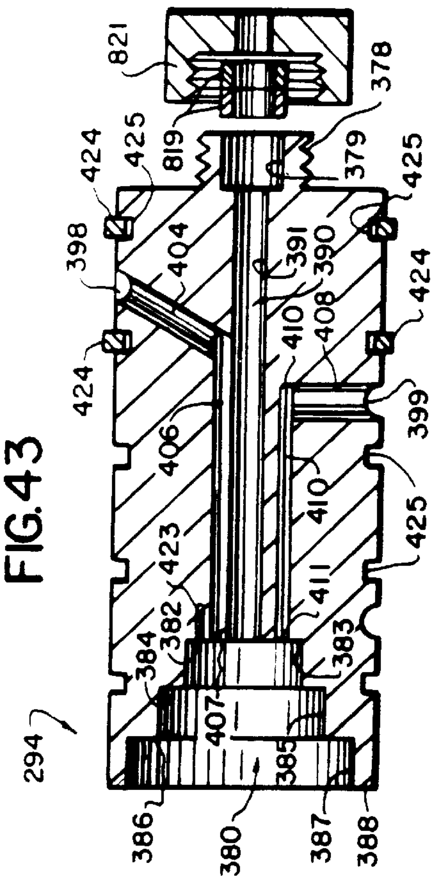
FIG. 43 is a vertical section taken along line 43—43 of FIG. 42.
Figure 44:
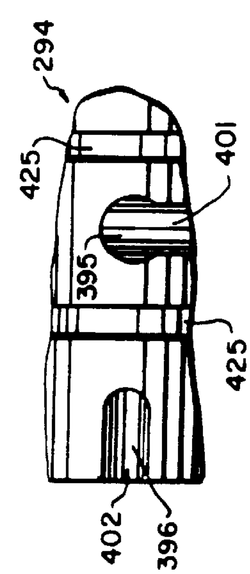
FIG. 44 is an enlarged view with portions broken away as would be seen along line 44—44 of FIG. 41.

The nozzle shells are assembled and placed in the injection machine in the following manner. First, the feed block is seated within bore 822 of runner block 288. This is done by first seating piston rings 424 in grooves 425 of the feed block and compressing the rings as the feed block is inserted into bore 822. Next, the feed block is properly oriented within the bore by placing shaft 156' of locator pin 154 within hole 158 in the side of the feed block (see FIGS. 29C, and 45–45B). Once the feed block is properly oriented and seated within bore 822, then, "O" rings 597, preferably made of soft copper, are inserted in seats 598 which are cut in the shoulder of each nozzle shell and the nozzle cap. The "O" ring is preferably formed from 22 gauge annealed copper wire having a cross-section 30 mils in diameter. Then, a position-alignment locator pin 611 is inserted into the locator pin hole in the rear face of the inner shell 430, the third shell 432 and the second shell 434, and the shells are individually serially inserted into and are seated within a portion of nozzle receiving chamber 380 at the forward end of feed block 294, more particularly, within the portion defined by first shelf 382 and first step 383 (FIGS. 41 and 43). Next, pin 611 in third shell 432 is respectively seated within hole 422 in feed block second shelf 384, and then the third shell is seated within the feed block receiving chamber portion formed by second shelf 384 and step 385. Next, pin 611 in second shell 434 is seated within hole 421 in feed block third shelf 386 and the second shell is seated within the chamber portion formed by third shelf 386 and step 387. Pin 611 in first shell 436 is then seated within hole 420 in front face 388 of feed block 294 and the rear face of the first shell is abutted against the front face of the feed block. Next, a sealing ring 597 is seated in a seat in the rear face of nozzle cap 438. The nozzle cap 438 is then slipped over the first shell and moved rearward until its rear face abuts the flange 582' of first shell 436. Next, keeper plate 176 (FIGS. 29A, 29A', and 29B) is slipped over the nozzle cap, and, by means of bolts 177 the plate is secured to runner block 288. Bolts 177 are drawn tight to compress seal rings 597 on the first shell and the nozzle cap. This lock up drives the rear face of the nozzle cap against flange 582' of the first shell 436, drives the rear face of that shell against front face 388 of feed block 294, permanently seats the first shell and nozzle cap respectively against fixed shoulder 822' in the runner block, and, as stated seats the first shell against the front face 388 of the feed block. Finally, lock ring 824 is tightened to compress the "O" rings to assure a metal to metal seat abutment between each of the shells, nozzle caps and feed block. Tightening the lock ring also prevents axial movement of the feed block within runner block bore 822.

The nozzle cap and each of the nozzle shells should be formed from a material having dimensional stability at the elevated temperatures to which they are subjected in the operation of the machine, on the order of 400°–430° F. The nozzle cap, the first nozzle shell 436 and the inner shell 430 should be formed from a material which also has high wear resistance. The second and third nozzle shells 434 and 432 should be made from a material which also has good ductility and elongation. Nozzle shells 430, 436 and nozzle cap 438 have been made from steel conforming to Unified Numbering System for Metals and Alloys No. T 30102. Suitable nozzle shells 432 and 434 have been made from Viscount 44 prehardened hot work steel H-13 (Latrobe Steel Co.) having a typical analysis: C 0.4; Si 1.0; Mn 0.8; Cr 5.0; Mo. 1.2; V 1.0. Most preferably, all the nozzle shells 430, 432, 434 and 436, and nozzle cap 438, are made from VascoMax C-300 steel having a nominal analysis: Ni 18.5%; Co 9.0%; Mo 4.8%; Ti 0.6%; Al 0.1%; Si 0.1% max.; Mn 0.1% max.; C 0.03% max.; S 0.01% max.; P 0.01% max.; Zr 0.01%; B 0.003%. The pin 834 and sleeve 800 should be formed from a material having high wear resistance and dimensional stability. Sleeves have been made from D3 steel conforming to Unified Numbering System. No. T 30403. The sleeve is made from D-3 steel, most preferably Vasco-Max C-250 steel having a nominal analysis: Ni 18.5%; Co 7.5%; Mo 4.8%; Ti 0.4%; Al 0.1%; Si 0.1% max.; Mn 0.1% max.; C 0.03% max.; S 0.01% max.; P 0.01% max.; Zr 0.01%; B 0.003%. Suitable pins are manufactured by D-M-E Co. (2911 Stephenson Hwy., Madison Heights, Mich. 98071) as ejector pins, Cat. No. Ex-11-M18.

Figure 77:
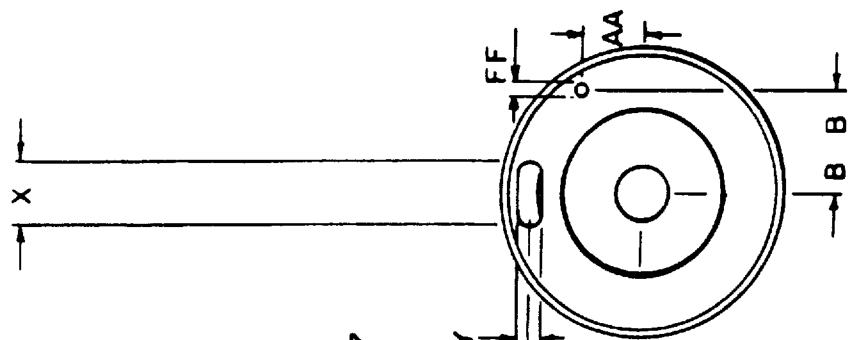
FIG. 77 is a rear elevational view taken along line 77—77 of FIG. 75, each of FIGS. 75, 76 and 77 showing letter designations for the dimensions of common structural features for each of the shells and cap of the nozzle assembly, for use with Table I.
Figure 75:
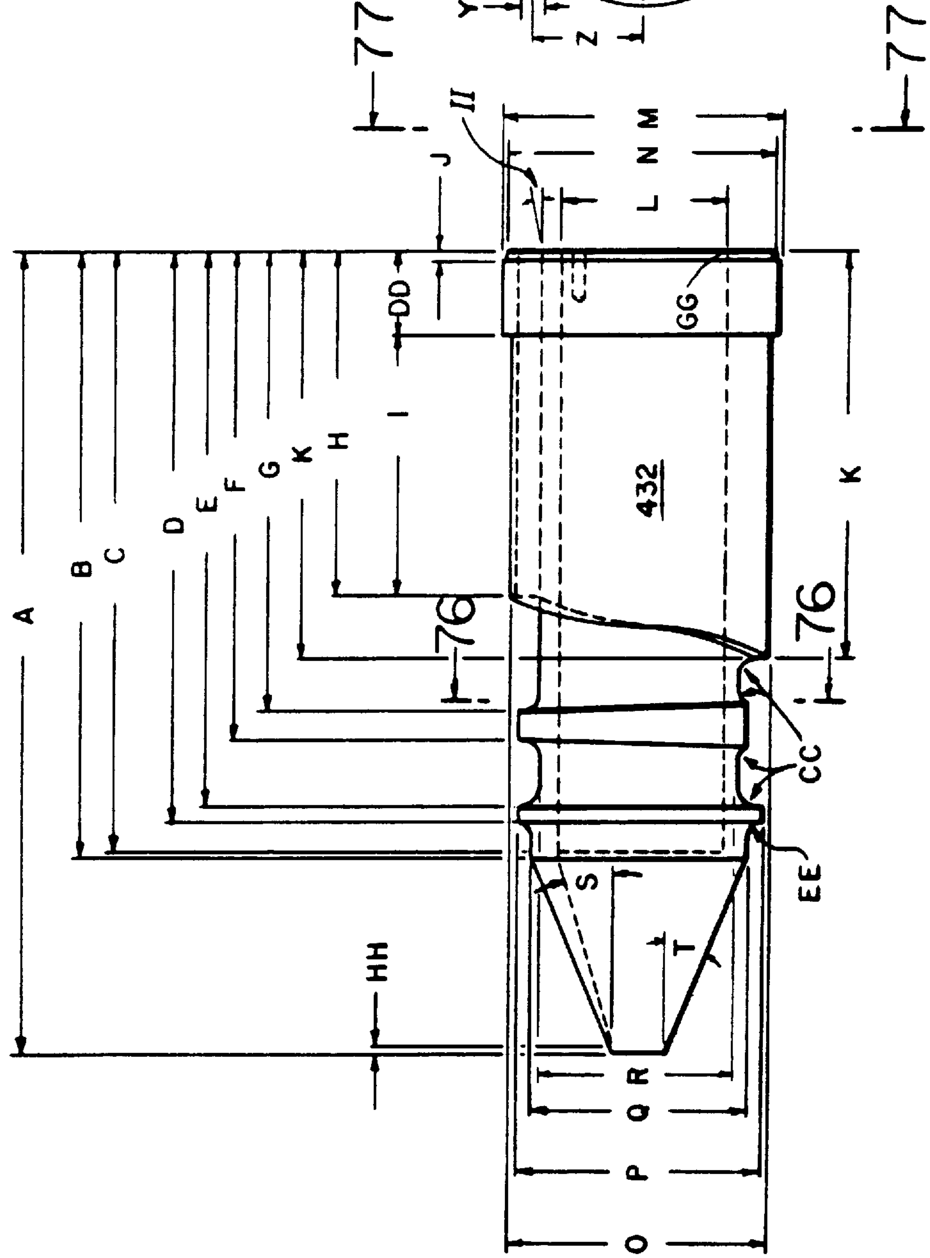
FIG. 75 is a side elevational view of shell 432.
Figure 76:
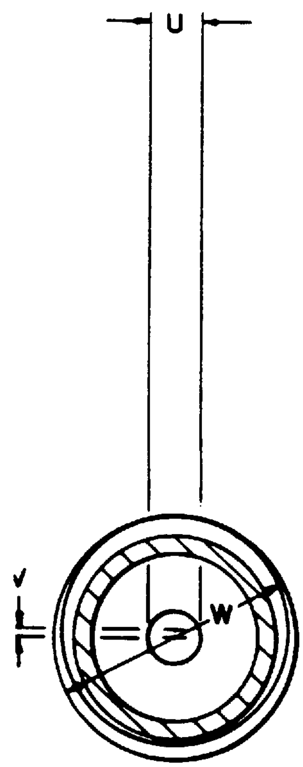
FIG. 76 is a vertical section taken along line 76—76 of FIG. 75.

FIGS. 75, 76 and 77 respectively are a side elevation, a cross-section and an end view of an exemplary nozzle shell showing letter designations corresponding to those of Table I for the dimensions of the stated parts of the preferred embodiment of outer shell 436, second shell 434, third shell 432, inner shell 430 and nozzle cap 438 of nozzle assembly 296. In Table I, all dimensions are in inches except S and T which are degrees.

TABLE I

NOZZLE SHELL DIMENSIONS

| | Outer Shell | Second Shell | Third Shell | Inner Shell | Nozzle Cap |
|---|---|---|---|---|---|
| A | 3.1370 | 3.3774 | 3.6979 | 3.9928 | 2.7991 |
| B | 2.2815 | 2.413 | 2.787 | 3.300 | 2.177 |
| C | 1.9640 | 2.3440 | 2.7691 | 3.125 | 1.7017 |
| D | 2.101 | 2.163 | 2.625 | 2.862 | — |
| E | 1.945 | 2.042 | 2.574 | 2.102 | — |
| F | 1.745 | 1.843 | 2.275 | 2.452 | — |
| G | 1.545 | 1.718 | 2.078 | 2.311 | — |
| H | 0.795 | 1.218 | 1.578 | 1.811 | — |
| I | 0.6251 | 0.3751 | 0.3751 | 0.3751 | 0.593 |
| J | 0.0255 | 0.0255 | 0.0255 | 0.0255 | — |
| K | 1.327 | 1.500 | 1.860 | 2.093 | — |
| L | 1.6251 | 1.1876 | 0.7501 | 0.2504 | 2.0007 |
| M | 2.3989 | 1.7179 | 1.2809 | 0.8439 | 2.436 |
| N | 2.3255 | 1.654 | 1.216 | 0.7795 | — |
| O | 2.000 | 1.6247 | 1.1872 | 0.7497 | 2.309 |
| P | 1.9000 | 1.500 | 1.0535 | 0.6897 | — |
| Q | 1.800 | 1.365 | 0.987 | 0.5897 | 0.500 |
| R | 1.800 | 1.365 | 0.907 | 0.5897 | — |
| S | 33 | 25 | 15.50 | 45 | |
| T | 42 | 30 | 22 | 13.50 | 60 |
| U | 0.2504 | 0.2504 | 0.2504 | 0.2504 | 0.1563 |
| V | 0.0295 | 0.03.73 | 0.0332 | 0.0173 | — |
| W | 1.880 | 1.500 | 1.0537 | 0.6647 | — |
| X | 0.250 | 0.250 | 0.250 | 0.250 | — |
| Y | 0.093 | 0.125 | 0.1095 | 0.093 | — |
| Z | 0.9525 | 0.7345 | 0.5145 | 0.2965 | — |
| AA | 0.462 | 0.375. | 0.281 | 0.344 | — |
| BB | 0.799 | 0.650 | 0.487 | — | — |
| CC | 0.090 | 0.090 | 0.090 | 0.090 | — |
| DD | 0.003 | 0.003 | 0.003 | 0.003 | — |
| EE | 0.012 | 0.012 | 0.012 | 0.012 | — |
| FF | 0.063 | 0.063 | 0.063 | 0.063 | — |

TABLE I-continued

NOZZLE SHELL DIMENSIONS

Figure 77A:
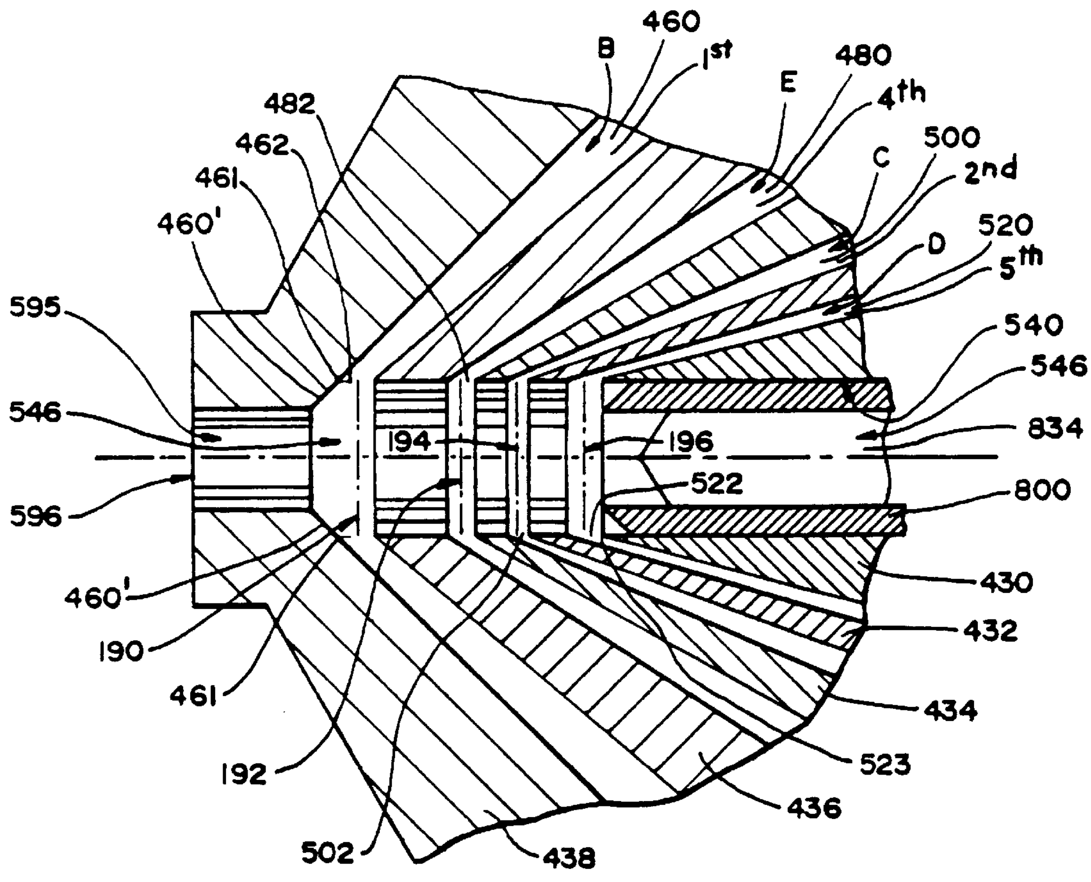
FIG. 77A is an enlarged vertical section with portions broken away, taken through a forward portion of a co-injection nozzle embodiment of this invention, showing orifice center lines perpendicular to the axis of the nozzle central channel.

| | Outer Shell | Second Shell | Third Shell | Inner Shell | Nozzle Cap |
|---|---|---|---|---|---|
| GG | 0.0075 | 0.0075 | 0.0075 | 0.0075 | 0.0075 |
| HH | 0.120 | 0.030 | 0.030 | — | — |
| | 3 | 1 | 0 | 0 | — |

where:
A = Overall length
B = Length from rear face of shell to beginning of frustoconical outer surface
C = Length from rear face to beginning of frustoconical inner bore surface
D = Length from rear face to forward wall of second choke
E = Length from rear face to rear wall of second choke
F = Length from rear face to forward wall of first choke
G = Length from rear face to rear wall of first choke
H = Length from rear face to start of primary melt pool and termination of top edge of flow channel
I = Length from rear face to forward face of shoulder
J = Depth of groove for seal ring
K = Length from rear face to location of termination point of elliptical edge of primary melt pool
L = Diameter of inner cylindrical bore
M = Outside diameter of shoulder
N = Inside diameter of seal ring groove
O = Outside diameter of pilot
P = Outside diameter of second choke
Q = Diameter of final melt pool cylindrical base wall at intersection with frustoconical surface
R = Diameter of primary and secondary melt pool cylindrical base wall
S = Inside frustoconical surface angle (degrees)
T = Outside frustoconical surface angle (degrees)
U = Diameter of inside surface at tip of forward end of the shell
V = Offset dimension for center of eccentric choke
W = Outside diameter of first choke
X = Width of feed channel
Y = Height of feed channel
Z = Location of axis of entrance port of feed channel
AA & BB = Coordinate locations of locator pin
CC = Corner radii at each location of choke and melt pool
DD = Radii break in sharp corners to eliminate stress areas
EE = Corner radii to eliminate sharp edge
FF = Diameter of hole to accept locator pin
GG = Chamfer of inside bore to eliminate corner interference with shoulder
HH = Length of sealing land
= Anqular deviation from axial for feed channel center line, sloping downward from origin at rear of shoulder FIG. 77A shows that in the preferred embodiment of the nozzle assembly or co-injection nozzle of this invention, an imaginary line drawn from the leading lip to the trailing lip about the circumference of each pair of lips which form each of the respective first, fourth, second, and fifth narrow, fixed, annular exit orifices 462, 482, 502 and 522 (the third orifice for A layer material is not shown) of passageways 460, 480, 500 and 520, forms an imaginary cylinder whose imaginary wall completely surrounds the central channel substantially parallel to the axis of the co-injection nozzle central channel, generally designated 546. Projections of the respective mid-points about the circumference of the imaginary cylindrical surface of each orifice are referred to and shown as center lines 190, 192, 194 and 196 and which, in the preferred embodiments, are perpendicular the axis of the co-injection nozzle. The orifices shown have an axial width which is uniform about the central channel and they have a cross-sectional area no greater than, and preferably less than that of the central channel. The central channel has a portion which coincides with the central channel 540 of inner shell 430, and extends forward through the channel portion of the nozzle assembly defined by the nozzle shell tips and by orifices 522, 502, 482 and 462. The nozzle central channel extends forward to the portion of the leading wall of passageway 460 which is designated 460' and which is shown extending diagonally downward from the leading lip

461 of orifice 462 toward the gate and the axis of the central channel, and the central channel coincides with channel 595 which runs forward through nozzle cap 438 to gate 596. The central channel preferably is cylindrical and has a uniform cross-sectional area throughout its length, or at least from the leading lip 461 of the first orifice to the trailing lip of the second orifice 502 or of the orifice most remote from the gate (other than the third orifice or feed channel for the A layer material). In FIG. 77A, the most remote orifice is the fifth orifice, 522. The nozzle central channel includes what is referred to as the combining area which is that portion of the central channel, preferably cylindrical, extending from the leading lip 461 of the first annular exit orifice 462 to the trailing lip of the annular orifice most remote from the gate, here, trailing lip 523 of fifth annular exit orifice 522. For a co-injection nozzle of a comparable design for co-injecting three layers, the orifice most remote from the gate would be the second orifice 502. In the combining area, the polymer streams combine into a combined flow stream for injection from the nozzle. For forming the thin walled containers and articles of this invention, it is preferred that the combining area be as short as possible, that is, that the orifices be located as close to each other as possible and as close as possible to the gate, given the certain nozzle tip thicknesses and strengths required for nozzle operating temperatures and pressures and given sufficient tip land lengths for sealing purposes, such as to prevent cross channel flow. Wherever it is located, the combining area for a five layer nozzle will usually have an axial length of from about 150 to about 1500 mils, more often from about 150 to about 500 mils. With respect to the preferred nozzle assembly schematically shown in FIG. 77A, the “combining area” preferably has a uniform cross-sectional area and has an axial length of from about 150 to about 1500 mils measured to trailing lip 523, more preferably, from about 150 to about 500 mils. When the combining area extends to the trailing lip of the second orifice, preferably its axial length is from about 100 to about 900 mils, more preferably from about 100 to about 300 mils. It is believed that the closer the orifices are to each other, the more precise the control will be over the relative annular locations of the respective materials in the combined stream, and the easier it is to knit and encapsulate the C layer material. Although the combining area can be located anywhere in the central channel, for example, more removed from the gate than shown in the drawings, it is preferred that the first, and additionally the fourth, second and fifth orifices be located as close as practically possible to the gate. It is believed that the closer the orifices are to each other and to the gate, the shorter will be the flow travel distance for the combined flow stream to the gate and the greater will be the likelihood that the precise control exerted over the material streams or layers at the orifices and in the combining area will be maintained into the injection cavities and reflected in the relative locations and thicknesses of the respective layers and their leading edges in the formed articles. For forming the thin walled articles of this invention, preferably, the leading lip of the first orifice is within from about 100 to about 900 mils of the gate, more preferably within from about 100 to about 300 mils of the gate. A suitable orifice arrangement is one wherein the first orifice has its center line within from about 100 to about 350 mils, preferably about 300 mils from the gate, the second orifice has its center line within from about 100 to about 250 mils of the center line of the first orifice, and the leading lip of the first orifice and the trailing lip of the second orifice are no greater than about 300 mils apart. Another suitable arrangement is that wherein the trailing lip of the second orifice, or of the least proximate orifice relative to the gate, is from about 100 to about 650 mils from the gate. Preferably the center line of the second orifice is within from about 100 to about 600 mils of the gate. The axial length from the leading lip of the fourth orifice to the trailing lip of the fifth orifice is preferably from about 100 to about 900 mils, more preferably from about 100 to about 300 mils. It is most desirable to have the fourth, second and fifth orifices as close together as possible. Preferably, the combining area has a volume no greater than about 5% of the volume of the injection cavity into which the combined polymer flow stream is injected from the nozzle. A greater volume renders it difficult to blow a thin bottom container and wastes polymeric material.

It is preferred that one or more of the nozzle passageways of this invention especially those having annular orifices be tapered, especially those whose materials are to be pressurized, to have rapid and uniform onset flow, and to thereafter flow at substantially steady conditions. A tapered passageway adjacent the orifice is also advantageous because it facilitates rearward movement of polymer material in the passageway and therefore it facilitates decompressing and reducing or stopping flow through an orifice when a ram is withdrawn. It is particularly desired to utilize the tapered passageways and narrow annular orifices in cooperation with the valve means of this invention, especially with respect to intermittent flow processes such as those included in this invention, particularly with respect to starting and stopping the flow of an internal barrier layer and intermediate adherent layer materials. It is usually desired that the passageway for internal layer material sometimes referred to as the second passageway, be tapered particularly when the material is a barrier material and the location of its leading edge and its lateral location in the injected article is important. For such applications, it is also desired that the passageway for the outer layer material, sometimes referred to as the first passageway, be tapered since the flow of that material affects the flow, thickness and location of the internal layer material. A tapered passageway here means that the walls which define the confines of the portion of the passageway adjacent the orifice, here the leading or outer and trailing or inner walls which define the final melt pool, converge from a wide gap at an upstream location of the passageway, here at the beginning of the final melt pool, to a narrow gap at the exit orifice. Although it is preferred that the convergence be continuous to the orifice, the taper, as defined above, can be independent of the passageway wall geometry therebetween. Thus, the orifice of a tapered passageway has a smaller cross-sectional gap than an adjacent upstream portion of the passageway. Although the taper may be provided by changing the slope angle of either the passageway outer or inner walls or both, it is to be noted that the taper of the passageway is distinct from the shape of the frustoconical portion of the shell. Employing a tapered passageway and utilizing pressurization of the material in the tapered passageway adjacent the orifice creates a pressurized final melt pool of polymeric melt material such that when the orifice is unblocked, there is a rapid initial flow uniformly over all points of the orifice and there is a sufficient supply of compressed material in the melt pool to substantially attain longer steady flow conditions. The rapidity and degree of uniformity of initial flow would be substantially less and there would be a significant drop-off in the flow volume into the central channel with a constant gap equal to the gap of the orifice determined by a line projected from the trailing lip perpendicularly through the flow passageway. The ability to rapidly stop the flow through a non-tapered, non-constant gap passageway would be significantly less than with a tapered passageway because the latter would have a substantially narrower gap.

As will be explained in connection with FIG. 77B and the Table below, a tapered, decreasing-diameter, frustoconical passageway enhances the polymeric material melt flow circumferentially around the narrowing conical shell portion and thereby assists in flow balancing the material about the conical tip prior to exiting the orifice.

Figure 77B:
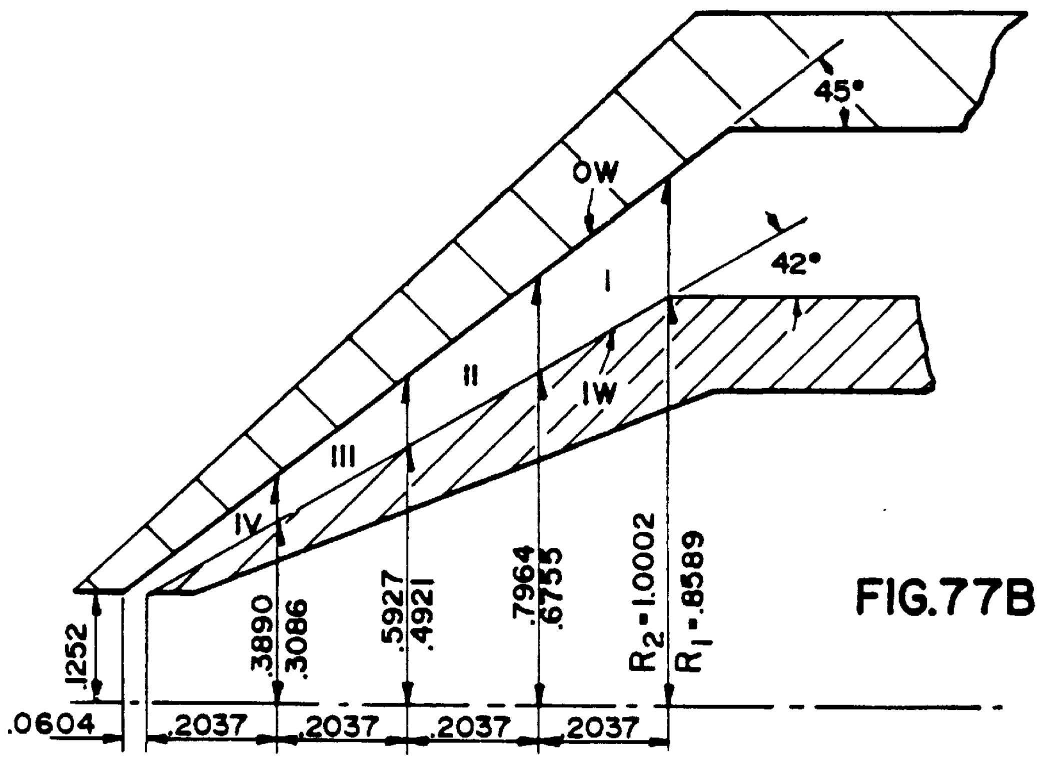
FIG. 77B is a schematic drawing representing a portion of shells of a co-injection nozzle showing dimensions thereof which are used in calculations to provide data shown in the Tables for FIG. 77B.

FIG. 77B, a vertical cross-sectional view through a hypothetical nozzle shows a tapered passageway formed by the leading or outer wall OW and the trailing or inner wall IW, the latter being the outer surface of the frustoconical portion of a nozzle shell, say 436 in FIG. 77A. FIG. 77B shows the passageway axially divided into four sections designated I, II, III and IV and shows the dimensions from the axial center line of the nozzle to points on the inner wall at the divisions of the sections and the dimensions from the axial center line radially to a point on the same radius and on the outer wall. The dimensions shown in FIG. 77B and a standard parallel plates channel flow equation for an incompressible isothermal purely viscous (non-viscoelastic), non-Newtonian power law fluid known to those in the art, were used to calculate the values shown in the Table below, where:

G=the geometrical factor for the design of the flow passageway. This is an equivalent form of flow resistance.

ΔP=the pressure drop between two points measured either at the midpoints between the sections in the axial direction, or 180° apart in the azimuthal direction within the same section.

It is known that there is an increase in the resistance to flow of a polymeric melt material as it flows axially forward through either a tapered gap or a constant gap passageway toward an orifice. This applies even though in each case the inner wall of the passageway is the outer surface of a frustoconical portion of a nozzle shell of this invention. This is due to the decreasing diameter of the frustoconical portion which reduces the circumference of the flow passage. FIG. 77B and the Table below show that given the small orifice gap, a tapered passageway in cooperation with the inner frustoconical surface enhances the flow of polymer melt material in the circumferential direction about the frustoconical shell portion and provides greater flow balancing of the material than would a constant gap in cooperation with the same inner frustoconical surface and having the dimensions of the orifice. This can be seen by comparing the value of G azimuthal for a tapered passageway with G azimuthal for a passageway having a constant gap of the dimensions of the orifice gap.

TABLE

| | Tapered Passageway | | | | Constant Gap Passageway | | | |
|---|---|---|---|---|---|---|---|---|
| | Axial Direction | | Azimuthal Direction | | Axial Direction | | Azimuthal Direction | |
| Section | G | ΔP | G | ΔP | G | ΔP | G | ΔP |
| I | 28 | 29 | 631 | 513 | 111 | 117 | 2532 | 2059 |
| II | 40 | 42 | 647 | 525 | 122 | 128 | 1938 | 1576 |
| III | 65 | 68 | 637 | 518 | 137 | 144 | 1343 | 1092 |
| IV | 125 | 131 | 552 | 449 | 163 | 170 | 750 | 610 |

In the preferred practice of the invention wherein all polymer streams flow in balance, each of the polymer streams is maintained at a temperature at which the polymer is fluid and can flow rapidly through the apparatus. Although any suitable heating system can be employed to bring and maintain the polymer streams to the desired temperature, preferably the polymers in their flow channels are maintained at the desired temperature by conduction from the metal forming and surrounding the channels. The metal in turn is maintained at its temperature by a hot fluid, such as oil, passing through flow channels suitably located near the polymer flow channels. In the previously-described apparatus, oil which has been heated to an appropriate temperature, preferably in the range of from about 400° F. to 420° F., usually about 410° F. simultaneously enters the left side of the rear injection manifold and the left side of the forward manifold, passes once horizontally through their respective widths in channels 309 and 311 and exits their right side into a manifold plate (not shown) which directs it to ram block 228. The oil enters the ram blocks lower right side, makes three passes through channels 310, and exits through its upper left side. Each pass through the ram block is at a different level and through a different combination of the channels. The exit oil enters a heated reservoir (not shown) for recycling.

The runner system, including the runner extension, has a three-zone oil heating system (see FIGS. 29, 30, 31). The first is a one-pass system for the runner extension wherein, at the twelve o'clock position of its central section 279, heated oil transferred from a reservoir through manifold 157 (FIG. 29) and through a pipe 159 connected thereto and to oil retainer sleeve 972, enters the rearmost of annular channels 277, is split and flows clockwise and counterclockwise downward around the runner extension, and exits at the six o'clock position in the forward direction through a notch 277A into a forward adjoining annular channel 277 where the oil is again split and flows upward to the top and forward through another notch 277A. The oil follows a similar forward path through all channels and exits the bottom of the frontmost one through a pipe 277B (shown broken away) which directs it to an entrance (not shown) in bottom oil manifold 277C bolted to runner 288. From manifold 277C the oil passes upward through the runner out through two holes 277D (FIG. 31) similarly positioned forward of the runner extension front face 952, to a top manifold cover 277E (shown broken away) on top of the runner (see FIGS. 29, 29C), which passes the oil to a heater for reheating the recycling through the first zone. The second zone or system is comprised of peripheral oil channels 277F which run along the rear and front faces of the runner block (see FIG. 31). The oil enters bottom oil manifold 277C through a port 160 for a channel 162 which through cross channels (not shown) directs the oil to oil channels 277F which in turn direct the oil upwardly through channels 277F to top oil manifold 277E, which directs it to a reservoir for reheating and from which it is transferred through a pipe (broken away) connected to port 160 for recycling through the second zone. The oil for the third zone or system enters bottom oil manifold 277C through a port 164 for a channel 166 which, through cross channels (not shown) directs the oil to oil channels 277F which in turn (FIG. 30), direct the oil upwardly through the oil channels 277G, to a common discharge (not shown) at the top of runner 288, which directs the oil to a reservoir (not shown) for reheating and from which it is transferred through a pipe (broken away) connected to port 164 for recycling through the third zone.

It will be understood by those skilled in the art that any suitable oil flow path and direction can be employed.

A conventional oil heating system (not shown) is employed in injection cavity bolster plate 950 for heating injection cavities 102.

The Valve Means, Drive Means and Mounting Means

The Sleeve

Figures 78, 79, 80:
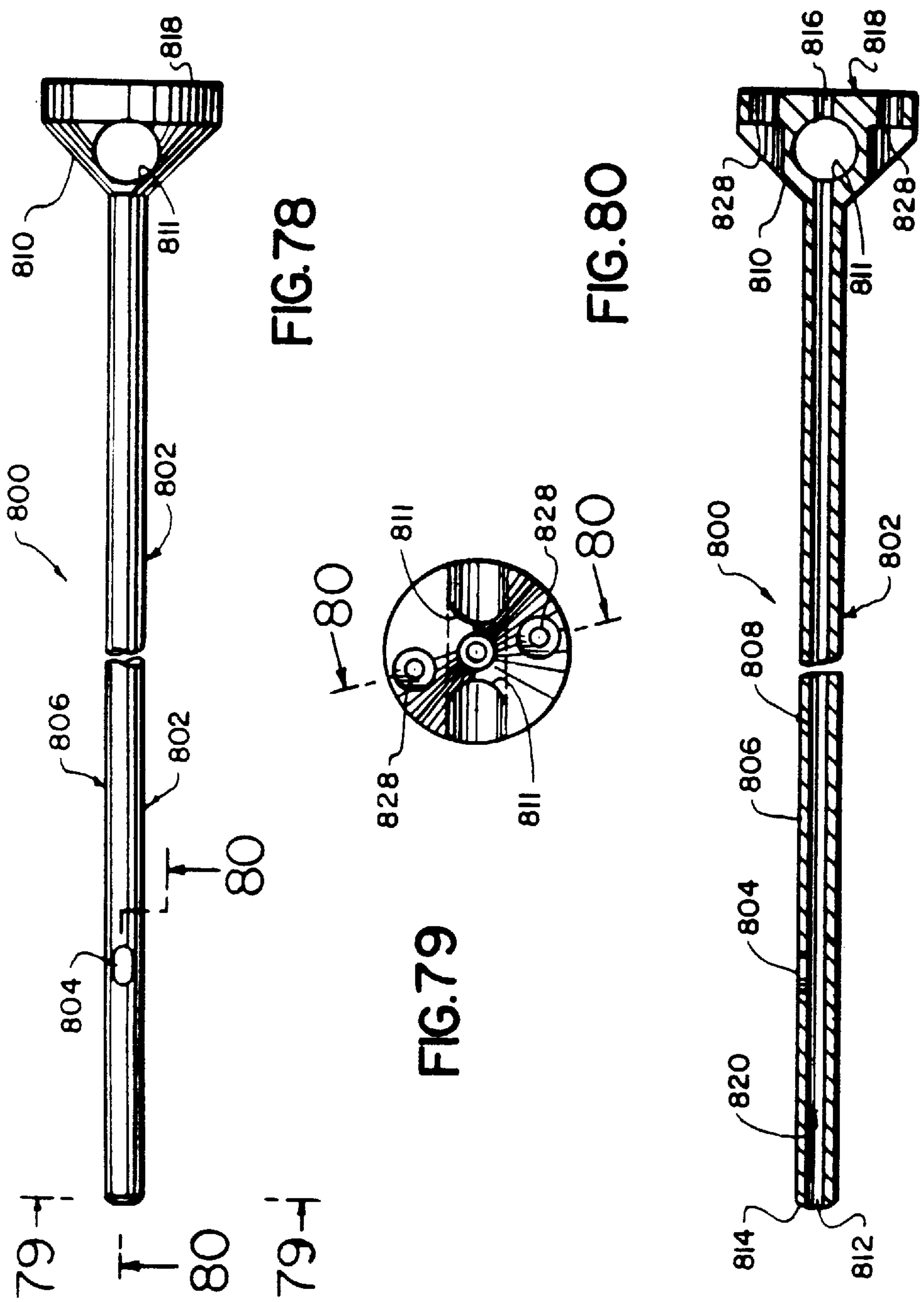
FIG. 78 is a side elevational view of a preferred embodiment of the hollow sleeve of the preferred valve means of this invention.

The structure comprising the nozzle valve means or valve means included within the co-injection nozzle means of this invention, and associated drive means for the valve means will now be described in greater detail, having reference to FIGS. 78–105. The valve means includes hollow sleeve 800 which is comprised of an elongated tubular member 802 (shown foreshortened), having an internal axial polymer flow passageway or bore 820, having a wall 808 and at least one port 804 in the wall at its forward end portion 806 and communicating with passageway 820, and having a back end portion shown in the form of a frustoconical mounting flange portion 810 which contains pressure relief vent hole 811. Sleeve 800 has a mouth 812 defined by an annular tapered lip 814 at its forward end, and an opening 816 in its rear face 818. The sleeve and mouth are adapted to provide a polymer stream orifice in communication with the central channel at least adjacent the trailing lip of the second or fourth orifices. In the preferred embodiment, the thickness of the wall 808 of the sleeve is 47 mils, the outer diameter of the sleeve is 250 mils, the tapered lip 814 is at a 45° angle, and the axial distance from the mouth 812 of the sleeve to the intersection of the taper with the outer surface of the sleeve is 47 mils. Mouth 812 and opening 816 communicate with axial bore 820 which runs the length of the sleeve. Sleeve 800 is mounted in the apparatus of this invention for reciprocal movement through the respective central channels 390 of feed block 294 and 546 of nozzle assembly 296. There is a close tolerance slip fitting between the internal diameter of the feed block central channel wall 391 and the outer surface of sleeve wall 808 of from about 0.0005 to about 0.0013 inch, and between the internal diameter of the nozzle assembly inner shell central channel 540 and the outer surface of sleeve wall 808 of from about 0.0002 to about 0.001 inch. Slip fitted about the circumference of sleeve 800 and mounted within bore 379 of the axially extending feed block threaded extension 378 are two annular sealing rings 819 (see FIG. 42A) for preventing polymeric material from being dragged rearward on the sleeve and thereby being pulled rearward out of feed block 294 when the sleeve is reciprocated in the rearward direction. Holding sealing rings 819 in place within threaded extension bore 379 is a sealing ring retaining cap 821 threaded onto extension 378. Feed block 294 is retained in axial position in bore 822 of runner block 288 by a lock ring 824 threaded within threaded bore 826 (see FIGS. 30, 31). As shown in FIG. 80, the frustoconical mounting flange portion 810 has two holes 828 bored axially therethrough for receiving shoulder screws 830 (FIG. 96) which pass through shims 831 and spatially mount the sleeve rear face 818 onto the forward face of suitable mounting and driving means, herein shown in the preferred form of a sleeve shuttle, generally designated 860 (see FIGS. 88–92, 95–97, 99 and 100–103).

The Pin

Sleeve bore 820 is adapted to carry additional nozzle valve means or valve means, preferably in the form of an elongated solid shut-off pin 834 (shown foreshortened) (FIG. 81), preferably having a pointed tip 836 at the forward end of its shaft 837, and a protruding annular head 838 at the rear end of shaft back end portion 840. In the preferred embodiment, the diameter of shaft 837 of pin 834 is 156 mils, the tip 836 is conical at a 45° angle, and the axial distance from the point of the tip to the intersection of the conical surface of the tip with the cylindrical surface of shaft 837 is 78 mils.

Pin 834 is mounted in the apparatus of this invention for reciprocal movement within and through the bore of sleeve 800 by suitable mounting means which comprise a portion of the driving means of this invention. The sleeve is mounted in the nozzle central channel, and the pin is mounted within the sleeve bore in a close tolerance slip fit sufficient to prevent a significant accumulation or passage of polymeric material between the slip fit surfaces. The amount of material in the plane of an orifice or in the port of the sleeve is not considered significant within this context. Pin 834 is adapted to have head 838 seated in a tight slip fit within a seat 842 cut into a suitable mounting and driving means preferably comprising a pin shuttle 844 (shown in FIGS. 82–87, and 97). Pin shuttle 844 is a solid rectangular-like member having attached to each of its sides suitable means, such as one of a pair of mounting ears 846 cocked at an angle, for cooperatively providing the shuttle with sliding reciprocal movement within cooperative, angled cam guide slots 848 of pin cam bars 850 (FIGS. 85, 85A) which are included within the drive means of this invention.

Figure 86:
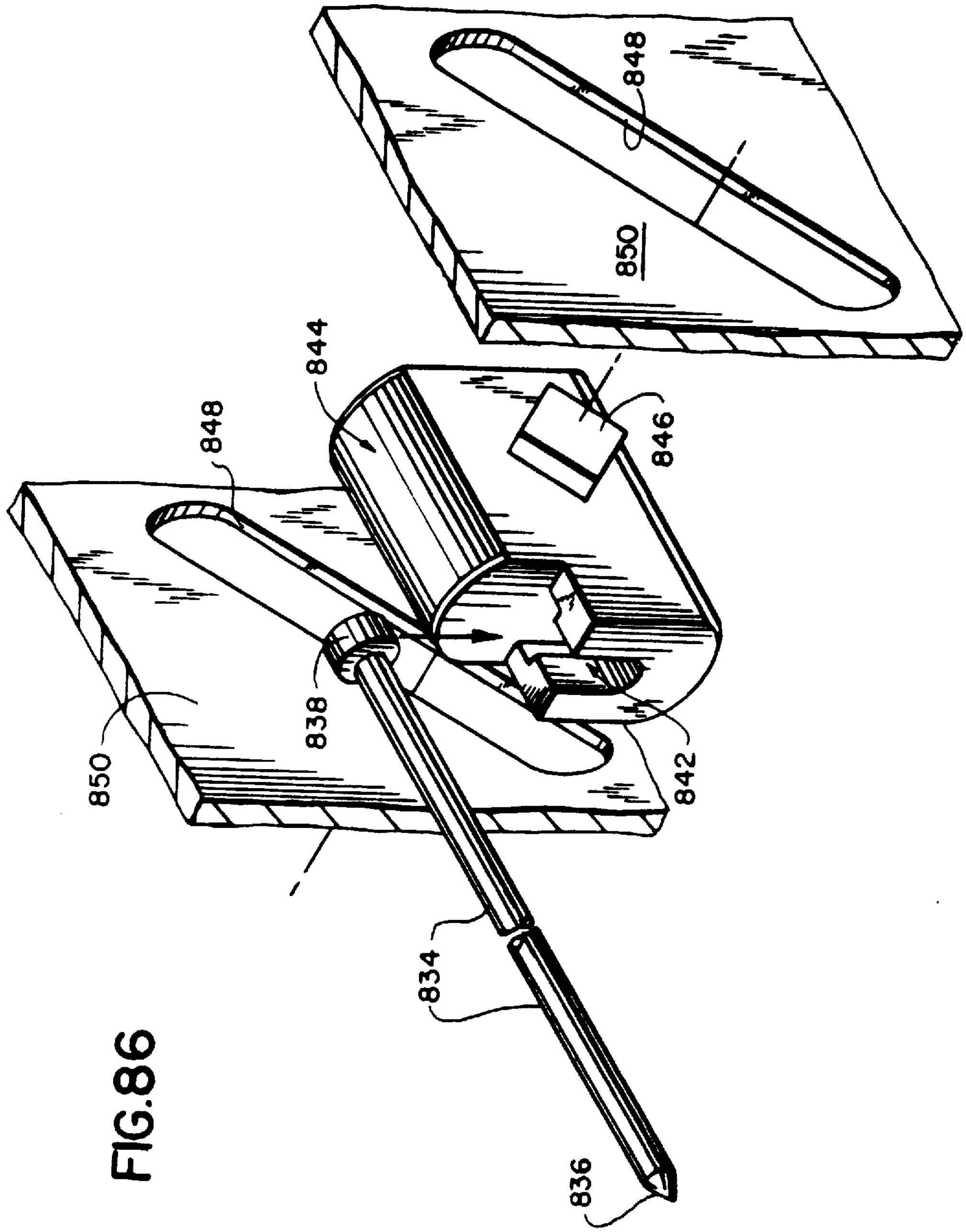
Figure 87:
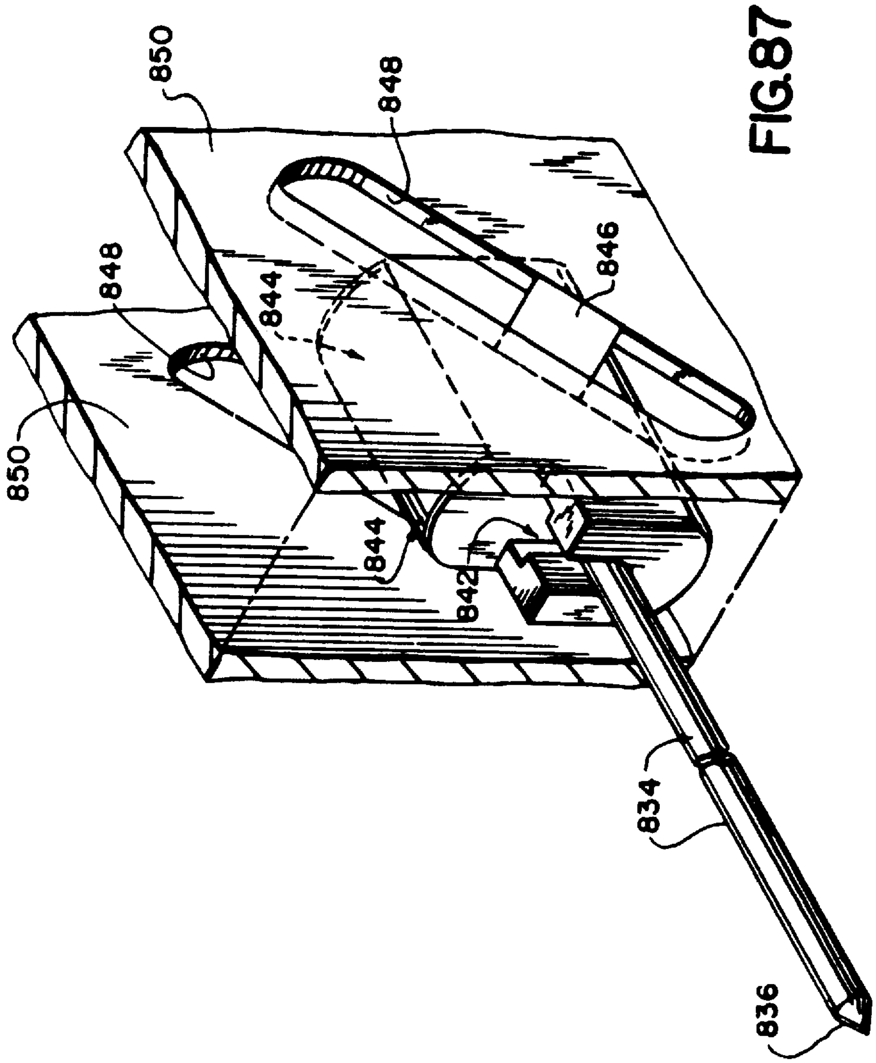

Each pin cam bar 850 of each pair of pin cam bars has cut through its thickness at its top end portion a hole 851 for connecting the bar to other portions of the drive means for effecting reciprocal movement of the pin cam bar. Each bar has cut through it and along its length, a set of four equally spaced, equally angled, identical cam guide slots 848. Pin shuttle 844 is mounted between and on the pair of spaced, juxtaposed, parallel pin cam bars 850 by ears 846 which are slideably seated within the juxtaposed cooperative slots 848 in each juxtaposed cam bar (FIGS. 86, 87). Two pairs of pin cam bars are employed in the apparatus of this invention, one pair positioned rearward of each perpendicular row of four nozzled assemblies. Each pair of juxtaposed slots 848 of the juxtaposed pin cam bars 850 receives the ears of a pin shuttle, which in turn holds a solid shut-off pin 834 which reciprocates within, and acts as valve means for, one of the four nozzle assemblies aligned along one of the perpendicular row of nozzle assemblies in the eight-up nozzle assembly apparatus of this invention. Each set of four solid pin shuttles 844 which straddle each pair of pin cam bars 850 are mounted behind one of sleeve cam bars 856 (FIGS. 93A, 94–98 and 100–102), such that each pin 834 passes through a sleeve shuttle 860, through a sleeve cam bar 856 on which the sleeve shuttle is mounted, and through a sleeve 800 which in turn, with the pin in it, passes through a feed block 294 and finally through a nozzle central channel 546. Movement of pin cam bars 850 and sleeve cam bars 856 substantially simultaneously and coordinatedly, vertically up and down in accordance with the preferred embodiment, drives or moves each group of associated sleeve and pin shuttles, and their sleeves and pins, substantially simultaneously as cooperative nozzle valve means and achieves substantially simultaneous valving action for each of the nozzle assemblies with respect to which they operate. This system provides substantially simultaneous, coordinated and controlled, substantially identical valving action with respect to each nozzle assembly in the eight-up nozzle assembly apparatus of this invention.

The mounting and drive means of the injection molding apparatus also includes eight sleeve shuttles. Each sleeve shuttle 860 (FIGS. 88–92) is comprised of a cylindrical member having an axial bore 862 extending through it for receiving and allowing reciprocal movement of solid pin 834. Each shuttle 860 includes a vertical slot 864 extending therethrough, defined by a pair of juxtaposed inner walls 866, and a knuckle 868 having the bore 862 running therethrough. Sleeve shuttle forward face 872 has an annular chamber 873 cut axially therein and which communicates with bore 862 which in turn communicates with slot 864. Face 872 also has two holes 867 therein for receiving the shoulder screws 830 (see FIGS. 95, 96) which mount the sleeve 800 onto the face of the sleeve shuttle. The sleeve shuttle outer surface has radially and axially extending lubrication reservoirs, generally designated 859 for accumulation grease fed to them and the interior surface of bore 902 in sleeve cam base 900 by grease channels 170 (FIG. 31).

The drive means for the eight-nozzle injection molding apparatus includes two pairs of sleeve cam bars 856. Each sleeve cam bar 856 (FIGS. 93, 93A, 94) has four identical angular slots 874 cut through its thickness. Each slot is adapted to receive a sleeve knuckle 868 in it for mounting a sleeve shuttle 860. The sleeve cam bar also has a hole 876 bored through the thickness of its bottom end portion for connecting the bar to other portions of the drive means for effecting reciprocating movement of the sleeve cam bar. Each sleeve cam bar 856 also has four identical, narrow, spaced, longitudinal edge slots 878 cut through the width of the bar from its forward edge 880 to its rear edge 882. Each edge slot 878 is positioned to communicate with an angular slot 874. Referring to FIGS. 95 and 96, each sleeve shuttle 860, including its internal knuckle 868, is comprised of two mirror image pieces 858 each mountable onto either side of sleeve cam bar 856 when the knuckle portions of each piece are abuttingly joined to each other within angular slot 874 by suitable means, here by the close tolerance slip fit of the outer peripherial surface of the abuttingly joined pieces 858 and the interior surface restriction of axial bore 902 in sleeve cam base 900. (See FIGS. 97, and 99–103). Alternatively, the pieces may be bolted together. Each knuckle portion is preferably machined to be one piece or integral with its shuttle piece. Each whole knuckle is about 0.010 inch wider than the width of the sleeve cam bar on which it is mounted to provide a gap between the side walls of the cam bar and the sleeve's inner walls 866. Each sleeve shuttle 860 is slideably mounted onto sleeve cam bar 856 with its knuckle 868 slideably seated within and operatively engaged with a slot 874. The drive means includes suitable axial travel variation compensation means, here including a spring to compensate for any axial play in the drive means or valve means or between them, and for any deviation in dimensions of the involved structures. Therefore, sleeve 800 is mounted onto sleeve shuttle 860 by positioning a helical compression spring 888 rearwardly into a slip fit within sleeve shuttle annular chamber 873. Spring 888 has an outside diameter of a free length of one inch and a scale rate of 193 pounds per tenth of an inch. The free length of the spring is longer than the axial length of chamber 873 and the width of the gap between sleeve shuttled forward face 872 and sleeve rearface 818. The scale rate is the predictable pounds per unit length of one-tenth inch compression. The spring is pre-loaded with one-hundred pounds spring compression when shoulder screws 830 are fully seated in their holes 867. The reason for pre-loading is to compensate for, i.e., eliminate or alleviate any possible axial play between the sleeve shuttle 860 and sleeve 800. For example, it prevents axial play between the sleeve shuttle and sleeve due to plastic pressure exerted on lip 814 of sleeve 800. The shuttle moves forward to seat sleeve tapered lip 814 against the matching angular edge 460' of the inside of nozzle cap 438 (See FIG. 77A), and, once seated, the shuttle continues to move another thirty-second of an inch further forward while the sleeve remains stationary, to assure seating of the angular interface and a pressure seal to block and prevent B material from entering the nozzle gate 596. The additional thirty-second of an inch movement compresses and is absorbed by the spring 888. The spring had been precompressed to 75 mils and maintained in that condition by the assembly of the shoulder screws in their holes 867. Thus, when the sleeve is retracted, the shuttle moves one thirty-second of an inch rearward to release the compression before the sleeve itself moves. This provides leeway should there be any slight deviation in the relative lengths of the respective sleeves 800 and/or in the dimensions of the components or shells of the nozzle assemblies. Sleeve rear face 818 is moved backward against the bias of the spring and is bolted to sleeve shuttle forward face 872 by shoulder screws 830 in a manner that leaves a gap between the sleeve rear face and the shuttle forward face (see FIG. 97). This gap allows for the thirty second of an inch additional movement of the sleeve. Shims 831 are employed between shoulder screws 830 and frustoconical mounting flange portion 810. The thicknesses of the shims is selected to compensate for dimensional non-uniformities in the valve means and in shuttles and cam bars of the drive means. Solid shut-off pin 834 is mounted to extend through sleeve cam bar edge slot 878, through sleeve shuttle slot 864, knuckle bore 862, annular chamber 873, spring 888, and finally through bore 820 of sleeve 800. The height of edge slot 878 permits sleeve cam bar 856 to reciprocate vertically and thereby drive sleeve shuttle 860 to reciprocate axially on the cam bar through bore 902 of sleeve cam base 900 while pin 834 is extending horizontally through each of them.

The manner in which sleeve shuttle 860, pin shuttle 844 and their respective cam bars 856, 850 are assembled within the apparatus will now be described (FIGS. 30, 31, 97–105). Each pin cam bar 850 is inserted for vertical reciprocation within a pin cam bar slot 890 cut vertically through pin cam base 892 and its forward face 893 and through pin cam cover 894 and its rear face 895. In an eight-up multi-polymer nozzle assembly injection molding machine, there are preferably four pin cam bars in two spaced parallel pairs (FIGS. 31, 98). Solid pin shuttle 844 is seated for horizontal, reciprocal movement within a horizontal bore 896 cut through both pin cam base 892 and pin cam base cover 894. Each sleeve cam bar 856 is inserted for vertical reciprocation within parallel sleeve cam bar slots 898 cut vertically through the sleeve cam base plate 900. When sleeve cam bar 856 reciprocates vertically, sleeve shuttle 860, having its knuckle 868 seated within sleeve cam bar slot 874, reciprocates horizontally in a close tolerance fit within and through sleeve shuttle bore 902 cut horizontally through the entire depth of sleeve cam base plate 900 and sleeve cam base cover 901. The sleeve cam bar edge slot 878 permits pin 834 to pass through sleeve cam bar 856 as the bar reciprocates vertically. Because sleeve shuttle bore 902 is larger than pin shuttle bore 896, and because sleeve shuttle bore 902, which extends through the sleeve cam base 900 and through sleeve cam base cover 901, is longer than sleeve shuttle 860 itself, there is sufficient clearance to permit horizontal reciprocation of sleeve shuttle 860 through both the sleeve cam base 900 and the base cover 901 such that rearward over-travel of the sleeve shuttle is prevented by the portion of the front face of pin cam base cover 894 which surrounds the pin shuttle bore 896. Forward over-travel of the sleeve shuttle is limited by the axial lengths of the cam bar slots.

Any suitable drive means can be employed for independently and simultaneously driving the valve means of this invention, here shown as including solid pin 834, and sleeve 800, in accordance with the method of this invention. The drive means for pins 834 include pin mounting means preferably in the form of pin shuttle 844, and the drive means preferably including pin cam bars 850. As shown in FIGS. 29, 29C, 30, 31, 99, 100 and 104, the preferred driving means for simultaneously driving pins 834 and pin shuttles 844 also includes servo-controlled pin drive cylinder 906 attached to mounting bracket 908 and having manifold 907 and servo valve 909 (FIG. 100), and the drive cylinder's connecting members including, and by which it is connected through, cylinder piston rod 910, drive frame 912 whose lower horizontal bracket 913 has a pair of spaced, depending ears 914, through bolts 916 passing through the ears, to the two pairs of spaced pin cam bars 850. Each cam bar 850 of each pair is spaced from the other and extends vertically downward through slots 890 in pin cam base 892 and its cover 894. Programmed, servo-controlled vertical movement of piston rod 910 simultaneously drives each pair of cam bars 850 up and down, and, by means of angled cam guide slots 848, simultaneously drives all shuttles 844, and drives all pins 834 seated therein forward and backward within bores 896 and through the apparatus, particularly through all nozzle assemblies 296 in accordance with the methods of this invention.

Looking now at the bottom of FIGS. 29, 29C, 99 and 100, the preferred driving means for simultaneously driving sleeves 800 and sleeve cam bars 856, and their mounting means, preferably in the form of sleeve shuttles 860, further includes servo-controlled sleeve drive cylinder 918 attached to mounting brackets and having a manifold 919 and servo valve 921 (FIG. 100), and the drive cylinder's connecting members including, and by which it is connected through, cylinder piston rod extension 920, bracket 922 and through bolts 924, to each sleeve cam bar 856. Programmed servo-controlled vertical movement of piston rod 920 simultaneously drives each cam bar 856 up and down through cam bar guides, and, by means of angular slots 874 in each cam bar, simultaneously drives all sleeve shuttles 860 forward and backward through their respective bores 902 and simultaneously drives all sleeves connected thereto through the apparatus, particularly through all nozzle assemblies 296 in accordance with the methods of this invention.

In the method of this invention, the operation of the drive means is controlled by the control means, sometimes referred to herein as a control system. By the control means, the drive cylinders 906 and 918, are programmed to operate in a desired independent yet simultaneous mode which includes simultaneous and non-simultaneous operation of all sleeves relative to all pins. The drive means, a long with other features of the invention, independently yet simultaneously provide the same valve means action in each of the eight co-injection nozzles or nozzle assemblies. The terms "same" or "identical" as used with respect to the inventions contemplated herein, means as much the same as possible given minor insignificant dimensional variations of structures due for example, to machining of parts. Thus, the terms "same" or "identical" as used in the description and in the claims includes the meaning "substantially the same" or "substantially identical." Likewise, the term "simultaneous" as used in the description and claims includes "substantially simultaneously." This permits the same initiations, flows, terminations and sequences of polymer flow in each nozzle assembly, consequent simultaneous injection of the same multi-polymer streams having the same, balanced characteristics from all eight nozzle orifices and the formation of parisons of the same materials and having the same characteristics in all eight juxtaposed blow mold cavities. Included within the control means, are the servo control drive means and programs and the one or more microprocessors with respect to which the drive means are cooperatively associated. The servo control drive means for driving the drive cylinders 906 and 918 are suitably programmed and operated by a microprocessor to operate the eight sleeves and eight pins independently but simultaneously as discussed, and in the desired mode.

The programmed servo controlled vertical movement of the piston rod 910 for simultaneously driving each pair of pin cam bars 850, as well as the programmed servo controlled vertical movement of piston rod 920 for driving each sleeve cam bar 856 is effected by means of a programmed microprocessor, described in conjunction with the processor control system set forth below. In brief detail, the drive cylinders 906 and 918 are driven by supplying hydraulic fluid to the drive cylinders by means of a servo controlled valve, operating in accordance with pre-programmed instructions in a microprocessor, described hereinabove as the second processor unit, and described in further detail in conjunction with figures set forth hereinafter. More specifically, and as shown in FIG. 29, drive cylinders 906 and 918 are energized by means of hydraulic fluid flow operated and controlled by means of a servo system which opens and closes the valves permitting fluid flow to enter therein. The position of each of the piston rods of drive cylinders 906 and 918 and their associated cam bars 850 and 856, respectively, are monitored by means of position sensing mechanisms, consisting of a position transducer and a velocity transducer, schematically respectively shown as 918A and 918B in FIG. 99, and 906A and 906B in FIG. 104. The precise nature of the movements of the cam bars 850 and 856 requires an accurate means of determining the actual position thereof. As was described hereinabove in conjunction with the ram servo mechanisms, the system is controlled in accordance with the first pre-programmed system processor for controlling major machine functions and a second processor pre-programmed to coordinate the movements of the ram servos with the movements of the cam bars. The movement of the cam bars controls the specific sleeve and pin positions for the purpose of allowing polymer melt to enter from the feed channels into the nozzle central channels at the appropriate times for producing the article in accordance with the desired sequence of the present invention. These relative movements, which will be described in further detail below, are pre-established in the second processor for moving the cam bars by driving the hydraulic drive cylinders 906 and 918 in accordance with the predetermined pattern. It is specifically important that the pin and sleeve movements be correlated and coincide with appropriate ram pressures, determined by ram servo energization, so that the desired result in accordance with the invention may be achieved. Specifically, the second processing unit is programmed to simultaneously coordinate all five rams and the cam bar movements, one with the other, in order to achieve the desired flow characteristics through the nozzle channel as has been described hereinabove. The resultant overall effect of the control system is to provide separate control of each ram pressure and of the pin and sleeve in accordance with the predetermined temporal profile for controlling the flows of plastic melt materials at the nozzle output in determined amounts and at determined times from the different supplies.

It will be understood that while the nozzle valve means of the present invention have been described in terms of a preferred pin and sleeve embodiment, other, equivalent structures for the valve means and drive means will be appreciated by those skilled in the art after having read the present description. For example, the valve means may comprise a sleeve 620 (illustrated in FIG. 106) axially moveable back and forth in the nozzle central channel and also rotatable therein, as by suitable rack and pinion drive 622 in which rotation of the pinion or gear wheel 624, attached to or formed as a part of sleeve 620, causes rotation of the sleeve. Rotation of sleeve 620 may also be effected by suitable key-link drive bar structure 626 (FIG. 107). Axial movement of the sleeve selectively blocks and unblocks one or more of the nozzle orifices to selectively prevent or permit flow of polymer streams, for example of polymers B, E, C and D, into the nozzle central channel. Selective rotation movement of the sleeve brings the aperture 804 in the wall of the sleeve out of and into alignment with a nozzle flow passageway, which may be keyhole passageway 440, for a polymer stream, for example of polymer A, to selectively prevent or permit flow of the polymer stream into the nozzle central channel.

In another alternative embodiment (not specifically shown), employing the hollow sleeve of the present invention, the aperture 804 in the wall of the sleeve may be selectively blocked and unblocked by rotation movement, for example by suitable modification of the rack-pinion or key-link means described above, of the adjacent nozzle shell 430 to prevent or permit flow of polymer into the internal axial flow passageway 803 within the sleeve. Alternatively, a check valve 628 (FIG. 108) may be included within the flow passageway 634 for the polymer which flows within the sleeve. The check valve may, for example, comprise a ball 629 urged by one end of a spring 630 against a seat 631 in passageway 803. The opposite end of spring 630 abuts the end of a hollow inner sleeve 632 which is inserted into friction fit engagement within the sleeve 633. In a further alternative embodiment (FIG. 109), employing the sleeve of the present invention and a modified form 636 of the preferred inner shell 430 (FIG. 51), the flow of polymer from channel 637 in shell 636 into the axial passageway 803 within the sleeve is blocked and unblocked by reciprocal movement of a tapered, spring-loaded sliding valve member 638 housed in a channel 640 formed in shell 636 and which member is biased to the closed position by spring 639 and is urged to its open position by a predetermined increase in pressure of the incoming polymeric material.

Figures 81, 82, 83, 84:
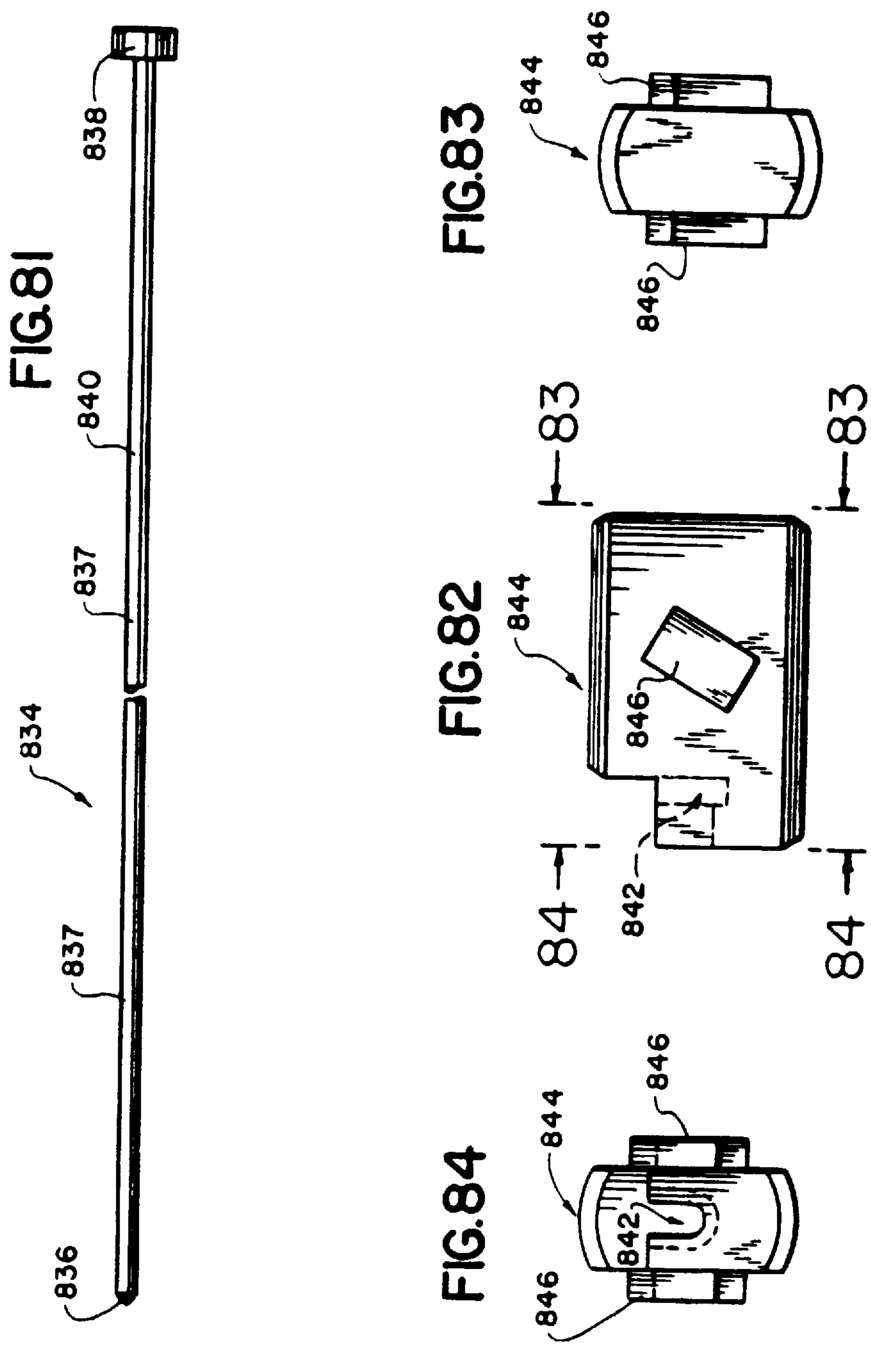

Yet another alternative embodiment (FIG. 110) employs the sleeve of the present invention and a modified form 642 of the preferred pin 834 (FIG. 81). Modified pin 642 has its forward end portion 643 formed into a flatted shaft having a semi-circular cross-section. Flow of polymeric material through the aperture 804 in the wall of the sleeve 800 into internal flow passageway 803 of the sleeve may be selectively prevented or permitted by selectively blocking or unblocking the aperture 804, by selective rotation of pin 642 within the axial channel 803 of the sleeve, to bring the flatted portion 644 out of, or into, alignment with aperture 804.

In a preferred embodiment, illustrated in FIGS. 111–116, the flow of the five polymer streams is selectively controlled by the combination of the sleeve of the present invention with means for blocking the sleeve port here shown as a fixed member, such as solid pin 648. It will be understood that the aperture 650 in the wall of the sleeve is suitably enlarged to permit the hereinafter described flow of polymer streams. It will also be understood that the tip 594 of nozzle cap 438 is modified to enlarge the diameter of a portion 652 of channel 595 to accommodate the thickness of the wall of the sleeve (FIG. 112). Further, in this embodiment fixed pin 648 partially blocks a portion of feed channel 440. In this embodiment, an injection cycle comprises selective movement of the sleeve into six positions or modes to prevent or permit the flow of a selected one or more of polymer streams A through E. In the first position or mode (FIG. 111), the sleeve is in its forwardmost position, blocking orifices 462, 482, 502 and 522 to prevent flow of polymers B, E, C and D, respectively, and blocking the exit of inner feed channel 440 in inner shell 430 to prevent the flow of polymer A. In the second mode (FIG. 112), the sleeve is withdrawn sufficiently to bring aperture 650 into communication with feed channel 440 to permit flow of polymer A into the sleeve's internal axial polymer flow passageway 803 which itself is in the nozzle central channel 546. The orifices remain blocked. In the third mode (FIG. 113), the sleeve is farther withdrawn sufficiently to unblock orifice 462, permitting flow of polymer B into nozzle central channel 546. Polymer A continues to flow into passageway 803. The sleeve continues to block orifices 482, 502 and 522, preventing flow of polymers E, C and D. In the fourth mode (FIG. 114), the sleeve is farther withdrawn to unblock orifices 482, 502 and 522, permitting the flow of polymers E, C and D into nozzle central channel 546. The flow of polymer A continues. In the fifth mode (FIG. 115), the sleeve is withdrawn farther, such that pin 648 blocks the exit of feed channel 440, preventing flow of polymer A. Orifices 462, 482, 502 and 522 remain unblocked, permitting continued flow of polymers B, E, C and D. positioning the sleeve in this mode permits knitting or joining together of polymer C, forming a continuous layer of that polymer in the injected article. In the sixth mode (FIG. 116), the sleeve is moved forward to the same position as in the third mode, described above, permitting sufficient flow of polymer B to enable it to knit or join together and form with polymer A a layer which completely encapsulates, among other layers, layer C. In this mode, polymer A flows from feed channel 440 into passageway 803. The injection cycle is completed by moving the sleeve to its forwardmost position, in the first mode, illustrated in FIG. 111 and described previously. It is to be noted that the size of feed channel 440 and the axial position of the aperture or port in the sleeve wall and of the fixed pin in sleeve 800 can be varied by design to provide a variety of desired opening and closing possibilities and sequences.

Figure 70A:
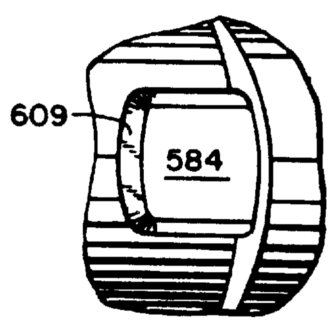
FIG. 70A is a top plan view with portions broken away showing a port in the upper wall of the outer shell of FIG. 70, as would be seen along line 70A—70A of FIG. 70.
Figure 70:
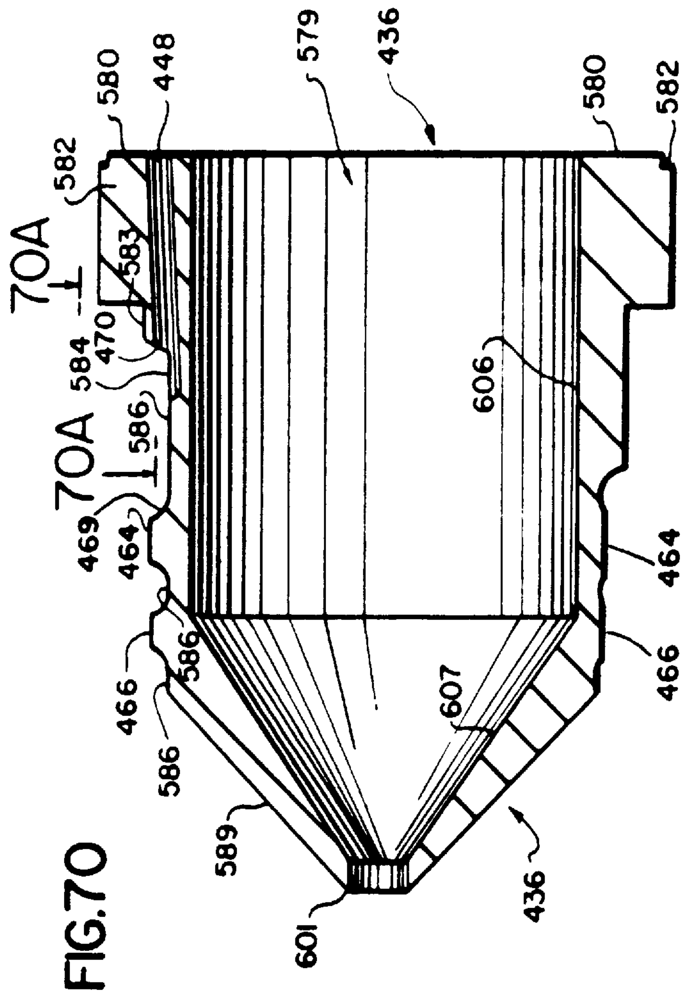
FIG. 70 is a vertical section taken along line 70—70 of FIG. 69.
Figure 72:
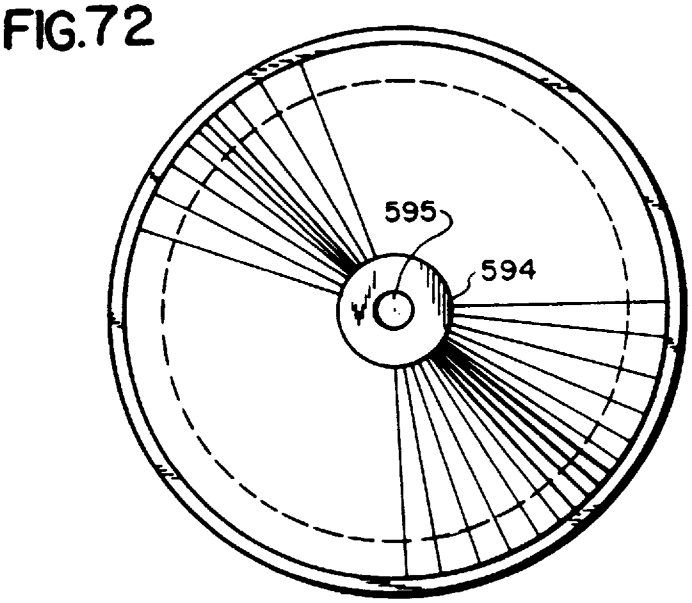
FIG. 72 is a front elevational view of the nozzle cap of FIG. 71.
Figure 73:
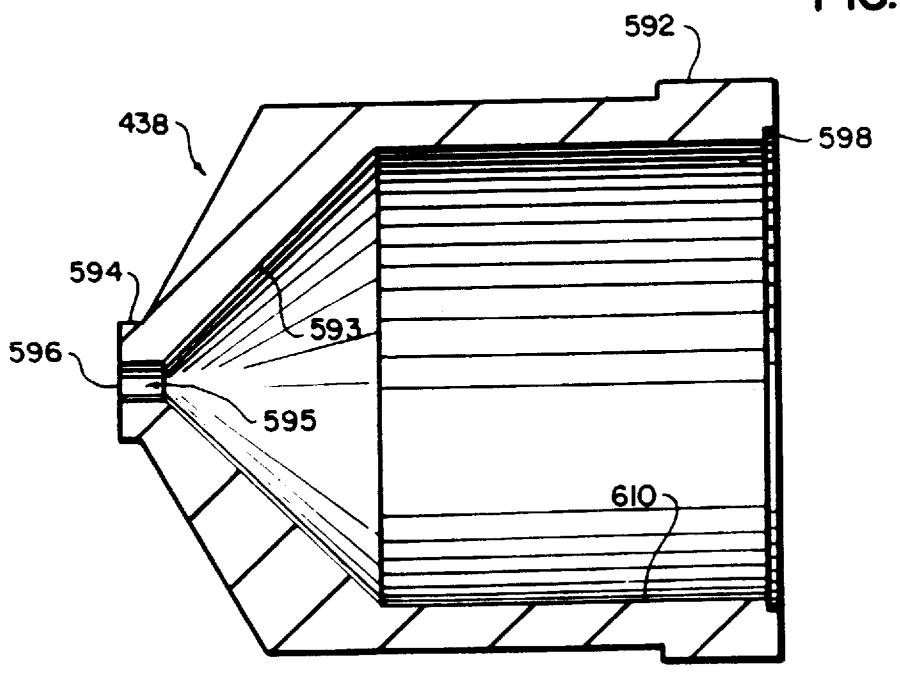
FIG. 73 is a vertical section taken along line 73—73 of FIG. 74.

In another embodiment, employing a solid pin, reciprocal movement of the pin in the nozzle central channel selectively blocks and unblocks inner feed channel 440 in inner shell 430 to prevent or permit flow of a polymer stream, for example polymer A. Flow of polymer streams D, C, E and B is selectively prevented or permitted by selectively blocking and unblocking communication between feed channel exit ports 411, 415, 417 and 418 in feed block 294 (FIGS. 41–43), and respectively associated feed channels 442 in inner shell 430 (FIGS. 51 and 53A), 444 in third shell 432 (FIGS. 57 and 57A), 446 in second shell 434 (FIG. 63) and 448 in first shell 436 (FIG. 70). Referring to FIG. 117, the selective blocking and unblocking of the feed channels, for example illustrative feed channels 654 and 655, may be accomplished by selective rotation of a suitably shaped rotary gate valve member 656 by means, for example, of suitable rack and pinion drive 657. It will be understood that the rear face of valve member 656 is formed to comprise one or more annular shoulders to fit within chamber 380 of the feed block (FIGS. 41 and 43) and that the front face of the valve member 656 contains one or more annular grooves to receive the shoulders of the nozzle shells. It will also be understood that valve member 656 contains other, suitably enlarged slots or channels to permit uninterrupted flow of the polymers, whose flow is not being controlled by rotation of valve member 656. Alternatively, the selective blocking and unblocking of the feed channels may be accomplished by selective rotation of a nozzle shell such as second shell 434 by means of a suitable rack and pinion drive (shown in phantom in FIG. 117). In this alternative embodiment, it will be understood that the flow channel for polymer A within the inner shell extends sufficiently far in the circumferential direction around the shell so that rotation of the inner shell to block flow of polymer D still maintains the feed channel exit port for polymer A in the feed block in communication with the entry feed channel for polymer A in the inner shell. In both of these embodiments, the means for preventing or permitting flow of the polymer streams through the nozzle central channel are at a distance from that channel and from the nozzle gate, and the degree of control over the start and stop of flow of the polymer streams may not be as precise as that obtained with the preferred embodiment of pin 834 and sleeve 800, described above.

In a further embodiment, illustrated in FIG. 118, the nozzle valve control means comprises sleeve structure having therein two axial polymer flow passageways. The sleeve structure comprises a cylindrical outer sleeve 660 having two apertures in the wall thereof, one aperture 661 being for flow therethrough of polymer D and the other 662 for flow of polymer A. An inner sleeve 664 has an aperture 665 in the wall thereof for flow of polymer A therethrough. The outer diameter of the forward portion of the inner sleeve is less than the inner diameter of the outer sleeve to form a polymer flow passageway 666. The outer sleeve is adapted for reciprocal axial movement within the nozzle central channel and the inner sleeve is adapted for reciprocal axial movement within the outer sleeve. The internal flow passageway 666 in the outer sleeve has a sealing land 667 of reduced diameter which cooperates with a portion of the outer surface of the forward portion of the inner sleeve to prevent or permit flow of polymer D into the nozzle central channel. Axial reciprocal movement of the inner sleeve brings the aperture 665 in the wall thereof into and out of communication with the aperture 662 in the wall of the outer sleeve to permit or prevent flow of polymer A through the apertures and into the axial channel 668 within the inner sleeve. The flow sequence is as follows. The inner sleeve 664 is withdrawn to bring aperture 665 into communication with the aperture 662 in the wall of the outer sleeve 660 to permit flow of polymer A. Next, both sleeves are withdrawn together as a unit to unblock orifice 462 to permit flow of polymer B. These movements of the sleeve may occur sequentially, as just described, to start the flow of polymer A before polymer B, or, if desired, substantially simultaneously, to start the flows of polymers A and B at substantially the same time. Alternatively, the flow sequence may begin by both sleeves being withdrawn together as a unit to permit flow of polymer B, followed by withdrawal of the inner sleeve sufficiently to permit flow of polymer A. Both sleeves are then further withdrawn to unblock orifices 482 and 502 to permit flow of polymers E and C, and at the same time the inner sleeve is further withdrawn to bring it out of engagement with sealing land 667 to permit flow of polymer D. Flow of polymer A is stopped by rotation of the inner sleeve relative to the outer sleeve to bring aperture 665 out of communication with aperture 662. Forward movement of the inner sleeve brings it into engagement with land 667 to prevent flow of polymer D and forward movement of both sleeves in unison blocks orifices 502 and 482 and stops flow of polymers C and E. Further forward movement of both sleeves in unison blocks orifice 462 and stops flow of polymer B. This embodiment provides semi-independent control of polymer streams A and D.

FIG. 118A schematically shows a sleeve 8000 adapted to provide an orifice cooperative with the central channel orifices for a flow stream passing axially through the sleeve central passageway 8200 from a source (not shown) exterior of the co-injection nozzle. More particularly, FIG. 118A shows co-injection nozzle means similar to that shown in FIG. 121, except that the co-injection nozzle embodiment itself herein designated 750 does not have a third passageway or orifice therein and that port 8040 in the wall sleeve is adapted to communicate with a passageway or channel of a feed block or other structure (not shown) exterior of the nozzle, for providing in the preferred method the polymeric material melt flow stream which is to flow through the sleeve central passageway 8200 when pin 834 is sufficiently withdrawn, and to form the inside structural layer A of the article.

Another embodiment of the nozzle means of this invention is that schematically shown in FIG. 118B, which shows a co-injection nozzle embodiment 752 having a central channel generally designated 1546 comprised of a plurality of communicating stepped cylindrical portions, herein designated 760, 762, 764 and 766, having different diameters and formed and defined in part by the respective tips of the frustoconical portions of nozzle shells 1430, 1432, 1434, and 1436. Sleeve 8000' is mounted in a close tolerance slip fit within the central channel combining area. The sleeve's outer wall has stepped cylindrical portions 761, 763, 765 and 767 respectively joined by interstitial tapered annular walls which abut the passageway outer walls OW of shells 1432, 1434 and 1436 and which cooperate with the stepped cylindrical walls to block the orifices of passageways 480, 500 and 520. The tapered lip 1814 of sleeve 1834 does not abut the outer wall of the first passageway 460. That passageway is shown blocked by the wall of sleeve 8000'. Pin 1834 is mounted in a close tolerance slip fit and is axially moveable within sleeve central passageway 1820. The nose of pin 1834 has an annular tapered wall 1837 which communicates with the radially outermost wall of the pin and which is adapted to abut portion 601' of nozzle cap outer wall OW which forms first passageway 460. Tapered wall 1837 communicates with a cylindrical protruding nose 1835 whose wall is adapted to slip-tolerance fit within channel 595 in nozzle cap 1438. The embodiment shown in FIG. 118B is meant to represent and to include within the scope of this invention, those valve means structures adapted to block to stop and unblock to start the flow of the E, C and D layer materials substantially simultaneously relative to one another.

FIG. 118C schematically shows an enlarged portion of a co-injection nozzle embodiment 754 having internal passageways 1480, 1500 and 1520 and their respective orifices 1482, 1502 and 1522 radially further removed from the central channel and in communication with a main or second passageway 1501 having its main orifice 1503 in communication with the nozzle central channel 546. Orifice 1503 in this embodiment is sometimes referred to, and can be considered as the internal or second orifice. The polymer material melt flow streams which flow from orifices 1482, 1502 and 1522 can combine in main passageway 1501 and flow from orifice 1503 as a combined stream into the central channel. This orifice arrangement can therefore provide the three internal layer materials, that is, internal layer C flanked by intermediate layer materials E and D, as one internal layer or stream for forming a three material internal layer for the articles of this invention. In other embodiments (not shown), the tips of nozzle shells 434' and 432' can be of different radial distances from the axis of the nozzle central channel, and only one of them can be radially removed from the central channel. Preferably, the axial distance from the leading lip of the main orifice to the trailing lip of that orifice is from about 100 to about 900 mils, more preferably from about 100 to about 300 mils.

A particular advantage provided by the valve means of this invention relates to the physical arrangement of the orifices. Their very close proximity to each other coupled with the capability of the valve means of very rapidly blocking and unblocking all of the orifices, is highly advantageous because it provides to the process the ability to effect very rapid changes in pressure at the orifices. This, coupled with pressurization, provides to the process the capability of effecting highly desirable rapid onset flows of a material into the central channel. Rapid unblocking and blocking is particularly important with respect to the internal orifices of a five or more layer process with respect to which it would be highly desirable that the initiation of flow of the E, C and D layer materials be effected at the same time, and that the termination of their flows also be effected at the same time. Given the staggered physical arrangement of their orifices in embodiments wherein they individually communicate with the nozzle central channel, the high rapidity of movement of the valve means in positively unblocking and blocking these orifices with pressurization minimizes the effects the arrangement has on opening one orifice before another. The valve means of this invention utilized in a co-injection nozzle having at least first and second orifices, can unblock all of the orifices within a period of about 75 centiseconds, desirably within about 20 centiseconds, and preferably within about 15 centiseconds. With respect to such a co-injection nozzle wherein the first orifice has its center line within about 350 mils of the gate, the second orifice has its center line within about 250 mils of the center line of the first orifice, and the leading lip of the first orifice and the trailing lip of the second orifice is no greater than about 300 mils apart, the valve means of this invention are adapted to move to a position which blocks all orifices and to a position which unblocks all orifices within about 75 centiseconds. With respect to a nozzle embodiment which has at least three fixed orifices, two of them being close to the gate, the first being proximate the gate, the second being adjacent the first orifice, and the third orifice being remote from the gate, wherein each of the first and second orifices are narrow and annular, combining area of the central channel has an axial length of from about 100 to about 900 mils, and the leading lip of the first orifice is within about 100 to about 900 mils of the gate, the valve means of this invention can unblock all orifices within from about 15 to about 300 centiseconds, preferably within from about 15 to about 75 centiseconds. Such rapid unblocking of all orifices can also be effected with respect to a nozzle having at least three orifices wherein the combining area has an axial length of from about 100 to about 900 mils, the leading lip of the first orifice is within about 100 to about 900 mils of the gate, and the center lines of each of the first and second orifices lie substantially perpendicular to the axis of the central channel. With respect to such a co-injection nozzle, the valve means can be utilized such that the elapsed time between the allowing of all materials to flow through the orifices and the subsequent preventing of the flow of all materials from their orifices is from about 60 to about 700 centiseconds, preferably from about 60 to about 250 centiseconds. Further in relation to such co-injection nozzles, and with respect to preventing the flow of polymer material through the second orifice while allowing flow of structural material through the first, the third or both the first and the third orifices, and then for allowing flow of polymer material through the second orifice while allowing material to flow through the third orifice, the valve means of this invention are adapted to effect both of said steps within about 250 centiseconds, preferably in about 100 centiseconds.

The valve means of this invention are physical means for positively physically blocking, partially blocking or unblocking and thereby controlling the flow of polymer melt stream material from co-injection nozzle orifices into the nozzle's central channel. This capability provided by the valve means obtains many advantages, some of which will now be described. The positive control provided by the physical valve means avoids problems that occur without valve means, such as having to synchronize the pressure of all streams or layers at all points in the injection cycle in order to avoid problems of cross-channel flow or back flow from the central channel into one or more of the orifices, or from one orifice into another. It also avoids the problem of premature flow through an orifice of any or all of the respective layers. For example, as can be more easily understood in connection with FIGS. 118D and 118E, when the A and B layer materials are flowing in the central channel of a co-injection nozzle, they create a pressure in the central channel, referred herein to as the ambient pressure. The pressure, for example, of internal layer C material at the orifice, absent physical valve means, has to be very carefully controlled to be just equal to or slightly below the pressure of the flowing A and B materials. If the pressure of the C layer material is greater than that of the A and B layer materials, the C layer material will prematurely flow into the channel. If the pressure is too low relative to the pressure of the A and B materials, either or both of the A and B layer materials will back flow into the C orifice. It may be possible to compensate for the back flow of A and/or B material into the C passageway by altering the timing of when the C passageway pressure level is high enough to start flow, that is, by increasing the pressure exerted on the C material earlier than it would be exerted if there were no back flow, to force the A and/or B materials back out of the C orifice, and such that C will enter the central channel at the same time as it would have without the back flow.

Another advantage of the positive control provided by the physical valve means of this invention, is that the valve means physically block the orifices and thereby allow for substantially high prepressurization levels to be obtained prior to injection of one or more of the materials into the central channel, substantially higher levels than would be possible without the valve means. Despite the high prepressurization, physical blocking of the orifices prevents premature flow and back flow. Without valve means, reliance must be placed on the very sensitive and critical control and synchronization of the pressure balancing of the respective materials. The ability to prepressurize one or more of the respective flows with valve means in turn provides additional advantages. For example, as will be explained, prepressurization is essential for obtaining simultaneous and/or uniform, rapid onset or initial flow over all points of an orifice into the central channel and for obtaining a uniform leading edge about the annular flow stream of a material. As will be explained, this is particularly important with respect to the internal layer C material. Another of the many advantages of prepressurization is that given the nozzle design of this invention which provides a primary melt pool of polymer melt material adjacent each orifice, prepressurization overcomes non-uniformities in design or in machine tolerance variations of the nozzles, the runner system, and the flow directing or balancing means, e.g., the chokes. It also helps overcome temperature non-uniformities of the runner system including the nozzle passageways. Without physical valve means for blocking the orifices, the process is limited to the aforementioned synchronized, sensitive, lower levels of prepressurization and there would be differences in the pressure levels obtained at the corresponding respective orifice in each of the plurality of co-injection nozzles of a multi-coinjection nozzle injection blow molding machine. Even with the nozzle design of this invention which provides a primary melt pool adjacent to the orifices, if the polymer melt material in each primary melt pool is not pressurized, it would not provide a rapid onset flow once the orifice is unblocked. Additionally, prepressurization assures that the primary melt pool at each corresponding orifice in each of the respective nozzles will have the same level of pressure prior to initiation of flow; therefore, the injected articles, for example the parisons would, with prepressurization and valve means, tend to be more uniform at each injection cavity than without valve means and/or without higher prepressurization levels.

Still another advantage provided by the physical valve means of this invention is that in providing the capability of physically blocking and unblocking the respective orifices, there is provided an improved capability of starting and stopping the respective flows in the sequence required to permit the formation of articles of very high quality wherein the internal layer is continuous and substantially completely encapsulated. More particularly, the physical valve means are adapted to block physically and to stop cleanly the flow of the layer A polymer flow stream material while the C layer material is flowing. This permits the layer C material to come together and knit in the central channel of the nozzle and be continuous at the sprue of the injected article.

Other advantages provided by the valve means of this invention, especially by the preferred sleeve and axially reciprocable pin embodiment, are that they can be employed to assist in knitting the internal layer (or layers) with itself in the central channel, and/or in encapsulating said layer (or layers) with either or both of the outer B and/or inner A structural or surface layer materials. Preferably, the valve means are used to, in the same operation, assist in both knitting and encapsulating the internal C layer material(s). With respect to knitting, for simplicity, reference will be made to only the internal layer material. To knit it, preferably, the moveable pin blocks the orifice of the A layer material and then the pin moves the A material ahead of it into the central channel while the B and C layer materials are flowing. When the pin stops short of the sleeve lip, the C layer material knits. Then the valve means blocks the flow of the C layer material while the B layer material is flowing. To encapsulate, the knit by one method, the sleeve and pin, while flush, are moved forward advancing the knit toward the gate while the B layer material covers it. Finally, the B layer material encapsulates the knit as the knit is pushed through the gate. The preferred method of knitting and encapsulating is to move the sleeve and pin forward with the pin inset upstream within the sleeve, as will be explained with reference to FIG. 77A. That Figure shows the conical nose or tip 836 of pin 834 axially inset upstream within sleeve 800 in the central channel of a co-injection nozzle to provide an area within the sleeve forward end for accumulation of polymer material therein. Prior to or while moving the valve means axially forward through the nozzle combining area towards the gate, polymeric material for example for forming the inside surface layer A from third annular orifice 440, can be accumulated or maintained in the forward inset area in front of the pin tip and within the sleeve, which material can be used to assist in encapsulating the internal layer C material in the combining area of the central channel. Preferably, the pin is moved forward relative to the sleeve to eject most of the material in front of it and thereby enhance the encapsulation of the internal layer. The pin can be inset as desired although if it is inset too little, the knit will be acceptable but there may be an insufficient amount of retained material to completely encapsulate the layer. This may of course be acceptable for certain container applications. Insetting the pin too far may result in a thin knit of the C layer material. The assistance of the valve means and the inset method is most effective when A layer material is accumulated and used for encapsulating, particularly when the A and B layer materials are the same, or when they are interchangeable or compatible.

The valve means can also be used advantageously in combination to flush, clear or purge polymer material from the combining area or from whatever portion or extent of the central channel desired. When the sleeve has moved fully forward through the central channel of the preferred nozzle assembly of this invention, its tapered lip 814 abuts against a matching surface portion 460' of the leading wall of the first passageway 460 (See FIG. 121), and if desired, the pin may be moved further forward into channel 595 of nozzle cap 438 to clear that remaining area of the central channel of polymeric material, say, before or at the termination of an injection cycle.

An important benefit provided by the physical valve means of this invention is for repetitively precisely timing the starting, flowing and stopping of the respective flow streams for each cycle. This in turn provides for uniformly consistent characteristics in the articles formed in each cavity, each cycle. The valve means of this invention are also adapted to block the flow of the respective materials in a sequence which is not the reverse of the unblocking sequence.

It will be understood that the valve means of this invention, especially the preferred dual valve means comprised of the sleeve and moveable shut-off pin, are adapted to and can be modified and utilized to block and unblock some or all of a plurality of co-injection nozzle orifices in a variety of combinations and sequences as desired.

Still another advantage provided by the physical valve means of this invention is that rapid cycle times are obtained, even for long runner systems. A "long runner system" here means one channel or runner, or a plurality of communicating channels or runners through which a polymeric melt material flows to a nozzle and which extend(s) upstream about 15 inches or more from the axis of the nozzle central channel (See FIGS. 118F and 118G). As mentioned, the valve means allow for rapid and high levels of prepressurization. This shortens the time required to build up the necessary pressure for initiation of the flow of C, it provides a rapid onset flow and it shortens the actual injection cycle time, as compared to cycle times without valve means and prepressurization. The physical, positive blockage of the respective orifices provides for rapid and precise termination of flow at the end of each injection cycle, prevents leakage or drooling into the channel, and avoids long cycle time delays due to lengthy pressure decays for the termination of flow.

In a long runner multi-cavity injection molding machine without valve means, the long response time and delay of pressure in the eye of the nozzle would make it difficult to knit or encapsulate the C material in the combining area of the central channel without cross flow of one material into the orifice of another material.

Particular reference will now be made to FIGS. 118D and 118E which show, for a multi-cavity injection molding machine having a long runner system, a comparison of pressure versus time, in the combining area of co-injection nozzles, with and without valve means operative in the combining area. More particularly, FIG. 118D shows that without valve means there is zero pressure in the nozzle prior to the start of the flow of any of the polymeric materials, and that upon initiation of injection of the A and B layer materials into the central channel due to ram displacement, the ambient pressure due to flow of the A and B materials into the central channel is represented by the curve having short lines of equal length. The pressure and flow of the internal layer material C with or without other internal layers is represented by the curve having long and short dashed lines. It represents a build-up of pressure of C which must be synchronized to the ambient pressure development of the A and B materials but which is at a slightly lesser pressure such that C does not flow into the central channel. At a certain desired point of time represented by the X on the time abscissa, the pressure of the C material is increased such that at a pressure level indicated as $P_1$, all pressures are equal, and just after that point in time, the C material flows into the central channel while the A and B materials are there flowing. This is represented by the solid line curve in the upper portion of the Figure.

With valve means, prior to opening any orifices, there is a residual pressure in each of the passageways. In FIG. 118E, this pressure is arbitrarily selected to be represented as $P_L$ for the A and B layer materials. At time zero, there is no melt in the central channel (the valve means is there blocking the orifices) and thus the ambient pressure is zero. As soon as the valve means opens an orifice (A and/or B), ambient pressure rapidly develops to the level of $P_L$. Due to flow restrictions as the injection cavity is filled, the ambient pressure must gradually increase by appropriate ram displacements in order to maintain the flow of A and B.

In the meantime, the internal orifice (here for simplicity, the orifice for the C layer material) is physically blocked with the valve means, the pressure of the C material in the passageway at that orifice (shown as long and short dashed lines) is maintained at (or increased to) the level indicated by P2 in the drawing. At the time represented by point X on the abscissa, the valve means allows C material to start to flow into the central channel combining area. Thereafter, all of the materials A, B and C flow into the central channel and the ambient pressure rises accordingly as indicated by the solid line. A comparison of FIGS. 118D and 118E shows that the valve means operative in the nozzle central channel permits the materials in the passageways to be prepressurized, the level or prepressurization can be significantly high, pressurization is easily controlled, (back flow of polymer material, either from the central channel or another orifice into the orifice of a different material is prevented) and the allowance of pressure build up with the valve means, regardless of runner length, eliminates having to closely synchronize the relative pressures of the internal layers with the ambient pressure of the A and B materials flowing in the central channel. A comparison of the Figures also shows that due to the prepressurization of the A, B and C materials, the flow rate of the three materials in FIG. 118E is greater than the flow rate of those materials in FIG. 118D.

FIGS. 118F and 118G are comparisons of cycle times of multi-cavity injection molding machines having long runner systems, with and without valve means. In FIG. 118F (co-injection nozzles without valve means), after the end of injection there is very gradual decay of pressure of say about 40 to 50 seconds for a long runner system. This gradual decay delays the start of the next cycle. Without a positive means for blocking the respective orifices, such a long delay is necessary to avoid undesired flow of material from the orifices into the central channel prior to the next injection cycle. This is to be compared with FIG. 118G wherein the same multi-cavity injection molding machine with the same long runner system and co-injection nozzles having operative therein valve means wherein at the end of injection, the respective orifices are immediately and very rapidly blocked to prevent flow of material into the central channel. The positive blockage of the respective orifices permits rapid replenishment of material into the passageways and rapid initiation of repressurization of the system to ready it for the next cycle. Thus, with valve means the time delay between cycles is greatly reduced. Also the overall length of the injection cycle is greatly reduced.

The valve means of this invention are, however, not without limitations. First, there is a limit on the amount of pressure that can be imparted to the blocked material in the nozzle passageway. While this is not a problem at the pressure levels utilized in accordance with this invention, beyond the limit, polymer melt flow material would tend to leak from the orifice into the central channel and might back flow into another orifice. A second limitation is that given the nozzle design wherein the passageways are provided in a certain axial order, the valve means, when combined with high levels of prepressurization, limit the process to a sequence dictated mostly by the design, for example, to opening say the internal orifices for the E, C, and D layer materials in that order, that is, E before C and C before D, and to blocking the orifices in the reverse order. Given the physical locations of and distances between the respective orifices, upon opening of the orifices, the E material will enter the central channel before C, and C before D. Therefore the leading edge of the annular stream of E layer material might tend to slightly axially precede the leading edge of that of the C layer material and likewise the leading edge of the C layer material might tend to slightly axially precede that of the D layer material. With this sequential pattern of initiation of flow into the central channel, in certain circumstances, there may tend to be delamination in the resulting injection molded article between the C layer and the inner structural material layer or less than desired side wall rigidity, should there be no or an inadequate amount of D adhesive adjacent to and interior of the leading edge of the C layer material. This might arise due to the axially offset upstream location of the D layer material leading edge relative to the C layer material leading edge. However, it has been found that in accordance with the methods of this invention, this tendency can be overcome by initiating positive displacement of and prepressurizing the E layer material in its passageway while its orifice is blocked with the valve means. The prepressurization is to a level which creates an abundance of E material at its blocked orifice, which abundance, upon removal of the blockage, initially flows into the central channel in a manner that the leading edge of the C layer stream flows into and through the abundance of E layer material, and such that the E layer material flows radially inward toward the axis of the central channel about the leading edge of and to the interior of the C layer material, and joins with the leading edge of the D adhesive material. This fully encapsulates the leading edge of the C layer material flow stream with intermediate adherent layer material and thereby prevents delamination between the C and A layer materials. It should be noted that without valve means, there is no such sequential limitation dictated by nozzle design. The D layer material flow can be initiated prior to initiation of the C layer material flow and prior to E layer material flow, or all flows can be initiated simultaneously since the means for moving the polymer material, e.g., the rams can be utilized to independently initiate flow of the respective flow streams. Thus without valve means there is no limitation on the sequence of opening and closing of the internal orifices. However, it is felt that the advantages of using valve means by far outweigh the aforementioned limitation and therefore preferred embodiments of this invention employ the valve means of this invention.

The Pressure Contact Seal

In injection molding machines, it is imperative that during their operation at on-line temperatures, there be an effective pressure contact seal between each sprue orifice and each juxtaposed nozzle orifice, particularly between each injection cavity sprue orifice and juxtaposed injection nozzle orifice. "Effective" herein means that during operation, all of the respective juxtaposed orifices are aligned axial center line to axial center line, and there is a constant, uniform, full, non-leaking pressure contact seal between and about the faces of the juxtaposed sprues and nozzles. "Effective" herein also means operative and that each, any, or all of the aforementioned requirements of alignment, constancy, fullness, non-leakage and uniformity need not be absolutely present but can be substantially present. Misalignment or an improper pressure seal contact causes leakage, loss of pressure, and often improperly formed plastic articles.

In the case of conventional single or unit cavity injection molding machines, obtaining and maintaining an effective pressure contact seal between one injection nozzle orifice with one sprue cavity orifice is not a significant problem. In such machines, the fixed platen is located between the moveable platen and the injection nozzle. The tool set and the injection cavity are comprised of two matching portions, each attached to a juxtaposed face of the moveable and fixed platens. The injection nozzle is moved leftward into the cavity sprue in the right side of the fixed platen and it is sealed thereagainst by hydraulic pressure. Alignment of the cavity sprue orifice and nozzle orifice is not a problem because each is mounted on the axial center line of the machine and because the cavity sprue is a female pocket and the nozzle is a matching male configuration, such as a ball nozzle. Alignment and a pressure contact seal is obtained because the injection nozzle is mounted onto the front face of the extruder which does not deflect and which is hydraulically driven to maintain the pressure contact seal.

However, with respect to multi-cavity, multi-nozzle injection molding machines, obtaining and maintaining proper alignment and a constant, uniform pressure contact seal between all nozzles and sprues has heretofore been attempted to be obtained by thermal expansion of its structure. This has been a significant problem. In one such machine, thermal expansion of the runner was relied on to obtain and maintain an effective pressure contact seal between the multiple injection nozzles and cavity sprues. This meant the machine had to be at high operating temperatures and tended excessively to force and compress the injection nozzles against the cavity sprues with the result that at lower temperatures, there was a gap between the juxtaposed nozzles and sprues caused either by insufficient thermal expansion or by excess metal compression. The resulting gap phenomenon causes polymer leakage and greatly limits to a narrow range the temperatures at which the machines can effectively operate without nozzle leakage or breakage. For one such machine, the operating temperature range was about 450° F. to about 455° F. These factors thereby limit the polymer materials utilizable to those which can be employed within the narrow temperature range. Also, in some conventional multi-nozzle injection machines, the runner is attached to the fixed platen by bolts which often break due to a temperature differential between the runner and the bolts, such as when the former is at a higher temperature and thermally expands faster than the bolts. Further, in multi-cavity, multi-nozzle, single-polymer injection machines, the forward injection pressure of polymers from the multitude of injection nozzles during injection and purging cycles, creates a great amount of back pressure which forces the runner and injection nozzles backward and thereby creates a gap or separation and leakage at the injection nozzle cavity sprue interfaces.

This invention does not rely on thermal expansion to obtain and maintain an effective pressure contact seal. This invention overcomes the previously mentioned problems, and provides and maintains through a virtually open range of on-line operating temperatures of at least from about 200° F. to 600° F. and higher, an effective pressure contact seal between all nozzles and sprues, particularly all eight juxtaposed injection nozzle sprues or orifices and injection mold cavity sprue orifices.

Alignment of Nozzles and Cavity Sprues

Figure 11:
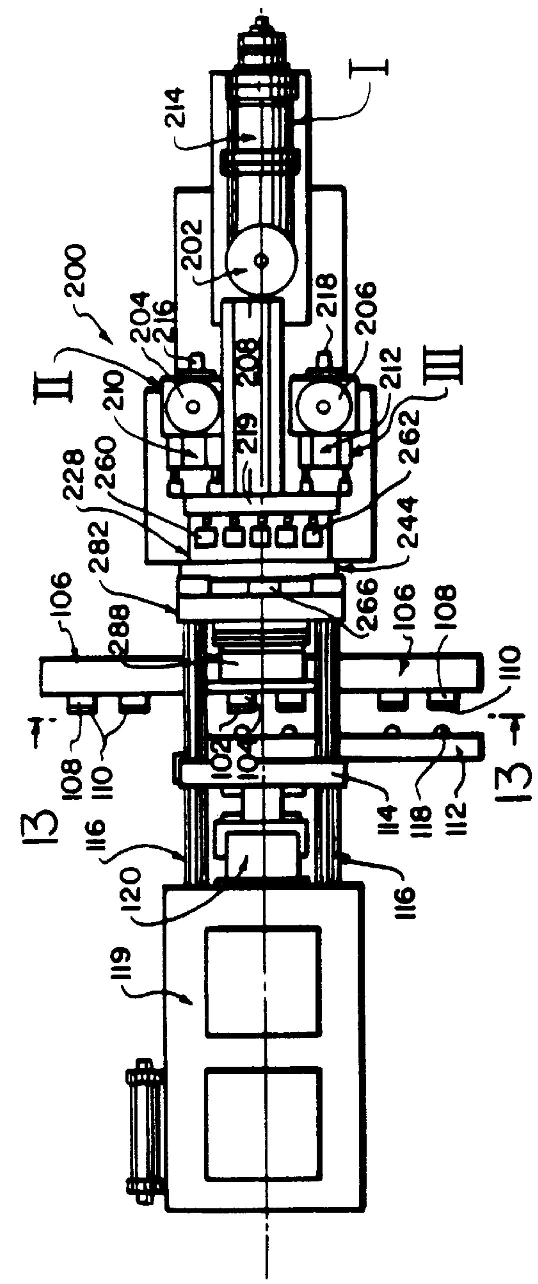
FIG. 11 is a top plan view of an injection blow molding line which includes apparatus of this invention.
Figure 12:
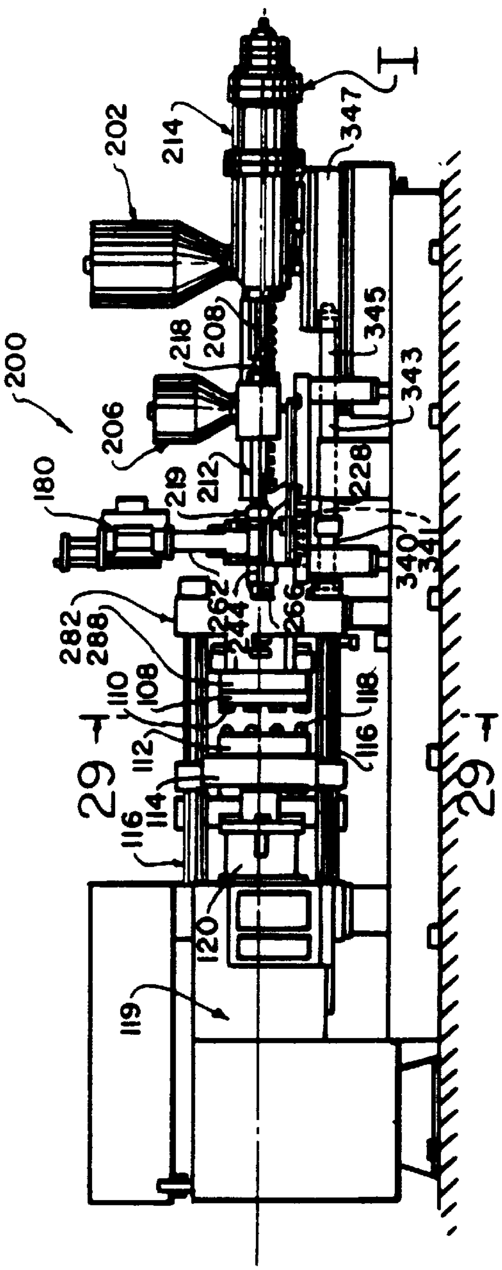
FIG. 12 is a side elevational view of the injection blow molding line of FIG. 11.
Figure 13:
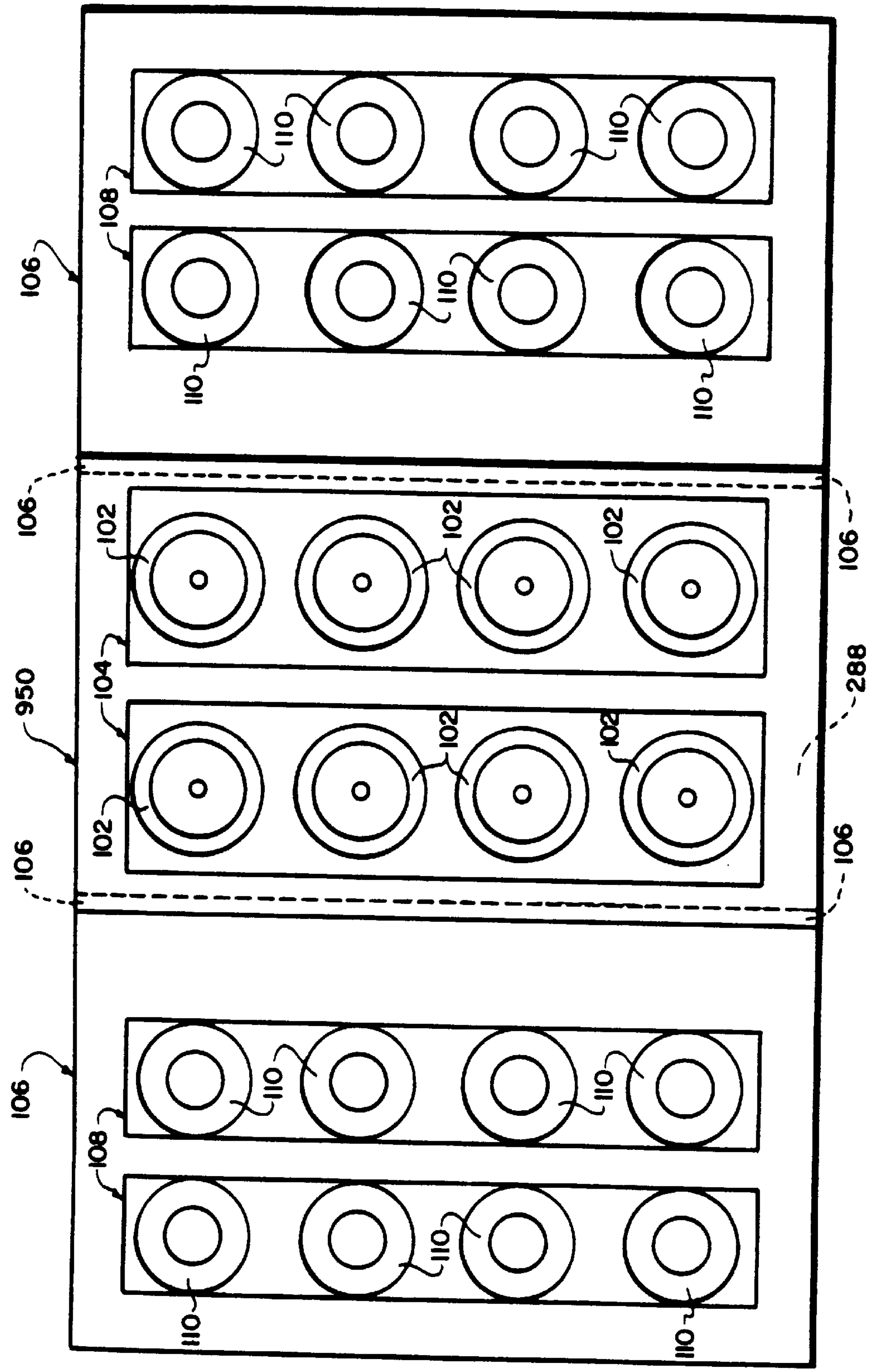
FIG. 13 is an elevational view of a portion of the apparatus with portions omitted, as would be seen along line 13—13 of FIG. 11 or of FIG. 98.

Alignment of parts is obtained and maintained by the following, interrelated operating conditions and portions of the structure of the machine. These structural elements and conditions cooperate to achieve and maintain alignment of the injection nozzle and cavity sprue orifices. Initially, there will be described the structures and conditions which relate to the runner block and its components. First, the runner block and all of the components mounted therein are maintained at substantially the same operating temperature. Therefore, all of these structures and components expand and contract together. This permits the apparatus to obtain and maintain on-stream alignment of the center lines of, and the matched seating of, the injection nozzle and cavity sprue orifices, the manifold extension nozzle and runner extension sprue orifices, and the polymer flow channels. Second, because runner block 288 is supported at its center at one end by its pilot pin 951, supported by and through the injection cavity bolster plate, C-standoff, adjusting screws and tie bar, and at the other end by the oil retainer sleeve flange which is supported by and through the fixed platen, and because it has a rectangular shape (FIGS. 29, 29A), when the runner block is heated, its center line moves upward to a precisely predictable desired point. Third, as shown in FIG. 29A, the runner block and its components can be moved upwardly to a precise desired hold dimension set position for operation by means of front and rear pairs adjusting screws 117, each screw of each pair being horizontally aligned with and parallel to the other of the pair, one screw of each pair being on each side of the runner block. The adjusting screws are threaded through C-standoff horizontal members 128 and bear upon non-moving tie bars 116 which pass through moveable platen 114 and are fixed at their forward ends to a rigid housing which houses the drive means 119, and at their rearward ends to fixed platen 282 (FIGS. 11, 12). The pair of adjusting screws at the forward end of the machine is located close to blow mold bolster plate 106 and the rearward pair is positioned just forward of the fixed platen. Since the blow mold bolster plate is bolted by socket head cap bolts 130 to fixed platen 282 through the vertical members 124 and horizontal members 128 of C-standoffs 122, turning the adjusting screws in one direction raises the C-standoffs, and, through the tying together of the respective structures, raises the blow mold bolster plate, injection cavity bolster plate 950, the runner block and the nozzle assemblies mounted therein. Once the adjusting screws are in the hold dimension set position for operation, all twenty-two bolts 130 which are tied to the fixed platen are tightened to a locked position. This locks the entire runner block and the runner extension in a fixed centered position. Upon heating to the desired operational temperature, the rectangular shaped runner block and the runner extension can float radially out from its center during thermal expansion to a predicted, desired hold dimension set position relative to the center point of the moveable platen whereat the injection nozzle and cavity sprue orifices and all flow channels in the various structures are operationally aligned along their axial center lines.

There will now be described a second group of structures which cooperate to provide alignment of the injection nozzle and cavity sprue orifices. Herein are two nozzle assembly-related design features. The first is that the tips of nozzle caps 438 have flat faces 439 which match flat faces on each injection cavity sprue. This provides a flat sliding interface between the respective structures to allow for thermal expansion of the runner and movement of the nozzles and nozzle caps mounted therein without fracturing one or more of the nozzles, sprues or other structures. Conventional round-nosed nozzles and matched concave sprue pockets do not permit such sliding interfacial actions without often breaking or damaging a sprue or nozzle tip or some other structure. The second is that the diameter of the central channel 595 at the orifice of the gate 596 of the injection nozzle is smaller than that of the sprue orifice, whereby the perimeter of the orifice of each channel 595 at the gate will still be encompassed within the diameter of each sprue opening even when there might be a slight misalignment of the axes of channels 595 and juxtaposed sprues, due, for example, to variations of nozzle-sprue dimensional specifications, variations in the operating temperatures of the nozzles or of the runner block at different process conditions, and changes in temperatures required by the injection of different sets of polymers. In the preferred apparatus, the diameter of the orifice of channel 595 in the tip of the nozzle is 0.156 inch and the diameter of the sprue is 0.187 inch. One added advantage which arises from the different diameters is that it promotes breakage of the polymer melt in or at the area of the interface of the nozzle cap and cavity sprue.

Floatation of the Runner Means

There will now be described a third group of structures and operating conditions which cooperate to obtain and maintain center line alignment of sprue and nozzle orifices. According to this aspect of the invention, the runner means which includes a runner or runner block 288, and runner extension 276 are mounted on, and are free to float axially on the absolute center line of the apparatus. They are mounted by mounting means in a minimum contact, gap-surrounding, free-floating manner which allows them thermally to expand and contract axially and radially from the center line, while maintaining the center line mounting and alignment. In particular, as shown in FIGS. 14, 17, 30, 31, 119 and 120, the runner means, including runner block 288 and all of its attached components, including runner extension 276, whose front face is bolted to the runner block by bolts (not shown) which thread into bolt holes 953 in the front face 952 of the runner extension, are freely supported at the forward end of the apparatus by means of pilot pin 951 which is mounted on the axial center line of the runner extension, is totally encapsulated in cut out 970 in the runner extension's forward face, and runs through the front portion of and has its axial center line on and along the axial center line of runner block 288. Pilot pin 951 is anchored and, therefore, not free to move axially relative to the runner assembly. It protrudes forward through a plain bore 945 in the runner block and through a matched diameter axial supporting bore 956 in injection cavity bolster plate 950. Pilot pin 951 rests on or is mounted on and the weight it carries is borne by the lower arcuate wall portion of the injection cavity bolster plate bore 956. The weight of the runner block and its attached components not borne by the pilot pin and the wall of bore 956 is ultimately borne by fixed platen 282. Ribbed middle portion 279 of the runner extension (see FIGS. 30, 31) is tolerance-fit mounted within a cylindrical oil retainer sleeve 972 which is bolted by bolts 980 to the runner extension through the sleeve's radially inwardly directed flange 974. The sleeve has a main bore defined by a cylindrical wall whose internal surface 975, in cooperation with runner extension annular fins 281, form the outer boundaries of annular oil flow channels 277, and a secondary bore formed by annular surface 978, whose internal diameter is controlled to contact the outer surface of the runner extension rear end portion 278. The flange's outer surface 980 is piloted to fit within and contact the wall which defines an axial supporting bore or first bore 982 in fixed platen 282. The rear portion 278 of the runner extension extends through fixed platen second bore 984. As seen in FIG. 31, since the only contact between the oil retainer sleeve and any other structure is that between its outer flange and the fixed platen first bore, the weight of the runner means, including the runner block and its components, including the rear portion of the runner extension, which is not borne by pilot pin 951, is borne at that place of contact by the fixed platen. Thus, the entire weight of runner block 288 and all components mounted therein, such as T-splitters 290, Y-splitters 292, feed blocks 294, nozzle assemblies 296, and runner extension 276, is supported by pilot pin 951 and oil retainer sleeve flange 974 and is respectively borne by injection cavity bolster plate 950 and fixed platen 282. The runner means or entire runner block 288 and runner extension 276 are free to float axially as a unit due to thermal expansion or contraction, because of the sliding tolerances between the inside diameter of bore 956 in the injection cavity bolster plate and the outside diameter of the pilot pin, and between oil retainer sleeve flange 974 and the wall of fixed platen first bore 982, and because of the clearance or gap, generally designated G, which surrounds the runner block and its components, including the runner extension. The gaps occur between runner extension rear portion 278 and fixed platen second bore 984, between the forward face of the fixed platen and the rear face of oil retainer sleeve flange 974, between the oil retainer sleeve outer diameter and the common bore 986 running through nozzle shut-off assembly 899 which is comprised of sleeve cam base cover 901, sleeve cam base 900, pin cam base cover 894, and pin cam base 892, between the rear faces of the runner block and of components attached to the runner block, such as annular retainer nut 824, and sleeve cam base cover 901, between the outer sides of runner block 288 and the surrounding structure such as posts 904 and 962, and between runner block forward face 289 and the rear face of injection cavity bolster plate 950. This minimum contact, gap-surrounding arrangement provides a virtually free-floating system which allows the runner block and its components, including the runner extension, to maintain their axial center line mounting while they expand and contract radially and axially, and float virtually freely axially due to changes in operating temperatures. By minimizing contact between the runner block and its components with adjacent or surrounding structure, which are at lower temperatures, the arrangement minimizes heat loss to those structures and helps to obtain and maintain substantial temperature uniformity throughout the runner means, particularly in the runner block and with respect to the plurality of nozzles mounted therein.

Additional structure according to the present invention cooperates with the previously-described structure to assist in providing a total system which establishes and maintains the unique, constant, uniform, full and non-leaking aspects of the effective pressure contact seal between each of the manifold extension nozzles and runner extension female pockets, and particularly at and about the interface between each of the eight injection nozzles and their juxtaposed cavity sprues.

The total system includes structures which in combination absorb or compensate for the total rearward pressure exerted by the clamping force of moveable platen 114, the injection nozzle-cavity sprue separation pressure (also referred to as injection back pressure) caused by the forward injection of polymers under pressure through the eight injection nozzles, and any force due to axial thermal expansion of the runner block and its components, including the runner extension.

The Rigidized Structure

A main feature of the total system is the support means or "rigidized structure" of the apparatus of the invention. It includes a frame-like structure comprised of second support means including a member or injection cavity bolster plate 950, three standoff systems, a nozzle shut-off assembly, and the first fixed support means, or fixed platen. The components of the rigidized structure are load-bearing members which protect the structure of the apparatus located between moveable platen 114 and fixed platen 282, by themselves bearing, instead of the runner block and its components bearing, the great compressive clamping force, usually between 45 to 500 tons pressure, exerted in the rearward direction by hydraulic cylinder 120 on the moveable platen when the latter is in its closed position. (See FIG. 11). The rigidized structure uniformly supports and distributes the compressive forces about the injection cavity bolster plate 950, prevents it from breaking, minimizes its deflection and prevents damage to and excessive compression forces from being exerted on the injection nozzles. In doing the above, the rigidized structure maintains the injection cavity bolster plate in a substantially vertical plane and thereby maintains the faces of the injection cavity sprues in a substantially vertical plane. This permits the faces or sprue faces of the nozzle caps, held in a substantially vertical plane by the rigid mass of the runner block, to contact and seat fully, completely, and uniformly against the juxtaposed injection cavity sprue faces.

As shown in FIGS. 29, 29A, 30, 31, and 98, there are three standoff systems in the apparatus of this invention. The first system includes a set of ten large standoffs, each designated 962, and a set of eight small standoffs, each designated 963. Each large standoff is positioned on a bolt 960 and each small standoff is positioned on a bolt 961. Standoffs 962, 963 and bolts 960, 961 run through the runner block, the former extending between the rear face of injection cavity bolster plate 950 and the forward face of sleeve cam base cover 901, and the latter extending through the injection cavity bolster plate 950 and being threadedly fastened to cover 901. The main purpose of these standoffs is to maintain the cavity sprues in a vertical plane and to minimize variation in cavity deflection due to the clamping force. Due to their proximity to the injection nozzles, they also assist in preventing the nozzles from being damaged or crushed by the clamping force.

The second standoff system includes a set of eight posts, each designated 904, which are outside of the runner block and run from the rear face of injection cavity bolster plate 950 to the forward face of sleeve cam base 900 where bolts 905, which run through the posts, screw into threaded holes in sleeve cam base 900.

The third standoff system is comprised of two C-shaped standoffs, each generally designated 122, one positioned on each side of runner block 288. Each one abuts the rear face of blow mold bolster plate 106 and extends to and abuts against the forward face of fixed platen 282. Each C-standoff has three components, a vertical member 124, and upper and lower horizontal members respectively designated 126, 128. Bolts 130 for securing the C-standoffs between blow mold bolster plate 106 and fixed platen 282, pass through the blow mold bolster plate from its forward face, extend through the C-standoffs and are threadedly secured to the fixed platen. The three standoff systems in concert absorb the clamping force and uniformly support and prevent or minimize non-uniform deflection of the injection cavity bolster plate.

It is to be noted that in a unit or single cavity system, there is no need for such an elaborate standoff system because the injection cavity mounted onto the fixed platen, and the nozzle mounted onto the ram block, are each mounted on the center line of the machine. Also, the faces of the platen and ram block are rigid and do not deflect from their vertical planes. In the multi-injection nozzle machine of this invention, such as the one shown in the drawings, wherein there are eight individual injection nozzles mounted in a pattern spread out from the absolute center line of the runner block and machine, wherein each nozzle has a very short combining area in its central channel, and wherein a thin injection cavity bolster plate 950 is needed between the runner block and the injection cavities 102 and injection cavity carrier blocks 104 to carry the cavities and carrier blocks and to prevent or reduce heat loss from the former to the latter, there is a great need that both the injection cavity bolster plate and the entire runner face be protected from the clamping force of the moveable platen relative to or against the fixed platen. Also, in a multi-nozzle machine such as the one shown, wherein there is an operating temperature differential between the injection cavities and the runner block which often varies because they are separate entities and perform different functional process requirements, there is a need for the previously mentioned flat sliding faces on the cavities and nozzle caps, and for the rigidized structure utilized herein which not only bears clamping loads but permits expanding metal of the runner block and its components to freely float within it.

The portion of the rigidized structure through which the mass of expanding metal freely floats is the support means or nozzle shut-off assembly generally designated 899, which is comprised of the sleeve cam base cover 901, sleeve cam base 900, pin cam base cover 894, and pin cam base 892. All are fixed and locked solidly to and between the injection cavity bolster plate 950 and fixed platen 282. As for the manner in which the nozzle shut-off assembly is tied together as a unit, injection cavity bolster plate 950 is rigidized through bolts 960 which extend through the plate and through stand-offs 962 and is threadedly secured to sleeve cam base cover 901. Looking at the upper portion of FIG. 31, sleeve cam base cover 901 is tied by bolts 910 to sleeve cam base 900, which is tied by bolts 970 to pin cam base 894, which in turn, by bolts 971, is tied through cam plate base 892, and threadedly secured to fixed platen 282. In this manner, the injection cavity bolster plate 950 is rigidized and the nozzle shut-off assembly is tied together as a unit. The gap between the front face of sleeve cam base cover 901 and the runner block, and between the main bore 973 carved through the components of the nozzle shut-off assembly and the oil retainer sleeve, permits the runner extension to float through the assembly.

The Force Compensation System

Another main feature of the total system which provides for the constant, uniform and full aspects of the effective operational pressure contact seal at the injection nozzle-injection cavity sprue interfaces is the force compensating system or apparatus and method of the invention which compensate for or absorb and offset the rearward separation force, which can be about four tons, created by the forward injection of polymers through and back into the multiple injection nozzles during the injection cycle, and any rearward displacement caused by the thermal expansion of the floating runner block and runner extension which may be from about 0.015 inch to about 0.025 inch. The separation force, which alone could cause a separation and leakage at the interface between the injection nozzles and cavity sprues, and any thermal expansion displacement, is transferred axially through the runner block, runner extension, and manifold extension 266 to the entire ram block 245. The separation force of about four tons is calculated by multiplying the area of a single nozzle gate times the number of nozzles in the injection machine, here eight, times the maximum injection pressure (about 11 tons). Thermal expansion is allowed to occur and is not relied on to obtain and maintain an effective pressure contact seal between the injection nozzles and cavity sprues. By compensating for and absorbing these rearward forces exerted on the ram block with an appropriate, constant, sufficient or greater forward force, the force compensating structure and method obtain and maintain an on-line constant, effective pressure contact seal of all injection nozzle sprue faces fully against and about the injection cavity sprue faces. The force applied in the forward direction to the apparatus must be and is applied constantly and uniformly so that it does not change with thermal expansion as it does in conventional systems, and so that during operation of the machine, whether or not during an injection cycle, each of the five manifold extension nozzles of the set and each of the eight injection nozzles of the set is respectively on a substantially vertical plane and receives the same, or substantially the same, respective, constant forward force, such that there is a uniform, full and balanced force applied to, and an effective pressure contact seal for, each nozzle of each set. Although the constant, uniform, greater forward force can be applied by any one or more suitable means at one or more locations on an injection molding apparatus, preferably, the means is hydraulic and is comprised of at least one, preferably a plurality, of hydraulic cylinders. For the apparatus shown in the drawings, a plurality of hydraulic cylinders are employed at various strategic locations to apply a constant forward force to or through and along the absolute center line of the overall apparatus, which is the axial center line of each of entire ram block 245, runner extension 276, and runner block 288. In this manner, they provide the uniform force which effects the full and complete pressure contact seal for each nozzle of each set. The hydraulic cylinders employed in the force compensation apparatus and method of this invention include drive cylinder 340, ram block sled drive cylinder 341, and clamp cylinders 986.

Referring to FIGS. 11, 12, 14, 18, 98, 119 and 120, during operation of the apparatus, each of the cylinders 208, 210 for respective Extruder Units I, II, and cylinder 212 for Unit III, each driven forward by its own respective hydraulic drive cylinders 341 (for Units I and II) and 340 (for Unit III), maintains a pressure contact seal between their respective nozzles 213, 215 and 248 and rear ram manifold sprues 223, 221 and 249. Drive cylinder 340 exerts its forward force through cylinder 208 and nozzle 215 directly on and along center line of entire ram block 245. Ram block sled drive cylinder 341, fixedly connected to sled bracket 336, in turn tied to ram block 228, pulls the entire ram block 245 forward on its center line. Each clamp cylinder 986 is mounted by suitable means onto the forward face of fixed platen 282 an equal radial distance from and on a plane, here the horizontal one, which runs through the absolute center line of the apparatus. Each clamp cylinder is one of a matched pair and has a cylinder rod and cylinder rod extension generally designated 988 which passes through a bore 990 in the fixed platen and through bore 991 in a side end portion of forward ram manifold 244. A holding pin 992 dropped into a receiving hole in each cylinder rod extension forms a stop against the back edge of the forward ram manifold. The clamp cylinders clamp or pull the entire ram block toward fixed platen 282. They exert their force through the center line of the entire ram block. Thus, the drive and clamp cylinders individually and in combination pull the entire ram block forward on its center line and force manifold extension 266 against runner extension 276. The force applied by the cylinders through the center line of the entire ram block is transferred to, through, and along the center line of the runner extension. This effects and maintains a uniform, full, constant, effective pressure contact seal between manifold extension nozzles 270 and runner extension nozzle pockets 272 and maintains alignment of the center lines of the respective communicating flow channels 220, 222, 250, 257 and 258. The force from these cylinders, applied through the center line of the manifold extension, is transferred through and along the absolute center line, which is common to the center lines of runner extension 276 and runner block 288, to the entire flat face of each injection nozzle tip mounted within the runner block. Since all injection nozzles are of a controlled, matched length and are mounted to substantially the same depth up to a vertical plane within the runner block, all portions of the flat face of the nozzle tip of each injection nozzle which bear against the juxtaposed injection cavity sprue do so with the same uniform, full and balanced pressure. Applying the forward forces other than along the center line at points not substantially equidistant from the center line in an insufficiently rigid runner, would tend to create an unbalanced cantilever effect which would prevent obtaining and maintaining a constant uniform, full, effective contact pressure seal for all manifold extension nozzles and all eight injection nozzles. The structures employed to apply these forces should not create any significant heat loss from the runner block. The center line transferral of force through these structures may, despite the larger size of the runner block, assist in maintaining injection nozzle-cavity sprue center line alignment.

With respect to the actual functioning of the cylinders as compensators during the operation of the apparatus, the rearward injection separation pressures exerted against the injection nozzles and through the floating runner block and runner extension and through manifold extension, plus any thermal expansion pressure exerted through the runner extension, force the entire ram block and the sled drive bracket 336 to which it is attached, in the rearward direction. While it is not known which of cylinders 340, 341, and 986 absorb what portion of the total rearward pressure, it is believed that the two drive cylinders, while sufficient to handle thermal expansion pressures, are not, because of their size, sufficient to handle the combined rearward pressures and that at least some, perhaps most, of the injection separation pressure is compensated for, absorbed and offset by clamp cylinders 986. As the injection machine operates through repeated injection cycles, the clamp cylinders, acting as shock absorbers, exert a forward pressure which is at least sufficient to compensate for or absorb the rearward pressure changes. For example, if the runner extension is moved rearward and the entire ram block moves rearward, the clamp cylinders react and their cylinder rods retract and pull the entire ram block forward against the runner extension. The cylinders absorb the rearward force and offset it with a greater forward force, keep the manifold extension nozzles and runner extention pockets in seated contact, and impart a forward force against the back end of the runner extension which in turn forces the runner block forward to maintain a constant effective pressure contact seal between all of the injection nozzle tip faces and all of the injection cavity sprue faces.

While displacement clamp cylinders 986 absorb perhaps most of the injection separation pressure, it is to be noted that all of the drive and clamp cylinders cooperate with one another to provide the necessary total force compensating system.

A substantially uniform and full forward force on each of the manifold extension nozzles and at and about each of the eight injection nozzles is obtained due to the strategic, uniform application of force on or through the absolute center line of the apparatus. For the apparatus shown in the drawings, it would be difficult to employ only one or two larger, stronger drive cylinders and eliminate the clamp cylinders, because it would be difficult to position such large drive cylinders to enable them to exert their forward force at or through and along the absolute center line. If the force were exerted through a point lower than the center line, a cantilever effect would be created wherein the pressure exerted through nozzles near the bottom of the star pattern of the manifold extension would be greater than through those near the top of the pattern. This could cause leakage through the upper nozzles and inoperability of the injection apparatus. Each clamp cylinder 986 is pressure set so that its pressure, combined with that of the drive cylinders, exert a constant force greater than the separation pressure. The pressure set can be obtained by any suitable means, for example, by a connection onto another pressure line having sufficient pressure or as obtained herein by a conventional hydraulic pressure controlling valve (neither shown). The clamp cylinders are controlled by a conventional flow control valve (not shown) to retract at a slow rate until the set balanced pressure is obtained in each clamp cylinder. If the set balanced pressure were not obtained in each clamp cylinder, there would be a difference in pressure between them which would also provide an undesirable cantilever effect.

Description of Process

The process begins with the plasticizing of the materials for each of the layers of the injected article. In the preferred embodiment, three separate plastic materials—structural material for the inside and outside surface layers A and B, barrier material for the internal C layer, and adhesive material for internal layers D and E—are plasticized in three reciprocating screw extruders. Plasticized melt from each of these extruders is rapidly, but intermittently, delivered to five individual ram accumulators. The structural material extruder feeds two rams; the adhesive material extruder feeds two rams; and the barrier material extruder feeds one ram. Each of the five rams then feeds the polymer melt material exiting from it to respective flow channels for each melt stream, as previously described, which lead to each of eight nozzles for eight injection cavities to form eight parisons each of whose walls is formed from five concurrently flowing polymer melt material streams. The process provides precise independent control over five concentric concurrently flowing melt streams of polymeric materials being co-injected into the eight cavities. As is more fully described below, this is accomplished by controlling the relative quantity of, the timing of release of, and the pressure on, each melted polymeric material.

Each of the five separate polymer melt material streams for layers A, B, C, D and E flows through a separate passageway for each stream in each of the eight nozzles. Within each nozzle, each passageway for each of streams A, B, C, D and E terminates at an exit orifice within the nozzle, and the orifices in streams B, C, D and E communicate with the nozzle central channel at locations close to the open end of the channel. The orifice for stream A communicates with the nozzle central channel at a location farther from the channel's open end than the orifices for the other streams. Each nozzle has an associated valve means having at least one internal axial polymer material flow passageway which communicates with the nozzle central channel and which is also adapted to communicate with one of the flow passageways in the nozzle, which in the preferred embodiment contains material for layer A. The valve means is carried in the nozzle central channel and is moveable to selected positions to block and unblock one or more of the exit orifices for the materials of layers A, B, C, D and E. The valve means further comprises means moveable in said axial passageway to selected positions to interrupt and restore communication for polymer flow between the axial passageway and a nozzle passageway. In the preferred embodiment, the valve means comprises a sleeve, which is moveable in the nozzle central channel to block and unblock the orifices for each of the streams B, C, D and E, and a pin which is moveable in the passageway in the sleeve to interrupt and restore communication for flow of the polymer melt material flow stream through the orifice for stream A between the sleeve passageway and a nozzle passageway.

The drive means previously described actuates the preferred sleeve and pin valve means to selected positions or modes for selectively blocking and unblocking the orifices, including the aperture in the sleeve which is regarded as the orifice for the stream of layer A material. In the preferred embodiment, there are six modes. In the first mode, illustrated schematically in FIG. 121, the sleeve 800 blocks all of the exit orifices 462, 482, 502 and 522, and the pin 834 blocks aperture 804 in the sleeve, interrupting communication between the internal axial passageway 803 of the sleeve and the nozzle passageway 440 associated with it. No polymer flows. In the second mode, illustrated schematically in FIG. 122, the sleeve blocks all of the exit orifices and the pin is retracted to establish communication between the axial passageway 803 in the sleeve and the nozzle passageway 440, whereby the material for layer A is permitted to flow from the nozzle passageway through the aperture 804 in the sleeve into the internal axial passageway 803 in the sleeve which is located in the nozzle central channel 546. In the third mode, illustrated schematically in FIG. 123, the sleeve unblocks the orifice 462 most proximate to the open end of the nozzle central channel, allowing the material for layer B to flow into the channel, and the pin does not block the aperture in the wall of the sleeve, permitting continued flow of layer A material. In the fourth mode, illustrated schematically in FIG. 124, the sleeve 800 unblocks three additional orifices 482, 502 and 522, permitting the flow of materials for layers C, D and E into the nozzle central channel 546, and the pin 834 remains in the position which unblocks the aperture 804 in the wall of the sleeve, permitting continued flow of layer A material. In this mode all five of the material streams are allowed to flow into the nozzle central channel. In the fifth mode, illustrated schematically in FIG. 125, the sleeve 800 continues to unblock the orifices for the materials of layers B, C, D and E and the pin 834 blocks the aperture 804 in the wall of the sleeve 800 to interrupt communication between the axial passageway in the sleeve and the nozzle passageway 440, whereby the flow of layer A material into nozzle central channel 546 is blocked. Positioning the pin and sleeve in this mode permits knitting or joining together of the material for layer C, forming a continuous layer of that material in the injected article. In the sixth mode, illustrated schematically in FIG. 126, the pin 834 continues to block the aperture 804 in the wall of the sleeve 800 and the sleeve unblocks the orifice 462 most proximate to the open end of the nozzle central channel 546, whereby only the material for layer B flows into the channel. Positioning the pin and sleeve in this mode permits a sufficient flow of the material for layer B to enable it to knit or join together and form a layer which completely encapsulates, among other layers, a continuous C layer.

In the preferred embodiment, a complete injection cycle takes place when the drive means for the valve means, the pin and sleeve, operate to move the valve means sequentially from the first mode to each of the second through sixth modes and then to the first mode. It is also preferred that the tip of the pin be proximate to the open end of the nozzle central channel when the sleeve and pin are in the first mode. Having the pin at this position substantially clears the nozzle central channel of all polymer material at the end of each injection cycle and causes a small amount of the material of layer A to overlie layer B at the sprue.

Figure 123:
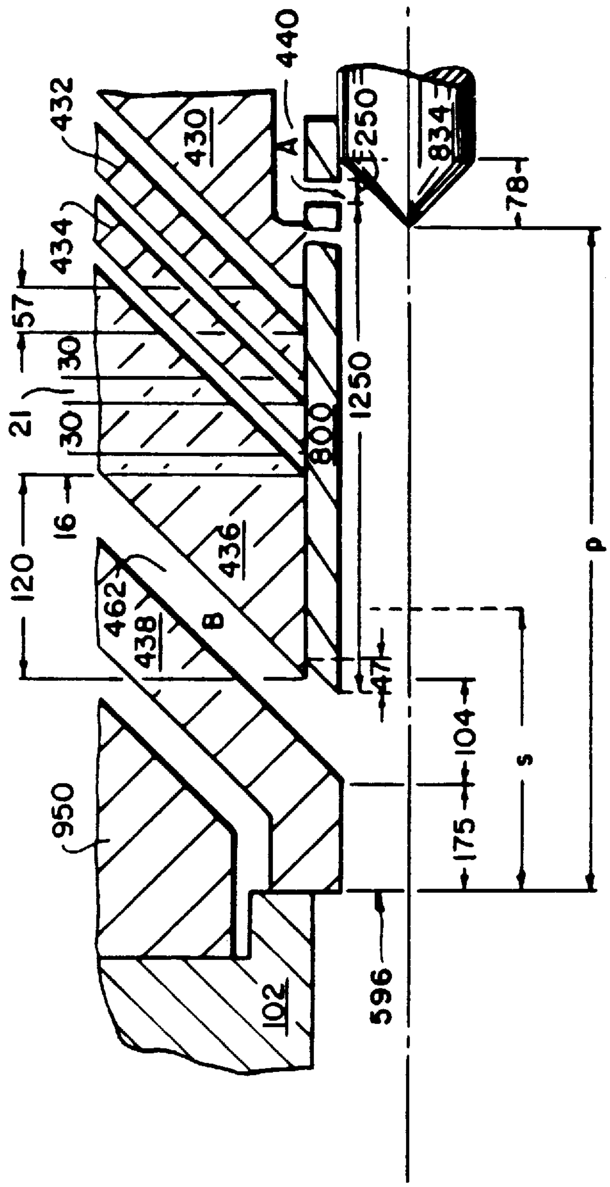

FIGS. 123 and 124 schematically show the relative location and dimensional relationship among the pin 834, sleeve 800, nozzle cap 438, and the orifices 462, 482, 502 and 522 for polymer flow formed by cap, outer shell 436, second shell 434, third shell 432, and inner shell 430. In these figures, the "reference" point "o" is the front face 596 of the nozzle cap, "p" is the distance of the tip of the pin from the reference, and "s" is the distance of the tip of the sleeve from the reference. The dimensions shown in FIGS. 123 and 124 are in mils. The front face 596 of the nozzle cap lies in a plane at the front end of channel 595 in the nozzle cap. The portion of the plane along front face 596 which intersects channel 595 is the gate of the nozzle.

Table II gives the positions of the tip of the pin and the tip of the sleeve from the reference as a function of time in centiseconds during a typical injection cycle for the eight-cavity machine previously described. The distances from the reference are in mils.

TABLE II

POSITION OF PIN AND SLEEVE AS A FUNCTION OF TIME

| TIME (Centiseconds) | PIN p | SLEEVE s |
|---|---|---|
| 0 | 112 | 175 |
| 20 | 1987 | 175 |
| 24.4 | 1987 | 175 |
| 30 | 1987 | 270 |
| 45 | 1987 | 270 |
| 49 | 1987 | 580 |
| 121 | 1987 | 580 |
| 130 | 612 | 580 |
| 133 | 587 | 320 |
| 140.9 | 521 | 175 |
| 145 | 487 | 175 |
| 165 | 112 | 175 |
| 170 | 112 | 175 |

FIG. 138 and Table III show the timing sequence of polymer melt stream flow into the nozzle central channel, as determined by timed movement of the sleeve and pin to the selected positions or modes previously described, for an injection cycle of the eight-cavity machine previously described. For polymer A, the opening and closing times refer to opening and closing of aperture 804. For polymers B, C, D, and E, the times refer to opening and closing of respective orifices 462, 502, 522, and 482.

TABLE III

POLYMER FLOW TIMING SEQUENCE

| | OPENING (Time in centiseconds) | | CLOSING (Time in centiseconds) | |
|---|---|---|---|---|
| POLYMER | STARTS AT | COMPLETE AT | STARTS AT | COMPLETE AT |
| A | 13.2 | 15.8 | 121.0 | 122.5 |
| B | 24.4 | 27.8 | 137.8 | 140.9 |
| C | 46.7 | 46.9 | 131.9 | 132.1 |
| D | 47.3 | 48.0 | 130.9 | 131.5 |
| E | 46.0 | 46.3 | 132.4 | 132.6 |

At the beginning of the injection cycle, the pin and sleeve are in the first mode (FIG. 121). No polymer material flows. The pin is withdrawn from the reference position where its tip was 112 mils from the front face of the nozzle cap, opening to the gate of the nozzle a short unpressurized cylindrical channel. The pin continues to be retracted and at 13.2 centiseconds the pin begins to unblock the aperture 804 in the sleeve through which the stream of polymer A material flows, and the opening of that aperture is completed at 15.8 centiseconds. The pin and the sleeve are now in the second mode. The polymer A material is under pressure and immediately fills the unpressurized cylindrical channel (within the sleeve and central channel of the nozzle), flows through the gate and begins to enter the injection cavity. At 20 centiseconds movement of the pin ceases and its tip is located 1.987 inch from the reference, as further shown in FIG. 122 and Table II. At 24.4 centiseconds withdrawal of the sleeve begins and the sleeve begins to unblock the circumferential orifice 462 for polymer B, and the opening of the polymer B orifice is completed at 27.8 centiseconds. The pin and sleeve are now in the third mode. Being pressurized, the layer B material displaces the outer portion of the cylinder of material A and becomes an advancing annular ring overlying the central strand of A material. The strand of A surrounded by the ring of B fills the gate and begins to enter the injection cavity. At 30 centiseconds, retraction of the sleeve stops and its tip is 270 mils from the reference. The next step is the rapid sequential release to the nozzle central channel of the materials for layers E (adhesive), C (barrier) and D (adhesive) as concentric annular rings surrounding the core of A material but within the outer annular ring of layer B material. Thus, at 45 centiseconds the sleeve begins to be further retracted, opening of the orifice 482 for polymer E starts at 46.0 centiseconds and is completed at 46.3 centiseconds, opening of the orifice 502 for polymer C starts at 46.7 centiseconds and is completed at 46.9 centiseconds, and opening of the orifice 522 for polymer D starts at 47.3 centiseconds and is complete at 48 centiseconds. The pin and sleeve are now in the fourth mode. All of polymers A, B, C, D and E are flowing at five concentric streams through the gate of the nozzle and into the injection cavity. The material for layer A (to form the inside structural layer of the injected article) flows as the innermost stream. Surrounding it, in order, are annular streams of the materials for layers D, C, E, and B. Although the rate of flow and thickness of the three streams D, C, and E are each independently controllable, they move in the preferred embodiment generally as though they were a single layer. This multiple-layer stream is positioned between streams A and B so that when the five flowing streams have entered into the injection cavity, the multiple-layer D-C-E stream is located substantially in the center of the overall flowing melt stream, on the fast streamline where the linear flow rate is greatest, and the multiple layer stream displaces part of and travels faster then the two layers, A and B, of container wall structural materials, reaching the flange portion of the injected article by the end of the injection cycle when the flow of all materials in the injection cavity has stopped. Retraction of the sleeve stops at 49 centiseconds at which time its tip is 580 mils from the reference (FIG. 124).

Figure 125:
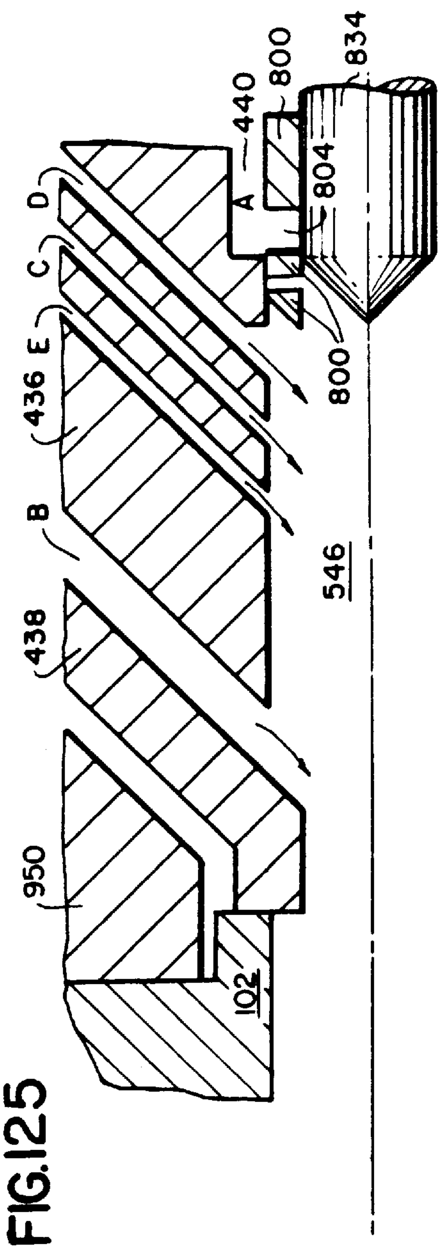
Figure 126:
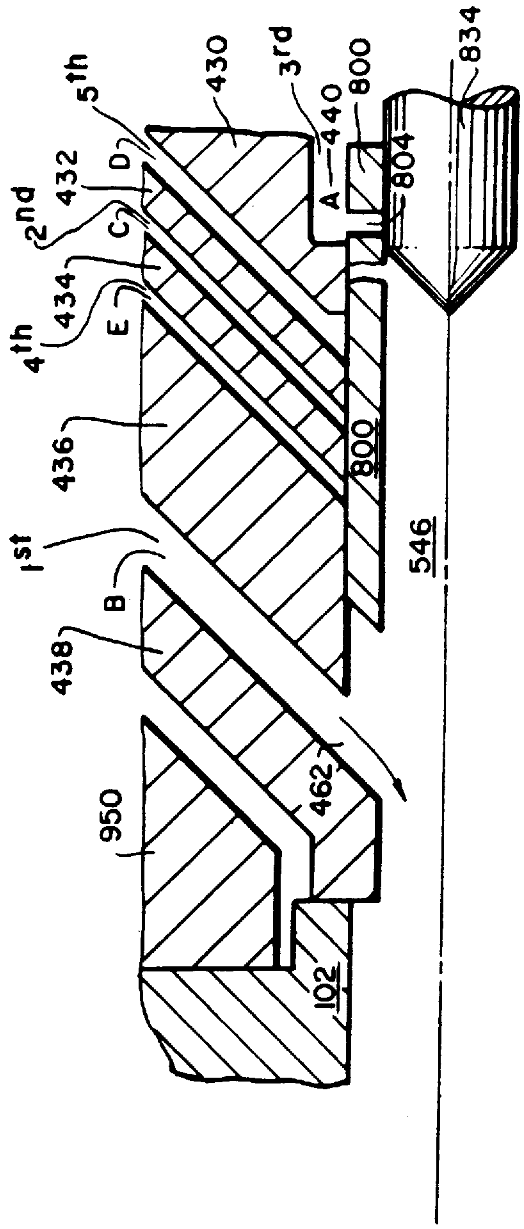

The closing sequence of the injection cycle is as follows. At 121 centiseconds, the pin is moved toward the reference and it begins to close the aperture in the sleeve and at 122.5 centiseconds has completely closed the aperture to stop the flow of polymer A into the nozzle central channel. The pin and sleeve are now in the fifth mode (FIG. 125). Polymer B, C, D, and E are flowing. The pin continues to move toward the open end of the nozzle central channel, and at 130 centiseconds, when its tip is 612 mils from the reference, its rate of forward movement is decreased. Movement of the sleeve toward the open end of the nozzle central channel commences at 130 centiseconds. At 130.9 centiseconds, the sleeve begins to close the orifice for polymer D and the orifice is completely closed at 131.5 centiseconds. At 131.9 centiseconds, the sleeve begins to close the orifice for polymer C and the orifice is completely closed at 132.1 centiseconds. At 132.4 centiseconds, the sleeve begins to close the orifice for polymer E and the orifice is completely closed at 132.6 centiseconds. The pin and the sleeve are now in the sixth mode (FIG. 126). Only polymer B is flowing into the nozzle central channel. The pin is still moving toward the open end of the nozzle central channel. At 133 centiseconds, when the sleeve is 320 mils from the reference, there is a decrease in the rate of forward movement of the sleeve. At 137.8 centiseconds, the sleeve begins to close the orifice for polymer B and the orifice is completely closed at 140.9 centiseconds. Forward movement of the sleeve stops at that time, when its tip is 175 mils from the reference. No polymer flows into the nozzle central channel. At 145 centiseconds the rate of forward movement of the pin is increased. Forward movement of the pin stops at 165 centiseconds when its tip is 112 mils from the reference. The pin and sleeve have returned to the first mode.

In the preferred practice of the method of this invention, the flow of polymeric material out of the open end of the nozzle central channel into the injection cavity at the beginning of the injection cycle is such that the materials for layers A and B enter the injection cavity at about the same time in the form of a central strand of the material for layer A surrounded by an annular strand of the material for layer B. In the embodiment described above, the material for layer A enters the sprue of the injection cavity in advance of the combined central strand of A surrounded by the annular strand of B. Where, as in the preferred embodiment which forms a very thin wall article, the flow cross-section in the injection cavity is very narrow, the material of layer A which first flows into the cavity will come into contact with the outer wall of the cavity as well as with the core pin within the cavity, causing the formation of a very thin, almost optically invisible, layer of the material on the outside surface of the injection blow molded article. If polymer A and polymer B are the same polymer or are compatible polymeric materials, either one of polymers A or B may sequentially enter the injection cavity, and in that circumstance the small amount of polymer A which may be on the outside surface of the injected article, or the small amount of polymer B which may be on the inside surface of the injected article, will not interfere with the formation of the article or its functioning. However, the present invention provides precise independent control over the flow of those polymer streams so that if it is desired not to have polymer A material be exposed to the external environment or not to have polymer B material exposed to the environment inside of the injected article or the injection blow molded article, such structure may be achieved by the present invention. Therefore, it will be understood that the modes of polymer flow and positions of the valve means, described above, are those for the preferred embodiment, but the invention in its broadest aspect is not limited thereto.

By controlling the location of the internal layer or layers within the thickness of the flowing five-layer plastic melt, the process is able to distribute the internal layers uniformly and consistently throughout each of a plurality of injection cavities and out into the flange of each of a plurality of injection molded parisons while keeping the internal layers generally centered within the outer, structural plastic melt layers.

It is important that internal layer C (and, if present, internal layers D and E) should extend into the marginal end portion of the side wall of the injected molded article, preferably substantially equally, or uniformly at substantially all locations around the circumference of the end portion, especially when layer C comprises an oxygen-barrier material and the article is intended to be a container for an oxygen-sensitive product such as certain foods. This is achieved in part by controlling the initiation of flow of the polymeric melt material flow stream which forms the internal layer. It is desirable to have the flow of the polymer material of that layer commence uniformly around the circumference of the orifice for that polymer. It is also highly desirable to have the mass rate of flow of the respective polymer material flow streams forming the inside (polymer A) and outside (polymer B) structural layers of the article be uniform circumferentially as they are flowing in the nozzle central channel at the time when flow of the polymer stream for internal layer C is commenced. The previously-described nozzle with valve means permits establishment both of the proper flow of the polymer streams forming the inside and outside structural layers, at the time of commencement of flow of the polymer stream forming the internal layer, and of the proper flow of the stream of internal layer polymer itself.

There are two immediate or direct sources of non-uniformity or bias in the extension of the internal layer into the marginal end portion of the side wall of the article. The first source which we shall refer to as "time bias" may be defined as the condition in which the time of commencement of flow of internal polymer melt material C is not uniform circumferentially around the polymer C orifice. Time bias in the flow of the polymer C stream, unless corrected elsewhere in the system or unless accommodated by foldover, as described below, will usually result in a failure of the internal oxygen-barrier layer C to uniformly extend into the marginal end portion of the side wall at substantially all circumferential locations thereof.

Two causes of time bias are non-uniform pressure of polymer C in its conical flow passageway near the C orifice and non-uniform ambient pressure in the nozzle central channel near the C orifice.

Non-uniform pressures of polymer C in its passageway can result primarily from differences among various portions of the flow passageway in time response of the polymer to a ram displacement. In particular, the pressure generated by the ram displacement movement will, in general, be experienced sooner at the circumferential portion of the orifice corresponding to the point of entry of the feed channel than it will on the opposite side of the orifice. Since polymer C will flow into the central channel as soon as its pressure in the orifice exceeds the ambient pressure in the combining area or eye of the nozzle, a difference in time response will result in a circumferential non-uniformity in the time at which polymer C enters the central channel. This difference in initial time response can be mitigated by the design of melt pools and chokes. As discussed elsewhere, melt pools and chokes can also be designed to circumferentially balance the mass flow rate later during the cycle when the flow is fully established. However, it is extremely difficult to design melt pools and chokes which result in complete uniformity of time response and in complete balance of flow later in the cycle. Dimensional tolerances and non-uniform temperatures within the C layer material flow passageway can also affect the uniformity of time response.

If the ambient pressure within the nozzle central channel, proximate to the C orifice, is not uniform around the circumference of the flow stream, this will also result in time bias. If the pressure of C is gradually rising as a result of a ram displacement, C will begin to flow into the central channel sooner in that circumferential area in which the ambient pressure is lower. Non-uniformities in the ambient pressure can have several causes. In particular, non-uniformities in the flows or in the temperatures of the other layers, particularly B, will result in non-uniform ambient pressure in the eye of the nozzle.

The second source of a bias in the extension of the internal layer into the marginal end portion of the side wall of the article shall be referred to as "velocity bias." Velocity bias may be defined as the condition in which the rate of progression of the buried layer toward the leading edge varies around the circumference, resulting in a further advance in some sections than in others.

In understanding this phenomenon it is useful to introduce the concept of streamlines. In laminar flow, one can define a streamline as a line of flow which represents the path which each polymer molecule follows from the time it enters the nozzle central channel until it reaches its final location in the injection molded article. Streamlines will flow at various velocities depending on their radial location, the temperatures of the mold cavity surfaces, the temperature of the various polymer streams, the time of introduction into the eye of the nozzle, and the physical dimensions of the mold cavity. For example, a streamline which is located very close to the mold cavity walls once it passes into the mold cavity will flow slower than an adjacent streamline which is more remote from the mold cavity walls. If the C polymer material enters the nozzle central channel on a faster streamline at one circumferential location than it does at another location, the C polymer material will be more advanced towards the marginal end at the first location. Since the C polymer material is introduced at or near the interface between the A and B layers, the radial location of the C flow streams will be determined by the relative mass flow rates of the A and B layers at each point of the circumference of the flowing stream. Velocity bias will therefore result if the flow of these layers, in particular the B layer, is not circumferentially uniform.

Circumferential non-uniformities in the temperature of the polymer streams or of the mold cavity surfaces can also result in velocity bias. Temperatures affect the velocities of the various streamlines because of the effect of cooling on the polymer viscosity near the mold surfaces. It should be noted that circumferential non-uniformities in the temperatures of the A or B layers, in particular, will affect the position of polymer C near the marginal end.

It should be noted that the various types and causes of bias are algebraically additive; that is, if both time bias and velocity bias are present, the net effect could be either greater than or less than the effect of either type of bias by itself. In particular, if the time bias and velocity bias both tend to result in a retarded flow of C polymer at the same circumferential location, the net bias will be greater. If time bias tends to retard the flow of polymer C at a circumferential location in which velocity bias tends to advance its flow, the net bias will be reduced.

Similarly, one cause of velocity bias could either compensate for the effect of another cause of bias or add to that effect. It will be obvious to one skilled in the art how the effects described above could be arranged so as to have the effects tend to partially compensate for each other. Since such compensation of biases will tend to be very specific to each article shape and choice of polymer, however, the preferred embodiment of this invention is to minimize each cause of bias through features of the apparatus and of the process.

As has been described above, circumferential non-uniformity in the flow of B polymer can cause non-uniformities in the final axial location of layer C through both time bias and velocity bias. The time bias results from the non-uniform ambient pressure in the nozzle central channel and the velocity bias results from the non-uniformity in the radial location of layer C as it is determined by the mass flow rate of layer B.

Circumferential non-uniformities in the flow of B polymer material may be minimized by selection of a choke structure of the nozzle shell 436 for layer B material to make the flow of the layer B material more uniform around the circumference of the orifice. The nozzle shell structure is also made such that a longer and wider primary pool of layer B material is formed, as at 468 at the melt inlet, to obtain a larger flow section in order to reduce the resistance to flow of the polymer material from the entry side of the feed channel to the opposite side. Incorporation of an eccentric choke will assist in balancing the resistance to flow within the nozzle passageway. Interposition of a uniform, large flow restriction close to the orifice will aid by tending to mask any upstream non-uniformities of flow. Further, non-uniform ambient pressure in the nozzle central channel at the moment of commencement of flow of layer C material may be minimized by reducing the pressure on the layer B material, or stopping its flow momentarily, just prior to commencement of the flow of the C material. This may be accomplished by reducing or halting ram movement on the B layer material, and will tend to dampen out pressure non-uniformities in the nozzle central channel caused by non-uniformity of mass flow of layer B and will tend to minimize the variation of pressure of layer B material or layer A material, or both, circumferentially around the nozzle central flow channel at the location where layer C material enters the flow channel.

Non-uniformity of the time of the start of flow of the stream of polymer C material around the circumference of the orifice may be minimized by having the leading edge of the polymer C flow stream penetrate as rapidly as possible into the already-flowing stream of layers B and A and by having the mass rate of flow of layer C material through its orifice be uniform around the circumference of the orifice. This may be achieved by valve means in the nozzle central channel which blocks the layer C material orifice until the moment when initiation of flow is desired. Pressurization of the layer C material prior to the time when the valve means unblocks the orifice greatly assists in achieving the desired rapid, uniform initiation of flow of layer C material.

Certain other features of the previously described structure of the present invention assist in minimizing time bias of the flow of the stream of layer C material. The conical, tapered passageway 518 (FIG. 50) for layer C material in the nozzle provides a symmetrical reservoir of pressurized polymer melt material downstream of the concentric choke 506 (FIGS. 50 and 55) and adjacent to the orifice. The taper serves continuously to provide a reservoir closer to the orifice. Eccentric choke 504 and concentric choke 506 in combination with primary melt pool 508, secondary melt pool 512 and final melt pool 516 assist in providing uniform flow of the stream of polymer C material around the circumference of its orifice (FIG. 50).

It is desirable that the volume of polymer in the central channel of the nozzle be kept small in order to facilitate ease of control of the start and stop of the flow streams. Accordingly, the diameter of the nozzle central channel should be relatively small. Likewise, the axial distance from the nozzle gate to the farthermost removed polymer entry flow channel into the nozzle central channel should be kept small.

At any given position around the circumference of the orifice for the polymer of the internal layer C, the polymer material will begin to flow when its pressure, $P_C$, is greater than the ambient pressure, $P_{amb}$, in the channel, which is the combined pressure from that of the stream of polymer of the inside structural layers $P_A$, and the pressure from the stream of polymer of the outside structural layer, $P_B$. The onset of flow of the stream of polymer C for the internal layer will be uniform, i.e., will start at the same time, at all positions around the circumference of the orifice for layer C, if the pressure of the polymer of that layer, $P_C$, is uniform around the orifice and if the ambient pressure, $P_{amb}$, in the nozzle central channel of the flowing streams A and B, of the inner and outer structural layers respectively, is constant at all angular positions around the flowing annulus. If $P_{amb}$ is not constant, the onset of flow of layer C will be uniform if the pressure distribution at the leading edge of layer C, as a function of radius and angular location in the nozzle central channel, matches the ambient radial and angular pressure distribution of the already flowing A and B streams at the axial location in the nozzle cehtral channel at which the C layer is introduced.

These conditions are difficult to achieve. When $P_C$ is not uniform around the orifice, or when the ambient pressure in the nozzle central channel is not constant, time bias of the leading edge of the entering polymer C flow stream will tend to occur, but it may be minimized by causing a rapid rate of build-up of pressure, $dP_C/dt$, in layer C as it enters the nozzle central channel.

While a rapid ram movement will cause a rapid build-up of pressure near the ram, it has been found that the resulting $dP_C/dt$ in the nozzle central channel at the time of introduction of layer C decreases as the runner distance from pressure source to nozzle central channel increases. A high baseline or residual pressure in the runner system has been found to increase $dP_C/dt$ in the nozzle central channel. Therefore, to obtain the desired, rapid rate of build-up of pressure in layer C in the nozzle central channel, in response to a rapid pressure build-up at the end of the runner adjacent the pressure source, the length of the runner should be shortened and the residual pressure of C increased. However, relatively long runners are utilized in multi-cavity machines, and there is an upper limit to the pressure of C above which an undesirably large mass of polymer C is obtained at its leading edge. Further, when long runners are employed, as in a multi-cavity machine, the flow rate of polymer into the nozzle central channel is the result both of flow due to physical displacement of a screw or ram at the far end of the runner and flow due to decompression of polymer in the runner and nozzle, if the polymer has been prepressurized. These factors, coupled with the effects of damping in the polymer in the runner, cause a rapid rate of increase of pressure in the polymer at the end of the runner adjacent the pressure source to deteriorate into an undesirable gradual rate of pressure increase at the other end of the runner and at the site of entry of the polymer into the nozzle central channel. (See the discussion regarding FIG. 139.) As a result of these constraints, it is difficult, particularly in a multi-cavity machine, to achieve the desired $dP_C/dt$ and even more difficult to achieve substantial uniformity of $dP_C/dt$ around the circumference of the orifice of polymer C.

As mentioned above, the desired uniformity is facilitated by the combination of a symmetrical preferably tapered, pressurized reservoir of polymer C material within the nozzle passageway for the material adjacent to the orifice, with valve means which selectively blocks and unblocks the orifice. The pressure $P_C$ may be increased to a level which overpowers any radial or angular non-uniformities of pressure distribution in the flowing streams A and B at the location of the layer C orifice in the nozzle central channel. It has been found that the layer C material should be pressurized to a level greater than the materials of layers A or B. The upper limit of pressurization of C material is the level at which there is obtained an undesired mass of C material at the leading edge of its flow stream.

These pressure variations are illustrated in FIGS. 127 and 128 in which the ordinate is pressure, the abscissa is time, and in which the ambient pressure, $P_{amb}$, of the flowing streams A and B in the nozzle central channel is assumed to be radially an& angularly constant at an axial location in the channel about the orifice for layer C.

FIG. 127 illustrates the effects of a relatively slow rate of build-up of pressure in the layer C material as it enters the nozzle central channel and reaches the ambient pressure at different times, $t_1$ and $t_2$, at two different angular locations. In FIG. 127, $Pc_1$, is a plot of the relatively slow pressure build-up of layer C at a first given angular location at the C orifice as a function of time, while $Pc_2$ is a plot of the relatively slow pressure build-up of layer C at a second given angular location at the C orifice as a function of time. Small non-uniformities of $P_C$, as a function of angular location, result in a relatively large difference in time, $t_2$ minus $t_1$, between the onset of flow of layer C at the two respective angular locations, causing a significant time bias of the leading edge of layer C from one angular location to another. FIG. 128 illustrates how the time bias is reduced by increasing the rate of build-up of pressure in layer C. In FIG. 128, $Pc_1$ is a plot of the relatively faster pressure build-up at the first given angular location as a function of time, while $Pc_2$ is a plot of the relatively faster pressure build-up at the second given angular location as a function of time. As $dP_c/dt$ increases, the difference between $t_2$ and $t_1$ decreases.

The relationship among the pressures of the layer A material, the layer B material and the layer C material at the beginning of the injection cycle and during the injection cycle will now be described. In the following description, the term "orifice for layer A material" refers, with regard to the previously-described preferred embodiment employing nozzle assembly 296, and hollow sleeve 800 and shut-off pin 834, to the aperture, slot or port 804 in sleeve 800 (FIG. 50). Likewise, with regard to the preferred embodiment, the term "orifice for layer B material" refers to annular exit orifice 462, and the term "orifice for layer C material" refers to annular exit orifice 502. It will be appreciated that equivalent pressure relationships will exist at equivalent orifices in other embodiments of nozzles and nozzle valve means within the present invention such as, for example, those associated with sleeve 620 (FIG. 107), or with check valve 628 in flow passageway 634 (FIG. 108), or sliding valve member 638 and axial passageway 803 (FIG. 109).

At the beginning of the injection cycle, when the layer A material is flowing in the nozzle central channel 546 past the orifice for layer B material, the pressure of material B in the tapered melt pool 478 (FIG. 50) in the nozzle just prior to unblocking the orifice for layer B material, $P(B)_o$, may be greater or equal or less than the pressure of the flowing stream of layer A material at the orifice for the layer A material, P(AA). In practice, it is believed that $P(B)_o$ is greater than P(AA). At the beginning of the injection cycle, when the layer A material is flowing in the nozzle central channel past the orifice for layer B material, $P(B)_o$ should be equal to or greater than the average radial pressure, P(AB), of the flowing stream of layer A material in the nozzle central channel at the axial location in the nozzle central channel of the orifice for layer B material in order to prevent cross channel or back flow when the orifice for layer B material is unblocked.

At the next step of the injection cycle, when both the layer A material and the layer B material are flowing in the nozzle central channel, the pressure of material C in tapered melt pool 518 just prior to unblocking the orifice for layer C material, $P(C)_o$, should be at least equal to, and preferably is greater than, the average radial pressure, P(AC), of the flowing stream of layer A material in the nozzle central channel at the axial location in the nozzle central channel of the orifice for the layer C material. $P(C)_o$ should be at least equal to P(AC) to prevent back flow when the orifice for layer C material is unblocked. The relationship of $P(C)_o$ being preferably greater than P(AC) is important in the achievement of uniformity of location of the leading edge of the annular flowing stream of internal layer C material and, in turn, uniformity of location of the terminal end of layer C in the marginal end portion of the side wall of the injected article at substantially all locations around the circumference of the end portion at the conclusion of polymer flow in the injection cavity. $P(C)_o$ should be greater than the pressure of the flowing stream of layer B material as it enters the nozzle central channel at the orifice for layer B material, P(BB). $P(C)_o$ may be greater or equal or less than P(AA). It is believed that $P(C)_o$ is greater than P(AA). It is believed that in practice, $P(C)_o$ is greater than $P(B)_o$.

At a later stage of the injection cycle, when the injection cavity is partially filled with the melt materials, the pressure of the flowing stream of layer C material as it leaves the orifice for layer C material, P(CC), is greater than P(AC), is less than P(AA), and is greater than the pressure of the flowing stream of layer C material in the nozzle central channel at the axial position in the nozzle central channel of the orifice for layer B material, P(CB). At this stage of the injection cycle, P(BB) is greater than P(AB), is less than P(AA) and is greater than P(CB). At the sprue of the injection cavity, at this stage of the injection cycle, the pressures of the flowing streams of layer A material, layer B material and layer C material are almost equal.

At a still later point in the injection cycle, when the flows of the materials for layers A and C from their respective orifices are being terminated, the pressure relationships are as follows. When the flow of material for layer A is terminated, and the materials for layers C and B are still flowing, P(CC) is greater than the residual pressure of layer A material remaining at the orifice for layer C material. This and the continuing flow of layer C material into the nozzle central channel permit knitting of the layer C material to provide a continuous layer of material C at the sprue of the injected article. Next, when the flow of material for layer C is also terminated, and only the material for layer B is still flowing into the nozzle central channel, P(BB) is greater than the residual pressure of layer C material remaining adjacent the orifice for layer B material. This and the continuing flow of layer B material into the nozzle central channel permits knitting of the layer B material to provide encapsulation of layer C by layer B material at the sprue of the injected article.

The above-stated description of the pressure relationships among the flowing melt streams does not take into account small variations of pressure in the radial direction which may be present but which are small in comparison with variations of pressure in the axial direction in the nozzle central channel. It does take into account the larger difference in radial pressure very close to the orifices of C and B required for these streams to enter the central channel, particularly when the knitting of the layer C and layer B materials is considered.

FIG. 129 is a plot of the melt pressure of each of the polymer flow streams A, B, C, D and E in pounds per square inch as a function of time during a portion of an injection cycle of the eight-cavity machine previously described. The pressure was measured at pressure transducer port 297 in manifold extension 266, approximately thirty-nine inches away from the tip of the nozzle (see FIG. 17). It should be noted that the pressures shown in FIG. 129 and Table IV are the pressures as measured approximately thirty-nine inches away from the nozzles and thus are not the pressures of the melt materials in the nozzles. However, the pressures and pressure relationships of FIG. 129 and Table IV do function to create the desired pressures and pressure relationship in the nozzle which are described above.

Table IV gives the pressure, in pounds per square inch, of each of the polymeric materials for layers A, B, C, D and E as a function of time in centiseconds of the injection cycle for the eight-cavity machine previously described. Table IV was prepared from the information in FIG. 129.

TABLE IV

VARIATION OF PRESSURE WITH TIME FOR THE DIFFERENT LAYERS

| TIME | PRESSURE IN PSI OF | | | |
|---|---|---|---|---|
| (CENTISECONDS) | A | B | C | D & E |
| 0 | 2000 | 2000 | 2800 | 1600 |
| 5 | 2400 | 2000 | 2800 | 1600 |
| 10 | 3000 | 2000 | 2800 | 1600 |
| 15 | 5000 | 2200 | 2800 | 1600 |
| 25 | 7800 | 4000 | 2800 | 1600 |
| 28 | 8000 | | 2800 | 1600 |
| 30 | | | 2800 | 1600 |
| 35 | 7800 | 6800 | 2800 | 2500 |
| 40 | | 6800 | 2800 | 4000 |
| 45 | 8000 | 6800 | 6000 | 6000 |
| 50 | | | 8000 | 6300 |
| 55 | 8100 | | | 6200 |
| 60 | | 6600 | 7900 | |
| 65 | 8200 | 6500 | 7800 | 6100 |
| 75 | 8300 | 6200 | 7650 | 6000 |
| 85 | 8400 | 6000 | 7600 | |
| 95 | 8500 | 6200 | 7600 | 5850 |
| 105 | 8600 | 6400 | | 5800 |
| 115 | 8700 | 7000 | 3000 | 5800 |
| 125 | 9500 | 6800 | 1000 | 5800 |
| 135 | 8000 | 6400 | 8500 | 5700 |
| 145 | 6200 | 5000 | 6200 | 5000 |
| 155 | 5000 | 4000 | 4500 | 3700 |
| 165 | 3500 | 2700 | 2700 | 2700 |
| 175 | 2700 | 2500 | | 2000 |
| 185 | 2300 | 3000 | | |
| 195 | | | | 3500 |
| 250 | 1800 | | | |
| 260 | 1750 | | | 800 |
| 275 | 1600 | | | |
| 300 | | | | 1900 |
| 325 | | | 2300 | |
| 420 | 3600 | 3600 | | 1600 |
| 430 | | | 3800 | 1600 |
| 460 | | | 2800 | 1600 |
| 465 | 2000 | 2000 | 2800 | 1600 |
| 600 | 2000 | 2000 | 2800 | 1600 |

The temperature range within which the melt streams of polymeric materials are to be maintained in accordance with this invention will vary depending upon various factors such as the polymeric materials used, the containers to be formed and as will be explained the products they will contain. Utilizing the preferred materials disclosed herein for forming the preferred five-layer containers for packaging most products including many food products, the polymeric materials are preferably maintained at a temperature in the range of from about 400° F. to about 490° F.

Table V shows estimations of the temperatures of each of the melt streams at different locations in the injection molding apparatus of this invention during a typical run for forming multi-layer plastic containers for packaging hot filled food products, and non-food products, based on the temperature settings of ambient structures through which the melt streams passed, from the extruders to the injection cavity sprues.

TABLE V

| | Layer Melt Material Temperature (°F.) | | |
|---|---|---|---|
| Apparatus Location | Outer (B) and Inner (A) | Internal (C) | Intermediate (D, E) |
| Extruder Exit | 490 ± 10 | 430 ± 10 | 450 ± 10 |
| Runner Block | 435 ± 5 | 435 ± 5 | 435 ± 5 |
| Orifice Entrances to Combining Area of Co-injection Nozzles | 450 ± 15 | 430 ± 15 | 440 ± 15 |
| Co-injection Nozzle-Injection Cavity Interface | 460 ± 15 | 440 ± 15 | 450 ± 15 |

It has been found that when certain polymeric materials such as certain polyethylenes are processed at the higher temperatures within the range, to form containers for packaging certain foods which require sterilization processing at elevated temperatures, the materials may impart an off-flavor taste to those food. For such applications it has been found that these materials should be processed at lower temperatures, within the range from about 400° F. to about 450° F.

It will be understood by those skilled in the art that processing conditions and the temperatures of structures of the apparatus may be adjusted to permit the use of such lower temperatures. An example of such an adjustment would be in raising the temperature of the injection cavity tool set.

FIG. 139 is a graph schematically plotting on the ordinate the melt flow rate of polymer material into an injection cavity as a function of time. The ascending dashed curve (4) indicates polymer melt flow due to a linear ram displacement through a non-pressurized runner system which includes a nozzle passageway. The gradual increase of flow rate from zero is an indication of time response delay caused by the compressibility of polymer melt. The ascending solid curve (2) indicates polymer melt flow only due to ram displacement through a pressurized runner and nozzle passageway upon removal of blockage of the orifice. An advantage of the pressurized flow system is that the transient response of the flow curve due to ram displacement is faster for a pressurized runner and nozzle passageway than a non-pressurized runner and nozzle. An additional advantage is that an instantaneous flow of polymer melt upon unblockage of the orifice will result (even the absence of further ram movement) from the decompressing of polymer melt in the runner and nozzle passageway, as indicated by the downwardly descending solid curve (1). The horizontal solid line (3) is the sum of polymer melt flow from decompression of polymer melt and ram displacement of a pressurized runner and nozzle passageway. Thus, FIG. 139 shows that in injection molding machines utilizing one or more co-injection nozzles and having long runner systems, to achieve control over the polymer melt materials in terms of being able to provide an instantaneous and relatively constant melt flow rate of any or all materials injected, physical means preferably operative in the nozzle central channel for preventing or blocking uncontrolled onset of flow from the nozzle orifice to the central channel should be employed with means removed from the orifice for displacing the melt material, and for pressurizing the melt material.

In order to assure the achievement of an instantaneous, simultaneous, uniform high melt flow rate over all points of an orifice in an injection nozzle with long polymer flow stream passageways, either in the nozzle or in the runner or both, it is highly preferred that the orifice be blocked as by the valve means of this invention, and while the orifice is blocked, the polymer flow stream passageway be pressurized. Uniform initial flow simultaneously over all points of the orifice is then achieved by merely unblocking the orifice. Preferably however, the means for displacing the polymer material in the passageway is used to additionally pressurize the material in the passageway just before or upon unblocking of the orifice. This achieves a high pressure level as the material initially flows through the orifice. If it is then desired to further control the flow of the material to achieve and maintain a relatively constant melt flow rate during the injection cycle, the polymer material in the passageway should continue to be displaced by the displacement means during the injection cycle.

The relationships which determine the specific requirements for residual pressure and for ram movements will now be described in greater detail. As has been described previously, it is necessary that the level of prepressurization at the orifice for the C layer material be at least slightly higher than the ambient pressure at all circumferential locations about the flowing material to achieve instantaneous flow through the orifice. This prepressurization, even in the absence of further ram movement, would supply polymer for flow through the decompression of the polymer melt in the tapered conical section, in the rest of its nozzle passageway, and in the rest of the runner system. The compressed polymer nearest the orifice will have a more immediate effect on the polymer flow than will the more remote polymer. It should be appreciated, however, that even a very small amount of flow will considerably decompress this polymer melt and reduce its pressure.

FIG. 139A shows the pressure history at the orifice for a simplified case in which there is no ram movement and no flow of other materials in the nozzle central channel. As soon as the orifice opens, there is flow from the orifice and the pressure starts falling. When the pressure reaches the ambient pressure (here, zero), melt flow ceases. When the orifice is closed and screw recharge is actuated (screw moved forward), the melt pressure rises in the runner system and at the orifice, and, assuming sufficient time is allowed, eventually reaches a level equal to that in front of the screw. This residual pressure remains until it is released in the next injection cycle.

FIG. 139B shows the ambient pressure within the central channel, at the closed C orifice, due to a steady flow of the A and B polymer melt materials. The pressure rises from zero, initially quite rapidly as the melt flow is established, and gradually increases as the injection cavity is filled and the total resistance to flow increases. This Figure also shows that at some point in time the ambient flow is stopped and the valve means clears the melt from the central channel, at which point the pressure is again zero.

FIG. 139C shows the pressure in the C orifice for a simplified case in which there is prepressurization and in which there is ambient pressure in the combining area of the nozzle from flow of all polymer s, but in which there is no movement of the ram which moves the polymer C layer material. Again, as in FIG. 139A, there will be an initial and spontaneous flow of polymer C layer material as soon as the orifice is unblocked, but the flow will rapidly diminish and cease as the C layer material is partially decompressed by its own flow. This initial flow of C layer material will be very slight and the resulting C layer will be extremely thin in the injected article if the prepressurization level is only slightly higher than the ambient pressure at the time of unblocking.

FIG. 139D shows a case in which there is prepressurization, ambient flow, and ram movement, but in which the ram movement is initiated somewhat after the orifice is opened. There will be an initial spontaneous flow of polymer C and there will be substantial later flow of polymer C, but there will be an intermediate time, shown in the Figure as the two pressure curves approach each other, in which there will be no or an insubstantial flow of polymer C.

FIG. 139E shows the same case as in FIG. 139D, except that ram movement is started somewhat before the orifice is opened. In Case (a), ram movement is relatively gradual such that by the time the major pressure response to the ram movement reaches the orifice, the C orifice has just opened and the initial drop in pressure seen in FIG. 139D is prevented. In Case (b), ram movement is initially very rapid so that by the time the orifice is opened, the melt pressure in the orifice is considerably higher than the residual pressure. As can be seen in Case (b), the pressurization of the C layer material, that is, the pressure difference between the pressure in the C orifice and the ambient pressure in the central channel is nearly constant, thereby resulting in a more uniform flow and a greater more constant thickness of C throughout the injection cycle. Case (c) is like Case (a) but it illustrates that a slight pressure above the ambient pressure is sufficient to cause flow. With respect to Case (c), the pressure difference at the time of opening of the orifice is relatively small, this could have been mitigated by a higher initial pressure level or by an earlier commencement of the gradual ram movement.

It should be appreciated that FIGS. 139A through 139E are schematic and that certain portions have been exaggerated to show more clearly slight, but important differences in pressures.

The previous paragraphs describe one of the advantages of a high level of prepressurization; that is, to provide spontaneous flow upon unblocking the orifice. It was further described how the initial level of prepressurization, the residual pressure, was preferably combined with a movement of the flow displacement means, the ram, to generate an additional pressure near the orifice prior to or simultaneously with the unblocking of the orifice. There will now more fully be described an additional advantage of pressurization; that is, shortening the time response of the polymer near the orifice to a movement of the ram.

A rapid response time is of great importance to the achievement of the preferred articles of this invention; that is, of multi-layer articles in which a relatively thin buried layer extends uniformly into the marginal end portion or flange and in which the buried layer does not become excessively thin at any location. As was described previously and illustrated in FIG. 139E, a rapid pressure rise as a result of a ram movement is desired near the orifice of C in order to compensate for the rapid pressure drop which results from unblocking the orifice. If the time response is too slow, even a very rapid movement of the ram will result only in a very gradual rise in the pressure at the opposite end of the runner. For that reason, it has been found difficult to develop the desired rate of pressure rise because of the length of the runner systems present in multi-coinjection nozzle injection molding machines, and because of the high compressibility of the material in the runner system. It shall first be described how the geometry of the runner system affects the response time and then the effect of fluid compressibility will be described.

The runner system of a balanced multi-cavity system is necessarily very long to reach from a remote polymer displacement means to each of several nozzles. The fact that the multi-cavity nozzles of this invention are designed to provide a balanced flow of extremely thin layers aggravates the time response problem in that the nozzles are relatively restrictive to the ready flow of material. In particular, the presence of chokes, of the converging conical sections, and of the geometrical restrictions imposed by the flow channels of the other layers tend to result in restricted flow. These restrictions tend to isolate the key portion of the flow passageway, i.e., the orifice, from the greater volume of the rest of the runner system. This makes the nozzle orifice section relatively unresponsive to the pressure in the mass of the runner system, whether that pressure is in the form of a relatively static pressure through prepressurization or of a dynamic pressure being generated by ram movement.

It should also be noted that the co-injection nozzles of this invention may not be completely balanced with respect to time response. That is, the material entering from the rear of the nozzle shell enters a melt pool at one location which will have a quicker time response than will the location in the melt pool 180° from the entry point. As a result of this imbalance, the pressure rise may be faster at one circumferential location of the orifice than it will at another. The effect of such an imbalance would be minimized if the overall response of the system would be faster.

The effect of compressibility on the time response of the runner system will now be described. The response time of a compressible viscous fluid within a closed channel or passageway can be defined as the time required to reach a given pressure as the result of a change in pressure at the opposite end of the fluid flow channel. For a given fluid within a specific channel, the time response is directly related to the compressibility of the fluid. Compressibility is defined as the fractional decrease in unit volume as a function of a one psi increase in hydrostatic pressure. FIG. 139F shows the compressibility of high density polyethylene at a temperature of about 400° F. as a function of pressure over the range of zero to 14000 psig. High density polyethylene is a material which may be utilized in forming some layers of the articles of this invention. Other polymer melts utilized herein will have similar curves. It is particularly significant that the compressibility is much higher at low pressures than it is at higher pressures. The compressibility at atmospheric pressure is $13.2\times10^{-6}$ $(psi)^{-1}$ while at 8000 psi it is only $6.5\times10^{-6}$ $(psi)^{-1}$. This means that a polymer melt of a material such as polyethylene will respond considerably faster to a given ram displacement if the melt within the runner system is already partially compressed. Stated differently, if one is compressing a polymer melt in a runner from atmospheric pressure to a very high pressure level, the initial portion of the pressurization will be considerably slower than the final portion.

By the preferred method of this invention the initial, slow pressurization is effected as early as possible in order for the entire runner system to be at the partially elevated pressure before that portion of the cycle in which rapid response is most critical. In particular, the initial pressurization occurs as soon as the valve means have closed following the previous injection. The level to which the system is pressurized at this early time may be limited, as has been discussed previously, by mechanical considerations such as leakage and breakage as well as by the possibility of obtaining excessive flow of the buried layer as soon as the orifice is unblocked.

The following will explain a method of this invention utilized for prepressurizing the runner system, which is herein meant to include the feed block and passageways in the nozzle assembly. At the end of an injection cycle when the ram is at its lowest volume, while the orifices in the co-injection nozzle are blocked by the valve means, a forward movement of the reciprocating screw in the extruder is initiated to provide material to and to pressurize the ram and runner system. Shortly before or shortly thereafter, the ram is retracted upward to increase the volume of the runner system. As the rams move upward, the pressure in the system tends to drop while the extruders are filling the expanded volume with polymeric melt material. When the rate of volume expansion in the ram equals the rate of melt replacement, the pressure in the ram runner system tends to remain substantially uniform. However, usually, the ram volume increases at a rate faster than the melt replacement rate and the pressure therefore tends to decrease. Given this dynamic system, there tends to be a pressure distribution or variation throughout the runner system with the lowest pressure usually being adjacent the ram plunger face and the highest pressure near the extruder nozzle. When the ram retracts to its furthest point and stops, the extruder continues to move melt material forward into the runner system. As it does the pressure increases. Once the extruder stops pushing material into the system, and the check valve prevents back flow of material toward the extruder, the pressure in the runner system, at this point, will have a distribution or profile which, given sufficient time, will equilibrate or become substantially uniform throughout. This amount of pressure in the system, whether it be non-uniform or substantially uniform, is herein referred to as the recharge pressure, baseline pressure or residual pressure. Thus, the residual pressure measurements will vary depending on where the measurement is taken in the system and when the measurement is taken. In accordance with the methods of this invention, the residual pressure employed in the runner system of the preferred apparatus of this invention is preferably from about 1000 psi to about 5000 psi, more preferably from about 2000 to 4000 psi. With this apparatus, some slow leakage may tend to begin to occur at some pressure above 4000 psi.

In accordance with the above, preferred methods for prepressurization practiced in accordance with this invention involve imparting to the polymer melt material in the runner system while the orifice is blocked by the valve means, a pressure greater than the ambient pressure in the system. Although the pressure imparted can be the residual pressure, preferably the level of pressure is greater than the residual pressure. The pressure is imparted by the means for displacing or moving the polymer material through the runner system. This can be a screw, or a reciprocating device such as a screw or ram. In this invention, the preferred means are the rams. The ram is moved forward to compress the melt and increase the pressure of the melt in the runner system including the nozzle passageway and its orifice. Subjecting a polymer melt material in the runner system, particularly in the passageway and at the blocked orifice, to any pressure greater than the residual pressure in the system can be referred to as further prepressurizing of the material. Further prepressurization can be effected prior to reaching equalization of the residual pressure in the system. It should be noted that the measured or discerned level of residual pressure can be either less than equilibrium or greater than equilibrium depending on where and when the measurement is effected. It is preferred to obtain as high as possible an average residual pressure without causing leakage of the material past the valve means into the central channel and without damaging the nozzle shell cones, particularly their tips, or damaging the plurality of seals throughout the system. The amount of further prepressurization will vary but it should be at a level sufficient to provide a rapid, or substantially simultaneous uniform initial onset flow over all points of the orifice, that is, one which will substantially reduce the time bias of the leading edge of the internal layer or layers in the marginal end portion of the container. It is particularly preferred that the prepressurization be at a level which is greater than that required to cause the polymer melt material in a passageway to flow spontaneously into the central channel once its orifice is unblocked, and that it be at a pressure which will create, when the orifice is unblocked, a sufficient surge of material over all points of the orifice into the central channel when the flow stream is considered relative to a plane perpendicular to the axis of the central channel. Preferably, the level of initial prepressurization is at least about 20% or more greater than the ambient pressure, or, than the level of pressurization necessary to cause the polymer melt material to flow into the central channel once the orifice is unblocked. The prepressurization level desirably is sufficient to densify the material in the passageway adjacent the orifice to a density of from about 2 to about 5% or more greater than atmospheric density. As previously stated, the amount of pressure sufficient to cause the material to flow into the central channel is greater than the ambient pressure of the already flowing materials in the central channel (See FIG. 139E).

It is also preferred that the level of prepressurization is sufficient to overcome any non-uniformities in flow due to imperfections in the uniformity and the symmetry of the designs of the structure of the passageway orifice. The advantages of prepressurization are increasingly significant in multi-coinjection nozzle injection molding machines in that the advantages in overcoming temperature variations and other variations, for example, within tolerances due to machining are increased and are more significant relative to obtaining injected articles from one co-injection nozzle having the same or substantially the same characteristics as the injected articles from each of the other co-injection nozzles. With the preferred methods of prepressurizing a polymer stream, particularly that of the internal layer material(s), as the prepressurized blocked orifice is being unblocked by movement of the valve means, there is included the step of changing the rate of movement of the displacement means, for example, by increasing the rate of displacement of the ram, to attempt to achieve or approach and maintain a substantially steady flow rate of the material through the orifice into the central channel. Preferably, the steady flow rate is the desired design flow rate, and preferably the subsequent pressure is maintained for from about 10 to about 80 preferably to about 40 centiseconds at a pressure level sufficient to provide and maintain a uniform thickness about and along the annulus of the material flowing from the orifice.

This invention includes methods of initiating the flow of a melt stream of polymeric material substantially simultaneously from all portions of an annular passageway orifice into the central channel of a multi-material co-injection nozzle, comprising, providing a polymeric melt material in the passageway while preventing the material from flowing through the orifice into the central channel (preferably with physical means such as the valve means of this invention), flowing a melt stream of one or more polymeric material(s) through the central channel past the orifice, subjecting the melt material in the passageway to pressure which at all points about the orifice is greater than the ambient pressure of the flowing stream at circumferential positons which correspond to the points about the orifice, the pressure being sufficient to obtain a simultaneous onset flow of the pressurized melt material from all portions of the annular orifice, and, allowing the pressurized material to flow through the orifice to obtain said simultaneous onset flow.

This invention also includes methods of initiating a substantially simultaneous flow of a polymeric melt material which will form an internal layer of a multi-layer injection molded article, from an annular passageway orifice such that the internal layer material surrounds another polymeric melt material stream already flowing in the central channel, wherein the co-injection nozzle is part of a multi-coinjection nozzle, multi-polymer injection molding machine having a runner system for polymeric melt materials which extends from sources of polymeric material displacement to the orifices of the co-injection nozzle, comprising, blocking an annular orifice with physical means, and while so blocking the orifice, moving polymeric melt material into the runner system, and while flowing polymeric melt material through the central channel past the blocked orifice, subjecting the polymeric melt material in the runner system to the pressure which at all points about the blocked orifice is greater than the ambient pressure of the flowing melt material stream at circumferential points which correspond to said points about the orifice, wherein the pressure is sufficient to obtain the substantially simultaneous onset flow, and unblocking the orifice to obtain said flow into the central channel. With respect to the aforementioned methods of initiating substantially simultaneous flows, preferably, the material pressurized is that which will form the internal layer of a multi-layer article injected from the nozzle, the subjected pressure is uniform at all points about the orifice, and the orifice has a center line which is substantially perpendicular to the axis of the central channel. During the allowing step there is preferably included the step of continuing to subject the material in the passageway to a pressure sufficient to establish and maintain a substantially uniform and continuous steady flow rate of material simultaneously over all points of the orifice into the central channel. The subjected pressure is sufficient to provide the onset flow of the internal layer material with a leading edge sufficiently thick at every point about its annulus that the internal layer in the marginal end portion of the side wall of the article formed is at least 1% of the total thickness of the side wall at the marginal end portion. In pressurizing the runner system, the pressure subjecting step is preferably effected in two stages, first by providing a residual pressure lower than the desired pressure at which the material is to flow through the blocked orifice to increase the time response of the polymer melt material in the runner system to subsequent movements of the source of polymeric melt material displacement means, and then before or upon effecting the allowing step, raising the level of pressure to the desired pressure at which the internal layer material is to flow through the orifice. The pressure raising step may be executed gradually but preferably rapidly, just prior to or upon effecting the allowing step. A polymer supply source exterior of the runner system such as a reciprocating screw upstream of a check valve can be employed to pressurize the polymeric material in the runner system. In the two stage pressurizing method, the providing of the residual pressure can be effected by reciprocating the source of polymer melt material displacement.

This invention includes methods of prepressurizing the runner system of a unit-cavity or multi-cavity multi-polymer injection molding machine for forming injection molded articles, having a runner system for polymer melt materials which extends from sources of polymer melt material displacement to the orifices of a co-injection nozzle having polymer melt material passageways in communication with the orifices which, in turn, communicate with a central channel in the nozzle, which in some embodiments basically comprises, blocking an orifice with physical means to prevent material in the passageway of the orifice from flowing into the central channel, and, while so blocking the orifice, retracting the polymer melt material displacement means, filling the resulting volume in the runner system with polymer melt material from a source upstream relative to the polymer melt material displacement means and external to the runner system, the amount of retraction and the pressure of the polymer melt with which the volume is filled being calculated to be just sufficient to provide that layer's portion of the next injection molded article and the pressure of the volume-filling melt being designed to generate in the runner system a residual pressure sufficient to increase the time response of the polymer melt material in the runner system to subsequent movements of the source of polymer melt material displacement means, and prior to unblocking the orifice, displacing the polymer melt material displacement means towards the orifice to compress the material further and raise the pressure in the runner system to a level greater than the residual pressure and sufficient to cause when the orifice is unblocked, the simultaneous onset flow. These methods can also be effected while the orifice is blocked, by moving melt material into the portion of the runner system extending to the blocked orifice, discerning the level of residual pressure of the polymer melt material moved into said portion of the runner system, and displacing the melt material in the runner system towards the orifice to compress the material and raise the pressure in the runner system to a level greater than the residual pressure and sufficient to cause the simultaneous and preferably uniformly thick onset flow.

This invention also includes other methods of effecting prepressurization. The invention includes a method of prepressurizing the runner system for a polymer melt material of a multi-cavity multi-polymer injection molding machine, which extends from a source of polymer melt material displacement to the orifice of a co-injection nozzle having a polymer melt material passageway in communication with the orifice which in turn communicate with a central channel in the nozzle, which comprises, blocking the orifice with physical means to prevent polymer melt material in the passageway of the orifice from flowing into the central channel, and, while so blocking the orifices, moving polymer melt material into the runner system, discerning the level of residual pressure of the polymer melt material moved into the runner system, and displacing at the polymer melt material in the runner system toward its blocked orifice to compress the material and raise the pressure in the runner system to a level greater than the residual pressure and which is sufficient to cause, when the orifice is unblocked, a simultaneous and uniformly thick onset flow of the prepressurized polymer melt material over all points of the orifice into the central channel. This method can be employed for any or all of the melt materials supplied to a co-injection nozzle, or to a plurality of co-injection nozzles of a multi-cavity multi-polymer injection molding machine.

Other prepressurization methods are those of forming a multi-layer plastic article with a marginal end portion, an outer surface layer, and an inner surface layer and at least one internal layer therebetween, such that the leading edge of the internal layer extends substantially uniformly into and about the marginal end portion of the article or container, wherein the method comprises the same steps as the prepressurization methods of this invention relating to extending the leading edge of the internal layer uniformly into the marginal end portion of an article or parison or container having a side wall.

Another method of prepressurization of this invention is that of forming an open-ended, five layer plastic article having a side wall with a marginal end portion, an outer surface layer, an inner surface layer, an internal layer, and an intermediate layer between the internal layer and each surface layer in an injection cavity of a multi-cavity multi-polymer injection molding machine such that the leading edge of the internal layer extends substantially uniformly into and about the marginal end portion, wherein the multi-cavity injection molding machine has a runner system which extends from sources of polymer melt material displacement to a co-injection nozzle having a polymer melt material flow passageway for each material which is to form a layer of the article, a central channel, and an orifice for each passageway in communication with its passageway and the central channel, means for displacing the polymer melt materials to the orifices and into the central channel of the co-injection nozzle, there being a displacing means for each material which is to form a layer of the article, means for providing polymeric melt materials into the runner system, and physical means for blocking and unblocking the orifices, which comprises, blocking at least the orifices for the materials which are to form the internal and intermediate layers, with physical means to prevent said materials from flowing through their blocked orifices into the central channel, moving polymer melt material into the runner system, discerning the level of residual pressure of the polymer melt materials that have been moved into the runner system, displacing the polymer melt materials for forming the internal layer and the intermediate layers in their passageways towards their blocked orifices to compress the materials and raise the pressure in the system for those materials to a level greater than the residual pressure and sufficient to cause uniform and simultaneous onset flow of each said prepressurized layer materials over all points of their orifices into the central channel when their orifices are unblocked, flowing the inner surface layer material into and through the central channel while preventing the flow of the internal and intermediate layer materials into the central channel, flowing the outer surface layer material through the central channel in the form of an annular flow stream about the flowing stream of inner surface layer material, unblocking the orifices of the prepressurized internal and intermediate layer materials, flowing the prepressurized internal and intermediate layer materials into the central channel into or onto the interface of the flowing inner and outer surface materials such that the internal layer material and the intermediate layer materials respectively have a rapid initial and simultaneous onset flow over all points of their respective orifices into the central channel and each forms an annulus about the flowing inner surface layer material between it and the outer surface layer material, and such that the leading edges of the respective annuluses of the internal layer material and the intermediate layer materials each lie in a plane substantially perpendicular to the axis of the central channel, and, injecting the combined flow stream of the inner, outer, internal layer materials into the injection cavity, in a manner that renders said leading edges substantially uniformly into and about the marginal end portions of the container.

Another method included within the scope of this invention for initiating a substantially uniform onset flow of one or more melt material streams of polymeric materials into the central channel of a nozzle of an injection molding machine for forming one or more internal layers of a multi-layer plastic article injected from the nozzle and having an outer surface layer, an inner surface layer and one or more internal layers therebetween, comprises utilizing one or more condensed phase polymeric materials as the one or more internal layer melt stream or streams of polymeric materials, flowing the inner layer melt stream into the central channel as a core stream past said at least one orifice, flowing the outer layer melt stream into the central channel to surround the already flowing core stream, providing the combined flowing streams for the outer and inner layers with a selected ambient pressure in the central channel, supplying said one or more internal layer melt streams of condensed polymeric material into their passageways, imparting a selected first pressure to each of said one or more internal layer melt streams at said at least one orifice, said first pressure being below that pressure which, relative to the ambient pressure, would cause the material(s) for the internal layer(s) to flow into the central channel, adjusting the first pressure to a second level equal to or just below the ambient pressure of the materials flowing in the central channel to compress the one or more internal layer melt streams to provide a flow response into the central channel which would be more rapid than without said adjusted first pressure, and to prevent back flow of already flowing material into the at least one internal orifice, and causing the internal layer melt stream or streams to flow rapidly through the at least one orifice into the central channel, by creating a rapid change in the relative pressures between the one or more internal layer materials at said at least one orifice and the ambient pressure in the central channel, such that the pressure of the one or more internal layer material(s) is rapidly changed to a level sufficiently high relative to the ambient pressure that there is established a substantially uniform onset flow of said one or more internal layer material(s) as one or more annular streams substantially simultaneously over all points of said at least one orifice into the central channel. In the aforementioned method, the rapid change in relative pressures can be effected by rapidly increasing the pressure of the one or more internal layer materials, or by decreasing the ambient pressure of the already flowing streams in the central channel, or by a combination of both. This method is applicable to forming five layer articles wherein three internal layers are injected, for example an internal barrier layer having to either of its sides an intermediate adherent layer.

A "condensed phase" material here means a material in which there is no significant gaseous or vapor phase when the material is subjected to atmospheric pressure or higher. A material containing an incidental quantity of dissolved water is herein considered to be a condensed phase material, even though dissolved water in sufficient amounts may foam somewhat at elevated temperatures and pressures. Foaming would be undesirable. It is to be noted that in the processes of this invention, no foaming has been observed. Condensed phase materials are relatively incompressible compared to mixtures or solutions used to make foams, and they have a measurable and substantive change of density with the high pressure levels used in injection processes.

Another method of initiating a substantially uniform flow of a melt stream material over all points of an annular internal passageway orifice into a central channel of a multi-material co-injection nozzle to form an internal layer of a multi-layer injected article involves preventing the internal layer from flowing through its orifice, pressurizing the material in the passageway while continuing to prevent its flow, said pressurization being sufficient to provide a pressure in the internal layer material which is greater than the ambient pressure in the nozzle central channel and greater than the pressure being imparted to the flowing other material, and said pressurization further being sufficient to densify the internal layer material in the passageway adjacent the orifice and to create a high initial rate of flow of internal layer material simultaneously and uniformly through all points around the passageway orifice when the material is permitted to flow therethrough, and permitting said pressurized internal layer material to flow through said orifice in said simultaneous and uniform initial manner. This method can be utilized with respect to forming a three or five layer material wherein the internal layer material surrounds a stream of another melt material already flowing in the central channel and the level of pressure is sufficient to cause the internal layer material to insert itself annularly about the already flowing material from the third nozzle orifice, usually the A layer material, to provide a combined stream which includes a substantially concentric and radially uniform core of material from the third orifice, a next surrounding uniform, substantially concentric layer of material from the second orifice, usually the C layer material, and surrounding that material, an encompassing uniform, substantially concentric layer of material flowing from the first orifice. Preferably this method is effected with tapered passageways for increasing the volume of compressed material adjacent the orifice which will initially flow into the central channel when the orifice is unblocked. Preferably the pressure on the internal layer material is from about 20% or more higher than the ambient pressure of the already flowing materials in the central channel. An additional pressure can be imparted upon the internal layer material once it is allowed to flow to maintain an effective total pressure sufficient to approach and maintain a substantially steady flow rate of the material through the second orifice into the channel. It is advantageous that the internal layer passageway be tapered toward its orifice to increase the volume of compressed material adjacent the orifice which will initially flow when the orifice is unblocked, relative to an untapered passageway having an orifice of the same dimensions.

Still another method of effecting a substantially uniform onset flow simultaneously over all portions of an annular passageway includes imparting a first pressure which is insufficient to cause leakage of the condensed phase materials through the blocked orifices into the central channel or from one orifice into another orifice, yet which would be sufficient to cause the materials to flow into the central channel if their flows were not prevented or their orifices were unblocked, and, prior to allowing them to flow through the passageway orifices, separately and independently subjecting the materials in the passageways to a second pressure greater than the first pressure and sufficient to create, when their orifices are unblocked, a surge of said polymeric materials and uniform onset annular flows thereof into the central channel when the leading edges of the respective flow streams are considered relative to planes perpendicular to the axis of the central channel, said second pressure being of a sufficient level and being imparted for a duration sufficient to establish and maintain the substantially uniform initial flows simultaneously over all points of the orifices into the central channel.

Another method of this invention is that of forming in a co-injection nozzle a multi-layer substantially concentric combined stream of at least three polymeric materials, which includes utilizing valve means in the central channel operative adjacent the orifices to block and unblock the second orifice and to prevent and to allow the flow of internal polymer material through the second orifice and for independently controlling the flow or non-flow of the core material through the third orifice, preventing flow of polymer material from all of the orifices, continuing to prevent flow of polymer material through the second orifice while allowing flow of structural material through one or both of the first and third orifices, then, subjecting the polymer material in the second passageway to a first pressure which would be sufficient to cause the material to flow into the central channel if its orifice was unblocked, prior to allowing flow through the second passageway, subjecting said material in the second passageway to a second pressure greater than the first pressure yet less than that which would cause leakage of polymer material through the orifice past the blocking valve means into the channel, said second pressure being sufficient to create when said orifice is unblocked, a surge of polymer material and a uniform onset annular flow of polymer material into the central channel when the flow stream is considered relative to a plane perpendicular to the axis of the central channel, increasing the rate of movement of said polymer, material to approach and maintain a substantially steady flow rate of said material through the second orifice into said channel, preventing the flow of polymer material through the third orifice while allowing the second pressurized flow of material through the second orifice, to knit the intermediate layer material with itself through the core material preventing the flow of polymer material through the second orifice while allowing flow of polymer material through the first orifice and, either moving the valve means forward to push the knit intermediate layer forward and to substantially encapsulate the knit internal layer with material from the first orifice, or, accumulating material that has flowed from the third orifice at the forward end of the valve means, and moving the valve means forward to substantially encapsulate the knit intermediate layer material with the accumulated material from the third orifice.

The above method can include the steps of subjecting said material in the first passageway to a second pressure greater than the first pressure and sufficient to create when its orifice is unblocked, a surge of polymer material and a uniform onset annular flow of polymer material into the central channel when the flow stream is considered relative to a plane perpendicular to the axis of the central channel, said second pressure being less than that which would cause leakage of polymer material past the blocking valve means into the channel, allowing the flow of material through the first orifice, and increasing the rate of said forward movement of said polymer movement means to attempt to achieve and maintain a substantially steady flow rate of said material through the first orifice into said channel.

The above method can further include the steps of, prior to allowing the flow of core structural material through the third orifice for forming the inner layer of the article, subjecting said material in the third passageway to a second pressure greater than the first pressure and sufficient to prevent any detrimental pressure drop when its orifice is unblocked, and upon unblocking of the orifice, to create an immediate flow response of polymer material into the central channel, said second pressure being less than that which would cause leakage of polymer material past the blocking valve means into the channel, allowing the flow of material through the third orifice, and modifying the rate of said forward movement of said polymer movement means to maintain a modified substantially steady flow rate of said material through the third orifice into said channel.

Another method of this invention is that of forming in a co-injection nozzle a multi-layer substantially concentric combined stream of at least three polymeric materials for injection as a combined stream into a cavity to form a multi-layer article, the combined stream having an outer layer of structural material for forming the outer layer of the article, a core of structural material for forming the inner layer of the article, and one or more intermediate layer(s) of material for forming an internal layer(s) of the article, which comprises, providing the co-injection nozzle means of this invention having at least three polymer flow stream passageways and orifices, valve means operative in the nozzle central channel and a source of polymer movement for each polymer material which is to form a layer of the structure to move each said material to its passageway and its orifice in the co-injection nozzle, preventing flow of polymer material from all of the orifices, continuing to prevent flow of polymer material through the second orifice while allowing flow of structural material through one or both of the first and third orifices, then, prior to allowing flow through the second passageway, subjecting said material in the second passageway to a pressure less than that which would cause leakage of polymer material past the blocking valve means into the channel, and yet sufficient to create when its orifice is unblocked, a surge of polymer material and a uniform onset annular flow of polymer material into the central channel when the flow stream is considered relative to a plane perpendicular to the axis of the central channel, allowing said surge and uniform onset flow of intermediate layer material through the second orifice, maintaining a pressure on said polymer material sufficient to approach and maintain a substantially steady flow rate of said material through the second orifice into said channel, preventing the flow of polymer material through the third orifice while allowing the second pressurized flow of material through the second orifice, to knit the intermediate layer material with itself through the core material, preventing the flow of polymer material through the second orifice while allowing flow of polymer material through the first orifice and, either moving the valve means forward to push the knit intermediate layer forward and to substantially encapsulate the knit internal layer with material from the first orifice, or, accumulating material that has flowed from the third orifice at the forward end of the valve means, and moving the valve means forward to substantially encapsulate the knit intermediate layer material with the accumulated material from the third orifice.

Another method of forming in a co-injection nozzle a multi-layer substantially concentric combined stream of at least three polymeric materials in the aforementioned co-injection nozzle means involves controlling the thickness, uniformity and radial position of the internal layer in the combined stream by providing and utilizing means in all annular polymer flow stream passageways at least in the first and second passageways for balancing the flow of the respective polymer flow streams passing through the first and second passageways such that, as the respective streams enter the central channel, each flow stream is substantially uniform in terms of pressure and temperature about its circumference such that in the combining area of the nozzle, each of the respective layers which form the combined stream are substantially concentric relative to each other. Preferably the core structural material is concentric relative to the axis of the central channel when the material for forming the outer layer of the article is introduced into the central channel, and preferably both the core material and the outer layer material are substantially concentric and have their midpoints substantially on the axis of the central channel when the internal layer is introduced between them in the combining area of the central channel.

Yet another method of forming in a co-injection nozzle a multi-layer substantially concentric combined stream of the at least three polymeric materials for injection into a cavity to form a multi-layer article, wherein the article has one or more intermediate layers of material for forming an internal layer of the article, comprises, providing the co-injection nozzle means of this invention having at least three polymer melt flow stream passageways and orifices and, utilizing valve means operative in the nozzle central channel for blocking the first and second orifices, subjecting the polymer materials in the passageways blocked by said valve means to a first pressure sufficient to cause the blocked materials to flow into the central channel if the valve means were not blocking the first and second orifices, subjecting the materials in the passageways to a second pressure greater than the first pressure, said second pressure being sufficient to create a uniform onset annular flow into the central channel having along the onset edge a plane substantially perpendicular to the axis of the central channel, said second pressure being provided while the valve means continues to prevent the respective materials from flowing through the first and second orifices, just before moving the valve means to unblock said first and second orifices, after subjecting the materials in the passageways to said second pressure, unblocking the first and second orifices by moving the valve means to provide a uniform onset annular flow of each of said materials into the central channel, said onset flow in the channel being in a vertical plane relative to the axis of the central channel, and maintaining a pressure on said materials at least for from about 10 to about 80 centiseconds sufficient to maintain a steady flow of said polymer materials through said first and second orifices into the central channel, and to provide and maintain uniform thickness about and along the annulus of the material flowing from the first orifice and the material flowing through the second orifice.

Other methods of prepressurization and methods of utilizing prepressurization to advantage are disclosed elsewhere herein.

The nozzle valve means alone, or, preferably, in combination with the pressurization and polymer flow movement provided by the polymer displacement means, which in the preferred embodiment are the five rams, one for each material which is to form a layer, provides precise independent control over the flow of each of the polymer flow streams and concomitant control over thickness and location of each of the layers of the multi-layer wall of the injected article. Independent control over the flow stream of the inside surface layer A material and over the flow stream of the outside surface layer B material provides control of the layers relative to each other, provides control over the relative thickness of each layer, provides control over the location of the interface between the flowing materials of those layers and thus provides control over the location of the internal layer C or layers C, D, E situated between the surface layers. Likewise, independent control over the flow of the materials of layers D and E can provide control over the location of layer C. Independent control over the flow of the internal layer or layers provides control over the thickness of the layer or layers. Thus, one or more of the internal layers C, D, E can be controlled to be very thin, and its location controlled, which is of substantial economic and technical benefit where, for example, the adhesive layer material is relatively expensive and more so the internal layer C is a relatively expensive polymer functioning as a gas barrier. If the barrier material is adversely sensitive to one or both of the environments inside or outside the injected article, control over the location of the barrier layer within the wall of the article is important in order to maximize the effectiveness of the protection of the barrier layer which is provided by the layer or layers on either side of the barrier layer.

For example, when it is desired to form a container for packaging an oxygen sensitive food product which requires thermal processing in the container at a temperature which sterilizes the packaged food, the injection molded or blow molded container utilized, while preferably having a bottom wall whose average thickness is less than the average thickness of the container side wall, preferably also has a barrier layer which is thicker in the bottom wall relative to the bottom wall total thickness than it is in the side wall relative to the side wall total thickness. Although the total thickness of the bottom wall may be changed relative to the total side wall thickness by changing the geometry of the blow mold tooling used for making the parison from which the container is blown, or the temperature of the tooling or of the melt materials, with the same tooling and without such modifications, the barrier layer may be made thick in the bottom wall relative to its thickness in the side wall by selectively reducing the rates or volumes of flow of the one or both of the structural materials during that portion of the injection profile which forms the bottom portion of the parison, and which when blow molded, forms the bottom wall of the container. This permits thinning one or both of the structural layers A and B in the bottom wall and thickens the C layer in the bottom wall regardless of whether the rate or volume of flow of the barrier layer C is held constant or is increased. Alternatively, during a said injection profile portion which, as disclosed in FIG. 142, can be from about 1.0 to about 1.1 second, the flow rate of each structural layer A, B and of each adhesive material D, E may be held constant while the flow rate of the barrier layer C is rapidly increased. Preferably, the flow rates of both materials A and B are decreased while t he flow rate of barrier layer C is increased or held constant. These techniques also thicken the barrier layer C in the bottom wall, relative to that layer's thickness in the side wall.

To move the location of, for example, a moisture sensitive barrier layer in the bottom wall away from the inside surface of the container to provide greater protection to the barrier from moisture in the container, the flow rate of the outer material B is decreased, the flow rate of the inner mate rial A is either increased or held constant, and the flow rate of the barrier layer C is held constant.

Having the ability to provide a thicker internal or barrier layer relative to the total thickness of all layers, in the bottom wall of containers of this invention, provides economic advantages over other containers, for example multi-layer thermoformed plastic containers wherein the internal layer is of a uniform thickness relative to the total thickness throughout the bottom and side wall, each of which are stretched uniformly from a blank during formation of the container. Therefore, providing a thick internal layer in the bottom wall of a thermoformed container requires that the layer be thick in the blank and necessarily means that the layer in the thermoformed container made from the blank will be as thick relative to the total thickness, in the side wall as in the bottom wall.

Another advantage provided by the use of an individual source of polymer displacement and pressurization such as a ram for each layer is that the capability of the valve means to rapidly traverse each and all orifices, particularly when they are narrow and close to each other, minimizes the effect of slight errors in machine tolerances or design of, say, a choke in one or more shells or in one or more but less than all of the eight co-injection nozzles, and minimizes the effect of any such errors in the initiation and termination of flow substantially simultaneously and substantially identically in all co-injection nozzles.

Although the previously discussed preferred embodiment of the process of this invention which provides the aforementioned precise independent control employs a ram for each material which is to form a layer of the article, it is to be appreciated that a less preferred process of this invention uses a single ram for a material which will comprise more than one layer. Though less preferred, this common ram system with the valve means provides sufficient independent control over the layers. More particularly, if the outer layer and the inner layer are of the same material, a single material movement means, displacement means or pressurization source can be employed for both streams. The features of this invention which permit the use of a common source of pressurization for a material which forms two layers of an article, are the valve means of this invention which permits the independent stopping and starting the flow of these layers of common material, even when both are pressurized, and the design of the runner system which provides an equal flow path for each melt stream of material that forms a corresponding layer of the item to be injected. Somewhere between the ram and the nozzle orifices, the flow channel for the common material is split into two flow channels to take the material for the two layers to each co-injection nozzle.

Moreover, in a preferred embodiment of such a common ram system, even the relative flows of the two streams of common material, for example, for the two structural layers can be controlled by moving the pin within the sleeve to partially block and reduce the flow of one of the melt streams, for example, of the A layer material through the sleeve port. To achieve the maximum range of control, it is preferred that, for example, the flow resistance of the melt channel for the inner A layer be less than that forming the outer B layer when the sleeve aperture is fully open. The melt channel in this context is measured from either the pressure source or from the point of splitting or branching into the two flow streams, to the central channel. In this way it will be possible to vary the flow of the inner A layer to be either greater or less than that of the outer B layer by utilizing the valve means for controlling the degree of blockage. This will apply whether the article to be formed is to have three, five or any plural number of layers. In the preferred embodiment of a co-injection nozzle of such a common ram system, wherein the passageway for the A layer material into the central channel is by design larger than the size of the other orifices, with a ram common to a material for the A and B layers, equal flow of the common material can be provided with the valve means by using the pin to partially block the entrance, while the orifice for the B layer is unblocked. As for controlling the radial distribution of layers in a combining area or injection cavity by use of the common ram system, it is effected more by pin manipulation than by ram displacement profile. For example, to decrease the outside structural layer thickness in order to shift the internal barrier layer, or the adhesive and barrier layers, toward the outside of a parison or container, the solid pin is withdrawn to increase the size of the unblocked portion of the entrance of the passageway for the A layer material. This increases the flow of the polymer material for the inside layer, A, and decreases the amount of material available for forming the outside layer, B, and thereby attains the desired radial layer distribution. When using the common ram system with valve means, in knitting the internal layer with itself by moving the pin forward to block the flow of the common material for the A layer through the sleeve port, more of the common material flow is diverted to the passageway for the B layer. This may be undesirable for certain high barrier container applications because it may result in an interruption in the continuity of the internal layer material in the bottom of the container, and in an internal barrier layer being too close to the inside of the container by reason of the increased flow and thickness of the B layer material. However, these results may be minimized or prevented by reducing the displacement of the common ram upon blocking of the entrance for the A layer.

Similarly, in the case of a five, seven or comparable layer article, a common pressure source can be employed for two or more intermediate layer material streams when they are comprised of the same material. In the case of a five layer article of this invention, the flow of the intermediate layer stream, here, D, next to the inner layer stream, here, A, can be modulated by partially blocking its orifice with the sleeve. Again, as previously explained in relation to the A and B layer materials, to achieve the maximum range of control, the resistance to flow in the intermediate layer D stream next to the inner layer stream A should be less than that of the intermediate layer stream, here, E, next to the outer layer stream, B, when both orifices are completely unblocked.

Utilizing the aforementioned common ram system, the previously discussed delamination consideration between the C layer and the inner layer A in five layer injection molded articles can be avoided by using the common ram to prepressurize the common adherent material for the intermediate E and D layers to the same level while their respective fourth and fifth orifices are blocked by the valve means, and withdrawing the sleeve to fully unblock the orifices for the E and C layers but only to partially block the orifice for the D layer. This will cause the desired flow of an abundance of E material into the central channel which is sufficient to flow about the leading edge of the C layer material, join the leading edge of the D layer and fully encapsulate the C layer leading edge with intermediate adherent material. Thus, while the common ram system does not provide the same flexibility and precise degree of control as is available with the preferred individual ram-to-individual layer system, it does provide a suitable alternative.

Another and significant feature of the independent layer control provided by either the single ram-for-each layer system or the common ram-for-two layers system is that they can be used according to the present invention to effect foldover of the terminal end of one or more of the internal layers. The preferred flow of polymer material in the nozzle central injection channel and in the injection cavity is laminar, wherein linear polymer flow velocity is maximum at a fast flow streamline, which, in the injection cavity, usually is at or near the center line of polymer flow and diminishes on either side thereof. The location of the fast flow streamline will, however, be other than the center line if the two wall temperatures are different or if the viscosity of the inside polymer stream is different from the outside stream. The flow of polymeric material in the nozzle injection channel has a flow streamline which corresponds to the fast flow streamline in the injection cavity. By selectively changing the flow of one or more polymer streams on one side of an internal layer, relative to the flow of one or more polymer streams on the other side of that internal layer, during a part of the injection cycle as described below, the location of the internal layer relative to the fast streamline may be selectively varied or moved so as to cause the terminal end of the internal layer to fold over.

If it is present, time bias of initial flow of the internal layer material into the nozzle central channel around its circumference, or velocity bias, can, as stated previously, result in the terminal end of the internal layer having different axial positions at various sections around the circumference of the injected article. Should this flow condition continue, the terminal end of the internal layer would not extend all the way into the end portion of the injected article at all sections around its circumference. Such result of time bias or velocity bias can be substantially reduced by folding over the biased terminal end to provide a substantially unbiased overall leading edge of the internal layer. It may be reduced by folding over at least a portion, preferably the leading portion of the marginal end portion of the internal layer by selective independent control of the location and flow of the polymer streams, as stated above, so as initially to introduce the internal layer at a flow streamline which is not coincident with the fast flow streamline and then moving the layer to a second location which is either relatively more proximate to, or substantially coincident with the fast flow streamline or is across the flow stream, i.e., past the fast flow streamline where the flow velocity is maximum, to a second location on the other side of the fast flow streamline and not too far from it. As a result, at the conclusion of polymer movement in the injection cavity, as illustrated in FIG. 135 the biased terminal ends, here designated 1117 and 1119, of the folded over portion of the internal layer have been folded over along fold line 1125 so that the internal layer extends into the marginal end portion of the injected article. Thus, at the conclusion of polymer movement in the injection cavity, the internal layer extends into the end portion of the injected article at substantially all sections around its circumference.

Broadly, foldover is achieved by a method, according to the present invention, of injecting a multi-layer flow stream comprising three layers into an injection cavity in which the speed of flow of the layered stream is highest on a fast flow streamline positioned intermediate the boundaries of the layered stream. The method comprises the steps of establishing the flow of material of a first layer of the flow stream and the flow of material of a second layer of the flow stream adjacent to the first layer to form an interface between the flowing materials of the first and second layers. In the preferred embodiment, the first and second layers of the multi-layer flow stream form the inside and outside surface layers of the injected article. The interface between the flowing materials of the first and second layers is positioned at a first location which is not coincident with the fast flow streamline. This is accomplished by selective control over the flow of the first layer material and of the second layer material. The flow of material of a third layer of the flow stream is then interposed between the first and second layers with the location of the third being at a position which is not coincident with the fast flow streamline. As noted above, the third layer material forms an internal layer of the injected article and may be a moisture-sensitive oxygen barrier material. The location of the third layer of the multi-layer flow stream is then moved to a second location which is substantially coincident with the fast flow streamline. Preferably, the third layer is moved to the second location when or shortly after its flow has been interposed between the first and second layers, and, most preferably, when or shortly after the flow of the third layer material has been interposed between the first and second layers at substantially all places across the breadth of the layered stream.

The present foldover invention also broadly encompasses the movement of the location of the third layer of the multi-layer flow stream from a first location on one side of the fast flow streamline to a second location which is intermediate to the first location and the fast flow streamline or more proximate to the fast flow streamline, and which is therefore a faster flow streamline than is the first streamline.

The present foldover invention also broadly encompasses the movement of the location of the third layer of the multi-layer flow stream from a first location on one side of the fast flow streamline, across the fast flow streamline, to a second location which is not coincident with the fast flow streamline. Such movement of the location of the third layer to its second location is preferably carried out when or shortly after the flow of the third layer material has been interposed between the first and second layers, and, most preferably, when or shortly after the flow of the third layer material has been interposed between the first and second layers at substantially all places across the breadth of the layered stream.

More specifically, in carrying out the present method of injecting a multi-layer flow stream to effect foldover, there is established in the injection channel of an injection nozzle the flow of material of a first layer of the flow stream and the flow of material of a second layer of the flow stream adjacent to the first layer to form an interface between the flowing materials of the first and second layers. The multi-layer flow stream in the injection channel of the nozzle has a flow streamline which corresponds to the fast flow streamline in the injection cavity. The rate of flow of the first layer material and the rate of flow of the second layer material are selected to position the interface between them at a first location which is not coincident with the fast flow streamline in the injection cavity, or which is not coincident with the flow streamline in the nozzle injection channel which corresponds to the fast flow streamline in the injection cavity. The flow of material of a third layer of the flow stream is interposed between the first and second layers with the position of the third layer being at a first location which is not coincident with the fast flow streamline in the injection cavity, or which is not coincident with the flow streamline in the nozzle injection channel which corresponds to the fast flow streamline in the injection cavity. The relative rates of flow of the first and second layer materials are then adjusted to move the location of the third layer to a second location. The second location is substantially coincident with the fast flow streamline in the injection cavity, or with the flow streamline in the nozzle injection channel which corresponds to the fast flow streamline in the injection cavity. Alternatively, the relative rates of flow of the first and second layer materials are adjusted to move the location of the third layer from the first location on one side of the fast flow streamline, across the fast flow streamline, to a second location which is not coincident with the fast flow streamline. In terms of the flow streamlines in the nozzle injection channel, the relative rates of flow of the first and second layer materials are adjusted to move the position of the third layer in the nozzle injection channel from a first location on one side of the flow streamline in the channel that corresponds to the fast flow streamline in the injection cavity, across the flow streamline in the channel that corresponds to the fast flow streamline in the injection cavity, to a second location in the channel which is not coincident with the flow streamline in the channel that corresponds to the fast flow streamline in the injection cavity.

Most specifically, in carrying out the present method of injecting a multi-layer flow stream to cause foldover of the leading edge of a flowing annular stream of internal layer material, there is provided a method of injecting, by means of a nozzle having an injection channel, a multi-layer flow stream comprising three layers. The multi-layer flow stream is injected into an injection cavity in which the speed of flow of the stream is highest on a fast flow streamline positioned intermediate the boundaries of the layered stream. The method comprises establishing in the nozzle injection channel the flow of material of a first layer of the flow stream and the flow of material of a second layer of the flow stream adjacent to and around the first layer to form an annular interface between the flowing materials of the first and second layers. The flow stream in the nozzle injection channel has a flow streamline which corresponds to the fast flow streamline in the injection cavity. The rate of flow of the first layer material and the rate of flow of the second layer material are selected to position the annular interface between the flowing first and second layer materials at a first location in the nozzle injection channel which is not coincident with the flow streamline in the channel that corresponds to the fast flow streamline in the injection cavity. The flow of material of a third layer of the flow stream is interposed around the first layer and between the first and second layers with the location of the third layer being at a position which is not coincident with the flow streamline in the nozzle injection channel that corresponds to the fast flow streamline in the injection cavity. When or shortly after the flow of the third layer material has been interposed between the first and second layers at substantially all places around the circumference of the annulus between the first and second layers, the relative rates of flow of the first and second layer materials are adjusted to move the location of the third layer in the nozzle injection channel to a second location in the channel. That second location may either be substantially coincident with the flow streamline in the channel that corresponds to the fast flow streamline in the injection cavity, or that second location may be across the flow streamline in the channel that corresponds to the flow streamline in the injection cavity. In the latter case, the location of the third layer in the injection channel is moved across the flow streamline in the channel that corresponds to the fast flow streamline in the injection cavity to a second location in the injection channel which is not coincident with the flow streamline in the channel that corresponds to the fast flow streamline in the injection cavity.

The preferred method of injecting a multi-layer flow stream to cause foldover of the leading edge of a flowing annular stream of internal layer material will now be described with particular reference to FIGS. 130–137 which schematically depict a portion of a simplified form of nozzle assembly 296 adapted, for illustrative purposes, for the flow of a three-layer flow stream. The material of layer A of the flow stream, and which forms the inside layer of the injected article, flows axially through the nozzle central channel 546 which will herein be referred to as the nozzle injection channel or the injection channel. The material of layer B of the flow stream, and which forms the outside layer of the injected article, flows between nozzle cap 438 and outer shell 436 and then through annular orifice 462 into the injection channel. The material of layer C of the flow stream flows, in this illustrative embodiment, between outer shell 436 and inner shell 430 and then through annular orifice 502 into the injection channel 546. In the injection channel, the material flow stream has a flow streamline 1101 (generally designated by a dash line) which corresponds to a fast flow streamline 1103 (generally designated by a dash line) of the material flow stream in the injection cavity 1105, which is bounded, on one side, by the surface 1107 of core pin 1109 and, on the other side, by the surface 1111 of injection mold

1113. The speed of flow of the material flow stream in the injection cavity is highest on fast flow streamline 1103.

Referring to FIG. 130, the first step of the method is establishing in injection channel 546 the flow of material of a first layer of the flow stream, layer A, and the flow of material of a second layer of the flow stream, layer B, adjacent to and around the first layer to form an annular interface 1115 between the flowing materials of the first and second materials, for layers A and B respectively. In the next step, the rate of flow of the layer A material and the rate of flow of the layer B material are selected to position the interface 1115 at a first location in the injection channel 546 which is not coincident with the flow streamline 1101 in the channel that corresponds to the fast flow streamline 1103 in the injection cavity 1105. The first location of interface 1115 is close to, but is offset from, flow streamline 1101. The relative rates of flow of the material of layer A with respect to the material of layer B are initially selected or later adjusted so that, just prior to introducing the layer C material into the nozzle central channel, the interface 1115 between the flowing A layer material and the flowing B layer material is positioned at the location where it is desired to locate the layer C material when it is first introduced into said channel. The first and second steps may take place substantially concurrently. In the illustrated embodiment, the interface 1115 is radially outboard of flow streamline 1101, i.e., radially farther away from the central axis of the flowing material streams. As will be described, this will result in the folded over portion of the third layer material being positioned between fast flow streamline 1103 and the outer surface of the outside layer B. When it is desired to position the folded over portion of the third layer between the fast flow streamline 1103 and the inside surface of the inside layer A, the interface 1115 will be positioned at a first location which is radially inboard of flow streamline 1101, i.e., radially closer to the central axis of t he flowing material streams.

Referring to FIG. 131, the third step is interposing the flow of material of a third layer of the flow stream, layer C, around the first (A) layer and between the first (A) and second (B) layers. In the preferred embodiment, the third layer (also referred to herein as an internal layer) is the barrier layer which, for example, may be EVOH. The location of the third layer is at a position which is not coincident with the flow streamline 1101 in the channel 546 that corresponds to the fast flow streamline 1103 in the injection cavity 1105. At the stage of the process depicted in FIG. 131, the flow of the third (C) layer material has been interposed between the first and second layers to the extent that the third layer material is interposed at substantially all places around the circumference of the annulus between the first and second layers. For the purpose of illustrating the benefit of the foldover aspect of the present invention, FIG. 131 shows time bias of initial flow of the internal layer (C) material, into the injection channel 546, around the circumference of the channel. Thus, the terminal end of the internal layer has an axial leading portion 1117 and an axial trailing portion 1119 at different places around the circumference of the annular terminal end.

Figure 132:
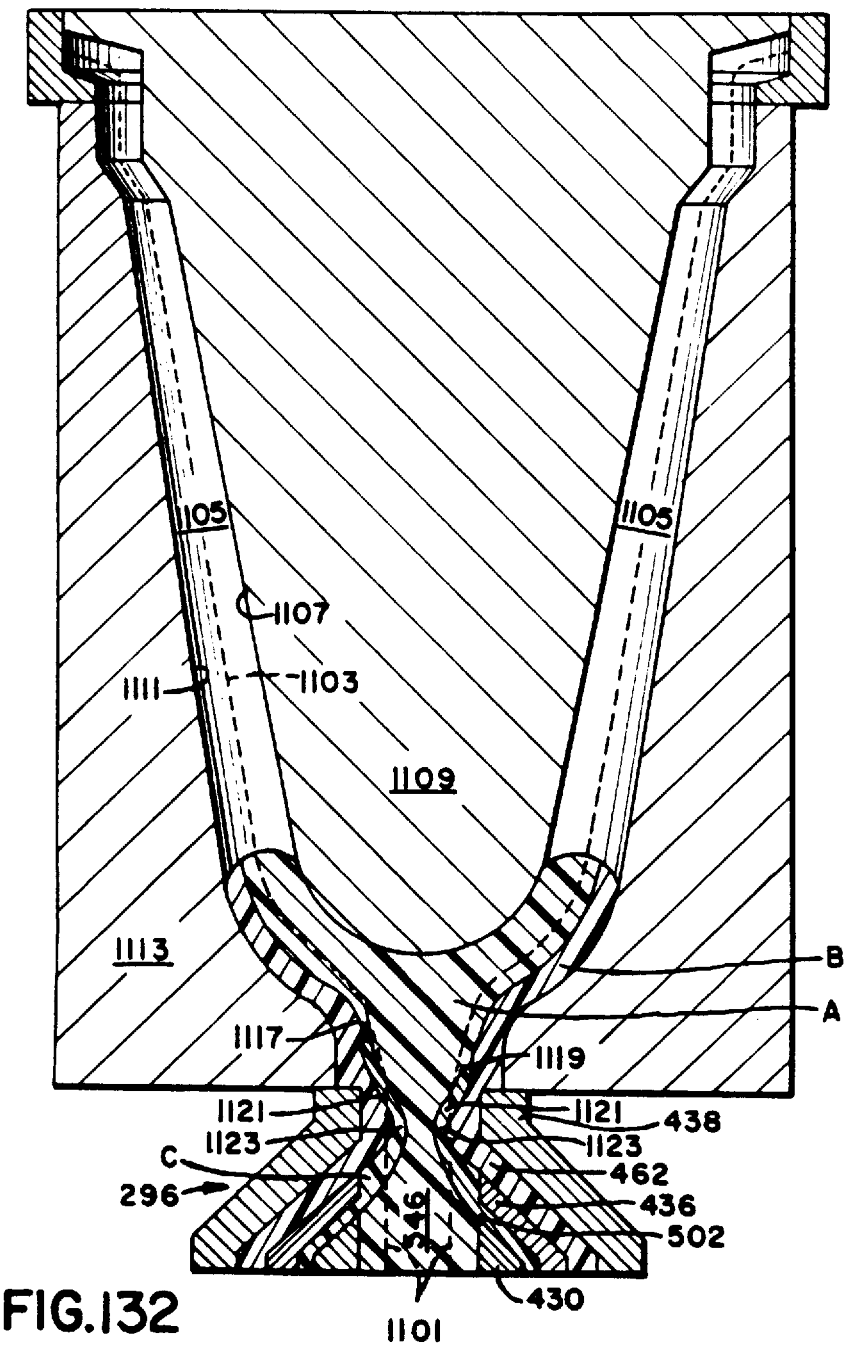

When, or shortly after, the flow of the third (C) layer material has been interposed between the first and second layers at substantially all places around the circumference of the annulus between the first and second layers, the relative rates of flow of the first (A) and second (B) layer materials into the injection channel 546 are adjusted to move the location of the third layer to a second location in the channel 546 (see FIG. 132). The second location of the third layer is relatively more proximate to, or substantially coincident with the flow streamline 1101 in the injection channel which corresponds to the fast flow streamline 1103 in the injection cavity (see FIGS. 136, 137), or the second location is across the flow streamline 1101 (see FIGS. 130–135). Because it is sometimes difficult in practice to place the second location of the third layer precisely on flow streamline 1101, it is preferred to move the location of the third layer across streamline 1101 in order to ensure that at least some part 1121 of the material of the third layer is coincident with streamline 1101 at substantially the same axial location in the multi-layer flow stream at substantially all locations 360° around the annulus of the third-layer material flow stream. As will be explained, it is this part 1121 of the third layer material which, by reason of its being located on the flow streamline 1101 (which corresponds to the fast flow streamline 1103 in the injection cavity), will have the highest speed of flow in the injection cavity 1105. Part 1121 will form a fold or "fold line" about which the third layer is folded over. The fold line will become the "leading edge" of the third layer. Because part 1121 of the third layer crossed over the flow streamline 1101 (and thus at that cross-over place became coincident with the streamline 1101) at substantially the same flow stream axial location around substantially all 360° of the circumference of the annulus of third layer material, there will be substantially no axial bias of the fold line and hence substantially no axial bias of the leading edge of the internal (C) layer. As a result, the folded over, leading edge of the internal layer will extend into the marginal end portion 12 of the wall 11 of the injected article at substantially all locations around the circumference of the end portion at the conclusion of polymer material movement in the injection cavity. Thus, the detrimental effect of any time bias of initial flow of the internal layer (C) material will have been overcome.

In the case where there is time bias of initial flow of the third or internal (C) layer, the time when the flow of that material has been interposed between the first and second layers at substantially all places around the circumference of the annular interface between the first and second layers is determined as follows. An injected article or a free injected shot of the multi-layer flow stream is examined and the axial separation between leading portion 1117 and trailing portion 1119 is measured. From the measured axial separation and the known geometry of the nozzle central channel 546 and of the rest of the nozzle assembly, the time interval between entry of leading portion 1117 into the channel 546 and entry of trailing portion 1119 into the channel may be calculated. In the preferred embodiment, the time when leading portion 1117 begins to flow into the nozzle central channel is the time when the sleeve 800 begins to unblock orifice 502. The sum of this time plus the above-calculated time interval is a close approximation of the time when the internal layer has been fully, circumferentially interposed between the first and second layers.

If, just prior to the introduction of the layer C material into the nozzle central channel, the location of the interface between the flowing A layer material and the flowing B layer material is radially farther from the central axis of the flowing melt streams than the location of flow streamline 1101, the previously-described change in A/B flow rates is selected to move the interface location toward the central axis to a second location closer to the central axis of the flowing melt streams. The second location is either coincident with the flow streamline 1101 or the second location is across the streamline 1101 and closer to the central axis of the flowing melt streams. This will cause foldover of the terminal end of the internal layer C material to occur and the folded portion of the layer C material will be located between the remaining, unfolded portion of the layer C material and the outside surface of the injected article at the conclusion of all melt material stream movement in the injection cavity at the end of the injection cycle. Conversely, if, just prior to the introduction of the layer C material into the nozzle central channel, the location of the interface between the flowing A layer material and the flowing B layer material is radially closer to the central axis of the flowing melt streams than the location of flow streamline 1101, the relative flow rates of the layer A material and the layer B material will be subsequently changed to move the interface location across the flow streamline 1101 to a second location which is either coincident with flow streamline 1101 or is across flow streamline 1101 and which is farther from the central axis of the flowing melt streams. This will cause foldover of the terminal end of the internal layer C material to occur, and the folded portion of the layer C material will be located between the remaining, unfolded portion of the layer C material and the inside surface of the injected article at the conclusion of all melt stream movement in the injection cavity at the end of the injection cycle.

Referring to FIG. 132, the relative rates of flow of the first (A) and second (B) layer materials are adjusted (B increased, A decreased) to move the location of the internal layer to a second location 1123 which is across, i.e., on the other side of, the flow streamline 1101 in the injection channel that corresponds to the fast flow streamline 1103 in the injection cavity.

The injection of the multi-layer flow stream is continued, and the part 1121 of the third layer material which was located on flow streamline 1101 in the injection location is across the streamline 1101 and closer to the central axis of the flowing melt streams. This will cause foldover of the terminal end of the internal layer C material to occur and the folded portion of the layer C material will be located between the remaining, unfolded portion of the layer C material and the outside surface of the injected article at the conclusion of all melt material stream movement in the injection cavity at the end of the injection cycle. Conversely, if, just prior to the introduction of the layer C material into the nozzle central channel, the location of the interface between the flowing A layer material and the flowing B layer material is radially closer to the central axis of the flowing melt streams than the location of flow streamline 1101, the relative flow rates of the layer A material and the layer B material will be subsequently changed to move the interface location across the flow streamline 1101 to a second location which is either coincident with flow streamline 1101 or is across flow streamline 1101 and which is farther from the central axis of the flowing melt streams. This will cause foldover of the terminal end of the internal layer C material to occur, and the folded portion of the layer C material will be located between the remaining, unfolded portion of the layer C material and the inside surface of the injected article at the conclusion of all melt stream movement in the injection cavity at the end of the injection cycle.

Referring to FIG. 132, the relative rates of flow of the first (A) and second (B) layer materials are adjusted (B increased, A decreased) to move the location of the internal layer to a second location 1123 which is across, i.e., on the other side of, the flow streamline 1101 in the injection channel that corresponds to the fast flow streamline 1103 in the injection cavity.

Figure 133:
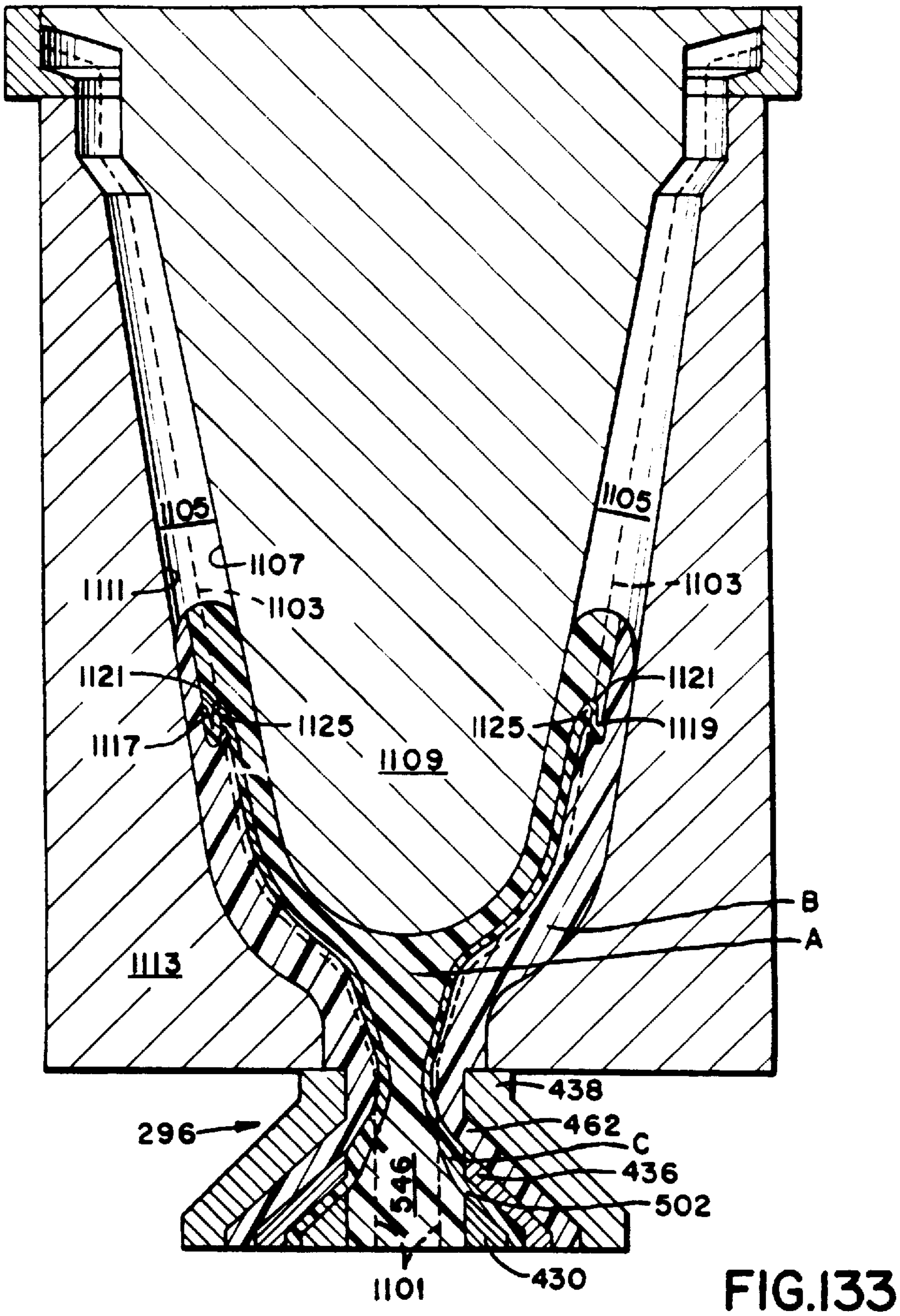

The injection of the multi-layer flow stream is continued, and the part 1121 of the third layer material which was located on flow streamline 1101 in the injection channel is located on fast flow streamline 1103 in the injection cavity. Part 1121 has a speed of flow in the injection cavity which is faster than that of either the axial leading portion 1117 or axial trailing portion 1119 of the terminal end of the internal (C) layer material. As the injection continues, part 1121 forms a fold or "fold line" 1125 (see FIG. 133) which flows faster than portions 1117 and 1119 and overtakes them, and thus becomes the leading edge of the internal layer. In FIG. 133, folded part 1121 has overtaken axial trailing portion 1119; in FIG. 134, the injection has further continued and folded part 1121 has now overtaken axial leading portion 1117. The leading edge of the internal layer is the fold line 1125 of the folded over internal layer at folded part 1121. The leading edge of the internal layer has substantially no axial bias and, as shown in FIG. 135, extends into the flange portion 13 of the injection molded article, here a parison, at substantially all locations around the circumference thereof at the conclusion of polymer material movement in the injection cavity.

As mentioned previously, when or shortly after the flow of the third layer material has been interposed between the first and second layers at substantially all places around the circumference of the annular interface between the first and second layer materials, the relative rates of flow of the first and second layer materials into the injection channel are adjusted to move the location of the third layer to a second location in the channel. FIGS. 136, 137, illustrate the second location being substantially coincident with the flow streamline 1101 in the injection channel which corresponds to the fast flow streamline 1103 in the injection cavity.

Referring to FIG. 136, the relative rates of flow of the first (A) and second (B) layer materials are adjusted (B increased, A decreased) to move the location of the internal layer to a second location 1127 which is substantially coincident with the flow streamline 1101 in the injection channel that corresponds to the fast flow streamline 1103 in the injection cavity 1105. Portion 1129 of the third layer material is the part of the third layer material which first became substantially coincident with flow streamline 1101. As the injection of the multi-layer flow stream continues, portion 1129 forms a fold or fold line about which the third layer is folded over. (See FIG. 137) As before, the fold line becomes the leading edge of the third layer. Because part 1129 of the third layer material became substantially coincident with the flow streamline 1101 at substantially the same flow stream axial location around substantially all 360° of the circumference of the annulus of third layer material, there is substantially no axial bias of the fold line and hence substantially no axial bias of the leading edge of the internal (C) layer.

The present foldover invention has particular utility in apparatus and process which, in a multi-nozzle machine, simultaneously injection molds a plurality of multi-layer articles. For example, in an eight-cavity machine there may be a small time bias of initial flow of internal layer material into the injection channel of one of the eight nozzle assemblies, leading to the production of less than optimum articles from that nozzle and associated injection cavity. By utilizing the aspect of the present invention which provides a substantially equal flow and flow path to each nozzle for each separate stream of polymer material, substantially the same relative rates of flow of the first and second layer materials can be obtained in each of the eight nozzle assemblies. Then, by an appropriately-timed change of rate of movement of ram 232 (for layer B material) and ram 234 (for layer A material), there is caused to occur a substantially simultaneous adjustment in each of the eight nozzles of the relative rates of flow of the first (A) and second (B) layer materials. This causes movement, substantially simultaneously in each of the eight nozzles, of the location of the third layer in the injection channel from the first location, previously described, to the second location, also previously described. The movement of the third layer location from the first to the second location is timed to occur when or shortly after the flow of the third layer material has been interposed between the first and second layers at substantially all places around the circumference of the annulus or interface between the first and second layers in all of the nozzles. Thus, the third layer will be concurrently folded over in the articles made in all of the injection cavities and the effect of time bias of initial flow of the internal layer in any one or more of the injection nozzles will be corrected.

It should be appreciated that in the embodiment of the injection mold 1113 shown in FIGS. 130–137, surface 1111 of the injection mold extending from and forming the transition from the sprue orifice to the portion of the cavity 1105 which forms the parison wall, has a smooth radius of curvature which provides a greater volume for material than a conventional narrower orifice with a sharper, angular transitional surface juncture. The greater volume permits more inner structural A layer material to form between the surface of the tip of the core pin 1109 and the internal C layer material. This can be advantageous when the C layer material is a moisture sensitive barrier material and it is desired to form a thick layer of inner structural material to protect the internal barrier layer of the finished container from liquid contents.

It should also be appreciated by those skilled in the art reading the present specification that the foldover invention is applicable to a multi-layer flow stream having more than three layers such as, for example, the five-layer flow stream previously described and which consists of layers A, B, C, D and E. With reference to that five-layer flow stream, the terms "internal layer" or "material of a third layer" or "third layer" are to be understood as meaning the three adjacent internal layers (C, D and E) which are caused to flow and to move substantially as a unit from the first location to the second location in the injection channel.

The task sequence, or process flow, for a single cycle is shown in FIG. 140. The time axis of FIG. 140 corresponds to the time axis shown in FIGS. 142 and 143. For purposes of explanation, a cycle will be defined as a point tA in time beginning just prior to the clamping operation, effected by means of the hydraulic cylinder 120 (FIG. 11), moving the moveable platen toward and away from the fixed platen, along the tie bars, and ending at a corresponding point in the next cycle. Thus, the beginning of an initial cycle takes place just prior to a clamping operation at time tA. As the cycle progresses, the cylinder 120 begins to move and at time tB the clamping pressure starts to build up. An accurate clamping action occurs by virtue of the process controller opening and closing valves to regulate the oil flow to the hydraulic cylinder. Further, at time tB, the timing cycle for blow molding begins. This consists of a blow air delay followed by a blow air duration of specific time length. The blow air delay allows sufficient time for clamping pressure to reach the desired limit prior to the blow molding operation so as to prevent misshapen articles. At time tC, when the clamp is at full pressure two other timing cycles begin, the first being the injection/recharge cycle, described in FIGS. 142 and 143, the second is the ejection cycle. At the end of the blow mold delay, the ejection of the molded article from the blow mold occurs by opening the blow mold and pushing out the base punch. During this same time period starting at tC, in the injection molding operation, after an initial injection delay, the injection profile, which will be described in conjunction with FIGS. 142 and 143, takes place. At time tD, the injection operation is completed and a period of time for parison conditioning occurs. Parison conditioning allows the parison to cool to a temperature sufficient for blowing the parison in the blow mold.

At the end of the parison conditioning, at time tF, a signal is provided for cut off of the air blowing cycle in the blow molder if it has not already been turned off by the blow air duration timer. At the same time, the opening of the clamp is initiated. After an initial delay period during which the clamping pressure drops, a further time period allows for the opening of the clamp. When the clamp is opened the core and parison come out of the cavity and withdraw to a position determined by appropriate limit switches. At this moment the shuttle starts to move so that the parison is then transferred to the blowing station and a further set of cores are provided in front of the injection molding station. At this point, the cycle has been completed and the clamp closing following shuttle movement initiates the next successive cycle. Going back to the time tD, at the same time that parison condition begins, the ending of the injection profile also starts a recovery check delay time interval. During the recovery check delay, the position of the screws are monitored to ascertain that the screws have recovered to their correct positions prior to initiating a new screw injection cycle. This is done by monitoring the limit switches which are established on the screws at appropriate positions. If the screws have recovered properly, two actions are initiated. First, screw injection is initiated, and then ram recharge is initiated. During screw injection, the melt in the screw is pressurized and, if the melt pressure in the screw exceeds the melt pressure in the ram/runner system, a check valve opens allowing melt to be transferred from the screw to the ram/runner system. Ram recharge is preceeded by a check on which rams need recharging by virtue of their position at this time (tE). If the rams are not at the initial position of the injection profile, they need recharging. The rams needing recharging are then retracted to their initial position. Since this ram movement expands the volume of the ram/runner system, the melt pressure drops, opening the check valve allowing the screws (undergoing screw injection) to transfer melt to the rams, thereby recharging the rams. With the rams now at their initial profile position, a time period is provided to allow the pressure in the runner and ram block to reach equilibrium. At the end of this delay (tG), the hydraulic pressure to the screw is released causing the melt pressure in the screw to drop and thereby closing the check valve trapping the melt in the ram/runner system. Subsequently, screw recovery begins. At this point, time tH, the entire operation has cycled to the equivalent positions with regard to all sequences as occurred at time tA. The cycle then repeats.

The various functions described hereinabove are achieved by means of a suitable system control means, described now in further detail.

In a preferred embodiment, referring to FIG. 141, a general system block diagram for effecting the foregoing operation is illustrated. With reference to FIG. 141, the system processor 2010 is coupled to control and monitor the various machine functions of the operation. Thus, the system processor 2010 controls the cycling of the clamping mechanism 2012, the shuttle controls 2014, and the blow molding control 2016, and responds to inputs received from various condition monitors and limit switches 2018 which monitor the extent of the movement and operation of the clamp mechanisms, the shuttle control and the blow molding control. It will be understood that the block referred to as clamping control 2012 provides timed sequences resulting in the movements of the platens into and out of relative positioning, an operation involving activating the hydraulic cylinder 120 after a specific time period, measuring its progress by limit switches appropriately positioned, and deactivating the cylinder at the appropriate moment and position. Alarm limits can be set if the appropriate position is not reached within a specific time period. These operations are similarly effected in the shuttle control 2014 and blow molding control 2016 for controlling the sequences as set forth in the task operational sequence of FIG. 142.

In conventional injection molding operations, injection profiles are frequently set or controlled by means of a pin programmer or like device for providing a patterned injection cycle. The present invention makes use of distributed processing for more accurately monitoring and controlling the more complex functions involved in the novel and unique injection processing necessary to create the multilayer article of the present invention. Thus, a control microprocessor 2020 is provided with appropriate interfaces for receiving and displaying information from a terminal and keyboard unit 2022. The microprocessor 2020 interfaces further with the injection screw control 2024 which, in turn, is used to supply start and stop signals for driving the three injection screw motors 2026, corresponding to motors 214, 216 and 218, shown in FIG. 11. Positions of the screws themselves, see FIG. 11, are position monitored by limit controls 2028 coupled to the screws at appropriate locations (not shown) and which provide input signals to a position sensing control 2030. The sensing control 2030 converts the signals to appropriate logic levels, and feeds them back to the microprocessor 2020 for appropriate error or abort controls. The microprocessor 2020 also interfaces with the ram control 2032 which, in turn, provides drive on command potentials to the time ram servos shown representationally as 2034, and more precisely as servos 234(A), 232(B), 252(C), 260(D) and 262(E), e.g., in FIG. 14. The sensors 2036, shown in FIG. 18A, monitor the ram positions and provide input signals to sensing means 2030, indicating improper positioning, thereby initiating error or abort conditions. The microprocessor 2020 also interfaces with the pin servo and sleeve servo controls 2040 which in turn provide drive or command potentials to the two sensors 2042, each of which respectively controls the relative positions of the cam bars 850 and 856, shown in FIG. 30, for the purposes of controlling the pin 834 and the sleeve 800. Position of the cam bars are monitored by sensor mechanisms 2044 and provide input signals to indicate improper positioning, thereby initiating trial or abort conditions. All of the data received through the sensor 2030 is applied to the microprocessor 2020 for integration in the overall control sequence. In addition, the microprocessor 2020 is provided with read only memory 2041 containing the programs controlling the sequences, an arithmatic unit 2043 for calculations, and a random access memory 2045 for performing active storage and data manipulation.

Referring to FIGS. 142 and 143, a typical injection profile labelled, A, B, C, D and E (corresponding to rams 234(A), 232(B), 252(C), 260(D) and 262(E) respectively as seen in FIG. 14 represent the command signals in millivolts, applied to the servo board for driving the rams which apply pressure to the polymer melt in channels A–E. The curves F and G represent the sleeve and pin displacements respectively. On the characteristic curves A–E, positions indicated with a dot along those curves and with circles on the pin and sleeve curves, represent the positions at which the relative sleeve and pin displacements result in an opening of the respective feed channel and the resultant release of polymer melt into the nozzle central channel. Indications of closings on these curves are omitted for clarity since most would be located in the area of the superimposition of the curves. The slash lines along pin and sleeve curves represent the points at which those channels are closed as a result of subsequent movements of the sleeve and pin. The specific opening and closing times of FIG. 142 are correlated to table II. The results of these movements can be see in FIG. 143, which represents measured pressure of the melt at a fixed reference position, as set forth in the above description, as a function of time. The variations in pressure are a direct result of the variation in ram servo command voltages, pin servo command voltages and sleeve servo command voltage.

The microprocessor 2020 is shown in greater detail in FIG. 144. As shown therein the concept of distributed processing is employed for the various functions described. The microprocessor 2020 is designed as a series of circuit boards contained within a card cage having appropriate edge connectors for inter-board connections. A master processor circuit board 2046 interfaces with a Tektronix type 4006 graphics terminal, described as unit 2022 in FIG. 141, and a printer. The microprocessor board 2046 is an Intel type 80/20-4 and consists of 8000 bytes of local programmable read only memory (PROM) addressable in hex format from 0000 to 1FFF, and containing the programs needed for operation. The Intel MULTIBUS (TM) system is employed for common databus and addressing, as well as to interface to the master processor board. The slave processor circuit board 2048, which employs the same commercially available Intel microprocessor, is coupled to the MULTIBUS and thus to the system processor 2010. Coupled to the MULTIBUS are a high speed math circuit board 2050 for the master unit 2046, and a high speed math circuit board 2052 for the slave unit 2048. Both math boards are conventional Intel SPC 310 units. Also coupled to the MULTIBUS is an additional 32,000 bytes of PROM/ROM memory on a commercially available circuit board 2054 available from National Semiconductor Co. Model BLC8432, and including hex data addresses 2000 to 8FFF. An additional memory board contains 32,000 bytes of random access memory 2056, and is addressed from 8000 to FFFF. The overlap in memory on this board is pre-empted by the PROM board. The board 2056 is coupled to the MULTIBUS for operation with the slave processor board 2048. An I/O board 2057 is provided, Intel type SBC519, of conventional design, and provides drive signals from the microprocessor to the various solenoids used for valve activation to drive the hydraulic motors and cylinders. Opto isolation for buffering these signals from the various solenoids is provided. Opto isolation, for the purposes of electrically buffering signals, is provided to isolate the microprocessor board from high voltage transient or other miscellaneous noise signals which may otherwise be present in the various system sensors or limit switch positions. Further opto isolation is provided for the specific circuit boards 2058 and 2060 for processing input signals will be described in further detail below. An additional board slot 2062 is provided for any additional circuit boards necessary.

Digital signals applied along the data lines through the MULTIBUS in accordance with commands received from the slave processor circuit board 2048 are provided through the digital to analog conversion circuit board 2064, which is a conventional Burr Brown type MP8304. The signals from this circuit are used to drive rams A, B, C, and D by application to a multi-channel servo loop circuit board 2066 which in turn provides conditioned analog servo signals for the purpose of driving the servo-mechanisms used to position the rams and pin 834 and sleeve 800. An additional digital to analog circuit board, similar to the circuit board 2064, is used to provide conditioned analog servo signals from digital commands to the servo loop circuit board 2066 for the purpose of driving the fifth ram E and the two pins F and G. Analog feedback signals received from the servo mechanisms are converted back into digital signals for use by the microprocessor through an analog to digital circuit board 2070, model No. RTI1202, manufactured by Analog Devices.

With reference to FIG. 145, a circuit representative of circuit boards 2058 and 2060 is shown. Limit switch signals are fed in along appropriate input terminals indicated generally as 2072, and fed through logic circuit 2076. Circuit elements 2077 are opto isolation circuits which act to shield the processor logic from machine noise, transients and the like which are present in limit switch closing and other kinds of machine related interference. These signals are then fed to encoding units 2078, which are multiplexing circuits, which in turn provide appropriate output signals to unit 2080, which is a conventional keyboard controller. The keyboard controller encodes the input position for the purpose of providing a specific digital code along its output line through buffer circuitry 2082 directly on to the data lines described as D0–D7. In operation, when this circuit is addressed along the MULTIBUS, any appropriate data signal indicating a limit switch will be provided along the MULTIBUS. The part numbers employed in this diagram are commercially available conventional logic circuitry, and the operation of the circuit will thus be apparent to those skilled in the art.

Referring to FIG. 146, a more specific circuit detail of the servo loop board 2066, shown in FIG. 144, and showing a single channel servo loop, is illustrated. As will be evident, the D-A conversion boards 2064 and 2068 shown in FIG. 144 provide the analog signals to the servo loop board where they pass through the servo amplifier units shown generally as 2090. The output of each of these servo amplifiers provides signals through a terminal connector to drive the servo valves. Position feedback signals are provided from the velocity transducers LVT (such as 184, FIG. 18B) and the position (linear motion) transducers LVDT (such as 185, FIG. 18B) and applied to the inputs of the servo amplifiers 2090.

The position transducers, shown mechanically in FIG. 18A, are potentiometers with their respective arms mechanically coupled to move linearly in accordance with their respective servos positions. Of course, other forms of transducers may be employed. The transducers thus provide both position signals and velocity signals. The velocity signal is employed as a gain adjustment factor to the operational amplifier A791, while the position feedback signal controls the actual servo position in the instrumentation amplifier AD521. The output of amplifier A791 drives the servo valve. The velocity feedback may not be needed if the amplifier range and sensitivity are sufficient. Although only a single loop is shown, it will be understood that a servo loop exists for each servo valve.

FIG. 147 is a flow diagram showing the operation of the processor 2020 of FIG. 144. The beginning point 0 in FIG. 147 represents the time sequence at which the processor program begins its cycle, and the point 81 represents the end reference point of the processor cycle. Points 81 and 0 substantially coincide since the new cycle begins right after point 81. According to the convention adopted in FIG. 147, the diamonds represent information to be supplied or questions asked regarding various logic conditions and the information and answers determine the path to be taken to the next step. Thus, the word "yes" or "no" is written adjacent to the arrows extending from each diamond to indicate the logic condition or how the question contained within the diamond has been answered and the resulting path to be followed. The rectangles in FIG. 147 contain instructions to the various logic or memory elements involved and the instruction is presumed to be carried out at that position in the flow diagram. The arrows on the connecting lines indicate the direction of flow of the steps through the diagram.

With reference now to FIG. 147, the flow chart illustrating the programmed sequence of the injection and recharge cycle controller unit 2020 of FIG. 144 will be described. The microprocessor unit 2020 is capable of two operations, the first being the actual control of the injection and recharge cycles, and the second being a process diagnostic check for analyzing the quality of the melt system referred to as a recharge injection sequence. The diagnostic check is employed to insure the microprocessor's sequences are working properly and provides a test routine whereby the entire processor unit may cycle through but in which the clamp does not operate. An actual operating cycle must include the recharge injection sequence with clamp operation. The recharge injection sequence therefore permits diagnostics to be provided in the processor control prior to actual molding cycles to insure proper operation of the equipment. With reference to FIG. 147, starting at reference point 0, a decision is made at block 2110 to see whether the keyboard operator has indicated a recharge injection sequence or complete mode. If a complete mode is indicated, then at block 2112 a second check is made to determine whether the clamp is to be closed at this point in time, and if so, at block 2114 a safety gate check is made to ascertain whether the switch has been closed indicating that the safety gates surrounding the injection molding machine are secure and in position. After a 50 millisecond delay, the status line indicating an "injection ready" signal is placed into a logic position indicating that the injection ready signal is on. When the injection ready signal is on, the clamp is then allowed to close subject to the appropriate clamp closing conditions, these being that the mold open timer has timed out and that the shuttle limit switch is tripped, indicating that the mold operation previously accomplished has been completed and the shuttle is now in its correct position. Beginning at reference point 6, in block 2118, the various ram positions are read, command values are set, and ram selection is made. These values, as will be explained in further detail below, are calculated from the profile which is previously set into the processor by means of the input terminal 2022, FIG. 141. Calculation of the command values based upon the profile determines the process parameters by which the ultimate article is made, in accordance with these profiled parameters.

At block 2120, the processor actuates the solenoid valve which diverts hydraulic oil to either the screw motor or to a cylinder driving the screw. At this time point, the solenoid shifts into a condition which turns off the screw motor but does not apply pressure to the screw. Then, at block 2122, if the screw recovery check indicates that the screws have not recovered, as indicated by a lack of signal from a screw recovery limit switch, then at block 2124 the screws are again turned on. At block 2126, a delay is provided to allow the screws further time to recover, and at block 2128 the screw positions are checked again. If screw recovery time is longer than the additional 3 seconds provided, in block 2126, the program is automatically aborted with an appropriate message transmitted to the operator terminal. It will be recalled that the plastic pellets are fed from the hopper to the screw. As the screw rotates, pellets are transferred along the screw by virtue of the rotating screw helix. As the pellets travel along the barrel, they are heated by external means such as electricity, hot oil or the like, and as they soften are compressed by the diminishing volume within the screw flights. Further heating occurs by compression and shearing so that the plastic melts. This melt is then forced in front of the screw and, if the melt is unable to exit the barrel by virtue of closed valves, creates a pressure against the front of the screw, forcing it back. Eventually the limit switch trips, activating a valve, and turning off the screw drive. The melt pressure will decay as the screw is forced back further. As the pressure is applied to the back of the screw the melt pressure in front of the screw rises proportionally and will be forced out the barrel, unless the valve blocks the flow. Thus, at block 2120 the screw motor is turned off and screw pressure is set to neutral position where the screw is ready to fill or recharge the rams.

At block 2130, the screw motors are again turned off and at block 2132 pressure is applied to the back of the screw in preparation for ejecting the melt from the extruder. At block 2136, a recharge check is made to determine which rams are to be recharged, an operation taking less than 10 milliseconds, and if any ram is grossly overcharged the system will abort. An abort will provide a message to the operator through the terminal. If any ram is to go through a recharge operation, this operation is initiated at block 2138. The rams are recharged at a prescribed rate, and if the rams are unable to move at that rate (within prescribed error limits) the system will abort. At this point the program continues along the same flow line to delay 2158 which provides time for the melt in the rams, the runners and the screws to come to an equilibrium pressure.

Continuing to block 2160, the screw pressure is now switched to neutral, thereby stopping the screw injection mode. No longer is pressure now being applied to the back of the extruder and thus, the melt pressure in the extruder will begin to drop. As a result, the pressure activated check valve closes, capturing the pressurized melt in the rams. A 50 millisecond delay is provided before turning the screw motor back on at block 2162 starting screw recovery.

At block 2166, ram positions are checked. At block 2170, the processor again checks to see if the system mode is to run complete or to run a recharge injection sequence. A "no" decision indicates the recharge injection sequence has been selected, causing the system flow along flow line 2172 to a point subsequent to the injection ready signal. If the complete mode is indicated, then at 2174 the injection ready logic signal is put on and as a result, the clamp close operation if not previously activated, is now activated, through the system processor operator, and the injection complete signal is turned off. At this point, the microprocessor 2020 waits for the system processor, element 2010 in FIG. 143, to indicate that the clamp, shuttle and blow mold controls have all been appropriately positioned. When positioned, without error, and after an injection delay, the system processor 2010 sends a machine start signal which hands off control of the machine operation from the system processor 2010 to the injection/recharge microprocessor 2020. In block 2176, at time reference point 53, the microprocessor receives its indication from the system processor 2010. At block 2178, the injection ready signal is turned off, indicating that the system is ready to continue. A complete mode check signal is again made in block 2180 in order to allow bypassing of the safety gates if a complete mode is not indicated. If a complete mode is indicated, then the safety gate check is made to insure all appropriate safety conditions are being met prior to actuating an injection sequence. At block 2184, the injection profile now begins. Injection profile consists of a sequence of steps pre-programmed into the microprocessor 2020 for driving the five rams A, B, C, D, and E and the two pins, F and G, through the desired profile which produce the actual article in accordance with the pre-set command values, as previously set forth. At the completion of this operation, in block 2186 the injection complete signal is turned on. This hands control of the machine functions back to the system processor 2010 at which point the mold close timer is started, which, when timed out, allows the clamp to open. In the meantime, at block 2188, the microprocessor checks to see if a new profile has been entered. If so, in block 2190, the system calculates all of the new command values and places all values in memory to be set during the reference point 8,in block 2118, in the next cycle time. The system is then returned to its initial position, block 2192, and the operation then repeats. It will be evident that the microprocessor flow chart thus described accomplishes the various functions ascribed to the microprocessor in the task sequence described in conjunction with FIG. 140. Variations within the task sequence can produce like variations in the microprocessor flow chart and variations within the flow chart.

The microprocessor board layout indicates the two separate processors employed include both master and slave processor boards. The master processor is in charge of handling operator input and the supervision of the machine for safety, concurrency with the printer, concurrency with the operator and communication with the slave processor. The safety functions monitor temperature, pressure, safety gates, emergency stop switch, and the condition of the shared MULTIBUS. The slave processor controls the rest of the injection and recharge cycles of the equipment along with the three extruders and does this on a multi-task system basis with a 10 millisecond clock for production of error messages. The slave processor produces pointers to error messages which are transmitted along the MULTIBUS to the master processor for relation to the user. The slave processor also performs the injection cycle using the injection profile given to it from the master processor. The total amount of memory available for controlling the operation of both the master and slave processors is defined by hexadecimal codes 0000 to FFFF. Referring to FIG. 148, a map showing the location of specific data areas for the memory is shown. Along the uppermost axis of FIG. 148, a complete map is shown showing the relationship between both master and slave processor memory areas and the area including the shared memory. Along the intermediate axis, a breakdown is shown between addresses F000 to FFFF showing the relationship between the two sets of memories for both the master and slave processor in the shared memory area, which contains all the common variables including the profiles, tables and flags used by both processors. A further breakdown from memory locations FF00 to FFFF are provided showing that in the area at the upper end of the shared memory the portion of the memory containing the pre-stored slave math and D to A and A to D conversion routines are stored. The operating system employed by the master processor includes commercially available RMX-80, an operating system available from Intel Corporation, a standard FORTRAN library and a standard PLM library. The specific tasks are also provided in the master processor as well as data for FORTRAN and PLM programs. For purposes of illustration and reference, specific reference is made to Appendix A which shows a complete listing, in hexadecimal code, of the binary values stored in the memory of the slave processor from memory locations 0000 to 1FFF. This listing, termed a "hexdump", is the complete program of the slave processor for performing all of the tasks including the injection profile as described hereinabove. The remainder of the printout shows the programs stored in the memory area shared by both the slave processor and the master processor, and which incorporates the profiles, tables and flags used to invoke various routines and subroutines within the main program in the order desired. The program as shown accomplishes the task sequence and microprocessor flow chart of FIG. 147 for conducting the specific injection profiles and recharging cycles. It will be evident to one skilled in the art that other forms of machine language encoding may be employed to accomplish task sequence described above.

Appendix B is a hexdump of the memory of the master microprocessor, from memory locations 100H to 5135 showing the complete program without Intel RMX-80, FORTRAN 80, PLM 80 libraries for performing all the tasks including the system monitoring and I/O interfacing discussed above. This program, together with the program shown in Appendix A, accomplishes the functions shown in the flow chart of FIG. 147.

Appendix C is a ladder diagram and program listing for the system processor 2010 shown in FIG. 141. The system processor 10 in FIG. 141 is a commercially available model 5TI process controllor available from Texas Instruments. The ladder diagram is a conventional form of illustration of operation of the process controller and indicates in terms of sequences of operation the interrelationship between the system processor and the injection controlling microprocessor including the handoff interrelationship between the two units as was described in greater detail above.

Appendixes A, B and C are part of and are on file with the original specification hereof in the United States Patent and Trademark Office.

What is claimed is:

1. An injection molding machine, comprising:

a plurality of co-injection nozzle means each having an associated injection cavity mold, each nozzle means being adapted to receive a valve means, and each having plural passages for feeding respective ones of plural polymeric materials, a plurality of valve means, there being a separate valve means for each of the co-injection nozzle means and each adapted to operate therethrough to identically permit and prevent the injection of the respective plural polymeric materials from each nozzle means, drive means associated with each valve means and adapted for simultaneously and identically driving the plurality of valve means in a manner that simultaneously provides identical movements of each of the valve means within its associated nozzle means and provides as to each nozzle means simultaneous identical control over the flow and non-flow of the respective plural polymeric materials from each of the co-injection nozzle means, and control means in communication with the drive means, for moving the valve means in a desired mode which provides said identical simultaneous flow controls.

2. The injection molding machine of claim 1 wherein the valve means includes an elongated member.

3. The injection molding machine of claim 1 wherein the injection molding machine is for forming a plurality of multi-polymer material injection molded containers each having a sidewall with a terminal end, an outside surface layer, an inside surface layer and an internal ethylene vinyl alcohol polymer oxygen barrier layer, the nozzle means includes a central injection path, a fixed passageway and associated fixed annular orifice for at least the oxygen barrier material which is to form an internal barrier layer, said passageway including a fixed tapered frustoconical portion to obtain uniform flow of and forming a tapered pool of said material in said passageway adjacent its associated orifice for balancing the flow of the material through the orifice for injection into the cavity mold.

4. The injection molding machine of claim 3 wherein the passageway for the oxygen barrier material includes means for balancing the flow of the oxygen barrier material through said passageway.

5. The injection molding machine of claim 3 wherein the coinjection nozzles have a gate with an open end and extending through the gate, and the orifices are as close to each other as possible and as close as possible to the gate.

6. The injection molding machine of claim 5 wherein the orifice for the oxygen barrier layer material is located within about 100 to 650 mils of the gate.

7. The injection molding machine of claim 6 wherein the injection molding machine includes means for pressurizing the oxygen barrier layer material while it is in its orifice in each nozzle, the means being adapted to pressurize said material while its orifice is blocked to insure uniform onset flow of the material from its orifice such that the leading edge of the oxygen barrier material is substantially uniformly extended into the side wall near its terminal end.

8. The injection molding machine of claim 1 wherein the drive means includes axial travel variation compensation means associated with the valve means for compensating for axial play in the drive means, the valve means, or both, and for dimensional deviations in associated structures by biasing the drive means relative to the valve means.

9. The injection molding machine of claim 8 wherein the variation compensation means includes a compression spring mounted between the valve means and the moving means.

10. An injection molding machine, comprising:

a plurality of co-injection nozzles each having an associated injection cavity mold, each nozzle being adapted to receive valve means, and each having plural passages for feeding respective ones of plural polymeric materials from the nozzle into its associated injection cavity mold, a plurality of identical valve means one only being for each co-injection nozzle and each adapted to operate therethrough to, as to each nozzle, identically permit and prevent the flow of the respective plural polymeric materials into its associated injection cavity mold, drive means associated with each valve means and adapted for simultaneously and identically driving the plurality of valve means through their associated nozzle means, the drive means including moving means for moving each valve means through the co-injection nozzle with which it is associated, and control means connected to the moving means, for moving the moving means in a desired mode which provides in each nozzle simultaneous identical control over the flow and non-flow of the respective plural polymeric materials from each of the co-injection nozzles.

11. The injection molding machine of claim 10 wherein the valve means includes an elongated member.

12. The injection molding machine of claim 11 wherein the injection molding machine is for forming a plurality of multi-polymer material injection molded containers each having an outside surface layer, an inside surface layer and an internal ethylene vinyl alcohol polymer oxygen barrier layer, the nozzle means includes a central injection path, a fixed passageway and associated fixed annular orifice for at least the oxygen barrier material which is to form an internal barrier layer, said orifice including a fixed tapered frustoconical portion for forming a tapered pool of said material in said passageway adjacent its associated orifice to obtain uniform flow of the material through the orifice for injection into the cavity mold.

13. The injection molding machine of claim 12 wherein the passageway for the oxygen barrier material includes means for balancing the flow of the oxygen barrier material through said passageway.

14. The injection molding machine of claim 11 wherein each member has a forward end portion operable within and through a co-injection nozzle and a back end driven by the moving means.

15. An injection molding machine for simultaneously injection molding a plurality of articles each made of a plurality of polymeric materials, comprising:

a plurality of co-injection nozzles, each of said nozzles having an associated injection cavity mold;

each of said co-injection nozzles having plural passages therein for feeding one or more streams of each of said polymeric materials to said molds;

a flow control device, for feeding at least one stream of polymeric material in each nozzle to each of said molds simultaneously.

16. The injection molding machine of claim 15 wherein a first stream of polymeric material is EVOH.

17. The injection molding machine of claim 16 wherein a second stream of polymeric material is PET.

18. An injection molding machine for simultaneously injection molding a plurality of articles each made of a plurality of polymeric materials, comprising:

a source of a first polymeric material;

a source of a second polymeric material;

a plurality of co-injection nozzles, each of said nozzles having an associated injection cavity mold;

each of said nozzles also having a first flow channel for providing a stream of said first polymeric material to said mold and a second flow channel for providing a stream of said second polymeric material to said mold;

a flow control device for feeding said polymeric materials from said sources to each of said nozzles and each of said associated molds, such that each of said streams of said first polymeric material flows from each nozzle into each associated mold simultaneously.

19. The injection molding machine of claim 18 wherein said flow control device also feeds said streams of said second polymeric material flows from each nozzle into each associated mold simultaneously.

20. The injection molding machine of claim 19 wherein said second polymeric material is ethylene vinyl alcohol.

21. The injection molding machine of claim 18 wherein said first polymeric material is PET.

* * * * *